United States Patent
Nowell et al.

(10) Patent No.: US 11,434,901 B2
(45) Date of Patent: Sep. 6, 2022

(54) FLUID END

(71) Applicant: Kerr Machine Co., Sulphur, OK (US)

(72) Inventors: Mark S. Nowell, Ardmore, OK (US); Kelcy Jake Foster, Ardmore, OK (US); Christopher Todd Barnett, Stratford, OK (US); Brandon Scott Ayres, Ardmore, OK (US); Michael Eugene May, Ardmore, OK (US); Guy J. Lapointe, Sulphur, OK (US); Micheal Cole Thomas, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 17/194,461

(22) Filed: Mar. 8, 2021

(65) Prior Publication Data

US 2021/0190067 A1    Jun. 24, 2021

Related U.S. Application Data

(63) Continuation of application No. 16/708,773, filed on Dec. 10, 2019, now Pat. No. 10,941,765.
(Continued)

(51) Int. Cl.
| | |
|---|---|
| *F04B 53/16* | (2006.01) |
| *E21B 43/26* | (2006.01) |
| *F04B 37/12* | (2006.01) |
| *F04B 53/00* | (2006.01) |
| *F04B 39/10* | (2006.01) |

(Continued)

(52) U.S. Cl.
CPC .......... *F04B 53/16* (2013.01); *E21B 43/2607* (2020.05); *F04B 37/12* (2013.01); *F04B 39/10* (2013.01); *F04B 39/123* (2013.01); *F04B 53/007* (2013.01); *F04B 53/164* (2013.01); *E21B 43/26* (2013.01); *F04B 53/22* (2013.01)

(58) Field of Classification Search
CPC ........ F04B 39/10; F04B 39/123; F04B 53/16; F04B 53/007; F04B 53/164; F04B 53/22; F04B 37/12; E21B 43/26; E21B 43/2607
See application file for complete search history.

(56) References Cited

U.S. PATENT DOCUMENTS

| | | |
|---|---|---|
| 1,316,539 A | 6/1919 | Ford |
| 1,822,682 A | 9/1931 | Weiger |

(Continued)

OTHER PUBLICATIONS

U.S. Patent and Trademark Office File History for U.S. Pat. No. 10,591,070, 168 pages, Alexandria, VA—See USPTO Records.
(Continued)

*Primary Examiner* — Christopher S Bobish
(74) *Attorney, Agent, or Firm* — Tomlinson McKinstry, P.C.

(57) ABSTRACT

A flangeless fluid end comprising a fluid end body releasably attached to a connect plate. The connect plate is attached to a power source using stay rods. The flow bores of the fluid end are sealed without threading a retainer nut into the walls of each bore. Instead, the flow bores are sealed by bolting a retainer to the fluid end body. Plungers to drive fluid through the fluid end body are installed within removable stuffing box sleeves. These sleeves are maintained within the plunger bores by the bolted retainers. A number of features, including the location of seals within bore walls and carbide inserts within valve structures, aid in reducing or transferring wear.

22 Claims, 143 Drawing Sheets

Related U.S. Application Data

(60) Provisional application No. 62/859,256, filed on Jun. 10, 2019, provisional application No. 62/777,705, filed on Dec. 10, 2018.

(51) Int. Cl.
*F04B 39/12* (2006.01)
*F04B 53/22* (2006.01)

(56) References Cited

U.S. PATENT DOCUMENTS

| | | | |
|---|---|---|---|
| 2,713,522 A | 7/1955 | Petch | |
| 2,756,960 A | 7/1956 | Church | |
| 2,856,857 A | 10/1958 | Saalfrank | |
| 3,053,500 A | 9/1962 | Atknison | |
| 3,146,724 A | 9/1964 | Cornelsen | |
| 3,173,648 A | 3/1965 | McGuire et al. | |
| 3,179,121 A | 4/1965 | Bredtschneider et al. | |
| 3,257,952 A | 6/1966 | McCormick | |
| 3,373,695 A * | 3/1968 | Yohpe | F04B 53/00 |
| | | | 417/569 |
| 3,427,988 A * | 2/1969 | Schmieman | F04B 53/10 |
| | | | 417/569 |
| 3,474,808 A | 10/1969 | Elliott | |
| 3,589,387 A | 6/1971 | Raymond | |
| 3,679,332 A | 7/1972 | Yohpe | |
| 4,047,850 A | 9/1977 | Berthelot | |
| 4,170,214 A | 10/1979 | Gill et al. | |
| 4,363,463 A | 12/1982 | Moon, Jr. | |
| 4,388,050 A | 6/1983 | Schuller | |
| 4,467,703 A | 8/1984 | Redwine et al. | |
| 4,470,771 A | 9/1984 | Hall et al. | |
| 4,520,837 A | 6/1985 | Cole et al. | |
| 4,768,933 A * | 9/1988 | Stachowiak | F04B 53/1025 |
| | | | 137/543.13 |
| 4,771,801 A | 9/1988 | Crump et al. | |
| 4,773,833 A | 9/1988 | Wilkinson et al. | |
| 4,778,347 A | 10/1988 | Mize | |
| 4,861,241 A * | 8/1989 | Gamboa | F04B 53/1027 |
| | | | 417/454 |
| 4,878,815 A * | 11/1989 | Stachowiak | F04B 53/1025 |
| | | | 417/63 |
| 4,948,349 A | 8/1990 | Koiwa | |
| 4,984,970 A | 1/1991 | Eickmann | |
| 5,059,101 A * | 10/1991 | Valavaara | F04B 53/109 |
| | | | 417/569 |
| 5,073,096 A * | 12/1991 | King | F04B 53/1022 |
| | | | 417/454 |
| 5,145,340 A | 9/1992 | Allard | |
| 5,207,242 A | 5/1993 | Daghe et al. | |
| 5,226,445 A | 7/1993 | Surjaatmadja | |
| 5,362,215 A | 11/1994 | King | |
| 5,370,148 A | 12/1994 | Shafer | |
| 5,507,219 A | 4/1996 | Stogner | |
| 5,524,902 A | 6/1996 | Cornette | |
| D383,053 S | 9/1997 | Schrader et al. | |
| 6,164,318 A | 12/2000 | Dixon | |
| 6,257,626 B1 | 10/2001 | Campau et al. | |
| 6,382,940 B1 | 5/2002 | Blume | |
| 6,419,459 B1 | 7/2002 | Sibbing | |
| 6,544,012 B1 | 4/2003 | Blume | |
| 6,641,112 B2 | 11/2003 | Antoff et al. | |
| 6,910,871 B1 | 6/2005 | Blume | |
| 7,140,211 B2 | 11/2006 | Tremblay | |
| 7,168,440 B1 | 1/2007 | Blume | |
| 7,186,097 B1 | 3/2007 | Blume | |
| 7,290,560 B2 | 11/2007 | Orr et al. | |
| 7,296,591 B2 | 11/2007 | Moe et al. | |
| 7,335,002 B2 | 6/2008 | Vicars | |
| 7,506,574 B2 | 3/2009 | Jensen et al. | |
| 7,513,759 B1 | 4/2009 | Blume | |
| D616,966 S | 6/2010 | Angell | |
| 7,789,133 B2 | 9/2010 | McGuire | |
| 7,828,053 B2 | 11/2010 | McGuire et al. | |
| 7,845,413 B2 | 12/2010 | Shampine et al. | |
| D631,142 S | 1/2011 | Angell | |
| 7,963,502 B2 | 6/2011 | Lovell et al. | |
| 8,100,407 B2 | 1/2012 | Stanton et al. | |
| 8,317,498 B2 | 11/2012 | Gambier et al. | |
| 8,360,094 B2 | 1/2013 | Steinbock et al. | |
| 8,528,462 B2 | 9/2013 | Pacht | |
| 8,528,585 B2 | 9/2013 | McGuire | |
| 8,701,546 B2 * | 4/2014 | Pacht | F04B 53/147 |
| | | | 92/128 |
| D731,035 S | 2/2015 | Lo Cicero | |
| 9,010,412 B2 | 4/2015 | McGuire | |
| D737,497 S | 8/2015 | Burgess et al. | |
| 9,188,121 B1 | 11/2015 | Dille | |
| D748,228 S | 1/2016 | Bayyouk et al. | |
| 9,260,933 B2 | 2/2016 | Artherholt et al. | |
| 9,328,745 B2 | 5/2016 | Bartlok et al. | |
| 9,371,919 B2 | 6/2016 | Forrest et al. | |
| 9,416,887 B2 | 8/2016 | Blume | |
| 9,435,454 B2 | 9/2016 | Blume | |
| 9,534,473 B2 | 1/2017 | Morris et al. | |
| 9,631,739 B2 | 4/2017 | Belshan et al. | |
| D787,029 S | 5/2017 | Bayyouk et al. | |
| 9,732,746 B2 | 8/2017 | Chandrasekaran et al. | |
| 9,822,894 B2 | 11/2017 | Bayyouk et al. | |
| D806,241 S | 12/2017 | Swinney et al. | |
| 10,184,470 B2 * | 1/2019 | Barnett, Jr. | F04B 1/0452 |
| 2002/0166588 A1 | 11/2002 | Dean | |
| 2004/0170507 A1 | 9/2004 | Vicars | |
| 2004/0234404 A1 | 11/2004 | Vicars | |
| 2006/0002806 A1 | 1/2006 | Baxter et al. | |
| 2006/0027779 A1 | 2/2006 | McGuire et al. | |
| 2008/0006089 A1 | 1/2008 | Adnan et al. | |
| 2008/0008605 A1 | 1/2008 | Bauer et al. | |
| 2008/0093361 A1 | 4/2008 | Kennedy et al. | |
| 2008/0279706 A1 | 11/2008 | Gambier et al. | |
| 2010/0243255 A1 | 9/2010 | Luharuka et al. | |
| 2011/0079302 A1 | 4/2011 | Hawes | |
| 2011/0173814 A1 | 7/2011 | Patel | |
| 2011/0189040 A1 | 8/2011 | Vicars | |
| 2011/0206547 A1 | 8/2011 | Kim et al. | |
| 2012/0063936 A1 | 3/2012 | Baxter et al. | |
| 2012/0141308 A1 | 6/2012 | Saini et al. | |
| 2012/0187321 A1 | 7/2012 | Small | |
| 2013/0020521 A1 | 1/2013 | Byrne | |
| 2013/0112074 A1 | 5/2013 | Small | |
| 2013/0202458 A1 | 8/2013 | Byrne et al. | |
| 2013/0319220 A1 | 12/2013 | Luharuka et al. | |
| 2014/0127062 A1 | 5/2014 | Buckley et al. | |
| 2014/0196883 A1 | 7/2014 | Artherholt et al. | |
| 2014/0348677 A1 * | 11/2014 | Moeller | F16K 15/063 |
| | | | 417/559 |
| 2015/0084335 A1 | 3/2015 | Farrell et al. | |
| 2015/0132157 A1 | 5/2015 | Whaley et al. | |
| 2015/0144826 A1 | 5/2015 | Bayyouk et al. | |
| 2016/0123313 A1 | 5/2016 | Simmons | |
| 2016/0160848 A1 | 6/2016 | Toppings et al. | |
| 2017/0089473 A1 | 3/2017 | Nowell et al. | |
| 2017/0002947 A1 | 5/2017 | Bayyouk et al. | |
| 2017/0204852 A1 | 7/2017 | Barnett, Jr. | |
| 2017/0211565 A1 * | 7/2017 | Morreale | F04B 39/125 |
| 2018/0017173 A1 | 1/2018 | Nowell et al. | |
| 2018/0313456 A1 | 11/2018 | Bayyouk et al. | |
| 2019/0011051 A1 | 1/2019 | Yeung | |
| 2019/0128104 A1 | 5/2019 | Graham et al. | |

OTHER PUBLICATIONS

Exhibit B—Gradner Denver, Well Servicing Pump, Model GD-3000 Operating and Service Manual, dated Apr. 2011, (GD-3000), 44 pages.

Exhibit C—National Oilwell Varco 267Q-6M Quintuplex Plunger Pump Parts List, issued Sep. 6, 2000 and revised Jul. 21, 2008 (NOV-267Q), 13 pages.

Exhibit D (Part 1)—Declaration of William D. Marscher, PE, 209 pages.

Exhibit D (Part 2)—Declaration of William D. Marscher, PE, 124 pages.

(56) References Cited

OTHER PUBLICATIONS

Exhibit E—U.S. Patent and Trademark Office File History for U.S. Appl. No. 62/234,483, 45 pages, Alexandria, VA.
Exhibit F—U.S. Patent and Trademark Office File History for U.S. Appl. No. 62/315,343, 41 pages, Alexandria, VA.
Exhibit G—U.S. Patent and Trademark Office File History for U.S. Appl. No. 62/318,542, 44 pages, Alexandria, VA.
Exhibit H—U.S. Patent and Trademark Office File History for U.S. Appl. No. 62/346,915, 41 pages, Alexandria, VA.
U.S. Patent and Trademark Office File History for U.S. Pat. No. 10,591,070, 353 pages, Alexandria, VA—See USPTO Records.
U.S. Patent and Trademark Office File History for U.S. Appl. No. 15/719,124, 183 pages, Alexandria, VA—See USPTO Records.
Exhibit K—Susan Woods, Groove Milling, Cutting Tool Engineering, published Aug. 1, 2012, 11 pages.
Exhibit L—"Weir SPM General Catalog" (2009), 40 pages.
Exhibit M—Groovex, "Groove Milling, High Precision Tools for Groove Milling" brochure, Edition 04, dated Dec. 2012, 24 pages.
Exhibit N—Ricky Smith & R. Keith Mobley, Rules of Thumb for Maintenance and Reliability Engineers, 239-250 (2008), 15 pages.
Exhibit O—Ross Mackay, "Process engineering: Properly seal that pump", Chemical Processing, dated May 17, 2005, 11 pages.
Exhibit P—Vargus Ltd., "Groovex Groove milling", Youtube (Dec. 12, 2011, https://www.youtube.com/watch?v=vrFzHJUXjvk, 68 pages.
Exhibit Q—Paresh Girdhar, Octo Moniz, & Steve Mackay, Centrifugal Pump Design, "Plant and Process Engineering 360°", 521-536 (2004), 21 pages.
Exhibit R—Paresh Girdhar, Octo Moniz, & Steve Mackay, Centrifugal Pump Design and Construction, Practical "Centrifugal Pumps: Design, Operation and Maintenance", 18-47 (2005), 33 pages.

Exhibit S—Gardner Denver, "Well Servicing Pump", Model HD-2250 Operating and Service Manual, dated Jan. 2005, 44 pages.
Exhibit T—Robert Crosier, "Flush Free Sealing Benefits", Empowering Pumps & Equipment, dated Oct. 3, 2011, 5 pages.
Exhibit U—Cat "Quintuplex Well Stimulation Pump", WS255 (2013), 2 pages.
Exhibit V—Oxford "Dictionary of Mechanical Engineering", excerpted (2013), 10 pages.
Exhibit W—United States Patent and Trademark Office, Before the Patent Trial and Appeal Board, "*Cizion, LLC d/b/a Vulcan Industrial Manufacturing, Petitioner* v. *Kerr Maching Co., Patent Owner*"Case PGR2020-00065 U.S. Pat. No. 10,591,070, Petition for Post-Grant Review of U.S. Pat. No. 10,591,070 Under 35 U.S.C. Section 321-329 and 37 C.F.R. Section 42.200 ET SEQ.—197 pages.
International Search Authority "PCT International Search Report", dated Mar. 31, 2020, 3 pages, Korean Intellectual Property Office, Republic of Korea.
Exhibits X-AA include photos of a power end and fluid end known in the are prior to Dec. 11, 2017, 4 pages.
Exhibit AB includes cross-sectional views of fluid end assemblies known in the art prior to Sep. 29, 2015, 4 pages.
Exhibit AC includes side views of valve seats known in the art prior to Sep. 29, 2015, 2 pages.
Exhibit AD is a cross-sectional view of a plunger end of a fluid assembly known in the art prior to Sep. 29, 2015, 1 page.
Exhibit AE includes an engineering drawing and pictures of a mud pump known in the art prior to Sep. 29, 2015, 4 pages.
Exhibit AF is a photograph of a fluid end offered for sale in the United States more than one year prior to Dec. 10, 2018, and also includes patent drawing of a fluid end similar to that shown in the photograph. The drawing was included in U.S. Appl. No. 62/532,574, filed Jul. 14, 2017, 2 pages.
Wikipedia, Washer (hardware), 2017, first page.

\* cited by examiner

DETAIL E

DETAIL F

DETAIL H

DETAIL K

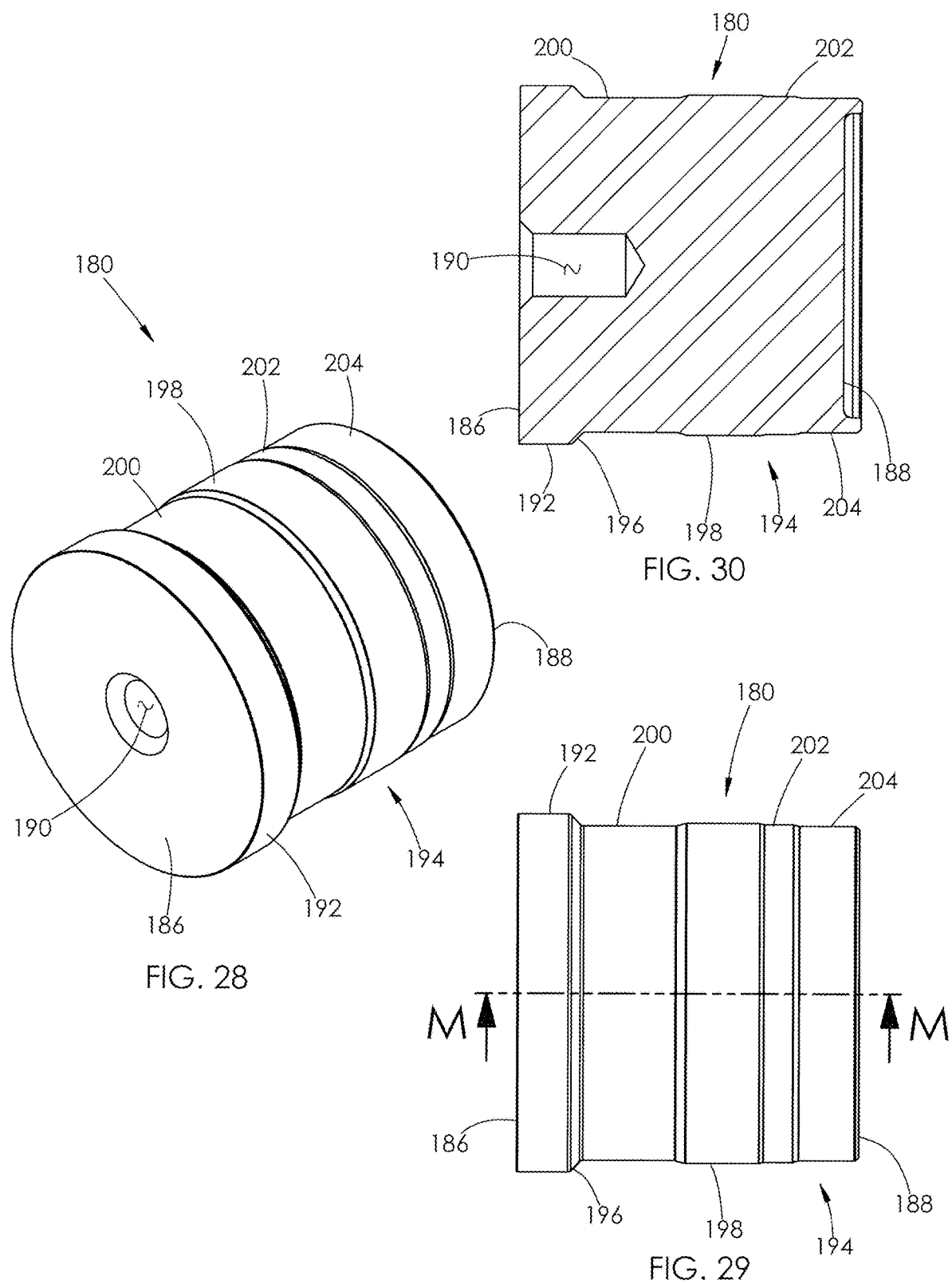

DETAIL N

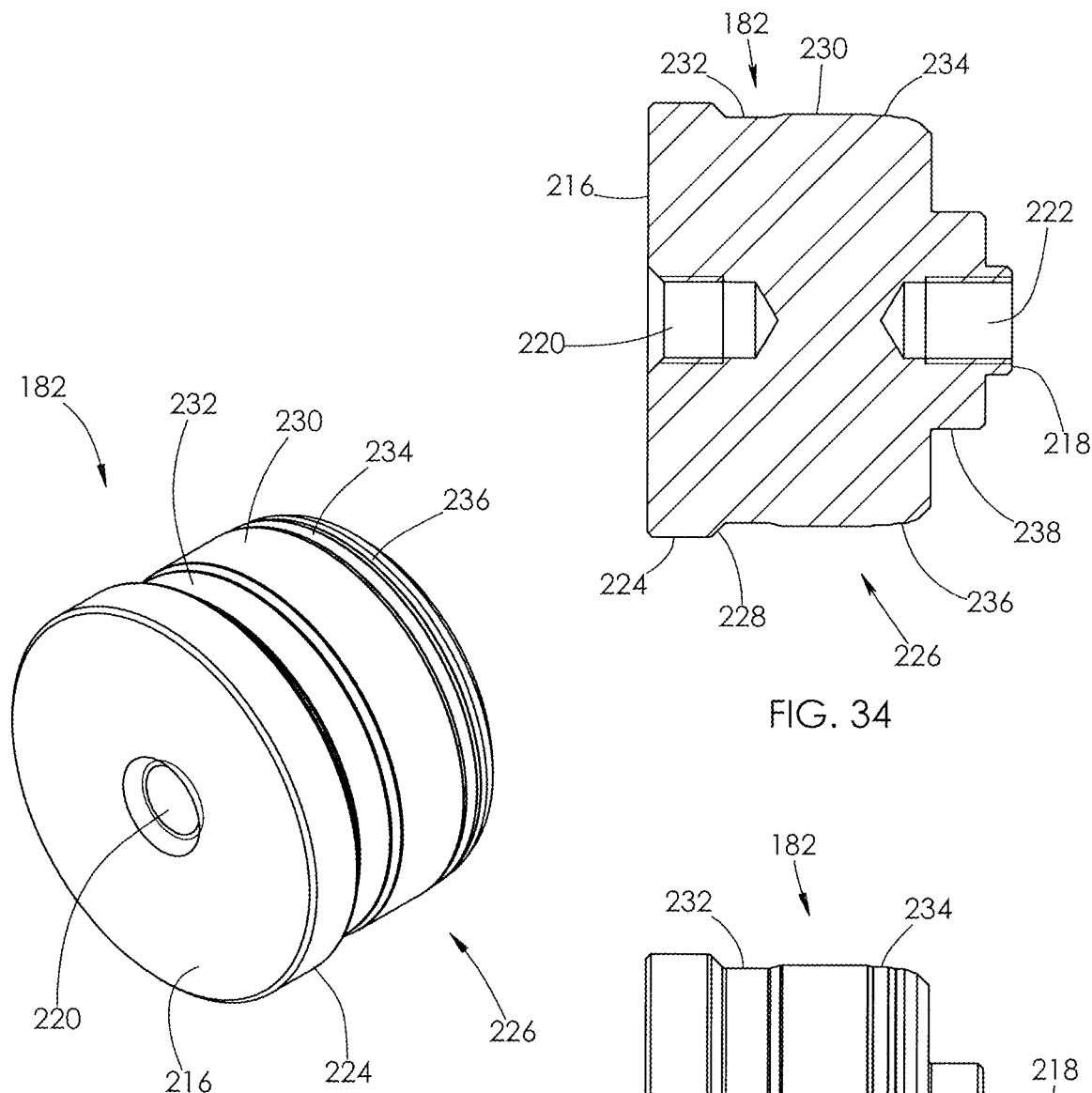
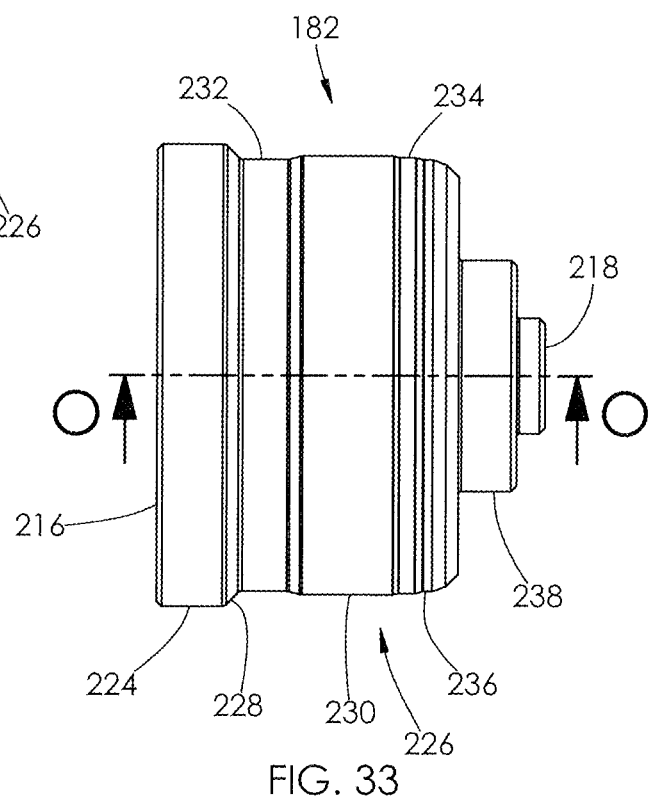
FIG. 32
FIG. 34
FIG. 33

DETAIL P

SECTION A-A

SECTION A-A

FLUID END

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressured fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating at a wellsite 24 in FIG. 2. Each of the fluid ends 22 is attached to a power end 26 in a one-to-one relationship. The power end 26 serves as an engine or motor for the fluid end 22. Together, the fluid end 22 and power end 26 function as a hydraulic pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. The power end used with the fluid end typically has a power output of at least 2,250 horsepower during hydraulic fracturing operations.

High operational pressures may cause a fluid end to expand or crack. Such a structural failure may lead to fluid leakage, which leaves the fluid end unable to produce and maintain adequate fluid pressures. Moreover, if proppants are included in the pressurized fluid, those proppants may cause erosion at weak points within the fluid end, resulting in additional failures.

It is not uncommon for conventional fluid ends to experience failure after only several hundred operating hours. Yet, a single fracking operation may require as many as fifty (50) hours of fluid end operation. Thus, a traditional fluid end may require replacement after use on as few as two fracking jobs.

During operation of a hydraulic pump, the power end is not exposed to the same corrosive and abrasive fluids that move through the fluid end. Thus, power ends typically have much longer lifespans than fluid ends. A typical power end may service five or more different fluid ends during its lifespan.

With reference to FIGS. 3 and 4, a traditional power end 34 is shown. The power end 34 comprises a housing 36 having a mounting plate 38 formed on its front end 40. A plurality of stay rods 42 are attached to and project from the mounting plate 38. A plurality of pony rods 44 are disposed at least partially within the power end 34 and project from openings formed in the mounting plate 38. Each of the pony rods 44 is attached to a crank shaft installed within the housing 36. Rotation of the crank shaft powers reciprocal motion of the pony rods 44 relative to the mounting plate 38.

A fluid end 46 shown in FIGS. 3 and 4 is attached to the power end 34. The fluid end 46 comprises a fluid end body 48 having a flange 50 machined therein. The flange 50 provides a connection point for the plurality of stay rods 42. The stay rods 42 rigidly interconnect the power end 34 and the fluid end 46. When connected, the fluid end 46 is suspended in offset relationship to the power end 34.

A plurality of plungers 52 are disposed within the fluid end 46 and project from openings formed in the flange 50. The plungers 52 and pony rods 44 are arranged in a one-to-one relationship, with each plunger 52 aligned with and connected to a corresponding one of the pony rods 44. Reciprocation of each pony rod 44 causes its connected plunger 52 to reciprocate within the fluid end 46. In operation, reciprocation of the plungers 52 pressurizes fluid within the fluid end 46. The reciprocation cycle of each plunger 52 is differently phased from that of each adjacent plunger 52.

With reference to FIG. 6, the interior of the fluid end 46 includes a plurality of longitudinally spaced bore pairs. Each bore pair includes a vertical bore 56 and an intersecting horizontal bore 58. The zone of intersection between the paired bores defines an internal chamber 60. Each plunger 52 extends through a horizontal bore 58 and into its associated internal chamber 60. The plungers 52 and horizontal bores 58 are arranged in a one-to-one relationship.

Each horizontal bore 58 is sized to receive a plurality of packing seals 64. The seals 64 are configured to surround the installed plunger 54 and prevent high pressure fluid from passing around the plunger 52 during operation. The packing seals 64 are maintained within the bore 58 by a retainer 65. The retainer 65 has external threads 63 that mate with internal threads 67 formed in the walls surrounding the bore 58. In some traditional fluid ends, the packing seals 64 are installed within a removable stuffing box sleeve that is installed within the horizontal bore.

Each vertical bore 56 interconnects opposing top and bottom surfaces 66 and 68 of the fluid end 46. Each horizontal bore 58 interconnects opposing front and rear surfaces 70 and 72 of the fluid end 46. A discharge plug 74 seals each opening of each vertical bore 56 on the top surface 66 of the fluid end 46. Likewise, a suction plug 76 seals each opening of each horizontal bore 58 on the front surface 70 of the fluid end 46.

Each of the plugs 74 and 76 features a generally cylindrical body. An annular seal 77 is installed within a recess formed in an outer surface of that body, and blocks passage of high pressure fluid. The body of each of the plugs 74 and 76 has a uniform diameter along most or all of its length. When the plugs 74 and 76 are installed within the corresponding bores 56 and 58, little to no clearance exists between the outer surface of the body and the walls surrounding the bores.

The discharge and suction plugs 74 and 76 are retained within their corresponding bores 56 and 58 by a retainer 78, shown in FIGS. 3, 5, and 6. The retainer 78 has a cylindrical body having external threads 79 formed in its outer surface. The external threads 79 mate with internal threads 81 formed in the walls surrounding the bore 56 or 58 above the installed plug 74 or 76.

As shown in FIGS. 3 and 4, a manifold 80 is attached to the fluid end 46. The manifold 80 is also connected to an intake piping system, of the type shown in FIG. 2. Fluid to be pressurized is drawn from the intake piping system into the manifold 80, which directs the fluid into each of the vertical bores 56, by way of openings (not shown) in the bottom surface 68.

When a plunger 52 is retracted, fluid is drawn into each internal chamber 60 from the manifold 80. When a plunger 52 is extended, fluid within each internal chamber 60 is pressurized and forced towards a discharge conduit 82. Pressurized fluid exits the fluid end 46 through one or more discharge openings 84, shown in FIGS. 3-5. The discharge openings 84 are in fluid communication with the discharge conduit 82. The discharge openings 84 are attached to a discharge piping system, of the type shown in FIG. 2.

A pair of valves 86 and 88 are installed within each vertical bore 56, on opposite sides of the internal chamber 60. The valve 86 prevents backflow in the direction of the manifold 80, while the valve 88 prevents backflow in the direction of the internal chamber 60. The valves 86 and 88 each comprise a valve body 87 that seals against a valve seat 89.

Traditional fluid ends are normally machined from high strength alloy steel. Such material can corrode quickly, leading to fatigue cracks. Fatigue cracks occur because corrosion of the metal decreases the metal's fatigue strength—the amount of loading cycles that can be applied to a metal before it fails. Such cracking can allow leakage that prevents a fluid end from achieving and maintaining adequate pressures. Once such leakage occurs, fluid end repair or replacement becomes necessary.

Fatigue cracks in fluid ends are commonly found in areas that experience high stress. For example, with reference to the fluid end 46 shown in FIG. 6, fatigue cracks are common at a corner 90 formed in the interior of the fluid end 46 by the intersection of the walls of the horizontal bore 58 with the walls surrounding the vertical bore 56. A plurality of the corners 90 surround each internal chamber 60. Because fluid is pressurized within each internal chamber 60, the corners 90 typically experience the highest amount of stress during operation, leading to fatigue cracks.

Fatigue cracks are also common at the neck that connects the flange 50 and the fluid end body 48. Specifically, fatigue cracks tend to form at an area 92 where the neck joins the body 48, as shown for example in FIGS. 4-6. Flanged fluid ends require sufficient space between the flange and the fluid end body so that a wrench can be manipulated within the gap. During operation, the pumping of high pressure fluid through the fluid end causes it to pulsate or flex. Such motion results in a torque at the fluid end. The magnitude of torque applied at the fluid end is proportional to the distance between the power end and the front surface of the fluid end body: the moment arm. Such distance is extended when a flange is interposed between the power end and the fluid end body.

In the fluid end 46, for example, the space between the flange 50 and the fluid end body 48 lengthens the moment arm that terminates at the body 48. As a result of this lengthening, pulsation of the fluid end 46 produces a torque of greater magnitude at the body 48. This increase in torque magnitude produces greater stress at the area 92, with fatigue cracks eventually resulting.

Additional failure points are commonly found around the discharge and suction plugs 74 and 76 and the packing seals 64, shown in FIG. 6. Over time, the seals 53 and packing seals 64 cause erosion of the walls surrounding the bores 56 and 58. As a result, fluid begins to leak around the plugs 74 and 76 and around the packing seals 64.

Further, because the plugs 74 and 76 fit tightly within their corresponding bores 56 and 58, the plugs are also difficult to install within and remove from the fluid end 46. Significant forces may be needed during installation and removal of these plugs, resulting in scratching or scraping of the walls surrounding the bores 56 and 58. Fluid may eventually leak around the plugs 74 and 76 in the scratched or scraped areas, causing the fluid end to fail.

Failure points are also commonly found around the retainers 65 and 78. These retainers are installed within the bores 56 and 58 via threads. Over time, the cyclical pulsations of the fluid end 46 may cause the retainers 65 and 78 to back-out slightly, allowing the retainer 65 or 78 to move relative to the fluid end 46. Such motion may result in cracked threads or fractures in the walls surrounding the bores 56 or 58.

The large torques required to install and remove the retainers 65 or 78 can also produce cracking of the threads. Such cracking may result in fluid leakage, or may altogether prevent removal of the retainer from the fluid end 46. In such case, the fluid end 46 will need to be repaired or discarded.

During operation, it is also common for the valves 86 and 88 to wear and no longer properly seal. A sealing surface on the valve seat 89 typically experiences the most wear, requiring the valve seats 89 to be replaced during operation. It is not uncommon for a valve seat 89 to require replacement after every forty (40) hours of fluid end operation.

With reference to FIG. 6A, fatigue cracks may also occur in the walls surrounding the vertical bore 56 adjacent the valves 86 and 88. The valve seats 89 each have an upper flange 96 joined to a cylindrical lower body 98. When the valve seat 89 is installed within the vertical bore 56, the flange 96 engages a corner 99 formed in the walls surrounding the bore 56. The corner 99 traditionally has an angle α of less than 180 degrees. During operation of a fluid end, the corner 99 experiences high levels of stress. Over time, this stress may cause the walls at the corner 99 to crack, leading to failure of the fluid end 46.

For the above reasons, there is a need in the industry for a fluid end configured to avoid or significantly delay the structures or conditions that cause wear or failures within a fluid end.

BRIEF DESCRIPTION OF THE DRAWINGS

FIG. 28 is a top perspective view of a suction plug used with the fluid end shown in FIGS. 18 and 24.

FIG. 29 is a side elevation view of the suction plug shown in FIG. 28.

FIG. 30 is a cross-sectional view of the suction plug shown in FIG. 29, taken along line M-M.

FIG. 32 is a top perspective view of a discharge plug used with the fluid end shown in FIGS. 18 and 24.

FIG. 33 is a side elevational view of the discharge plug shown in FIG. 32.

FIG. 34 is a cross-sectional view of the discharge plug shown in FIG. 33, taken along line O-O.

THE FOLLOWING FIGURES ILLUSTRATE ADDITIONAL EMBODIMENTS DISCUSSED WITH RESPECT TO APPENDICES A-J

Figure 80:
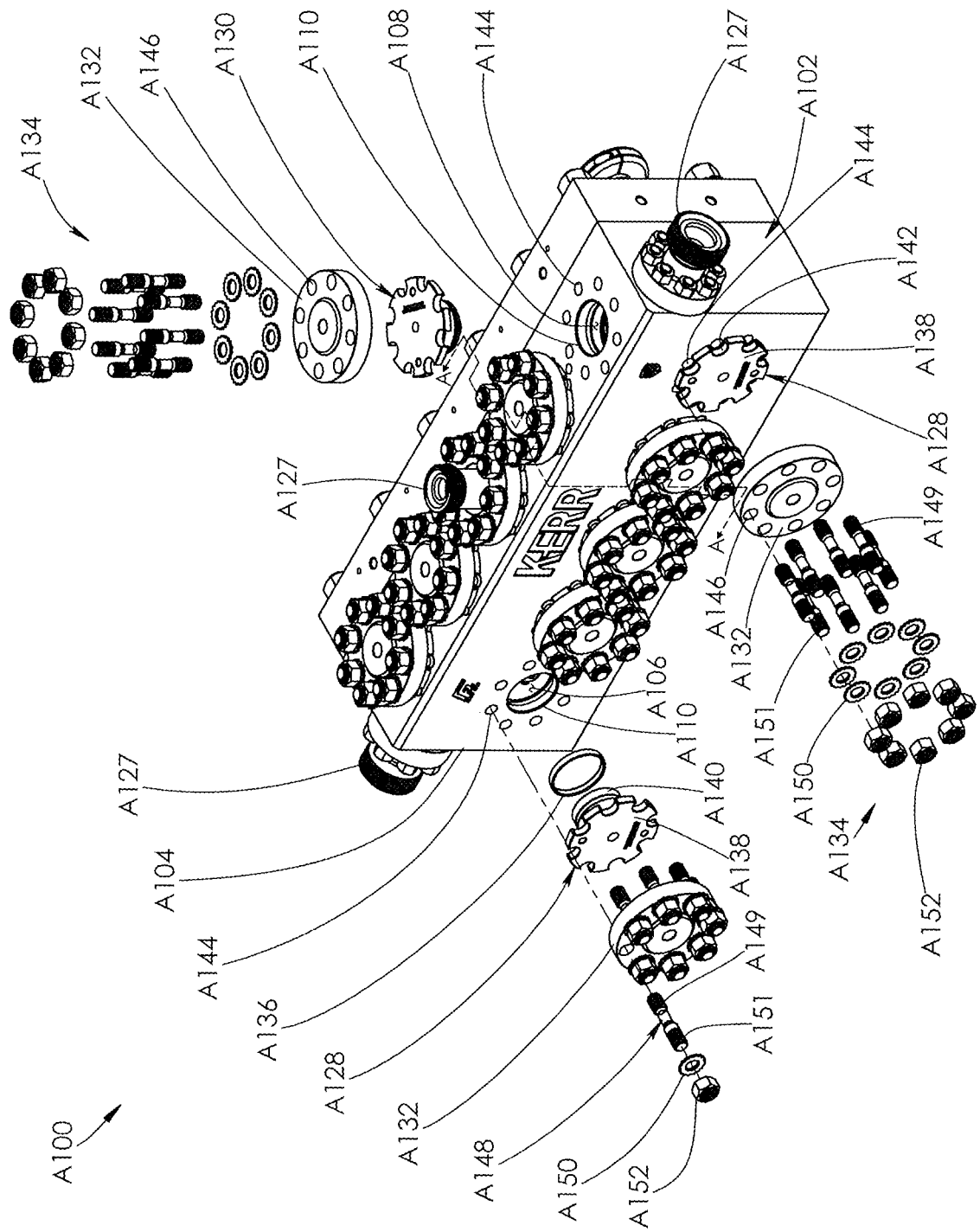

FIG. 80 is a partially exploded view of a first embodiment of a fluid end. FIG. 80 shows a suction and discharge end of the fluid end.

Figure 81:
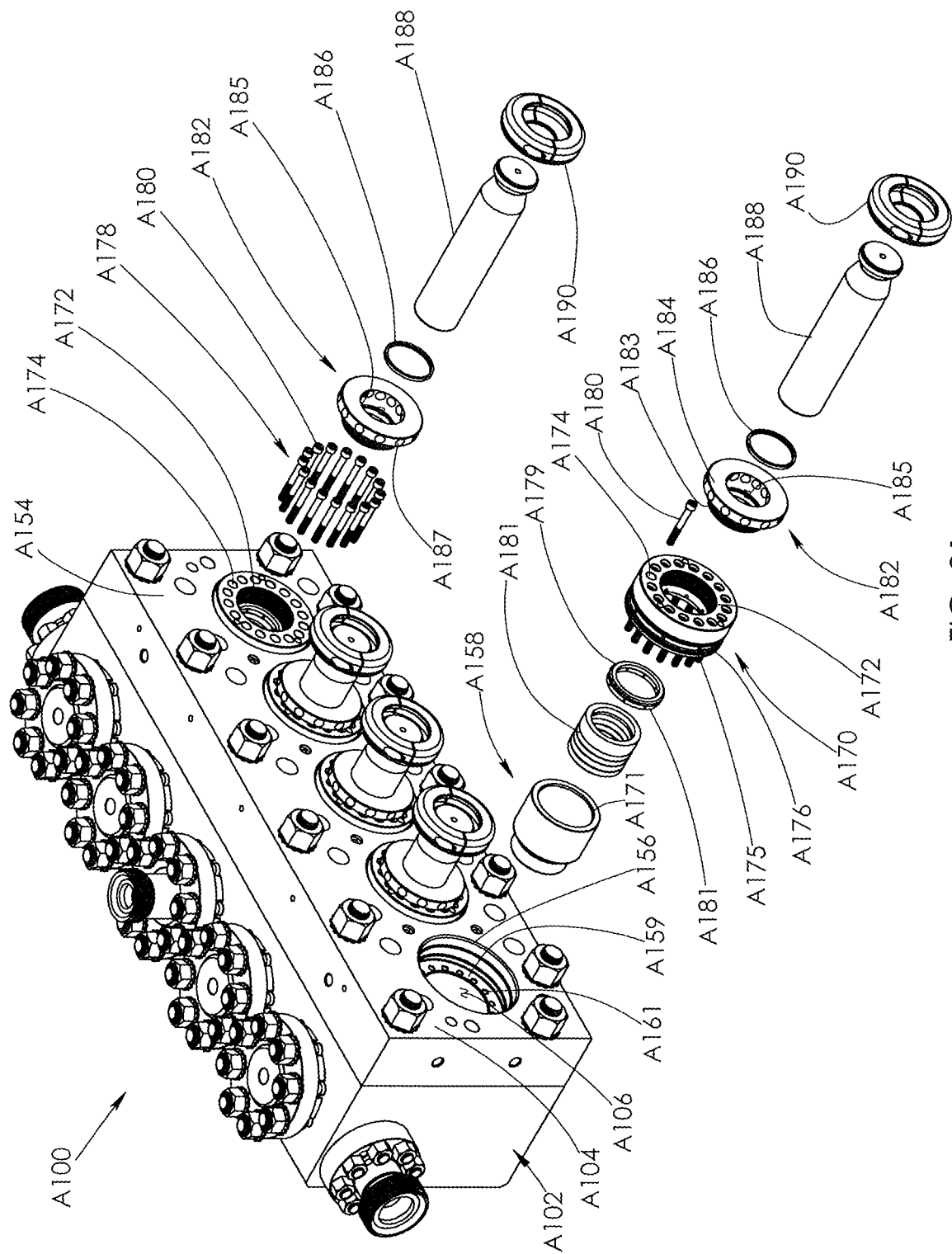

FIG. 81 is a partially exploded view of a plunger end of the fluid end body shown in FIG. 80.

Figure 82:
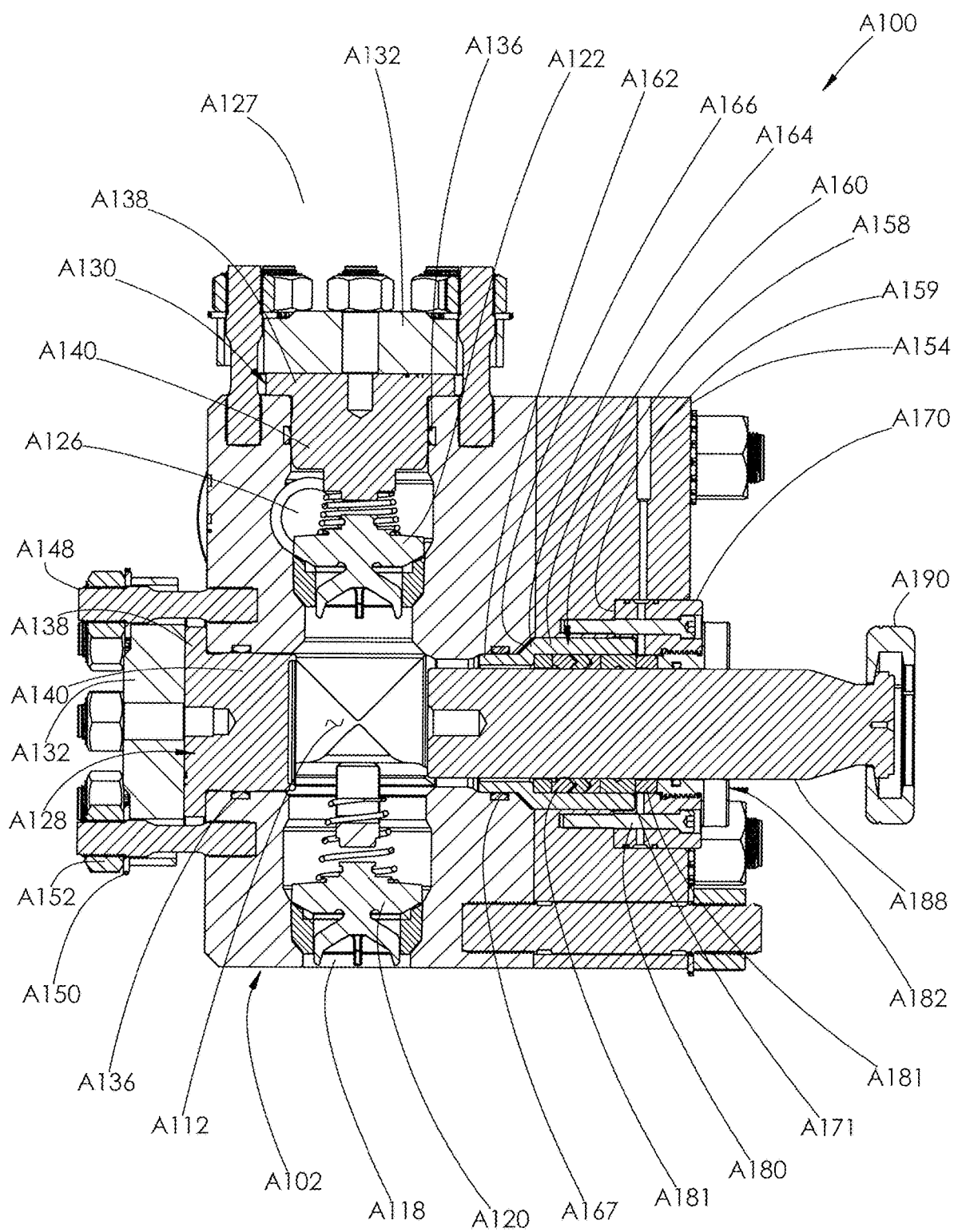

FIG. 82 is a cross-sectional view of the fluid end shown in FIG. 80, taken along line A-A.

Figure 83:
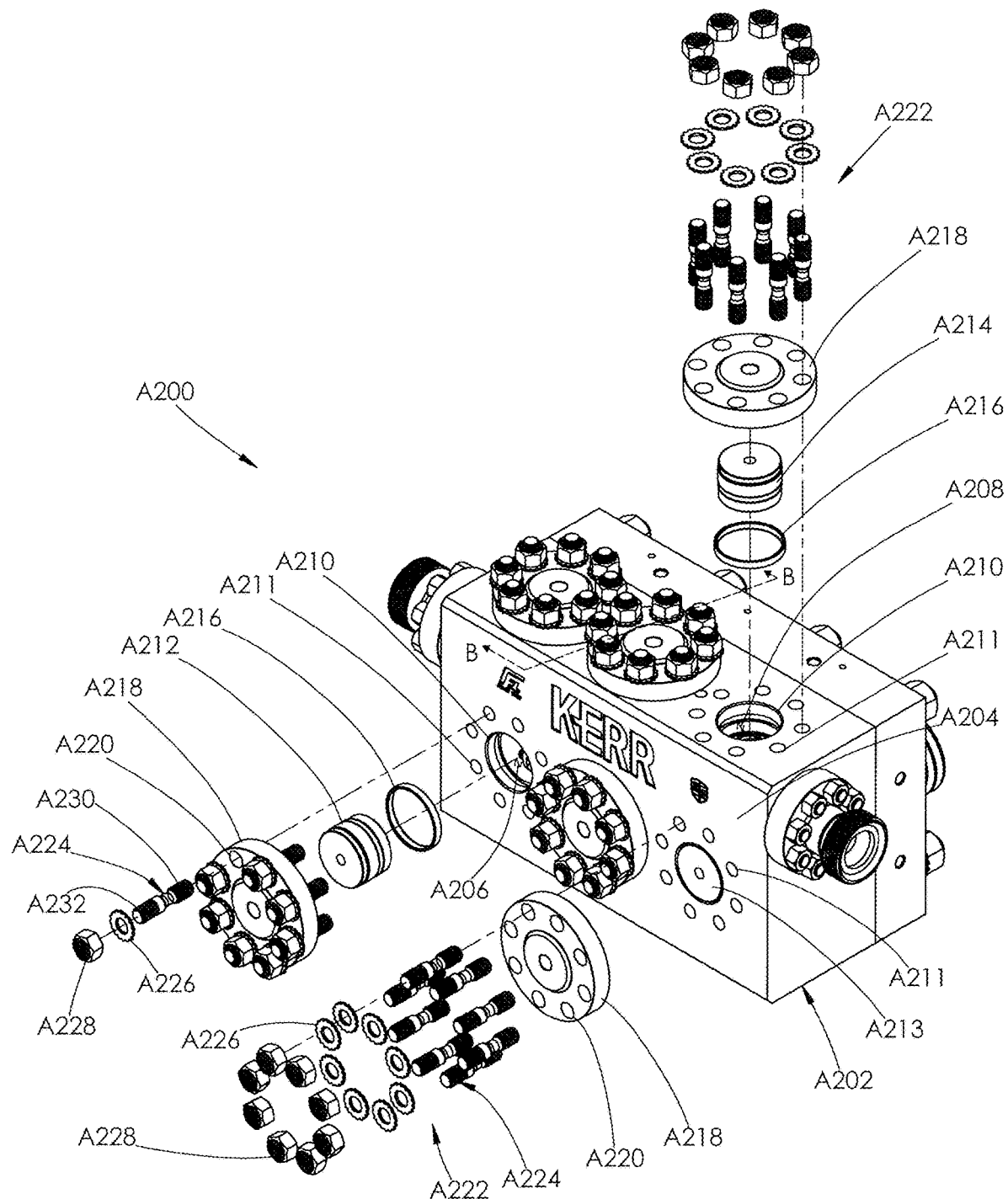

FIG. 83 is a partially exploded view of a second embodiment of a fluid end. FIG. 83 shows a suction and discharge end of the fluid end.

Figure 84:
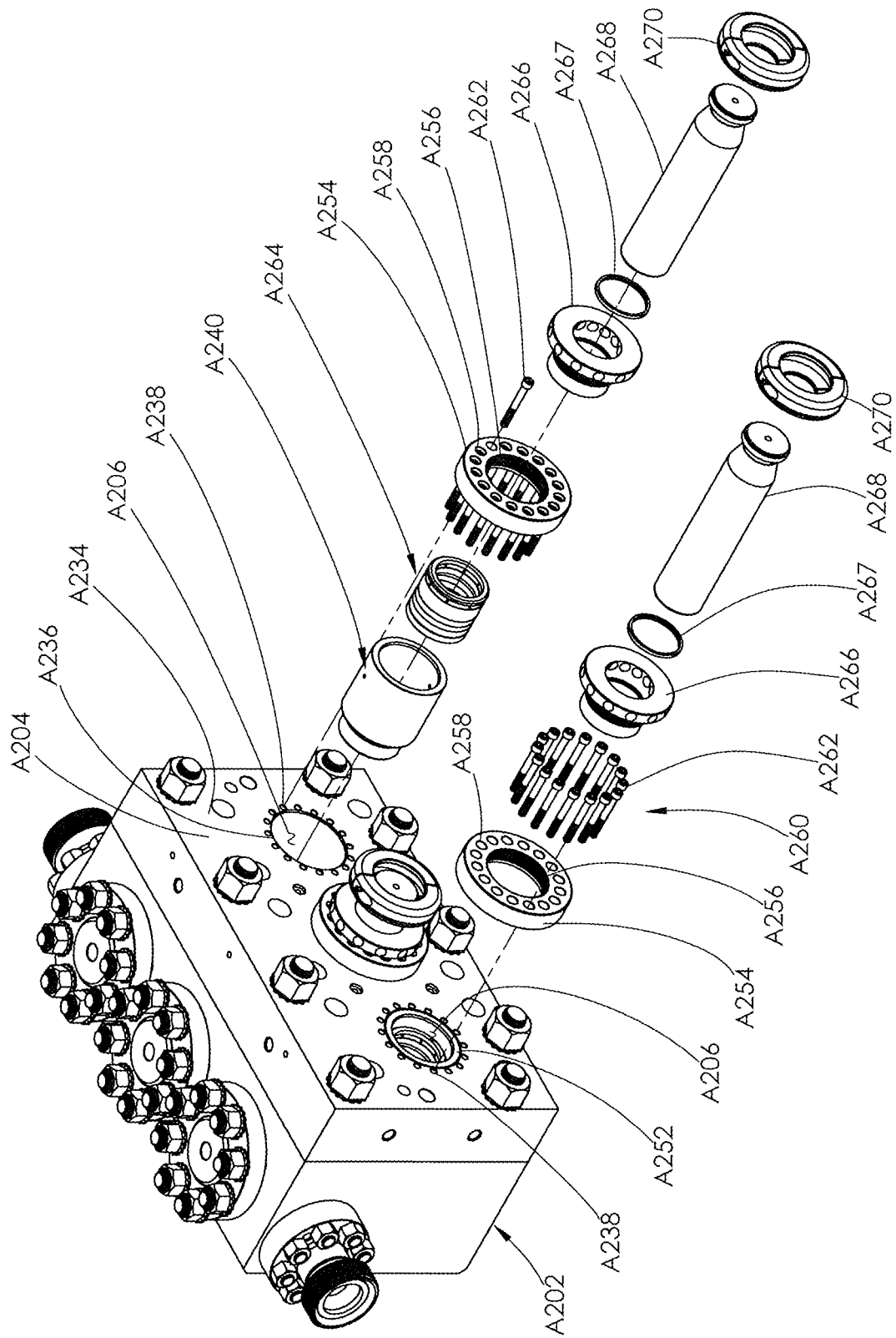

FIG. 84 is a partially exploded view of a plunger end of the fluid end body shown in FIG. 83.

Figure 85:
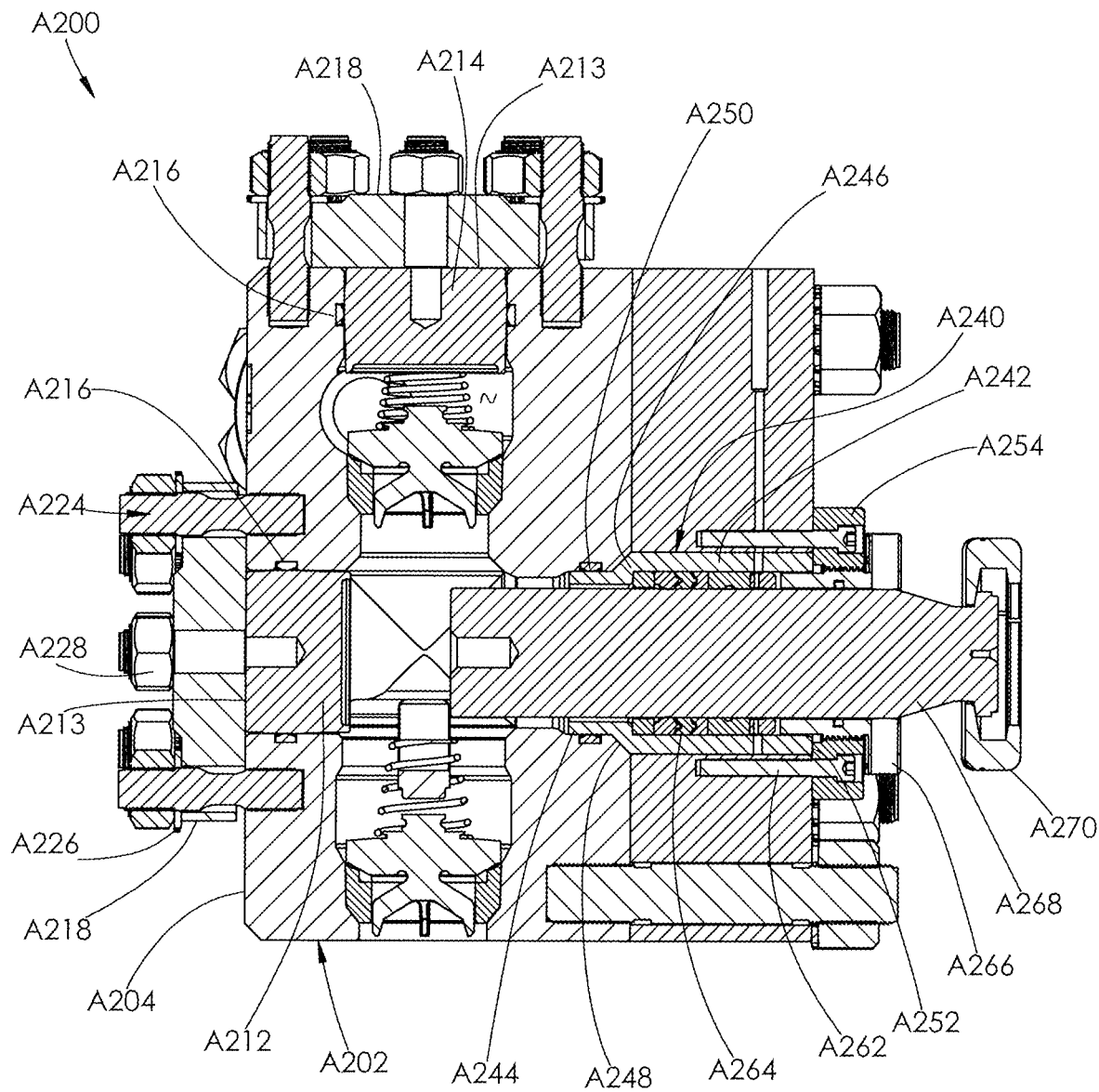

FIG. 85 is a cross-sectional view of the fluid end shown in FIG. 83, taken along line B-B.

Figure 86:
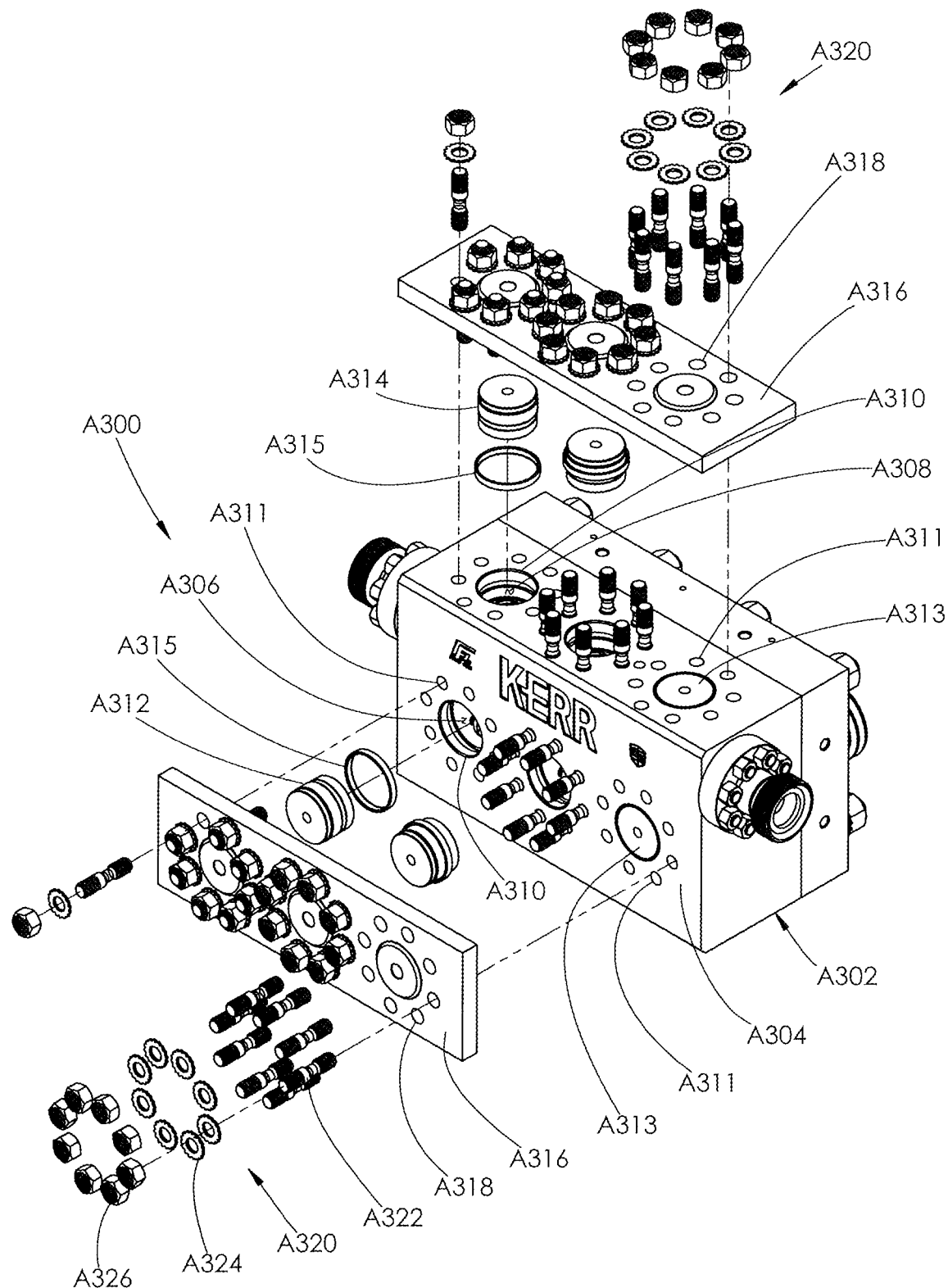

FIG. 86 is a partially exploded view of a third embodiment of a fluid end. FIG. 86 shows a suction and discharge end of the fluid end.

Figure 87:
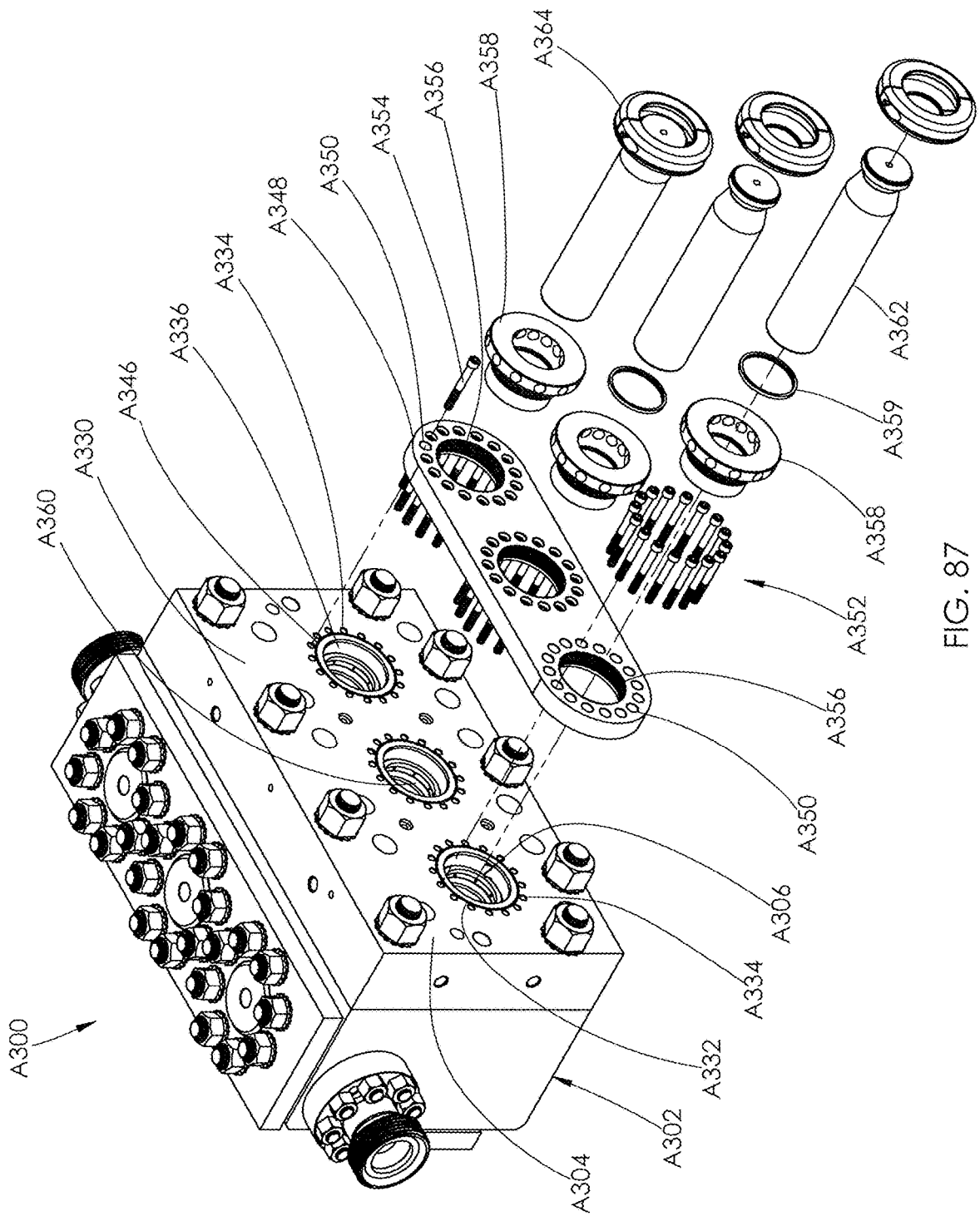

FIG. 87 is a partially exploded view of a plunger end of the fluid end body shown in FIG. 86.

Figure 88:
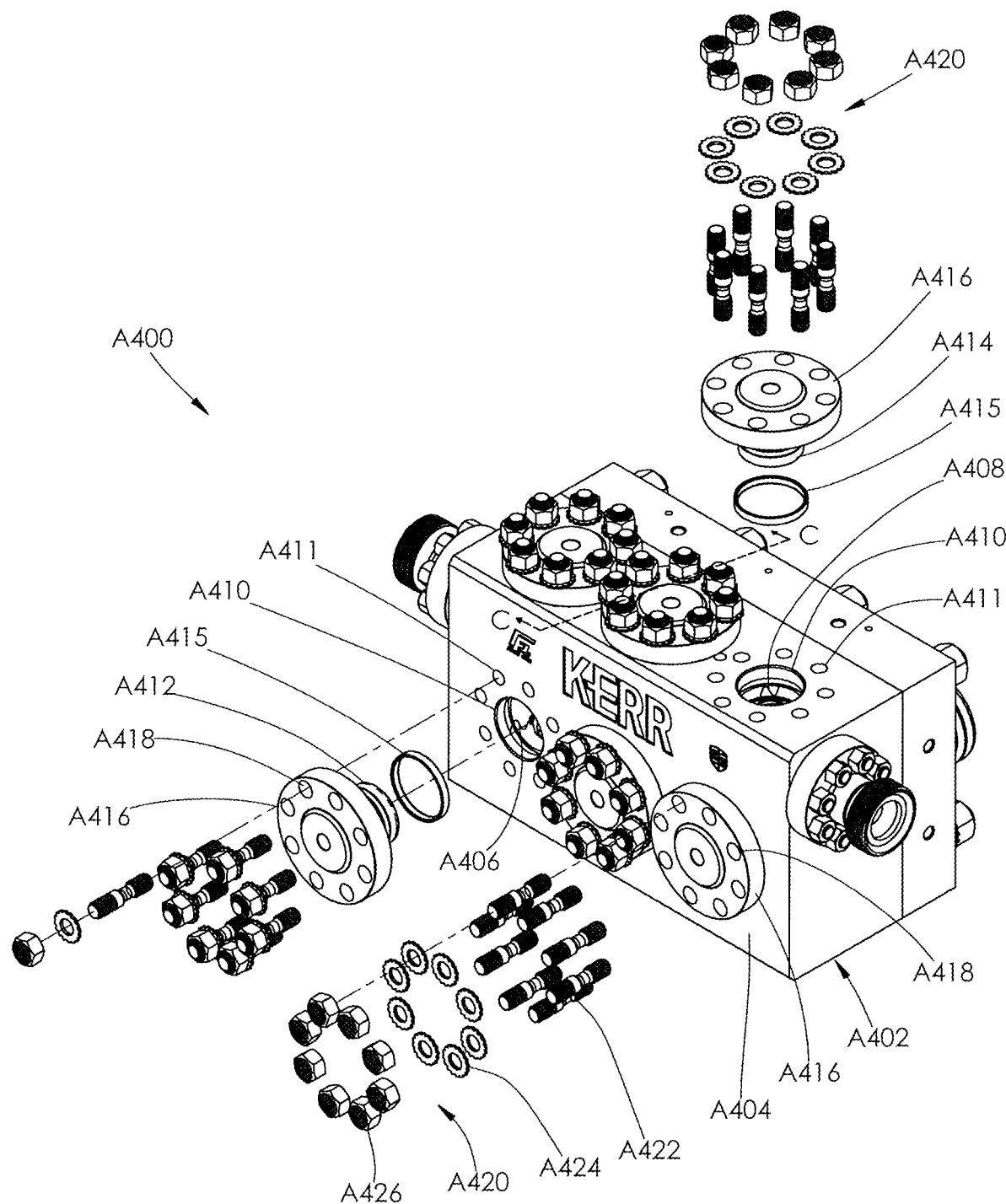

FIG. 88 is a partially exploded view of a fifth embodiment of a fluid end. FIG. 88 shows a suction and discharge end of the fluid end.

Figure 89:
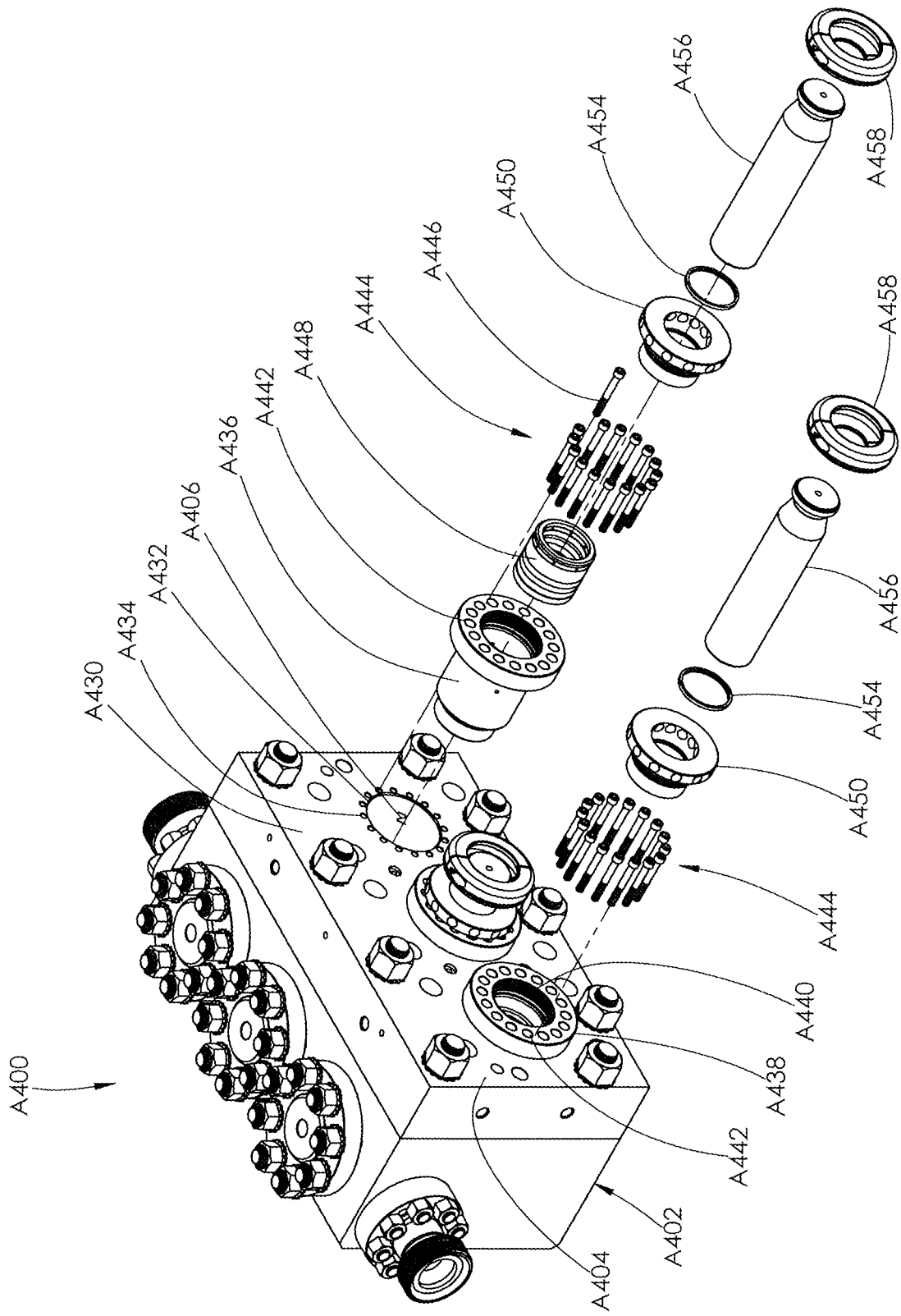

FIG. 89 is a partially exploded view of a plunger end of the fluid end body shown in FIG. 88.

Figure 90:
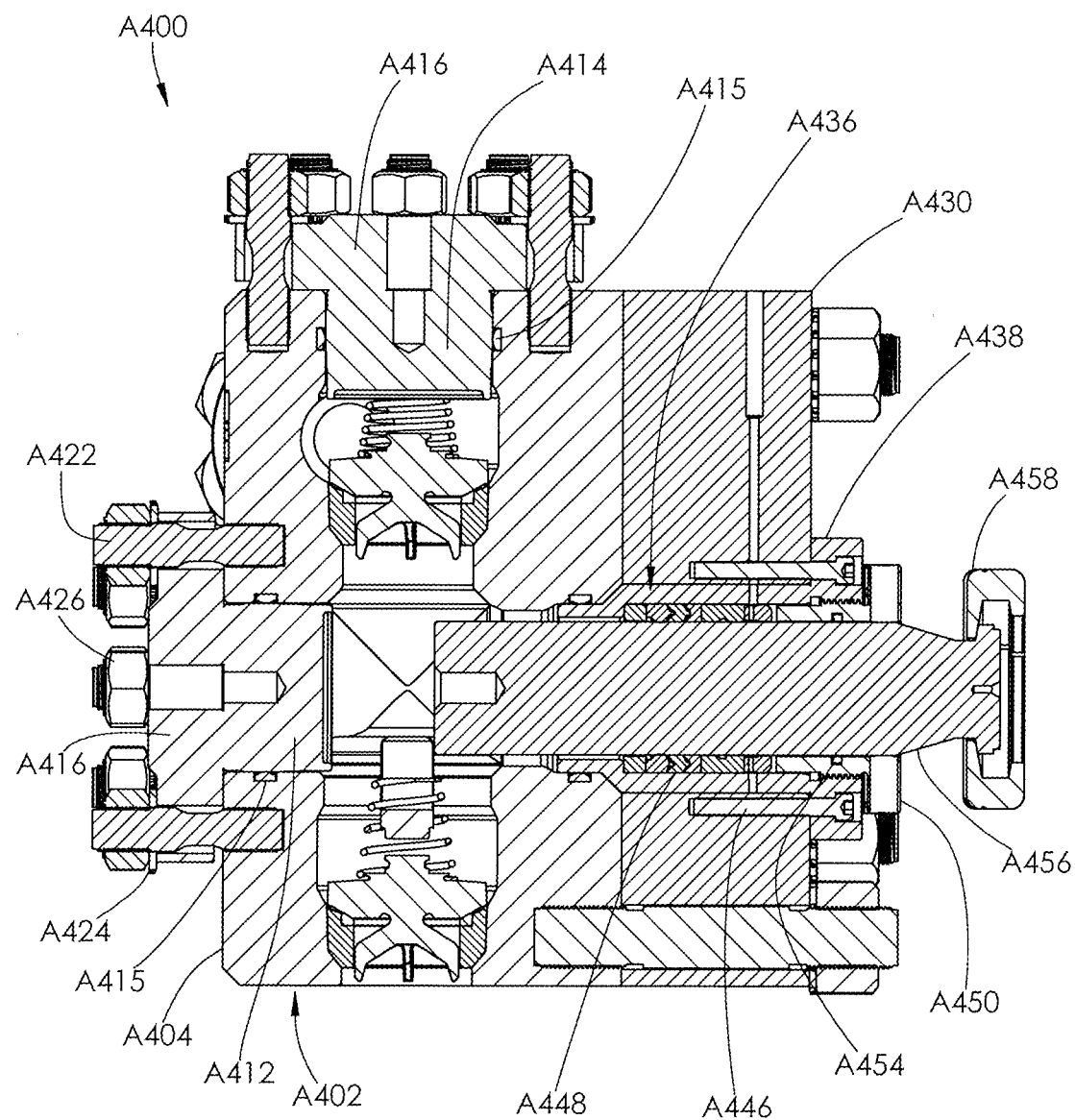

FIG. 90 is a cross-sectional view of the fluid end shown in FIG. 88, taken along line C-C.

Figure 91:
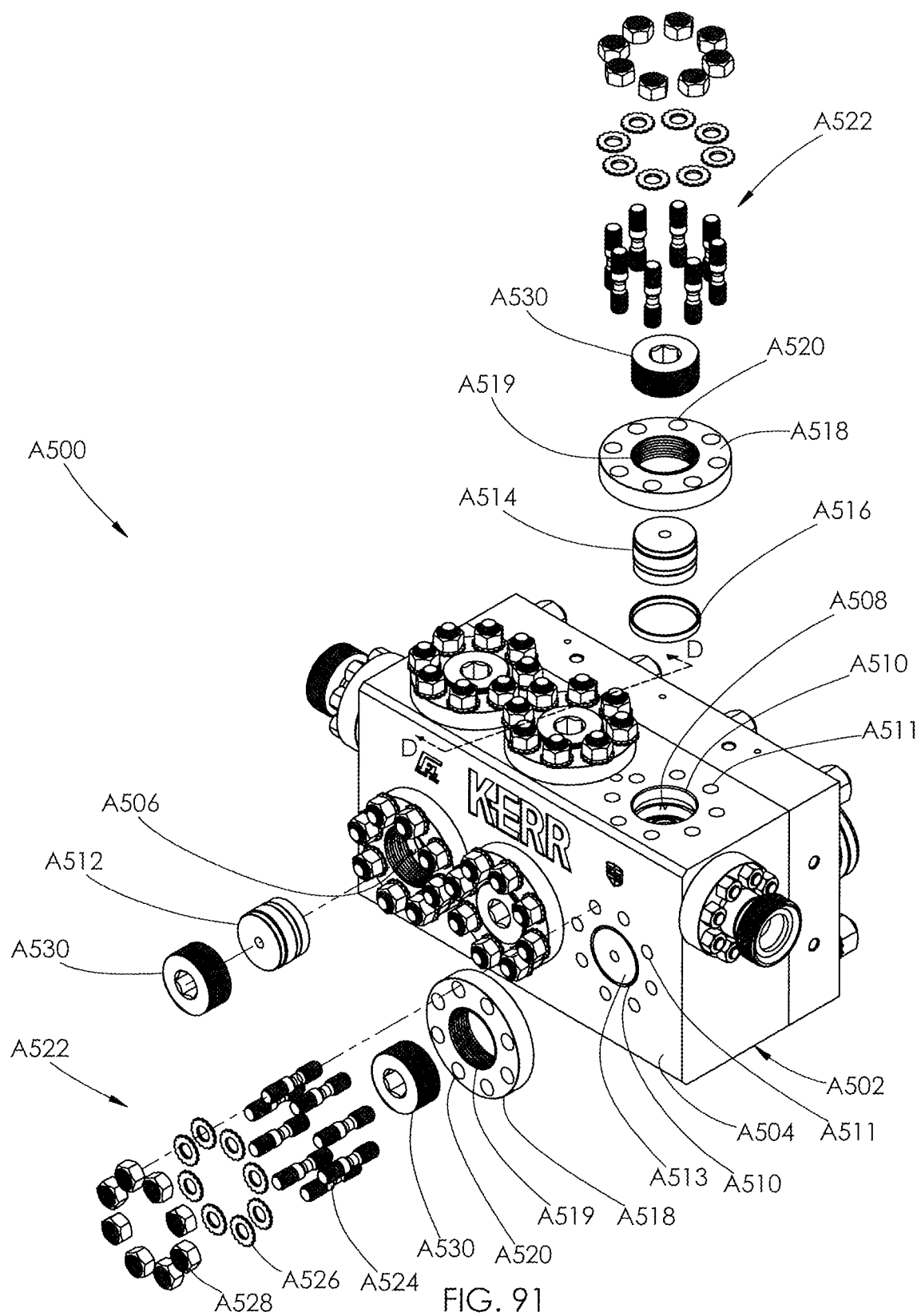

FIG. 91 is a partially exploded view of a sixth embodiment of a fluid end. FIG. 91 shows a suction and discharge end of the fluid end.

Figure 92:
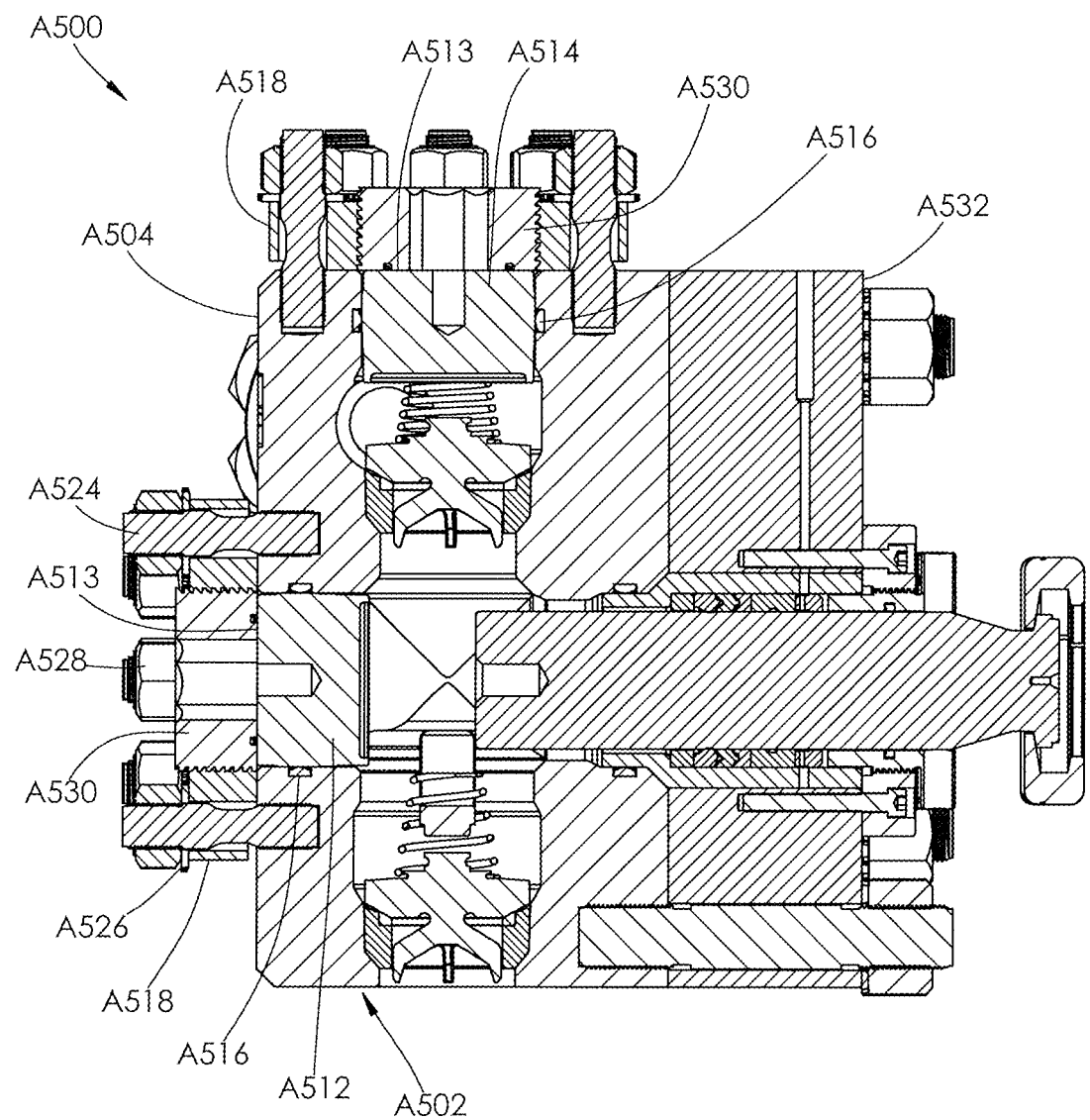

FIG. 92 is a cross-sectional view of the fluid end shown in FIG. 91, taken along line D-D.

Figure 93:
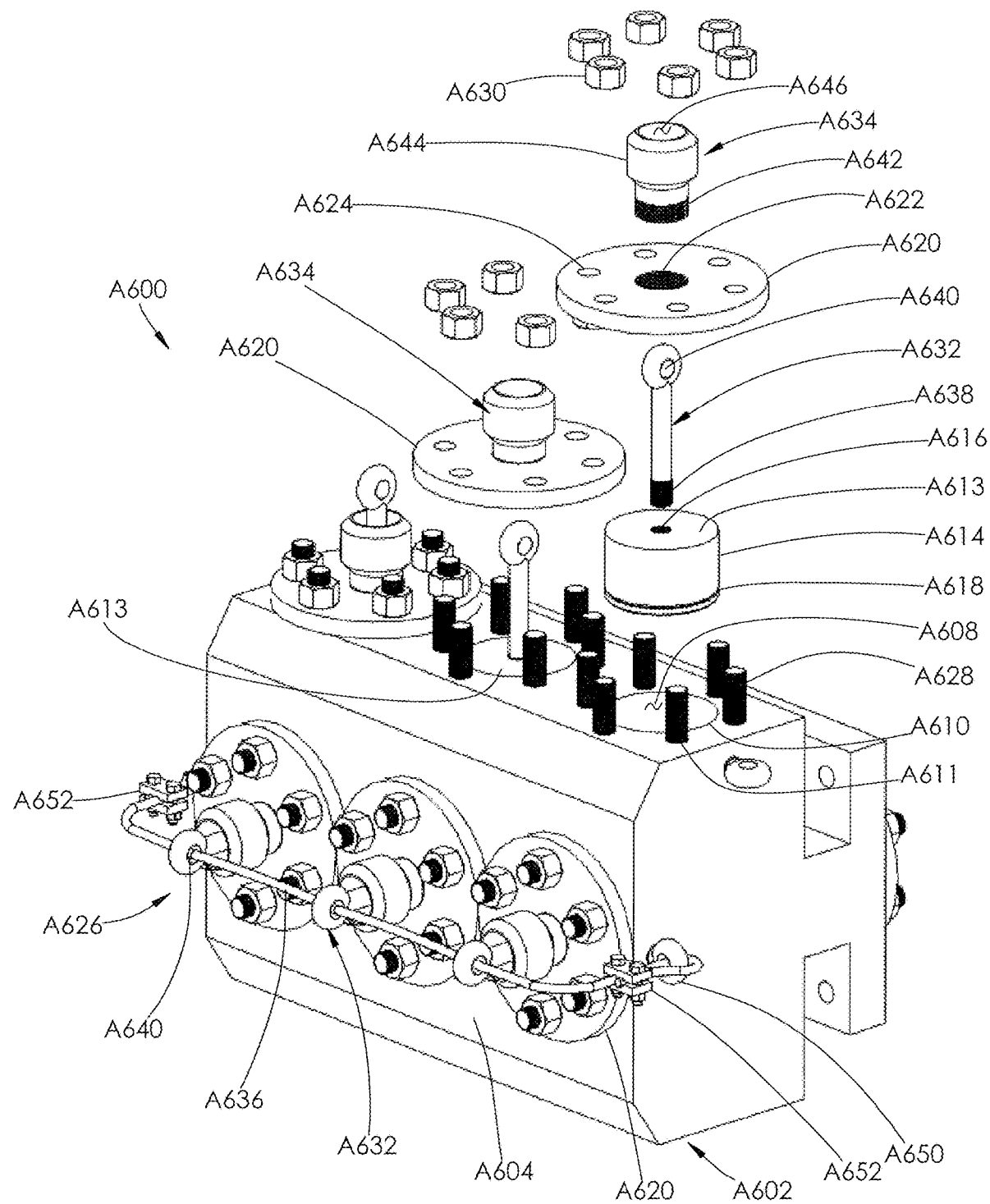

FIG. 93 is a partially exploded view of a seventh embodiment of a fluid end. FIG. 93 shows a suction and discharge end of the fluid end.

Figure 94:
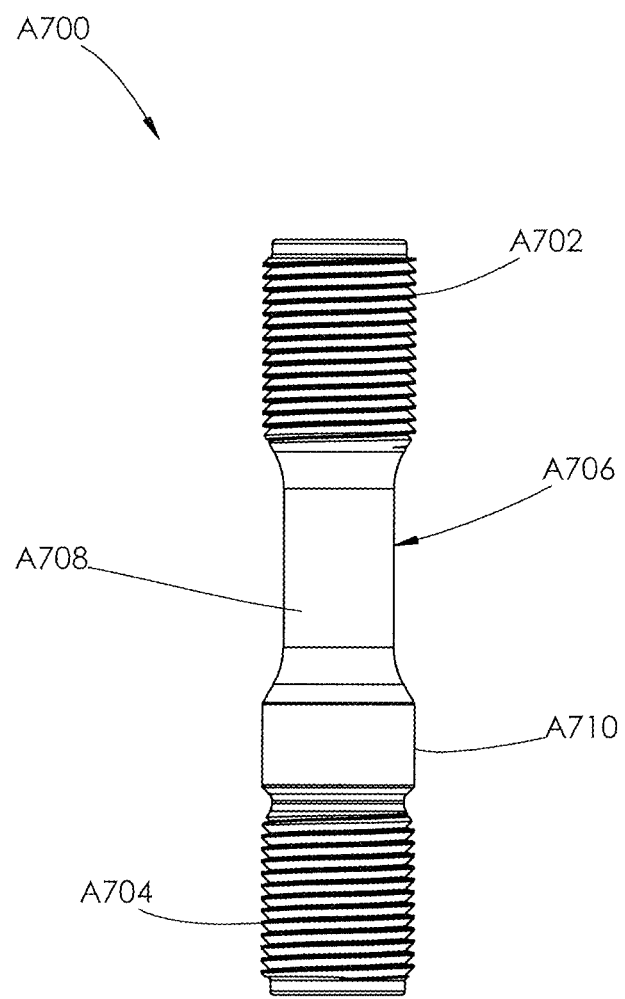

FIG. 94 is a side elevational view of one of the plurality of studs for use with the fluid ends.

Figure 9:
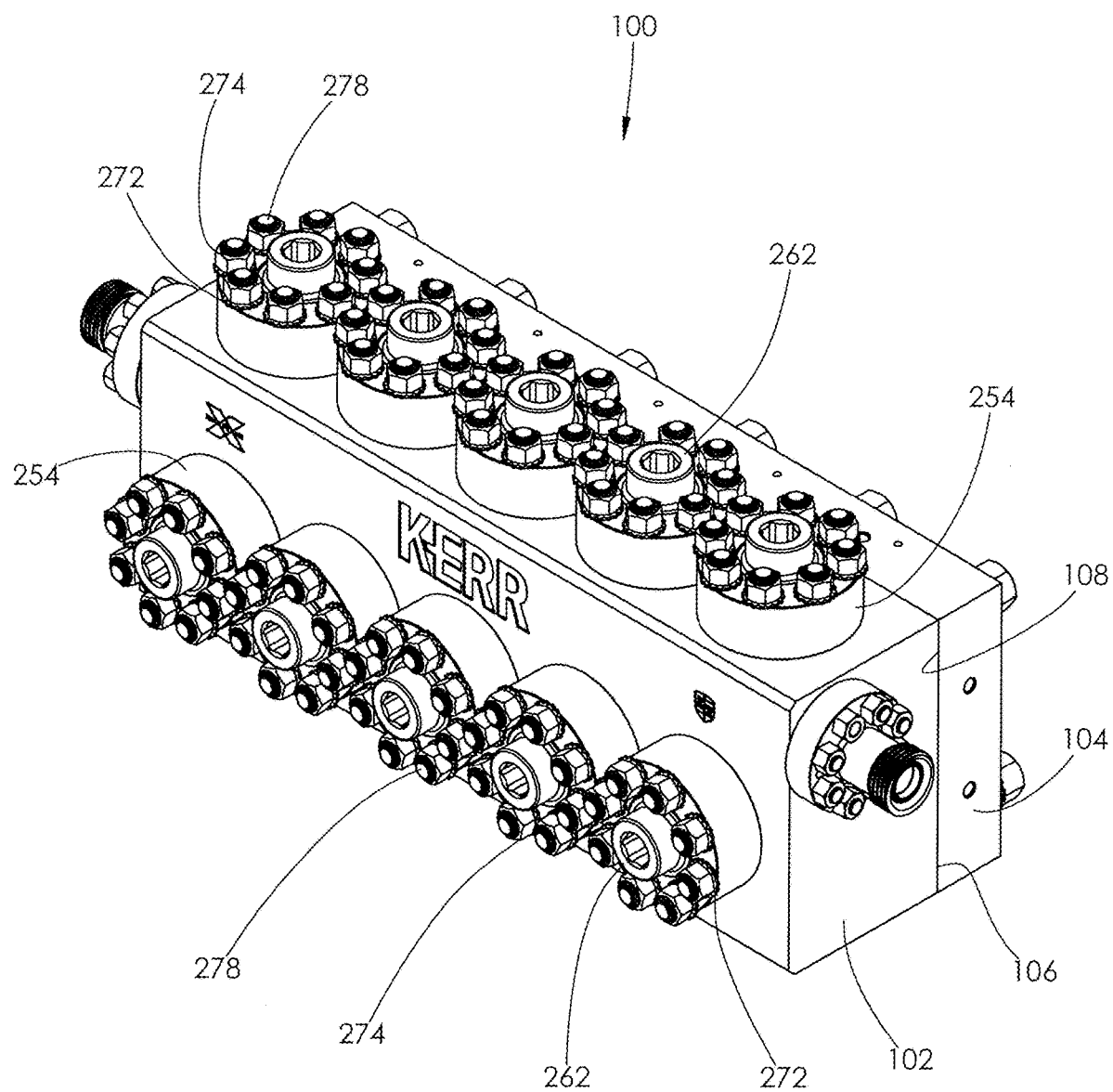
FIG. 9 is a front perspective view of the fluid end shown in FIGS. 7 and 8.
Figure 95:
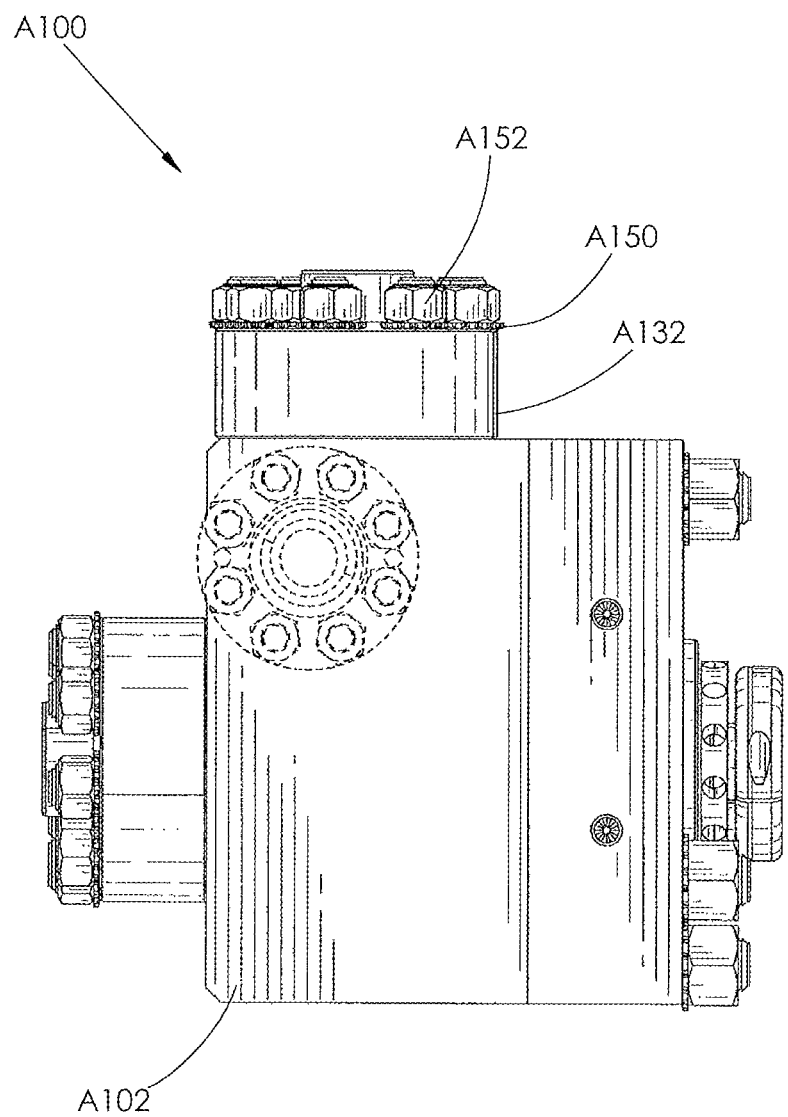

FIG. 95 is a right side elevational view of the fluid end shown in FIG. 9. Portions of the fluid end are shown in dashed lines.

Figure 96:
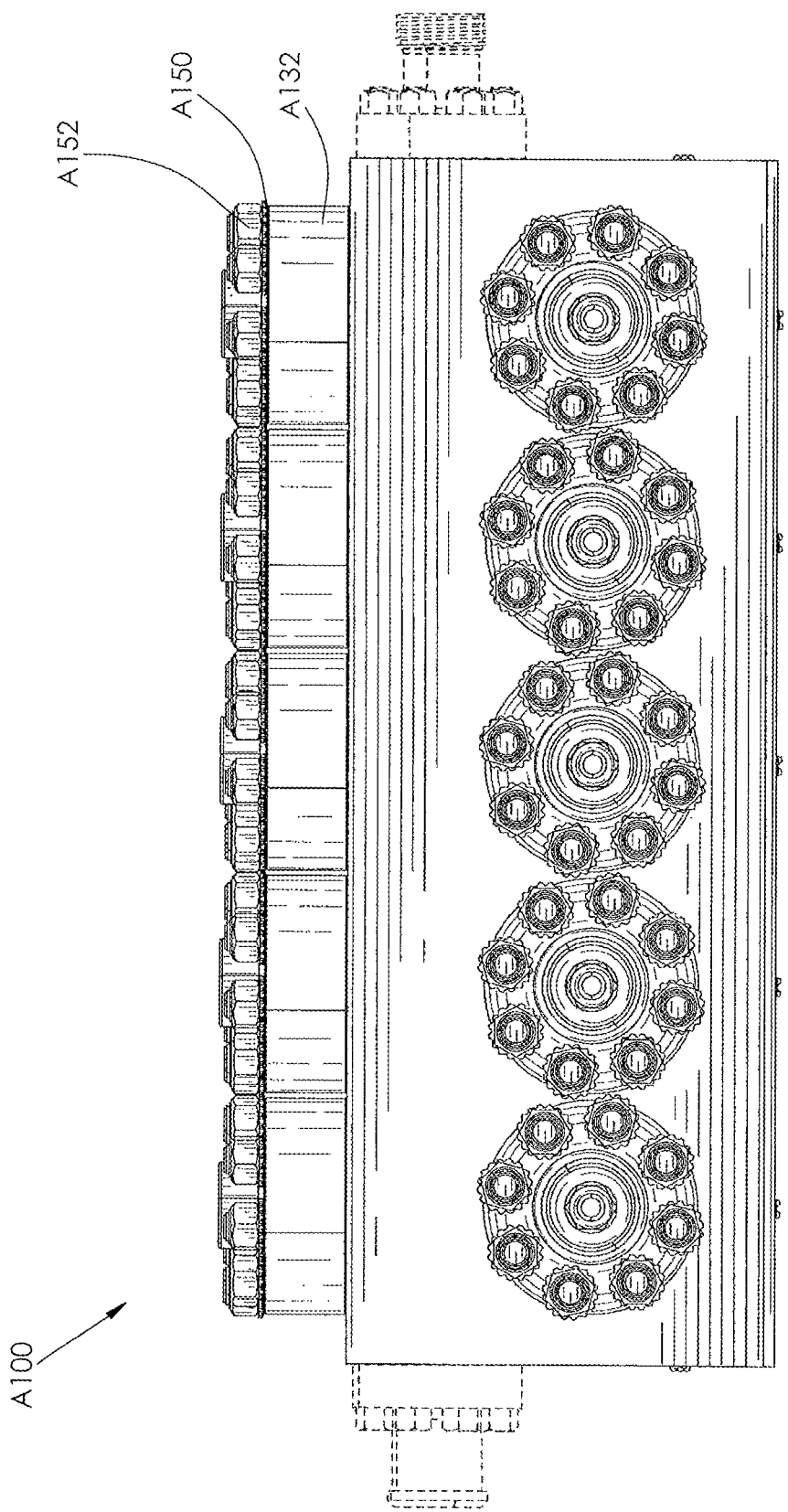

FIG. 96 is a front elevational view of the fluid end shown in FIG. 95.

Figure 97:
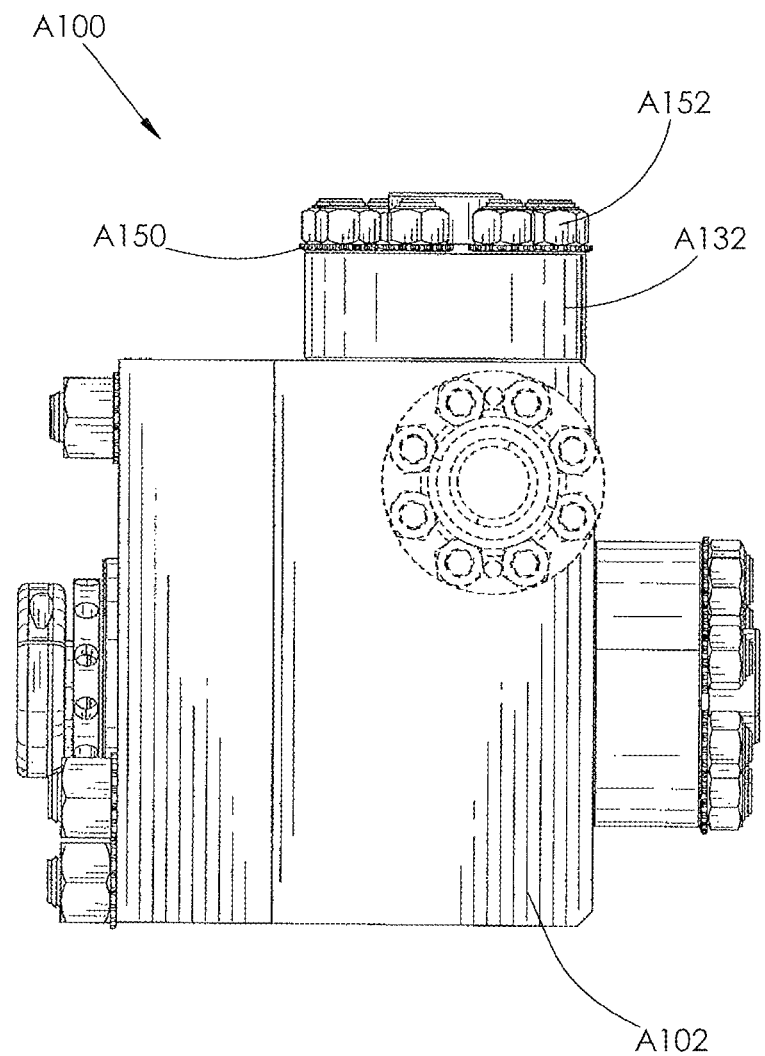

FIG. 97 is a left side elevational view of the fluid end shown in FIG. 95.

Figure 98:
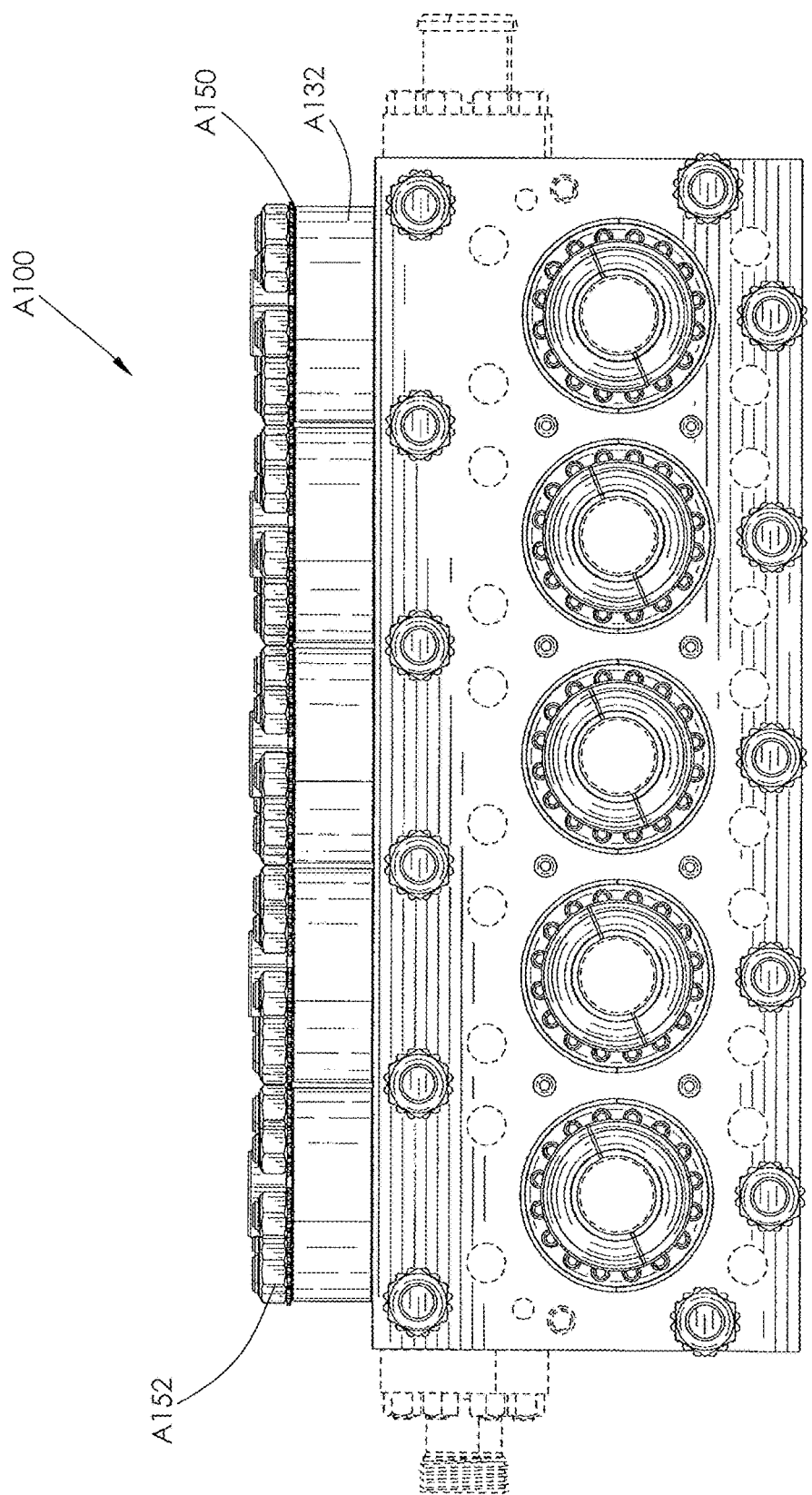

FIG. 98 is a rear elevational view of the fluid end shown in FIG. 95.

Figure 99:
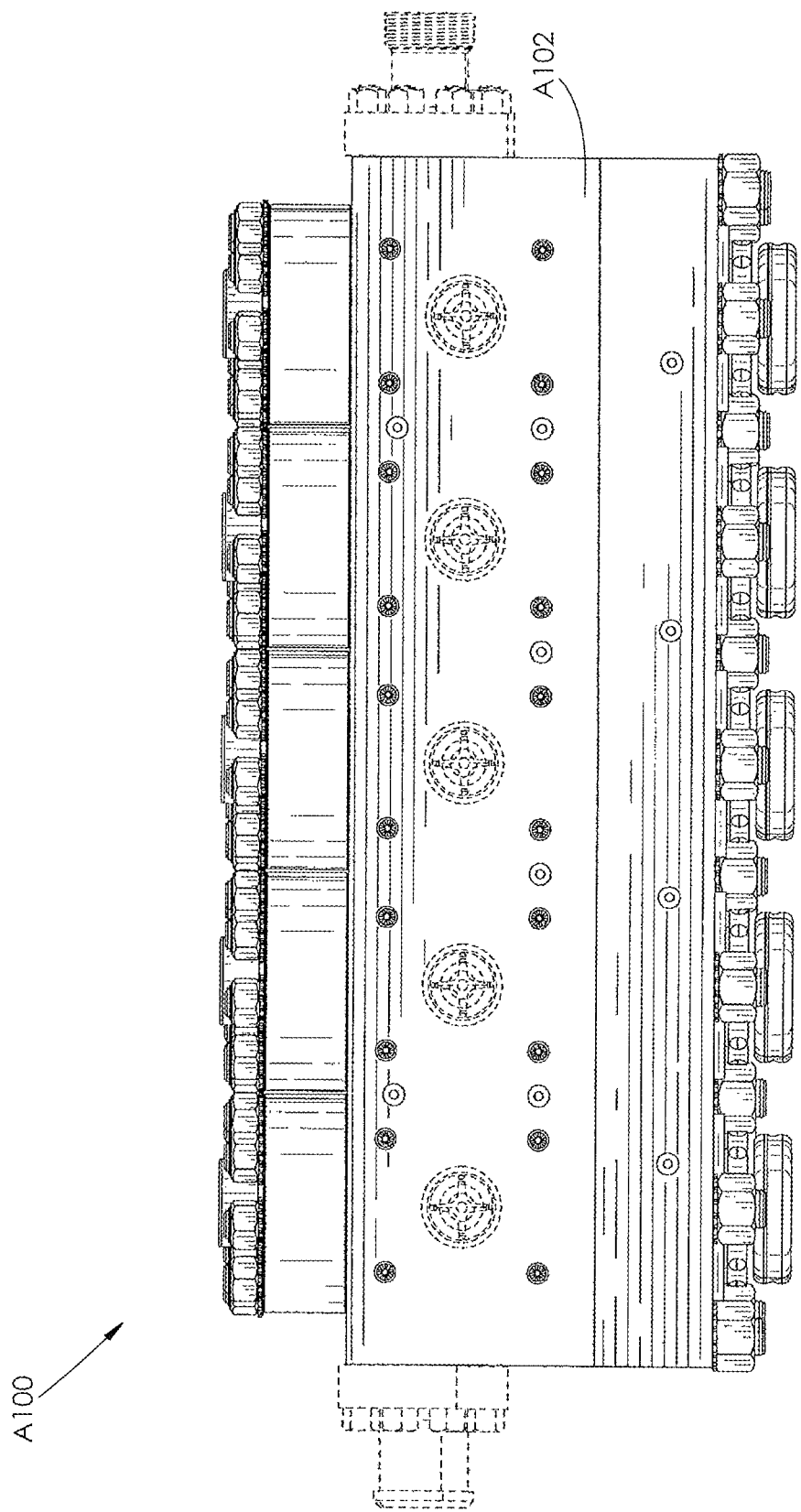

FIG. 99 is a bottom plan view of the fluid end shown in FIG. 95.

Figure 100:
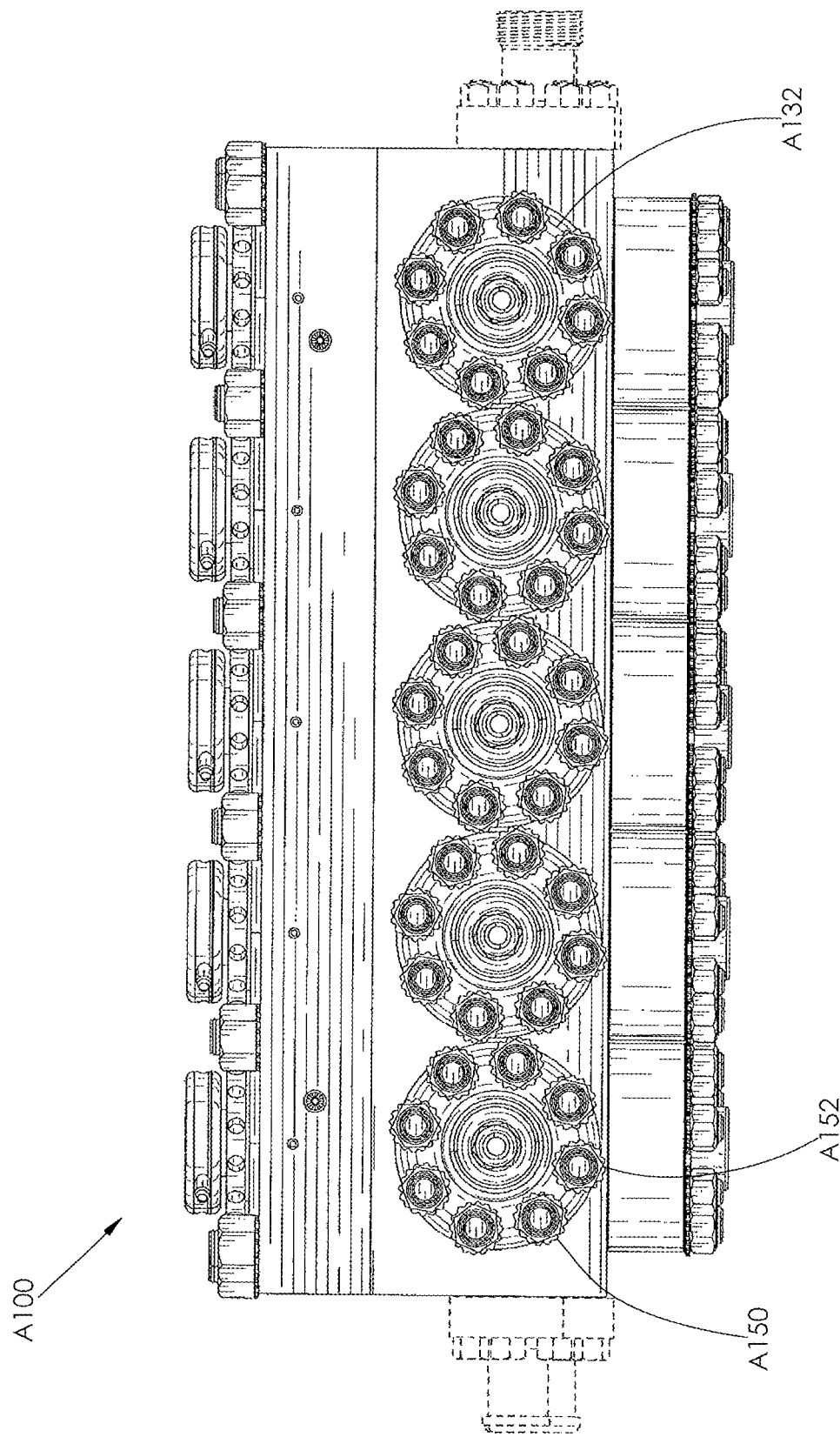

FIG. 100 is a top plan view of the fluid end shown in FIG. 95.

Figure 101:
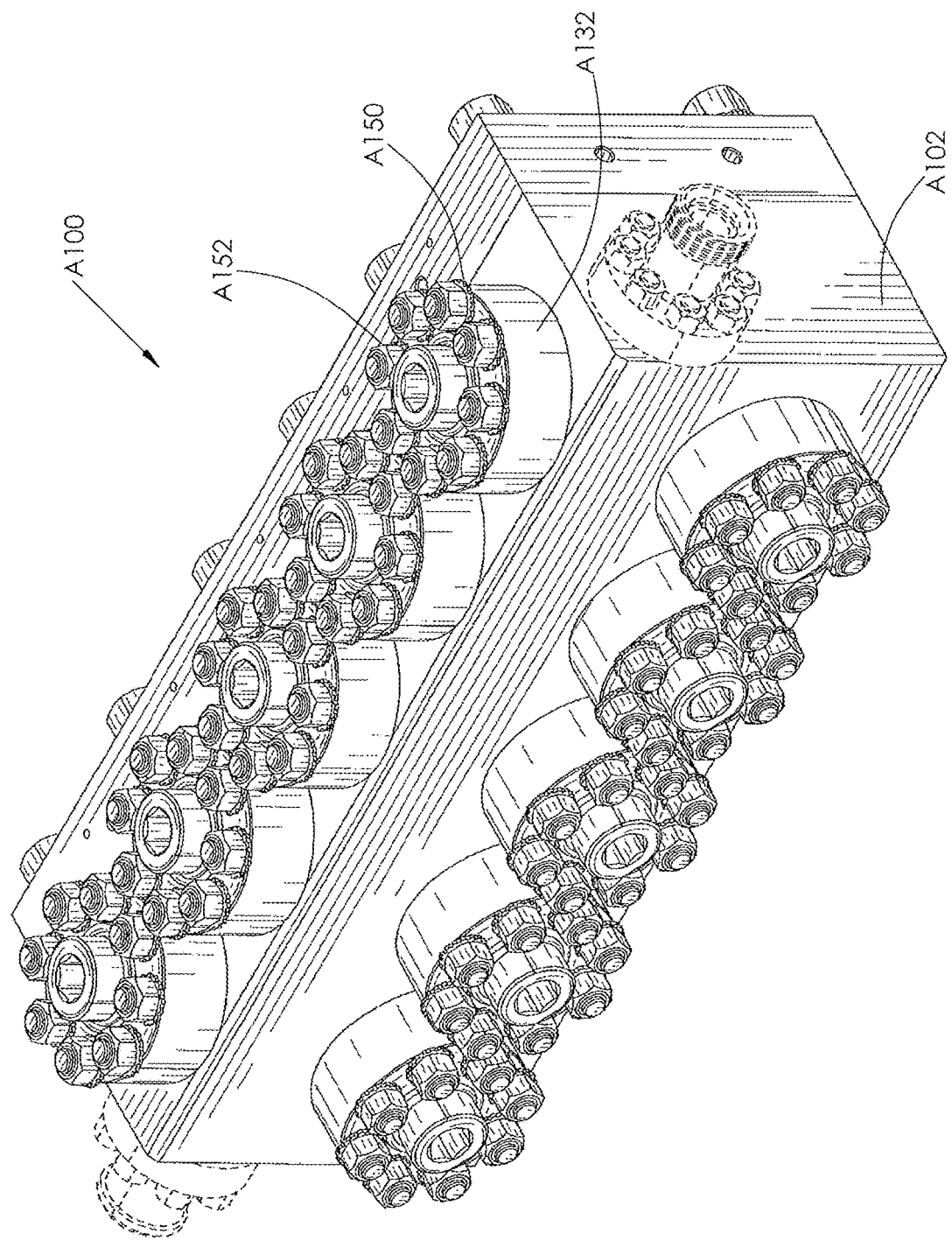

FIG. 101 is a front perspective view of the fluid end shown in FIG. 95.

Figure 102:
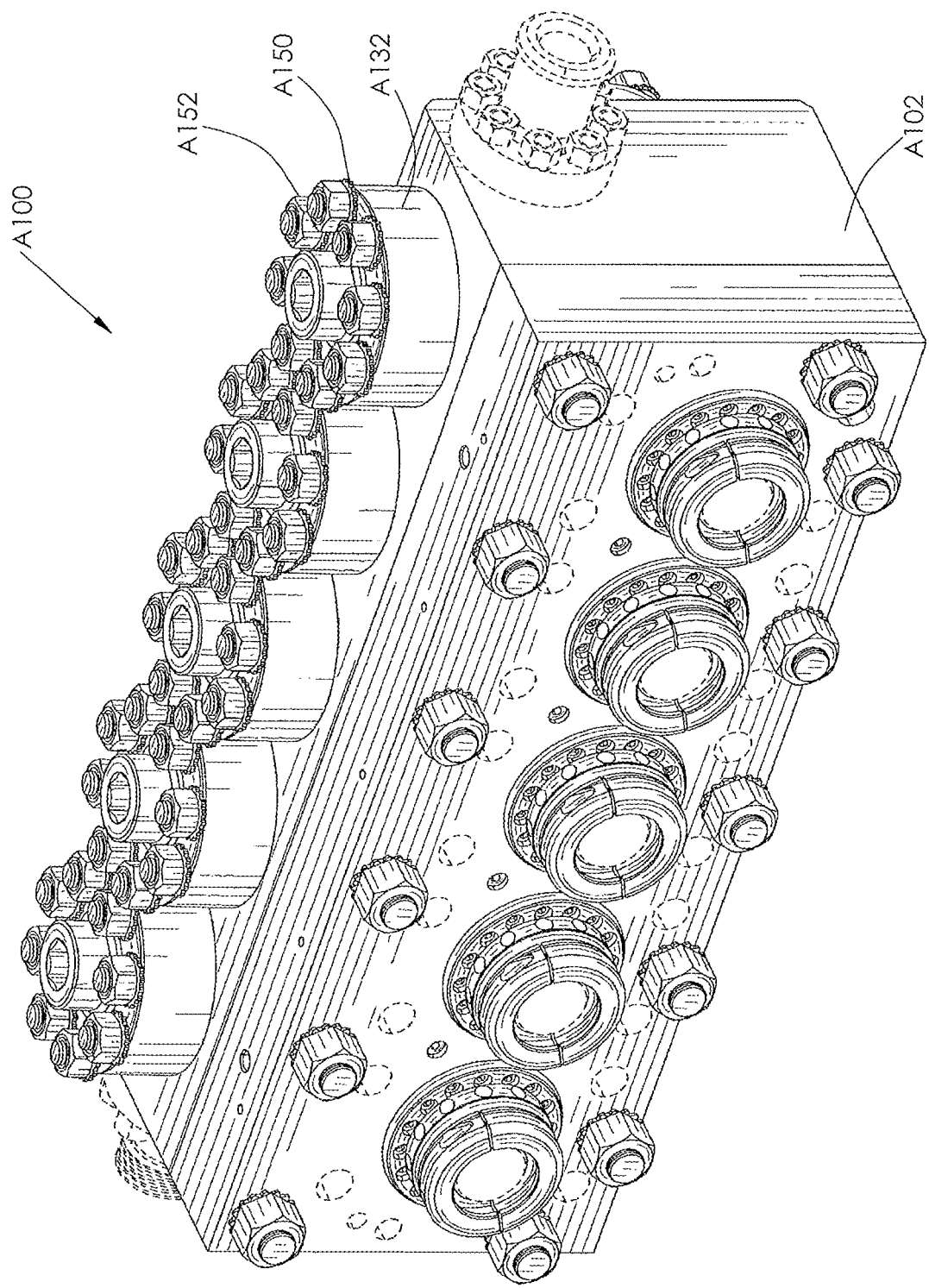

FIG. 102 is a rear perspective view of the fluid end shown in FIG. 95.

Figure 103:
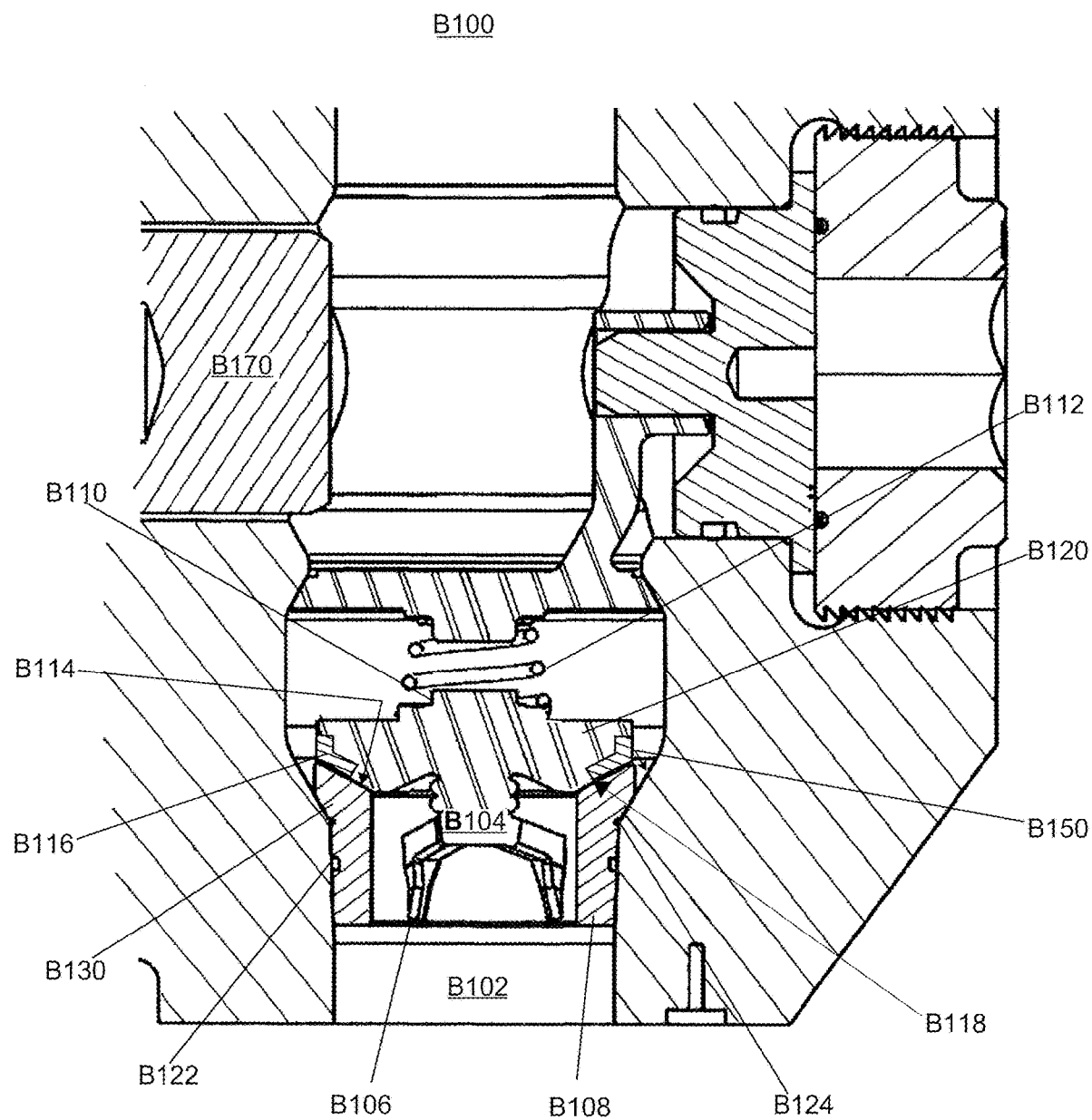
Figure 104:
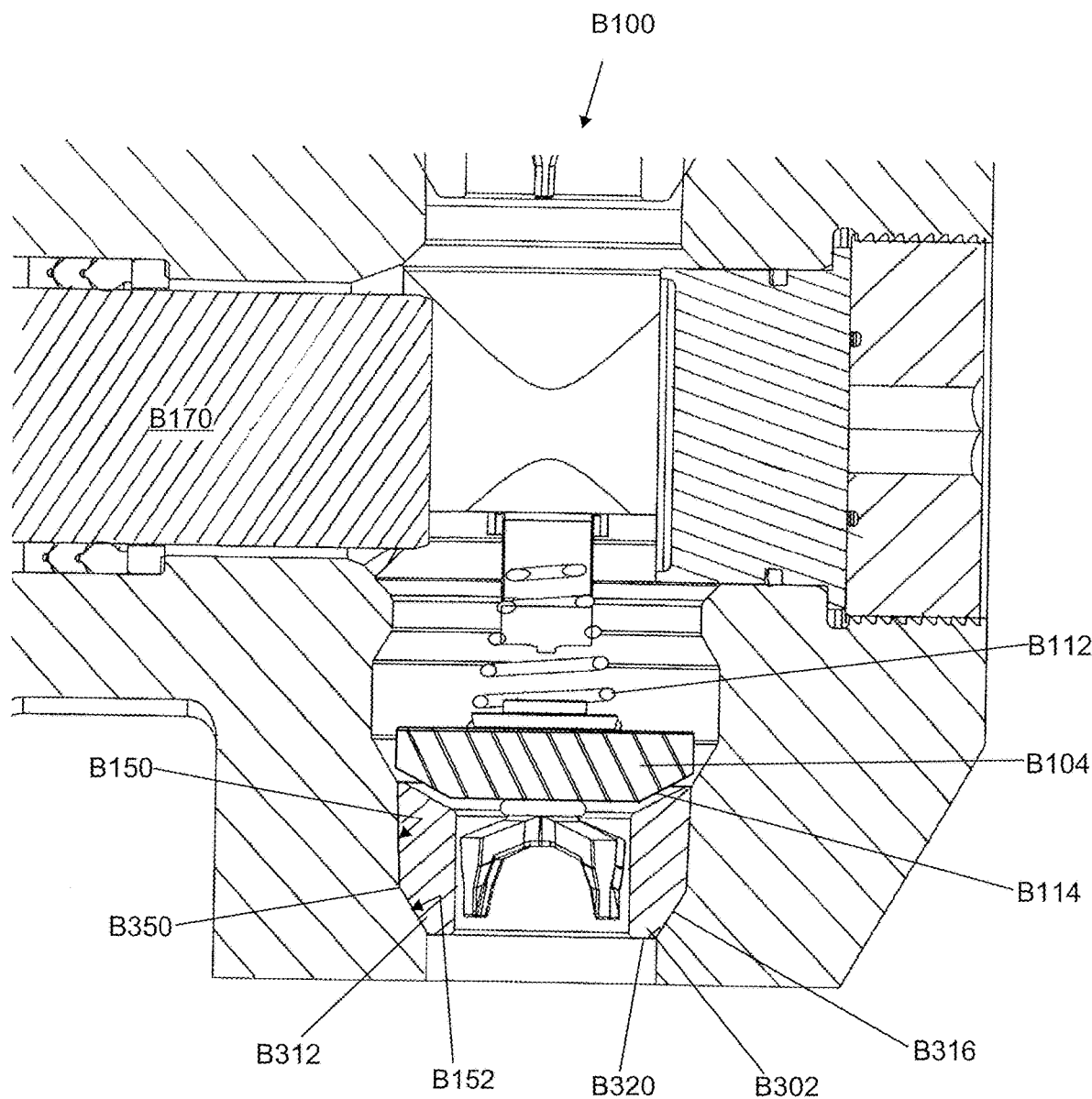

FIG. 103 is a sectional side view of a fluid end having a prior art valve seat for explanatory purposes FIG. 104 is a sectional side view of a fluid end having a tapered valve seat.

Figure 105A:
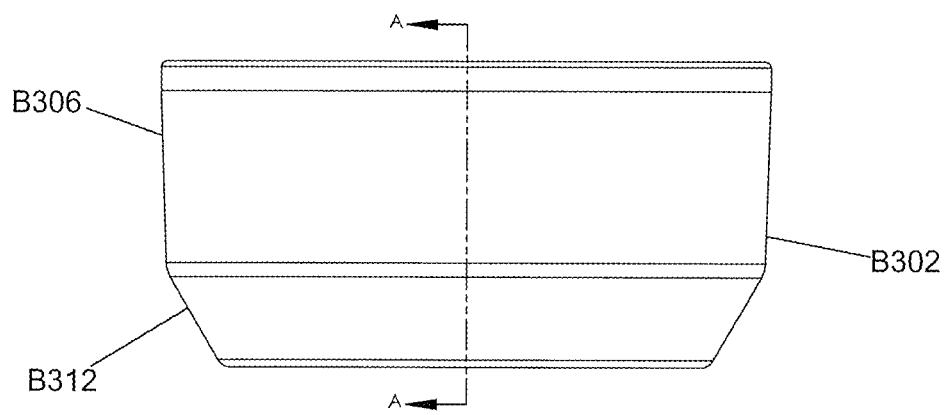

FIG. 105A is a side view of the valve seat shown in FIG. 81.

Figure 105B:
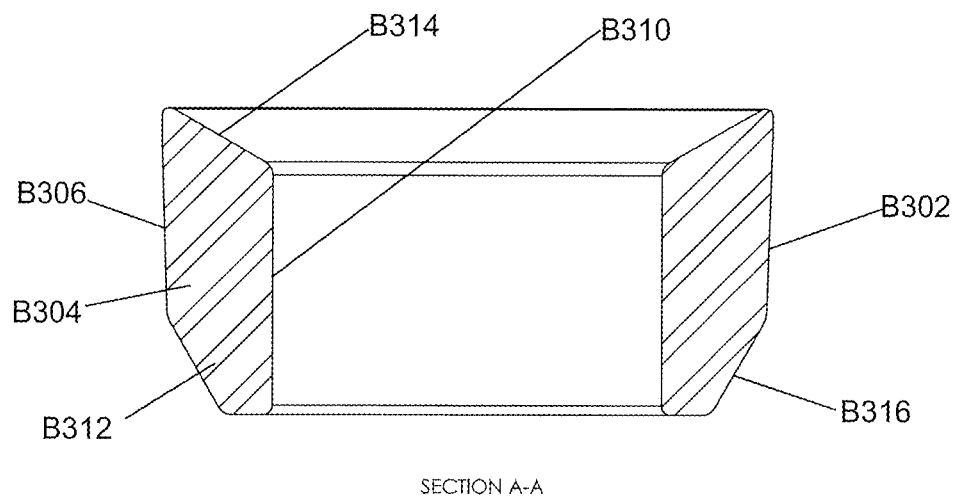

FIG. 105B is a sectional view of the valve seat of FIG. 105A along line A-A.

Figure 106A:
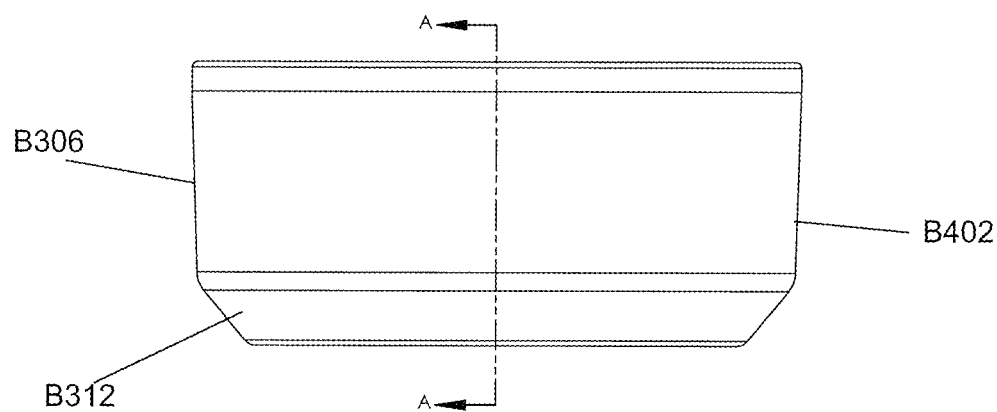

FIG. 106A is a side view of an alternative valve seat.

Figure 106B:
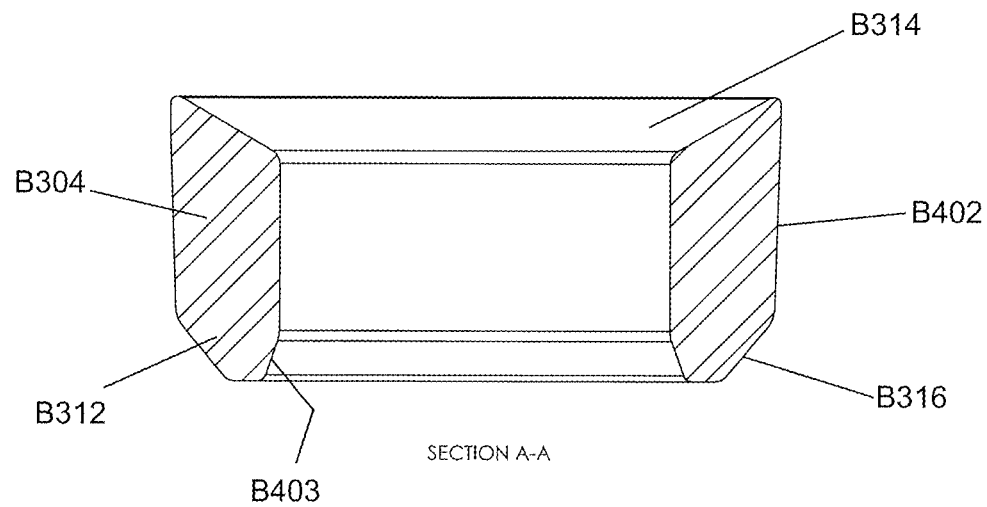

FIG. 106B is a sectional view of the valve seat of FIG. 106A along line A-A.

Figure 107:
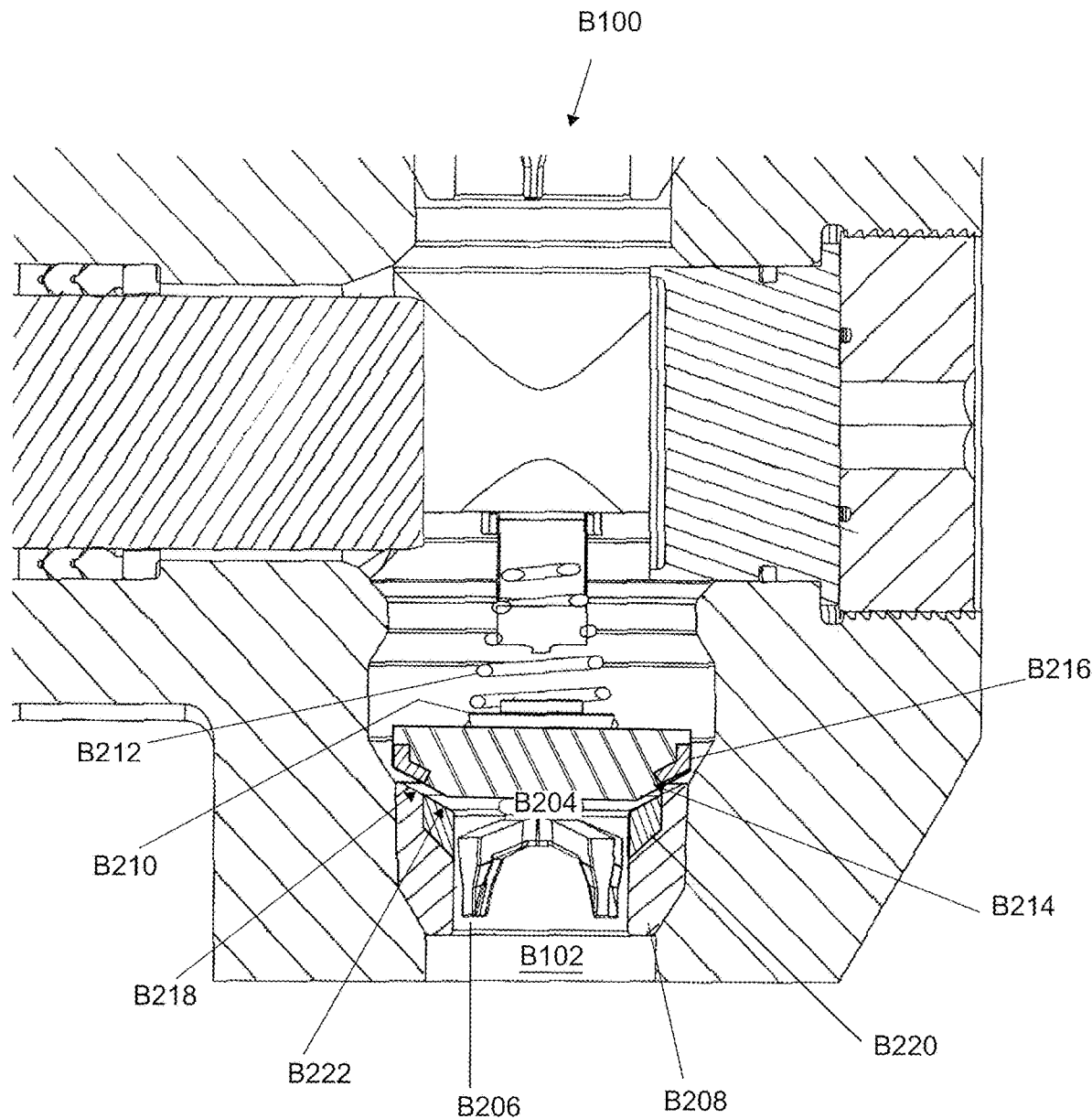

FIG. 107 is a sectional side view of a fluid end having a tapered valve seat containing an insert.

Figure 108A:
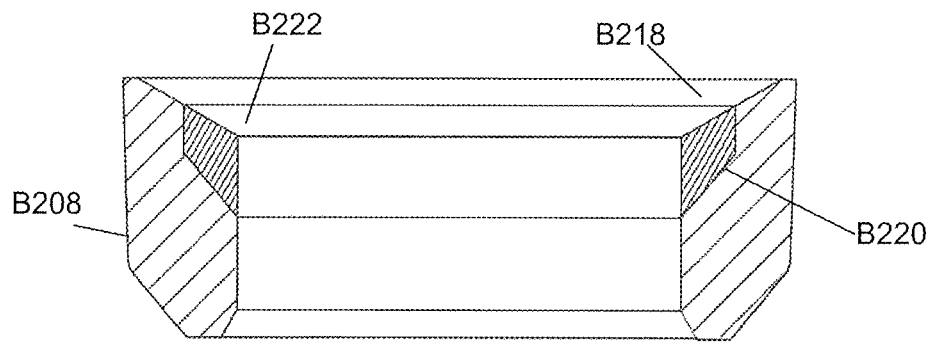

FIG. 108A is a sectional side view of a valve seat containing an insert.

Figure 108B:
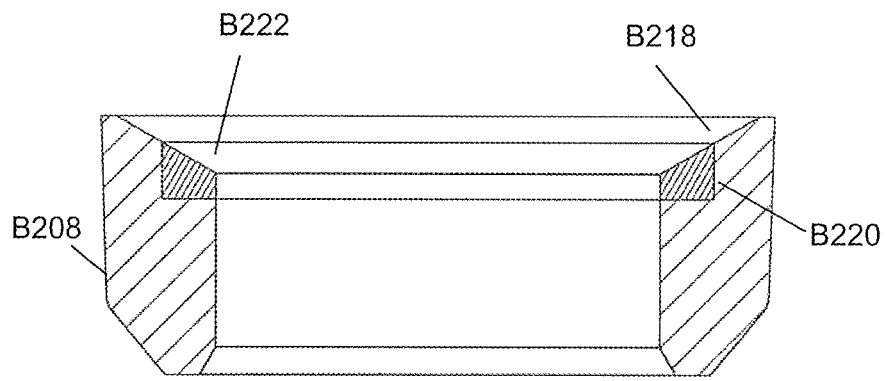

FIG. 108B is a sectional side view of a valve seat containing an insert.

Figure 108C:
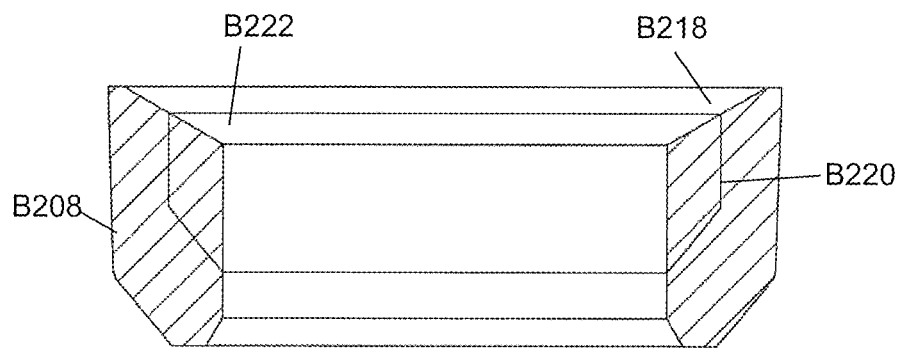

FIG. 108C is a sectional side view of a valve seat containing an insert.

Figure 109A:
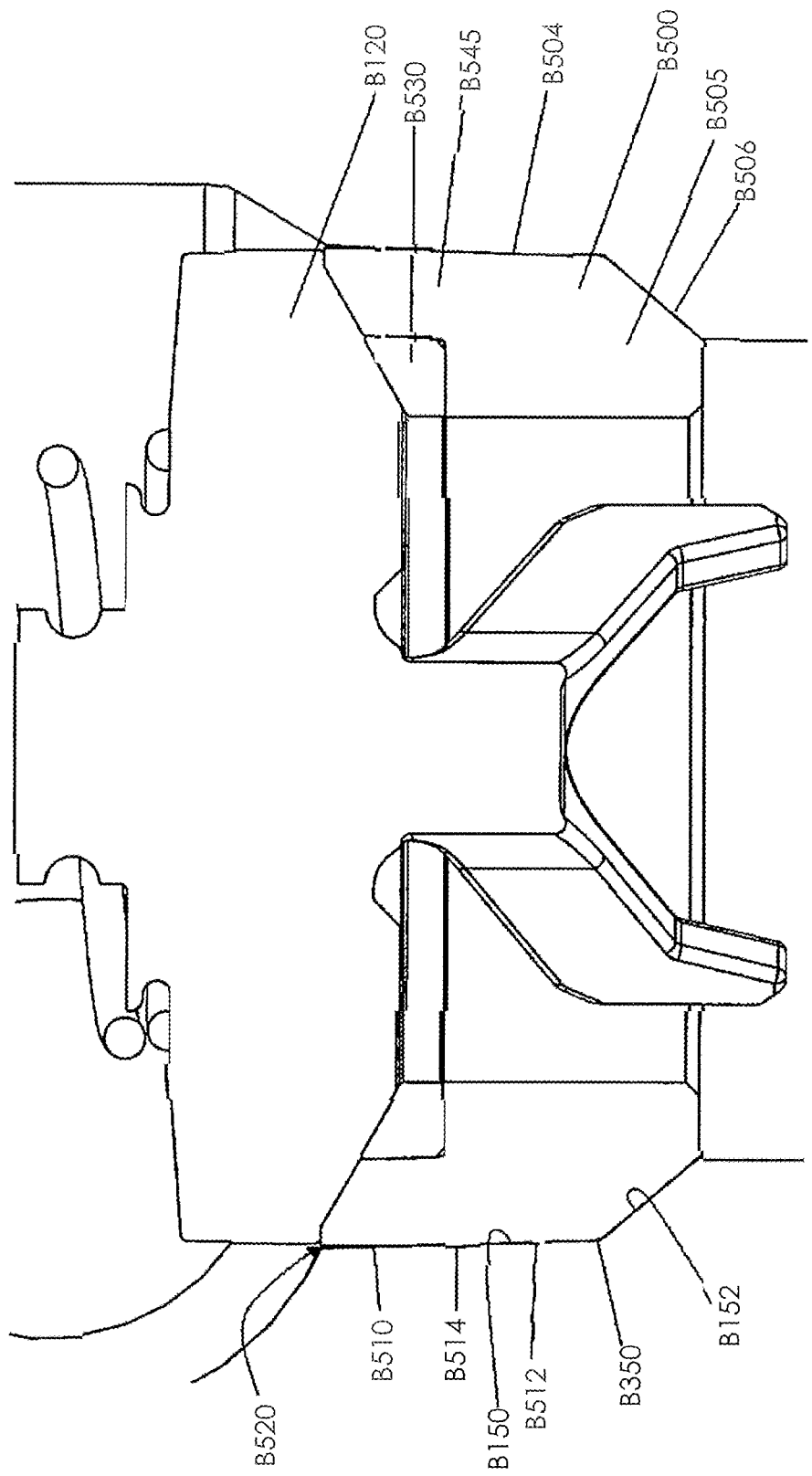

FIG. 109A is a sectional side view of a fluid end having a tapered valve seat.

Figure 109B:
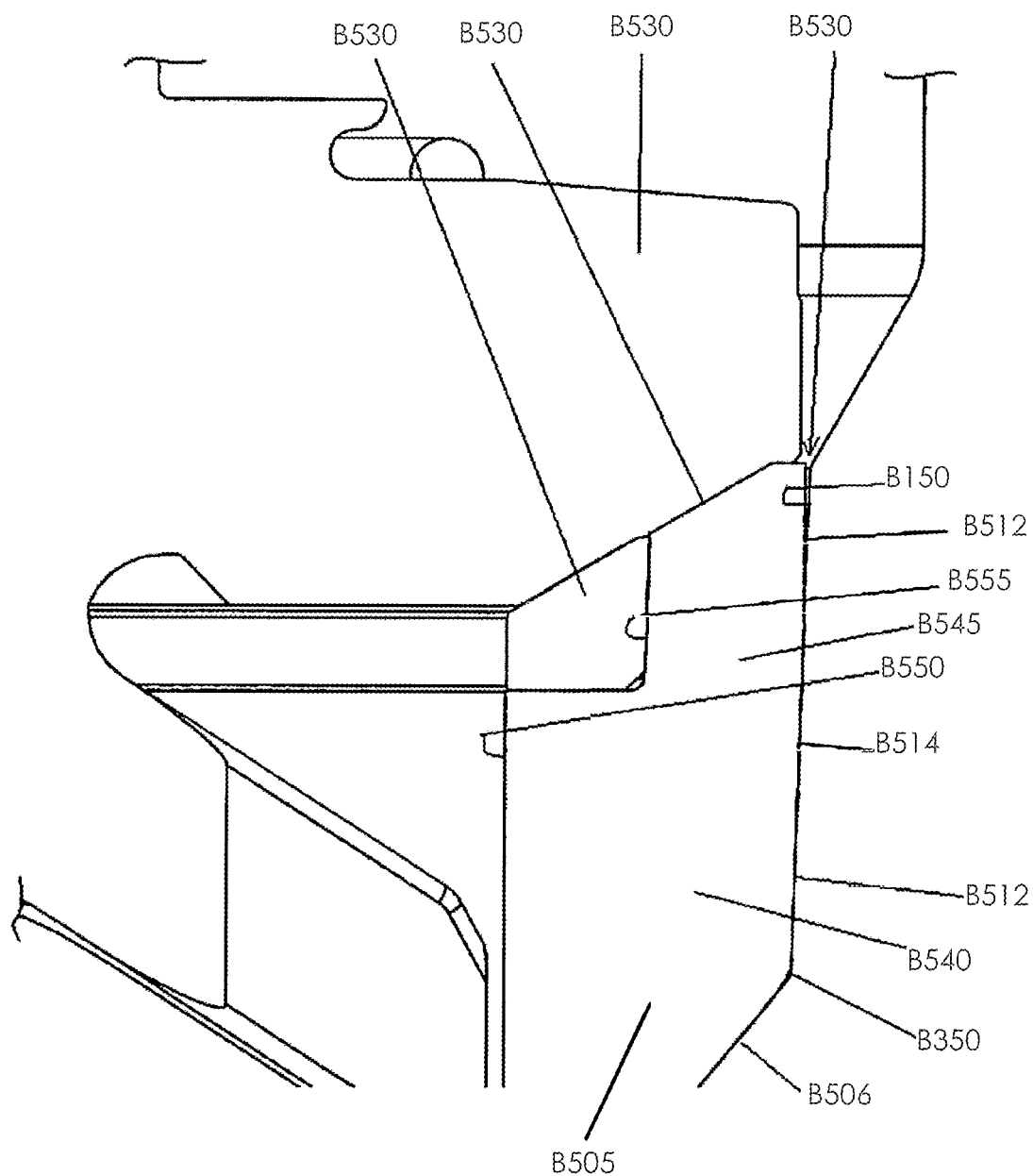

FIG. 109B is a detail view of a gap between the tapered valve seat and valve bore shown in FIG. 109A.

Figure 110:
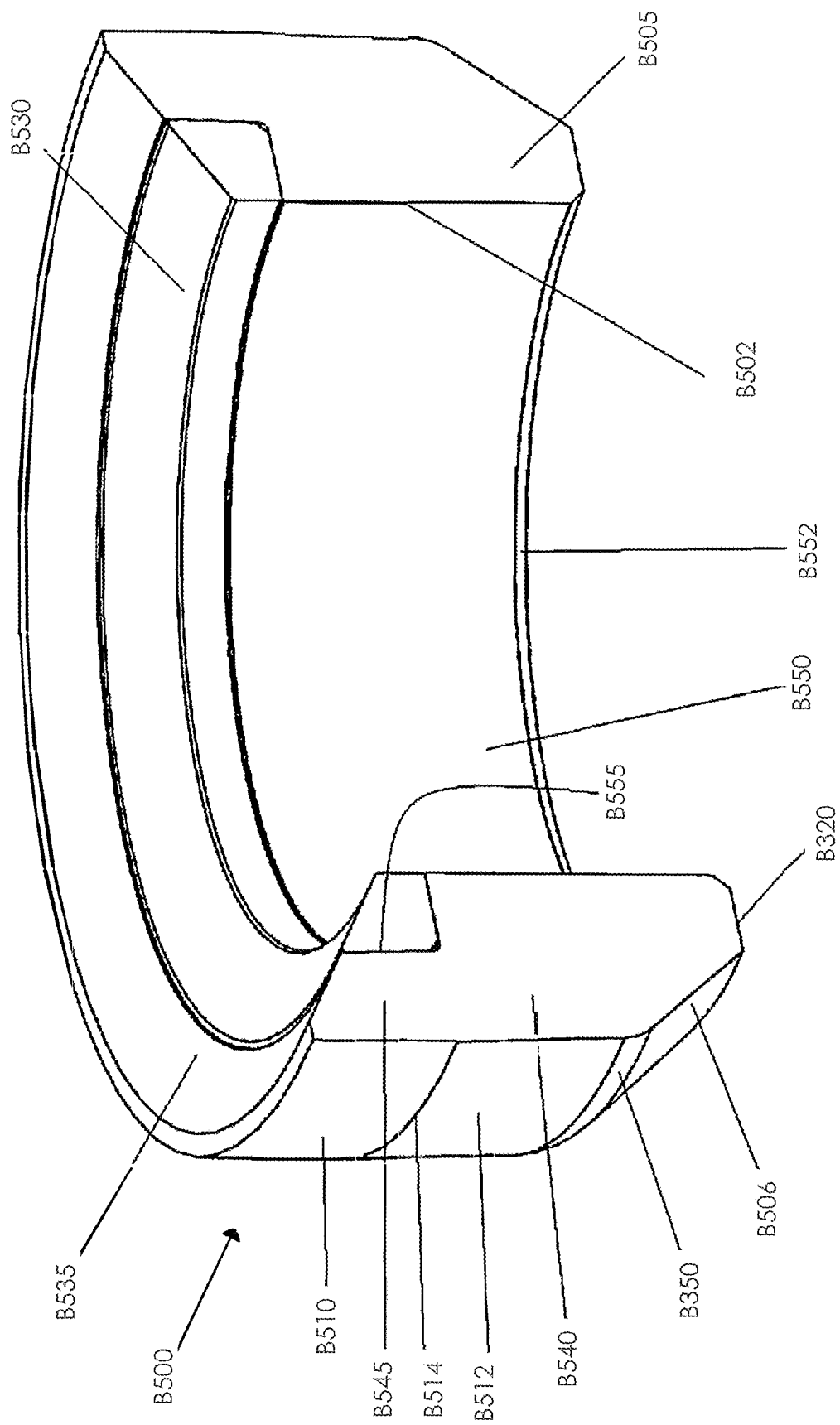

FIG. 110 is a cutaway perspective view of the valve seat shown in FIGS. 109A and 109B.

Figure 11:
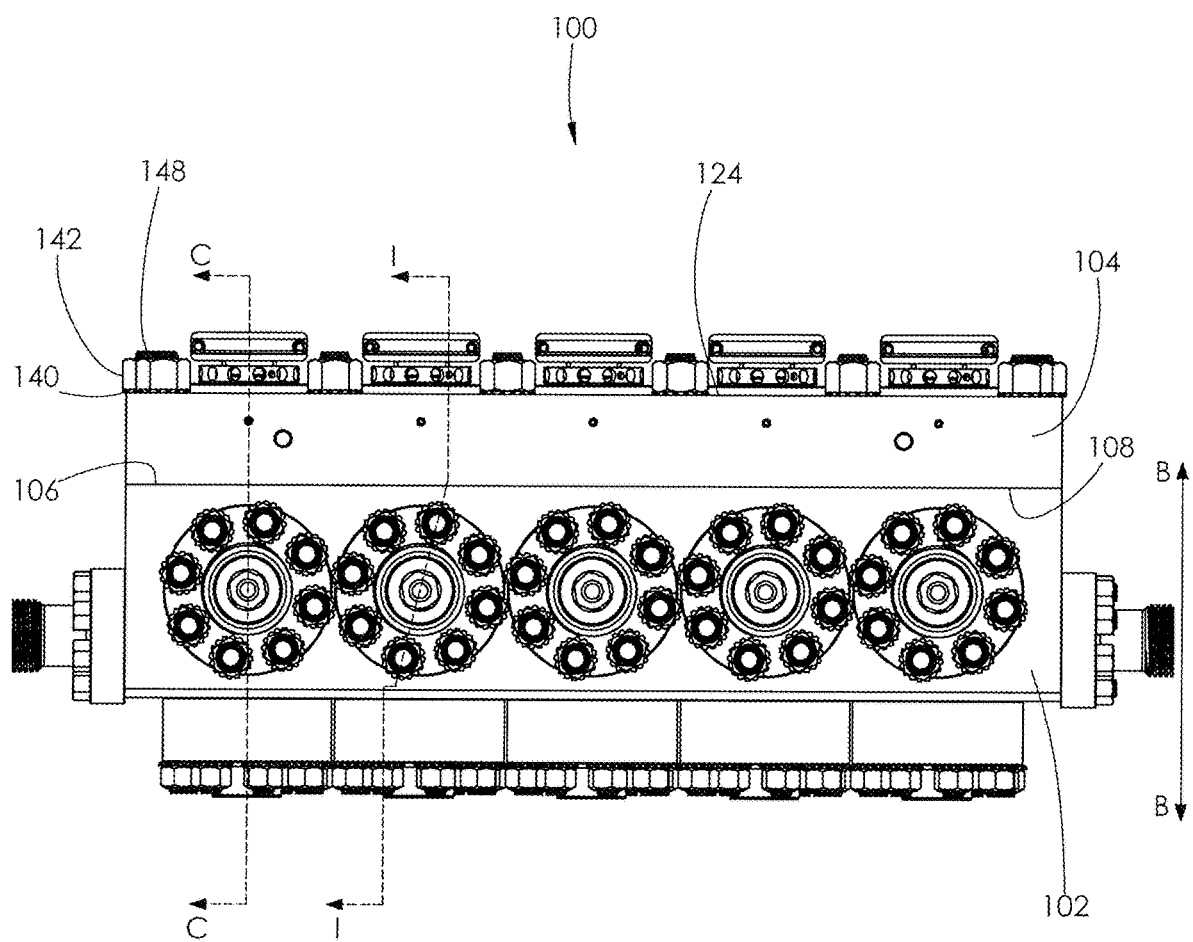
FIG. 11 is a top plan view of the fluid end shown in FIG. 9.

FIG. 11 is a cross-sectional side view of a fluid end.

Figure 112:
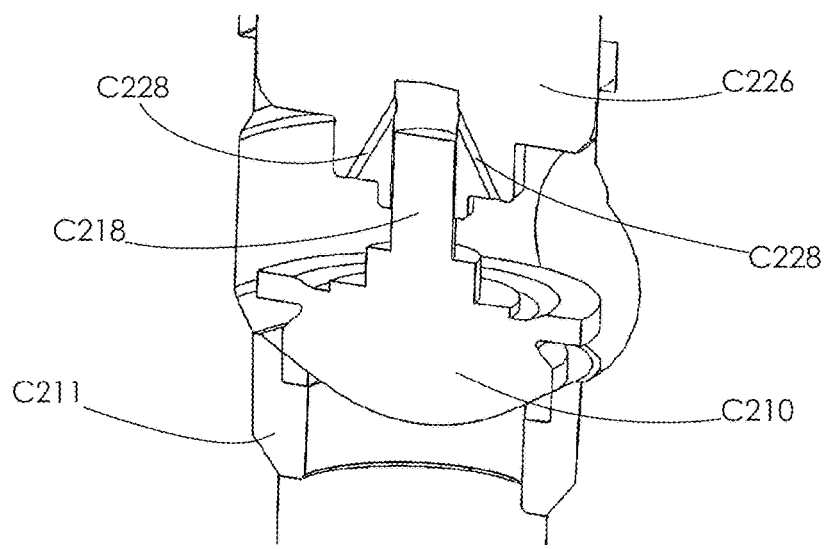

FIG. 112 is a sectional perspective view of a valve having a stem.

Figure 113:
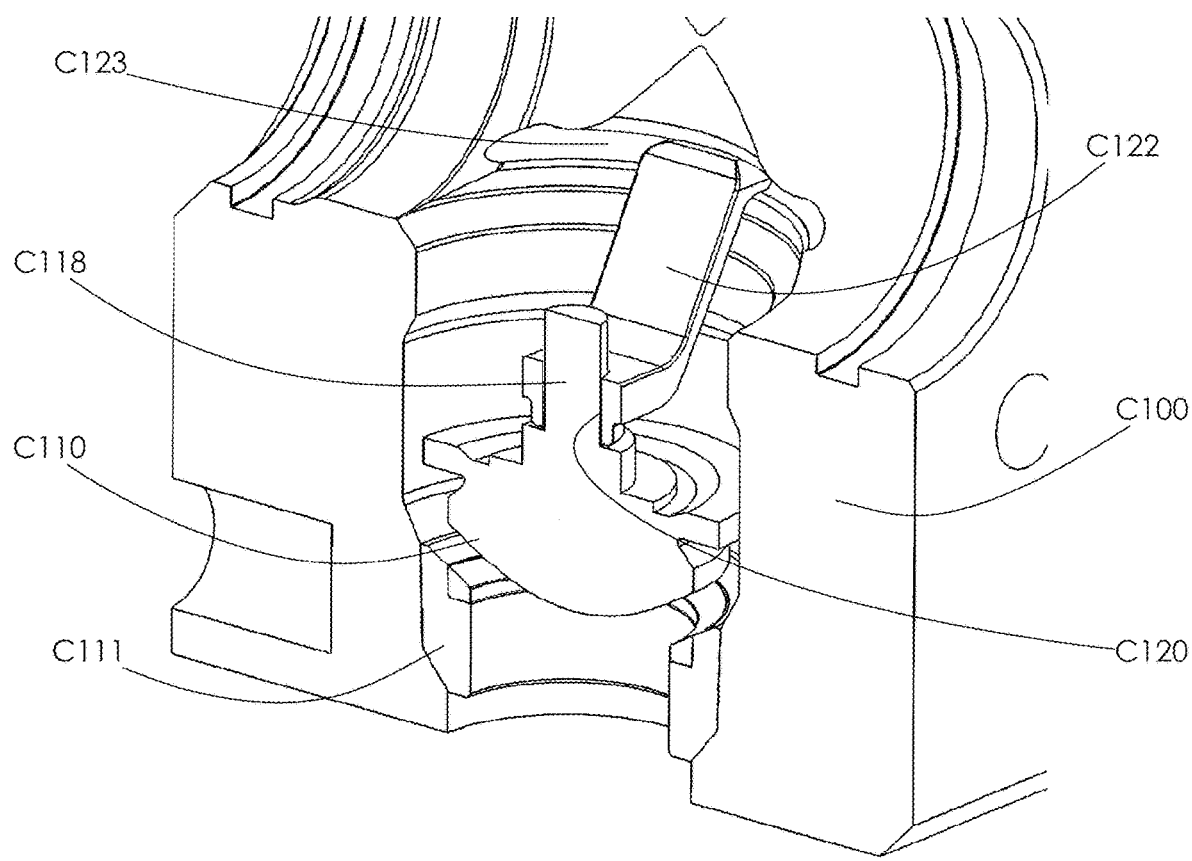

FIG. 113 is a sectional perspective view of a valve having a stem in communication with a valve retainer.

Figure 114:
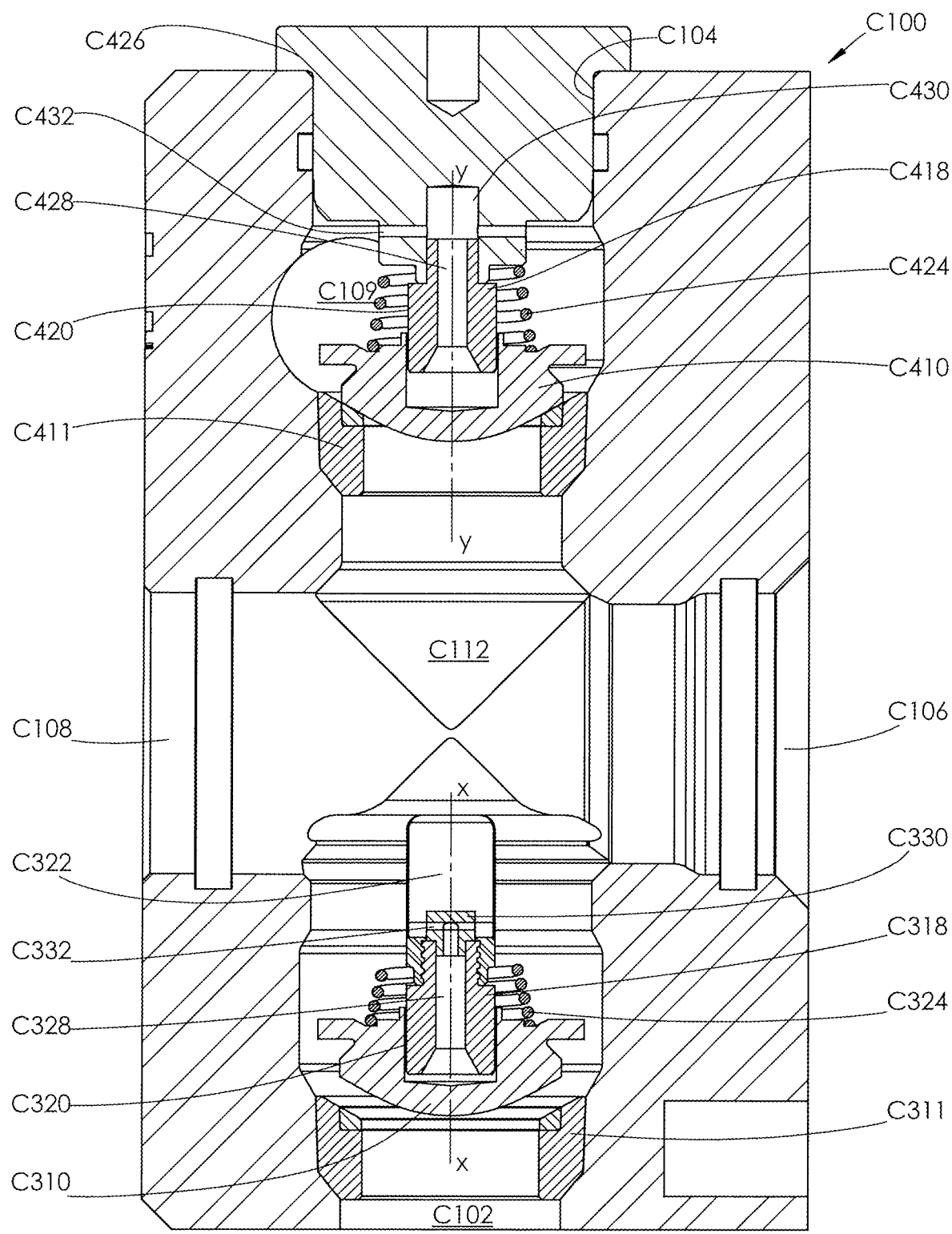

FIG. 114 is a sectional side view of an alternative valve seat and fluid end.

Figure 115:
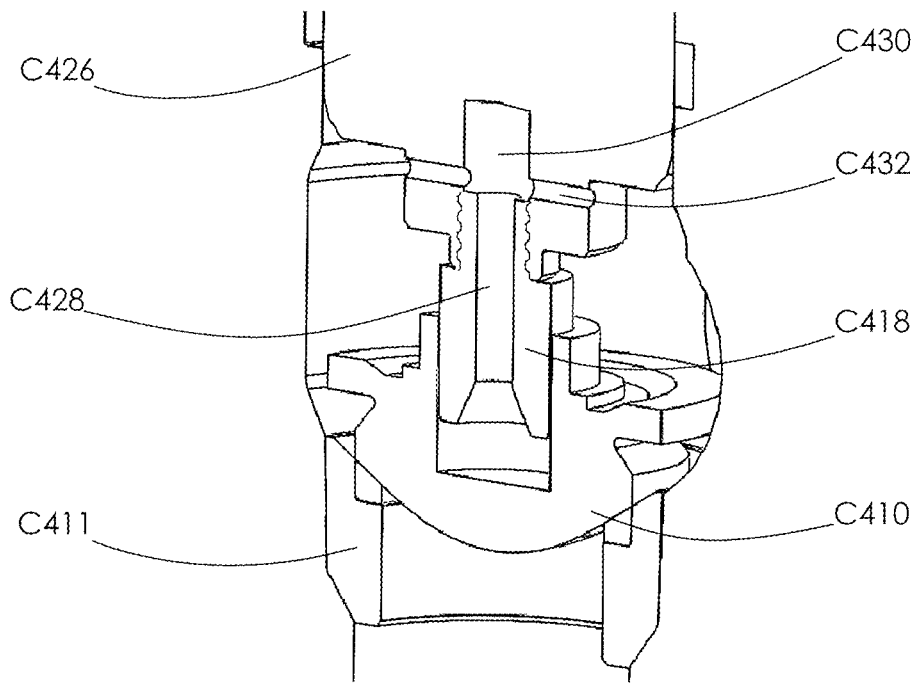

FIG. 115 is a sectional perspective view of a valve.

Figure 116:
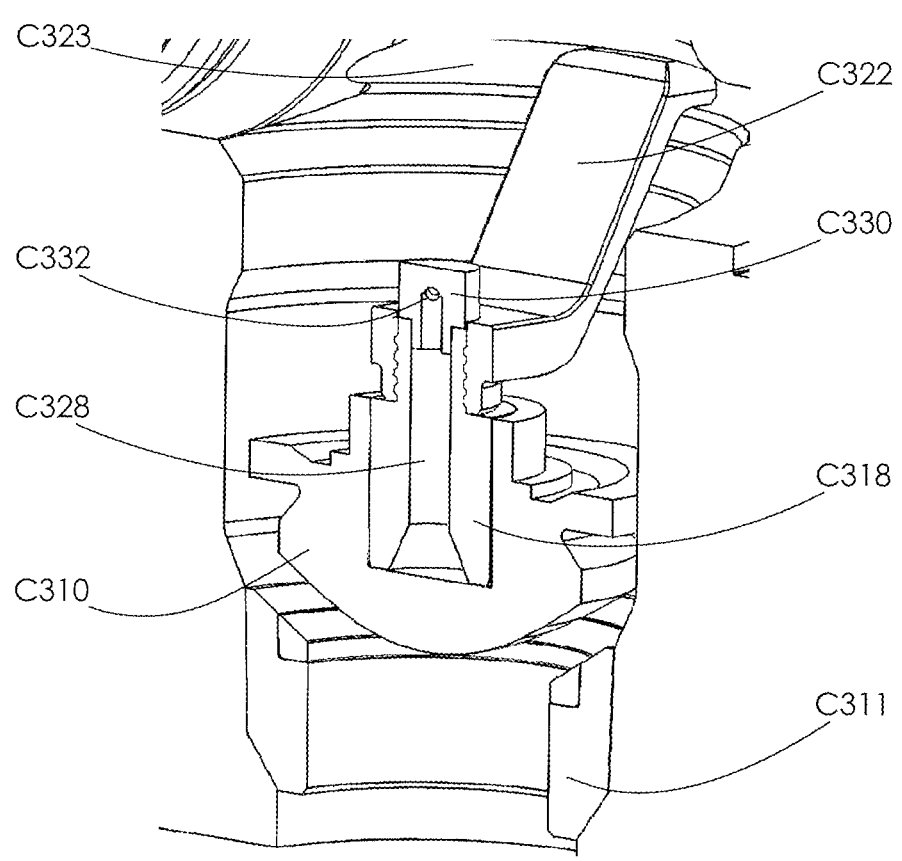

FIG. 116 is a sectional perspective view of a valve in communication with a valve retainer.

Figure 117:
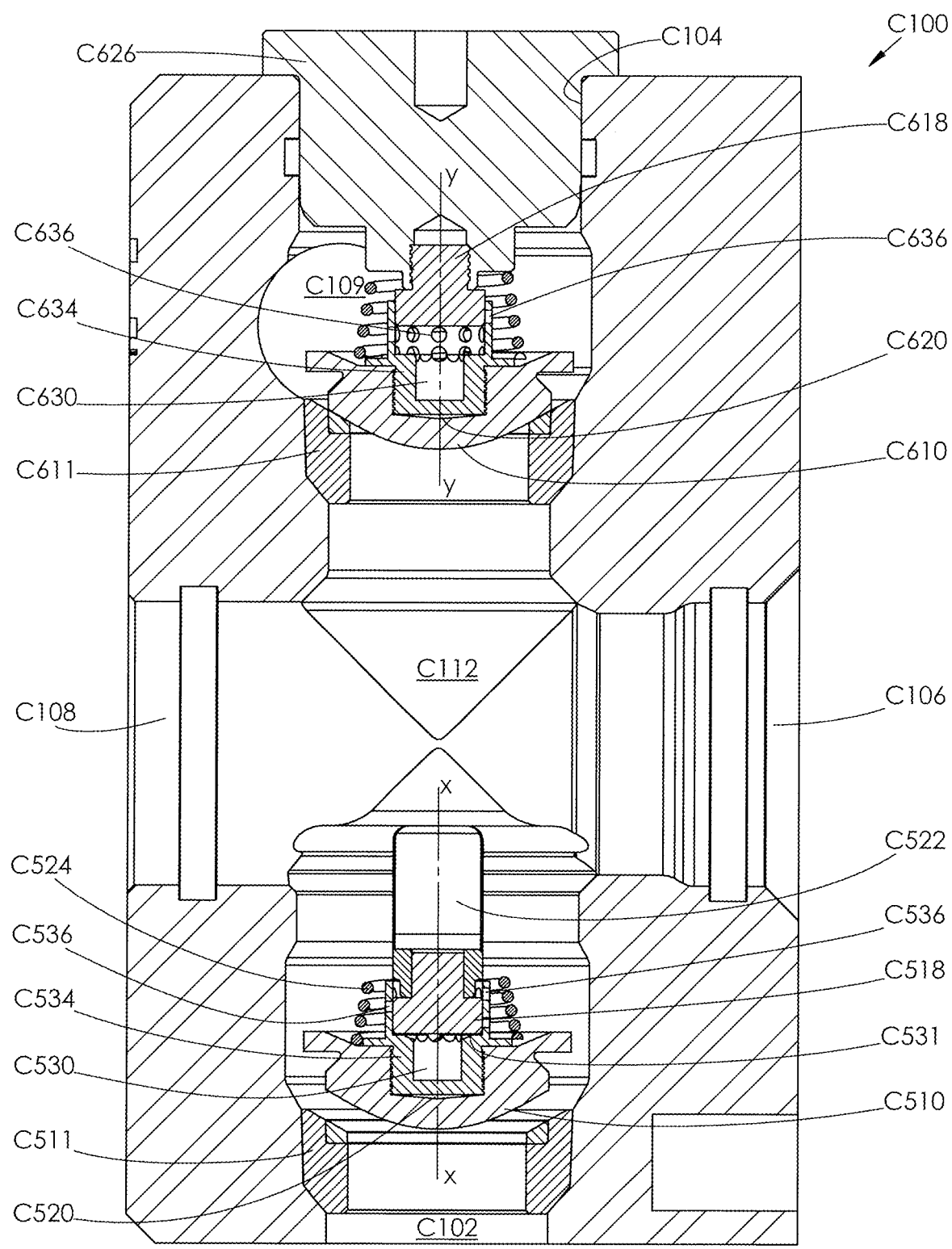

FIG. 117 is a sectional side view of an alternative valve seat and fluid end.

Figure 118:
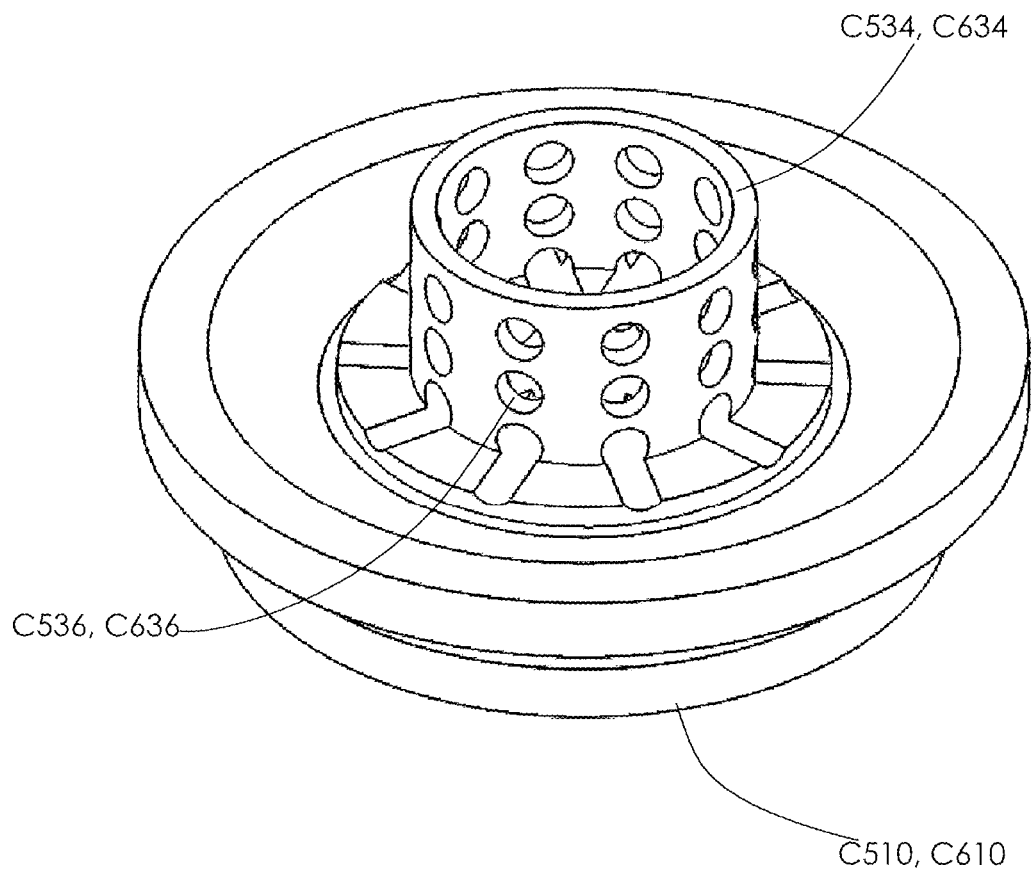

FIG. 118 is a top perspective view of a valve body.

Figure 119:
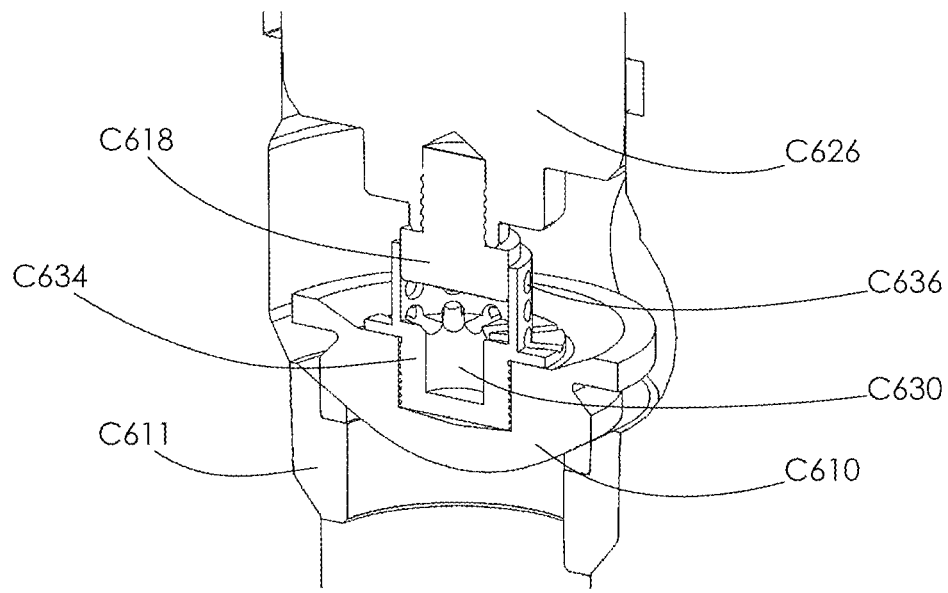

FIG. 119 is a sectional view of the valve of FIG. 118 within a fluid end bore.

Figure 120:
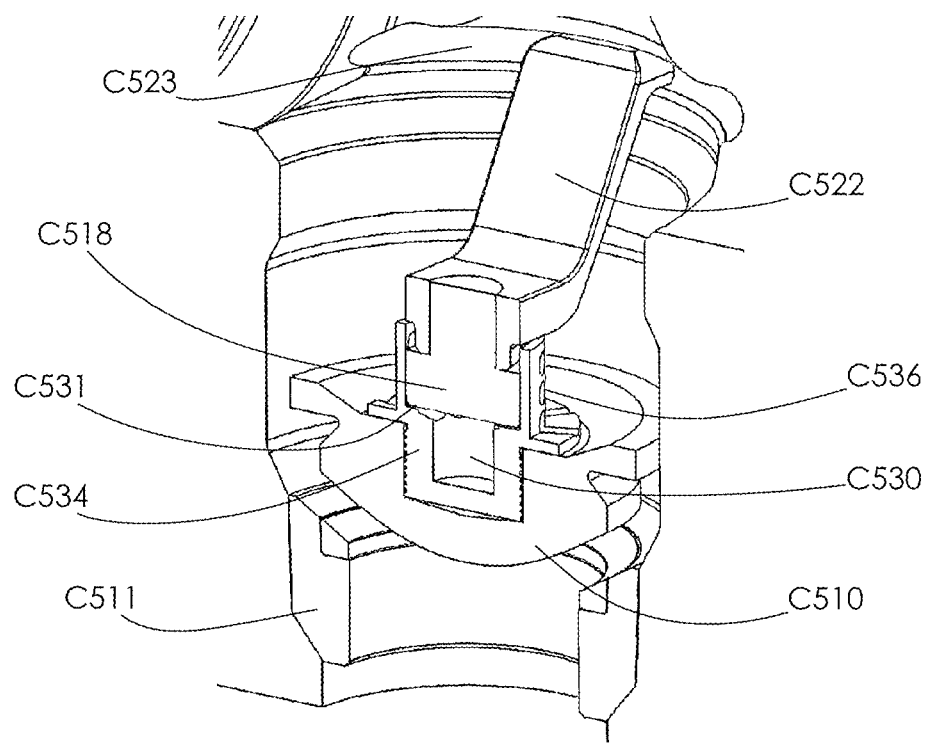

FIG. 120 is a sectional view of the valve of FIG. 118 within a fluid end bore in communication with a valve retainer.

Figure 121:
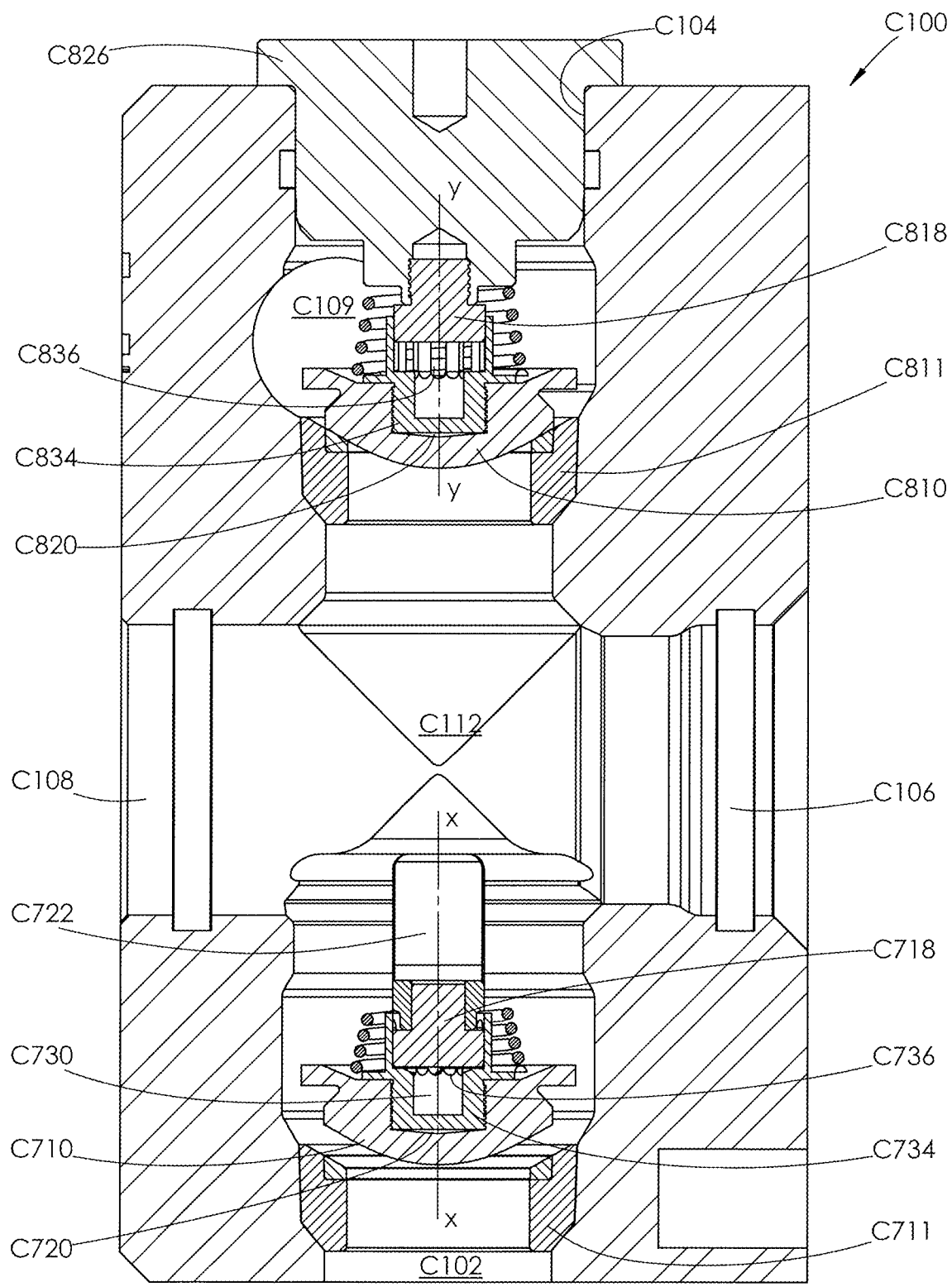

FIG. 121 is a sectional view of a fluid end with a top valve in a closed position and a bottom valve in an open position.

Figure 122:
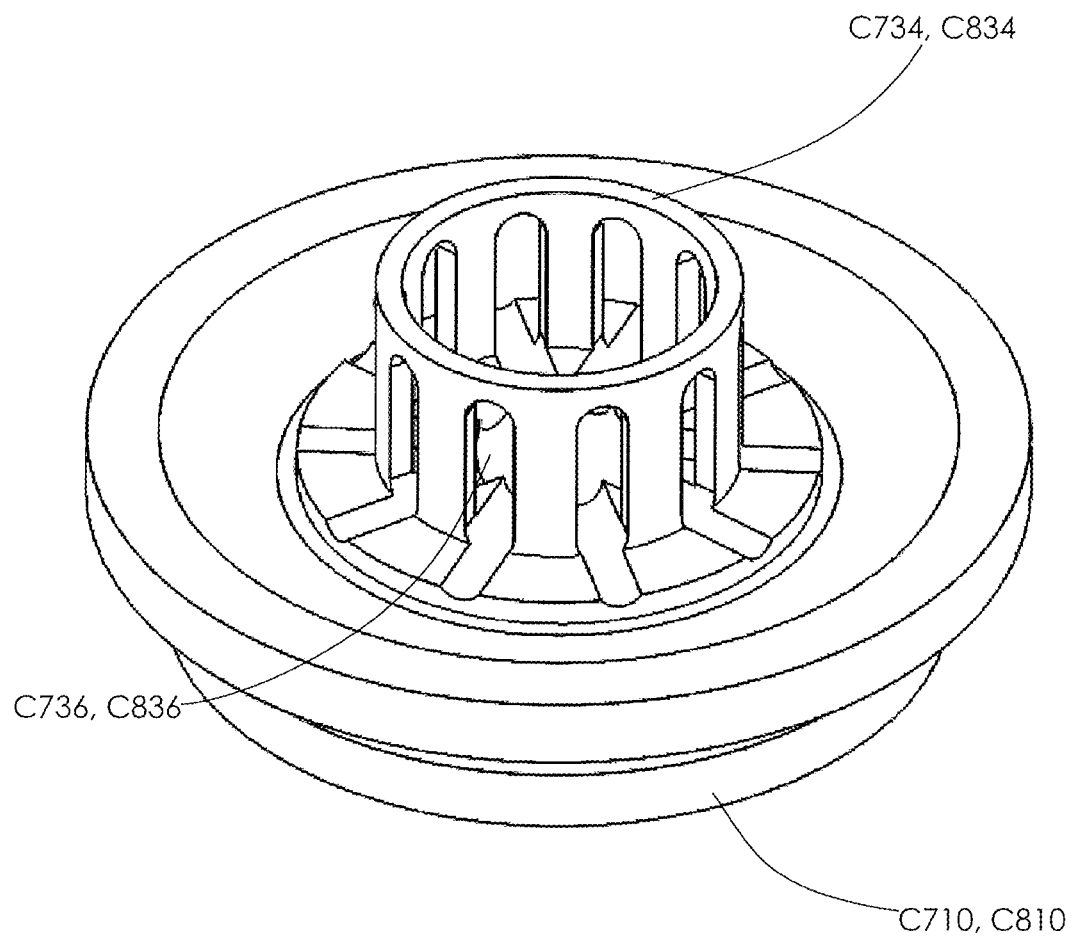

FIG. 122 is a top perspective view of a valve body.

Figure 123:
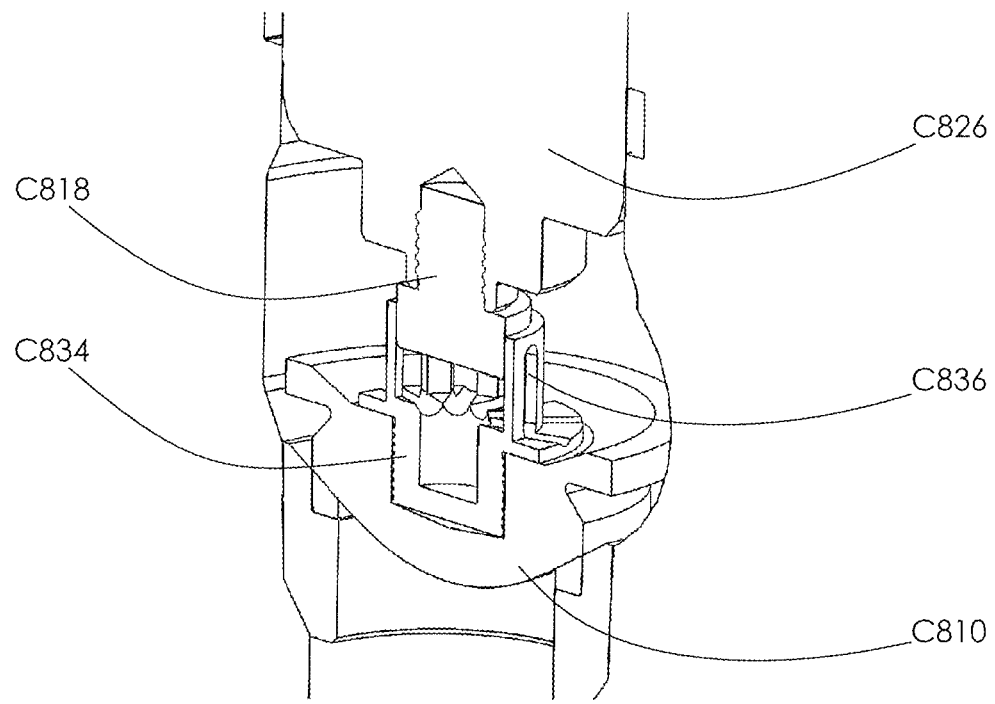

FIG. 123 is a sectional view of the valve of FIG. 122 within a fluid end.

Figure 124:
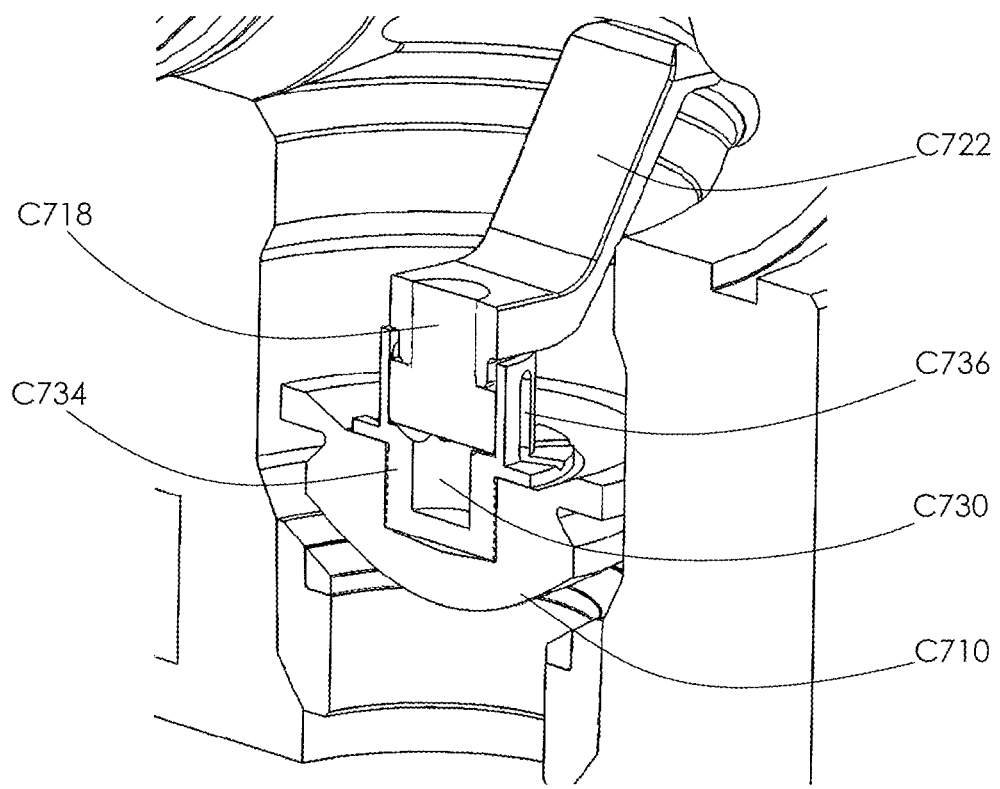

FIG. 124 is a sectional view of the valve of FIG. 122 within a fluid end bore in communication with a valve retainer.

Figure 125:
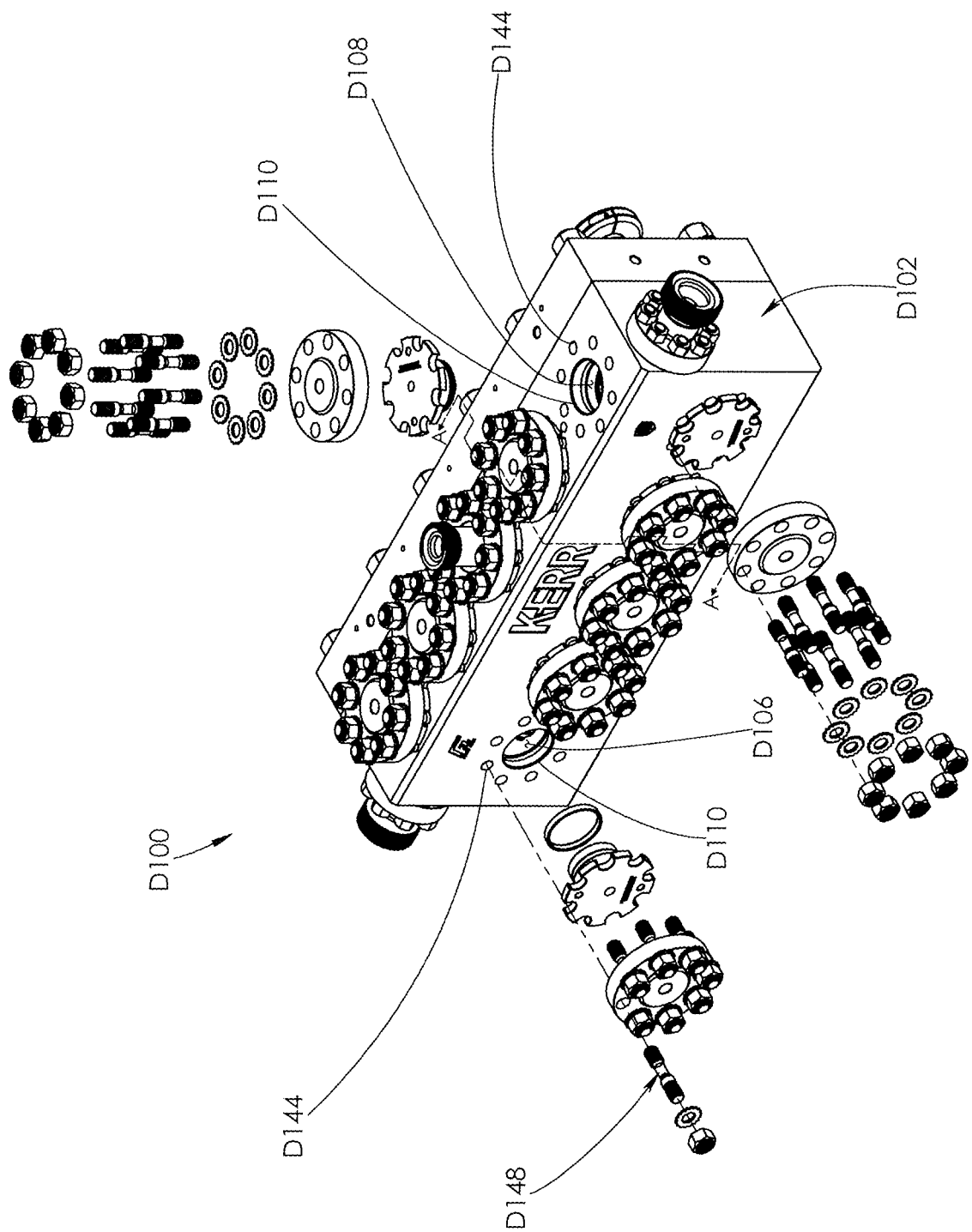

FIG. 125 is an exploded perspective view of a fluid end.

Figure 126:
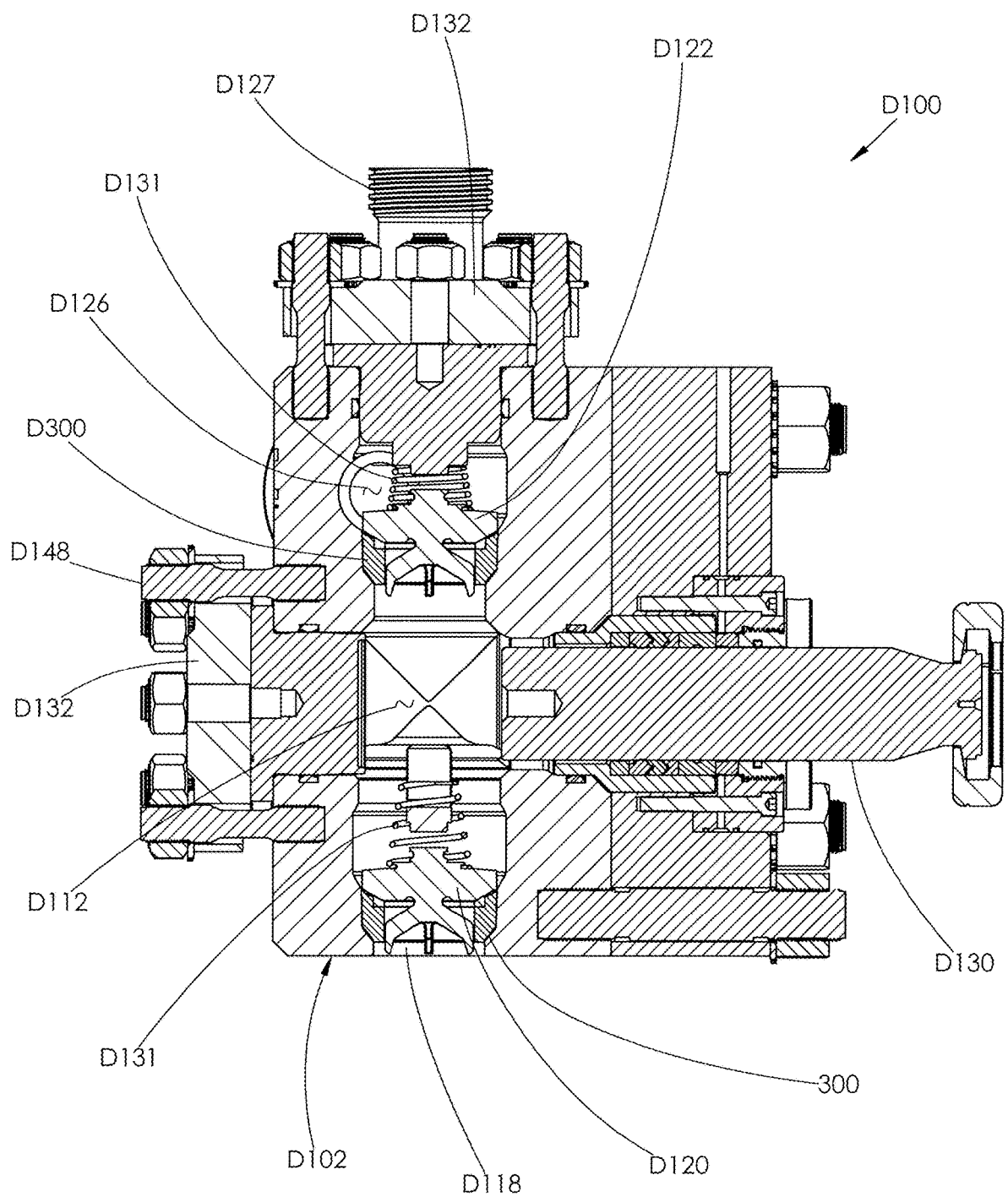

FIG. 126 is a sectional side view of the fluid end of FIG. 125 along section A-A.

Figure 127:
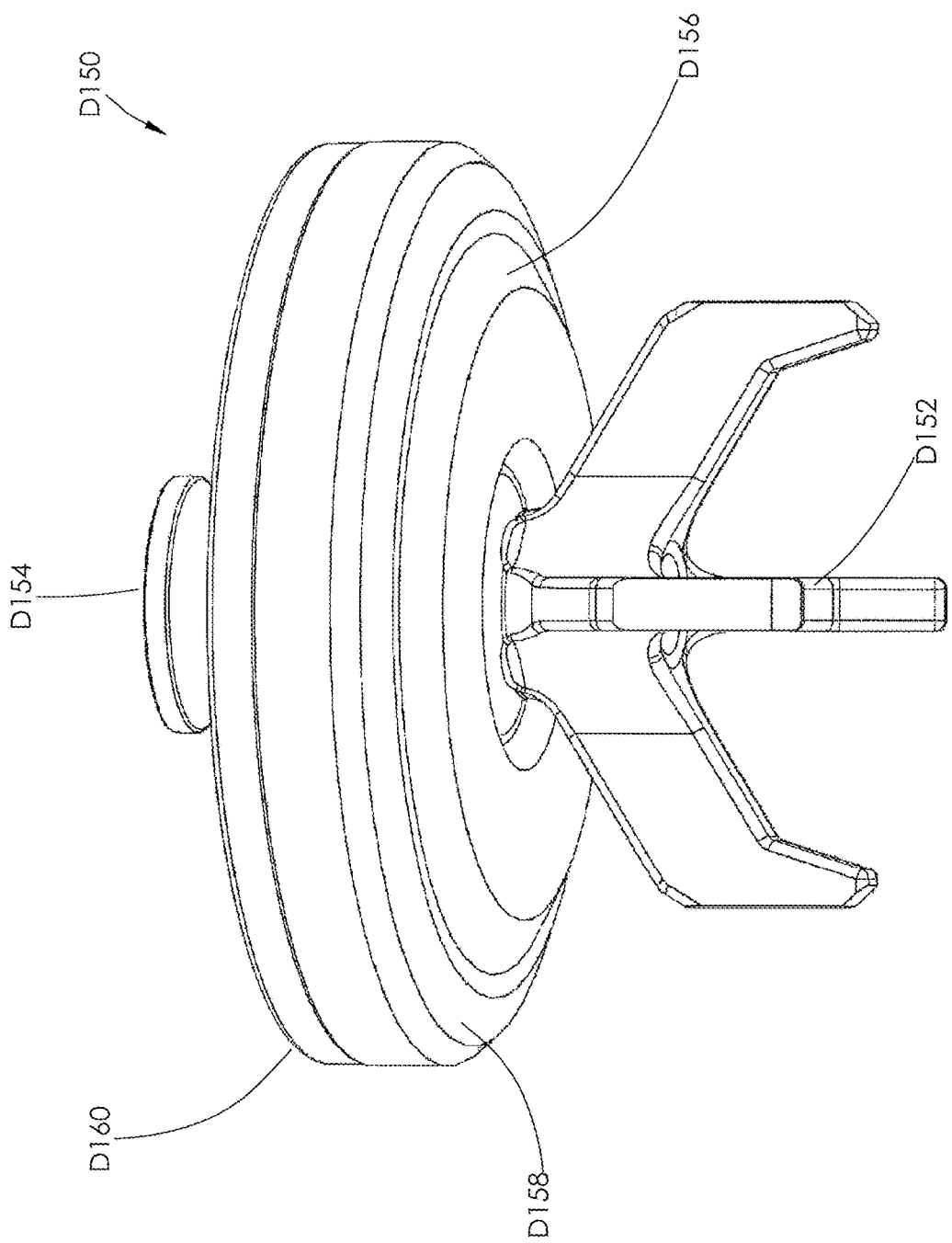

FIG. 127 is a bottom side perspective of a prior art valve body.

Figure 128:
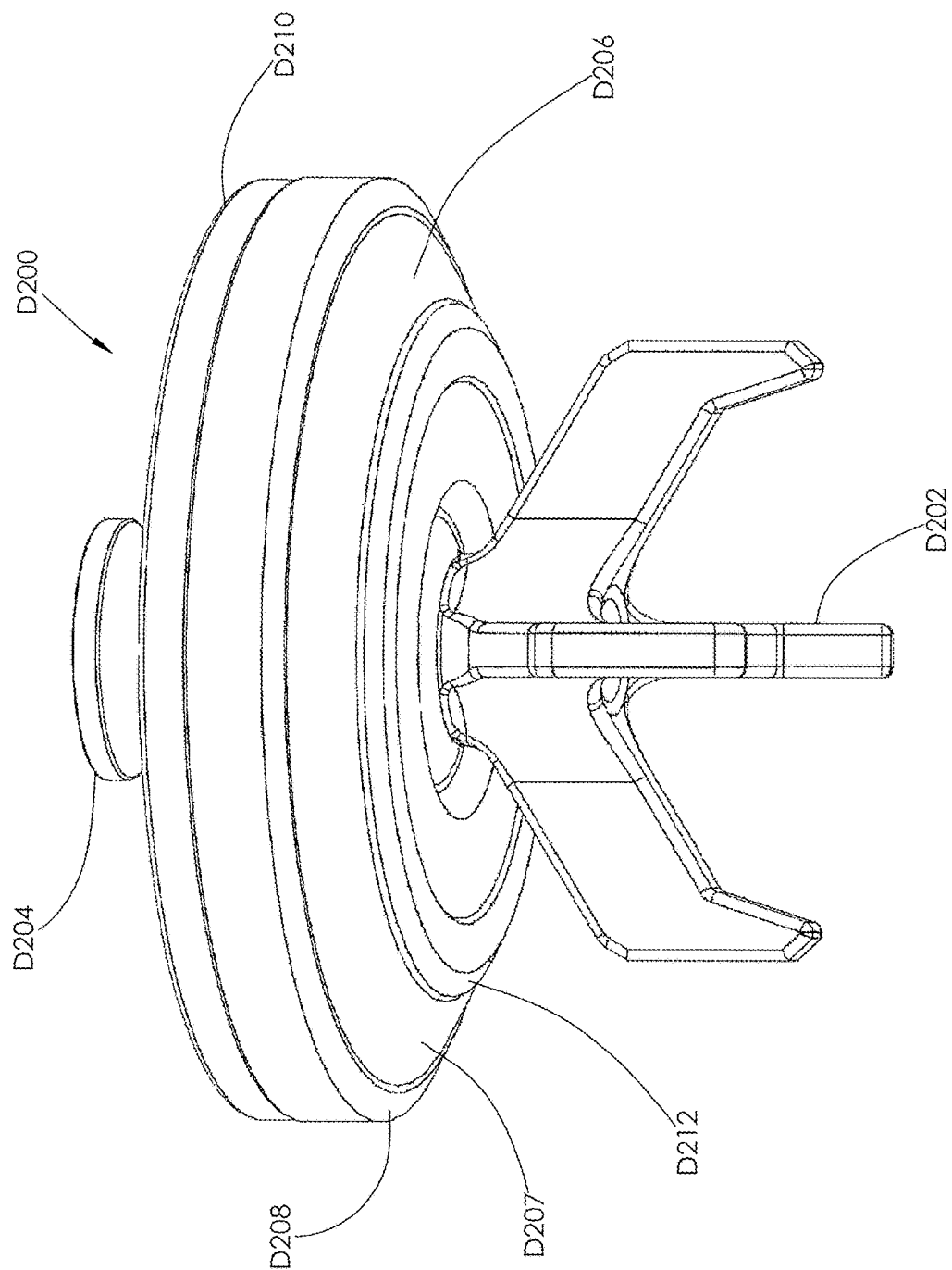

FIG. 128 is a bottom side perspective view of the fluid end valve body.

Figure 129:
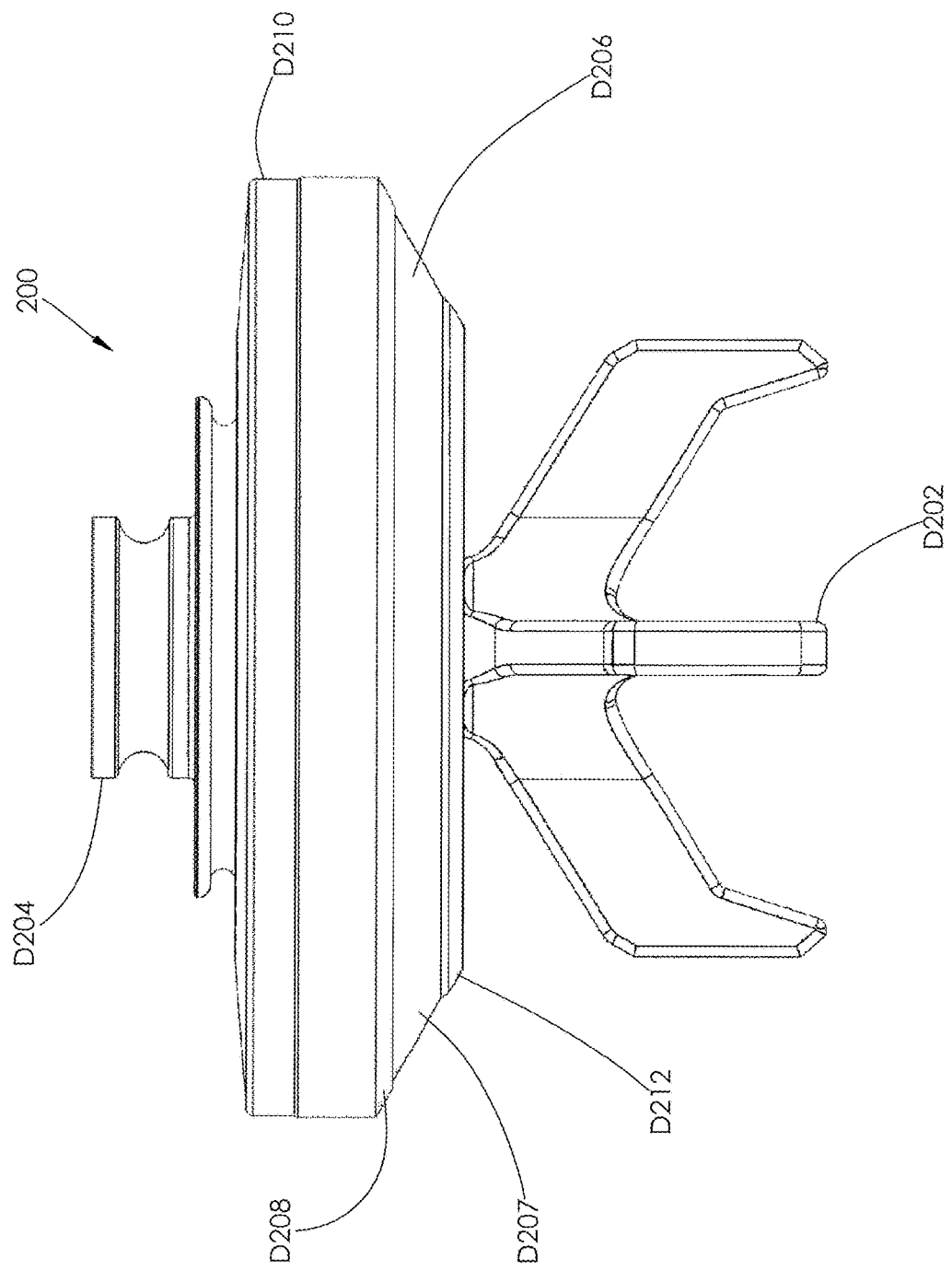

FIG. 129 is a side view of the fluid end valve body of FIG. 128.

Figure 130:
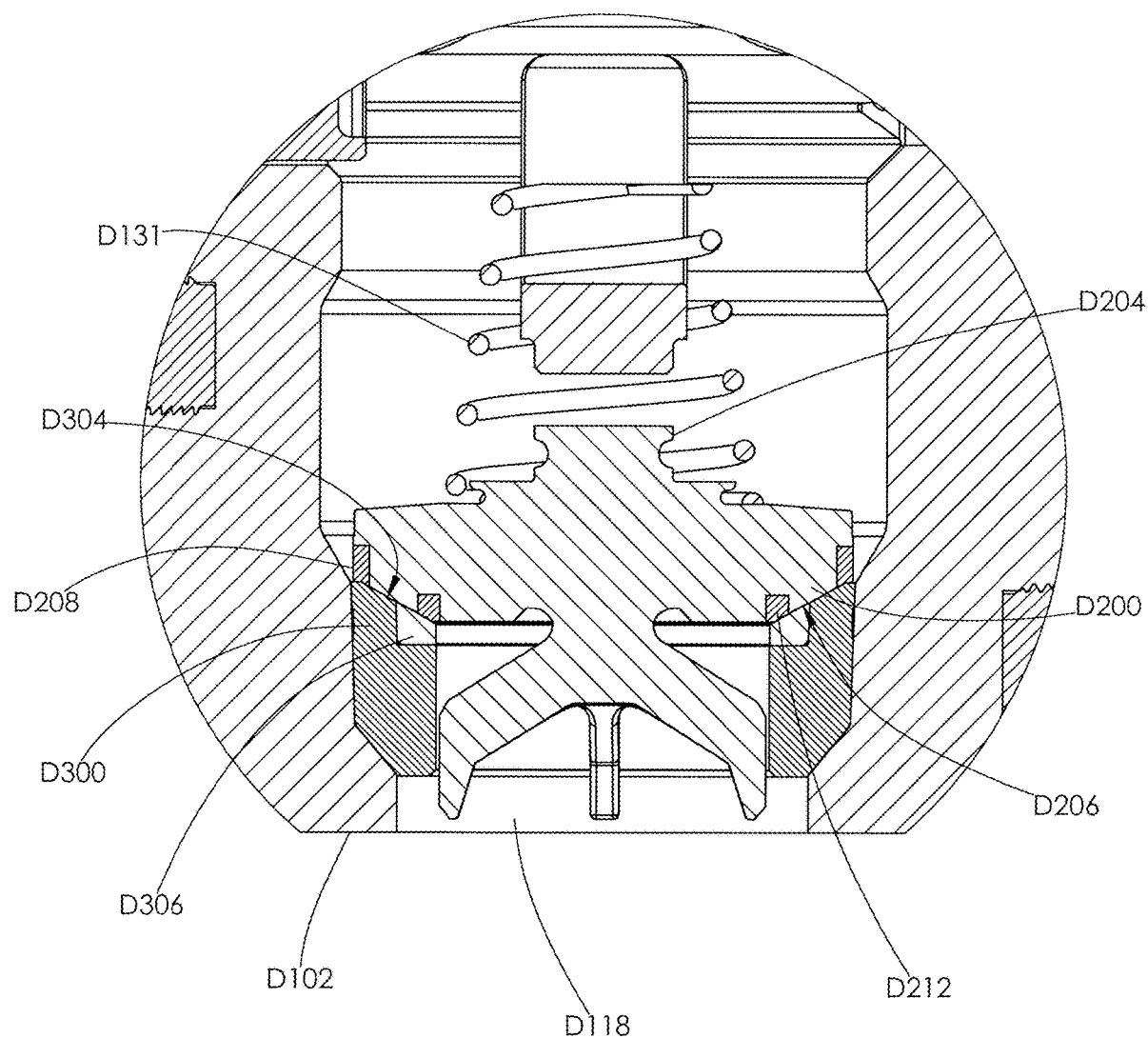

FIG. 130 is a cutaway sectional side view of a fluid end bore with the valve body of FIG. 128 disposed therein.

Figure 131:
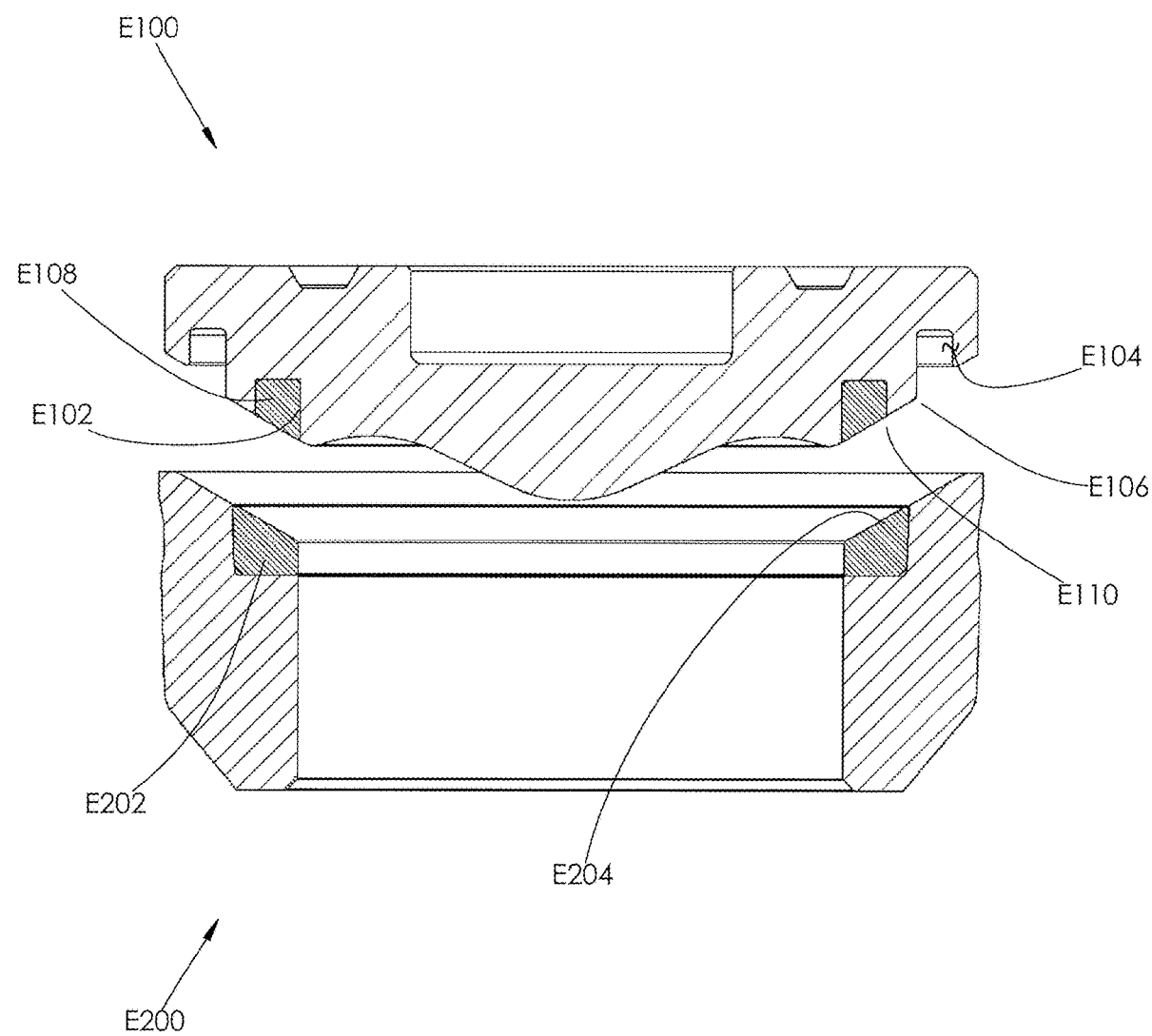

FIG. 131 is a side view of a valve and valve seat.

Figure 132:
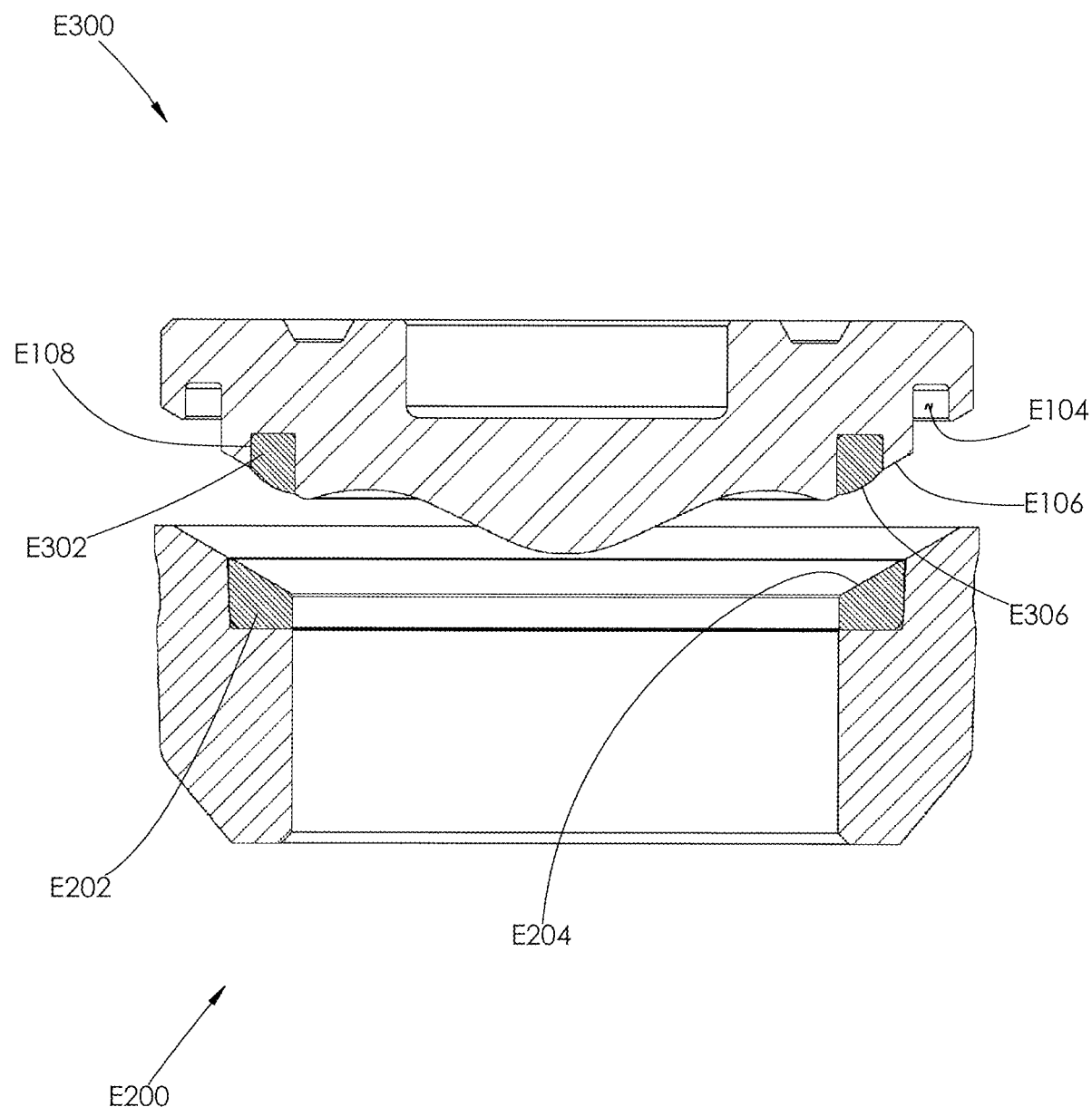

FIG. 132 is a side view of a valve and valve seat.

Figure 133:
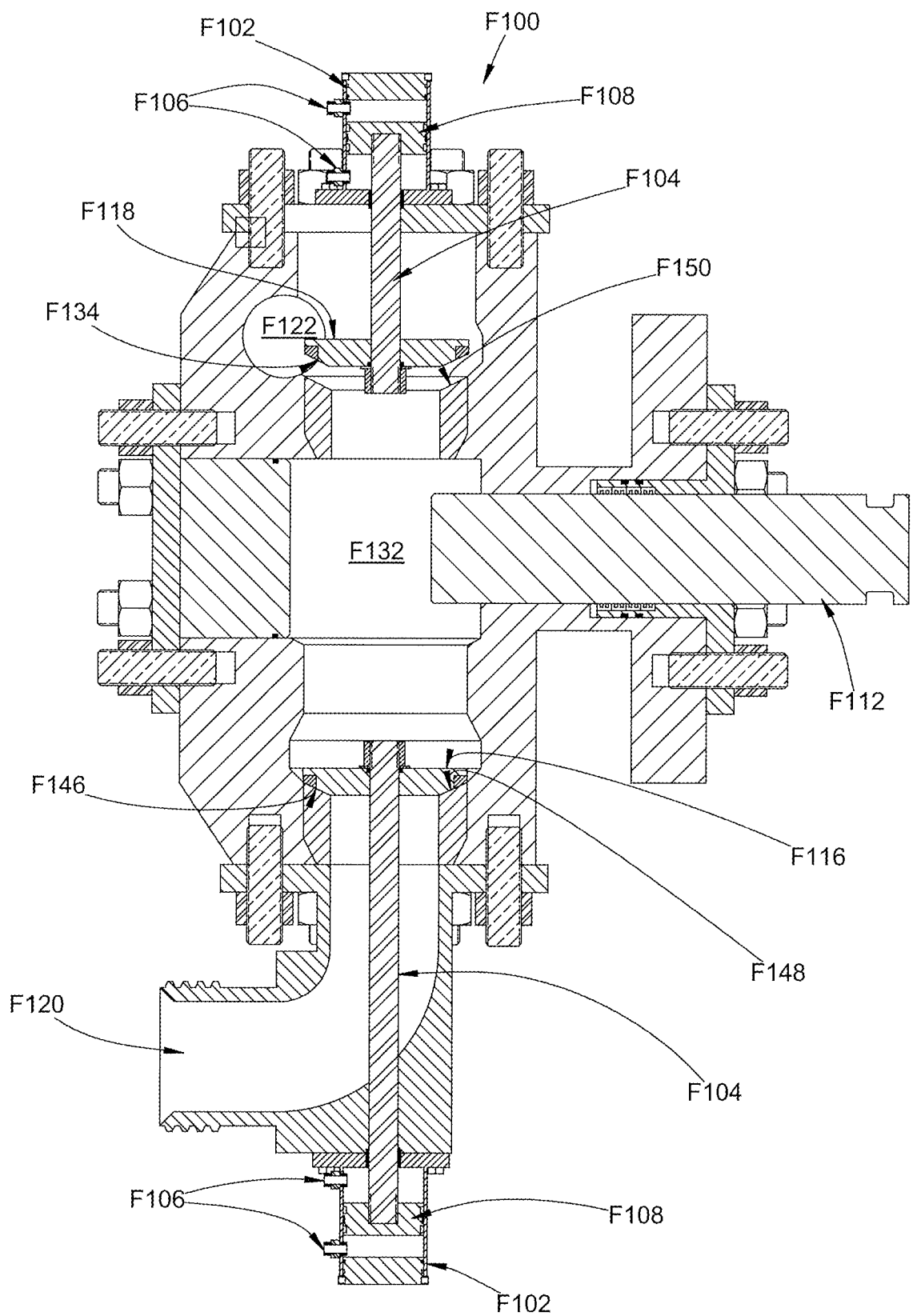

FIG. 133 is a sectional view of a fluid end with an adjustable valve.

Figure 134:
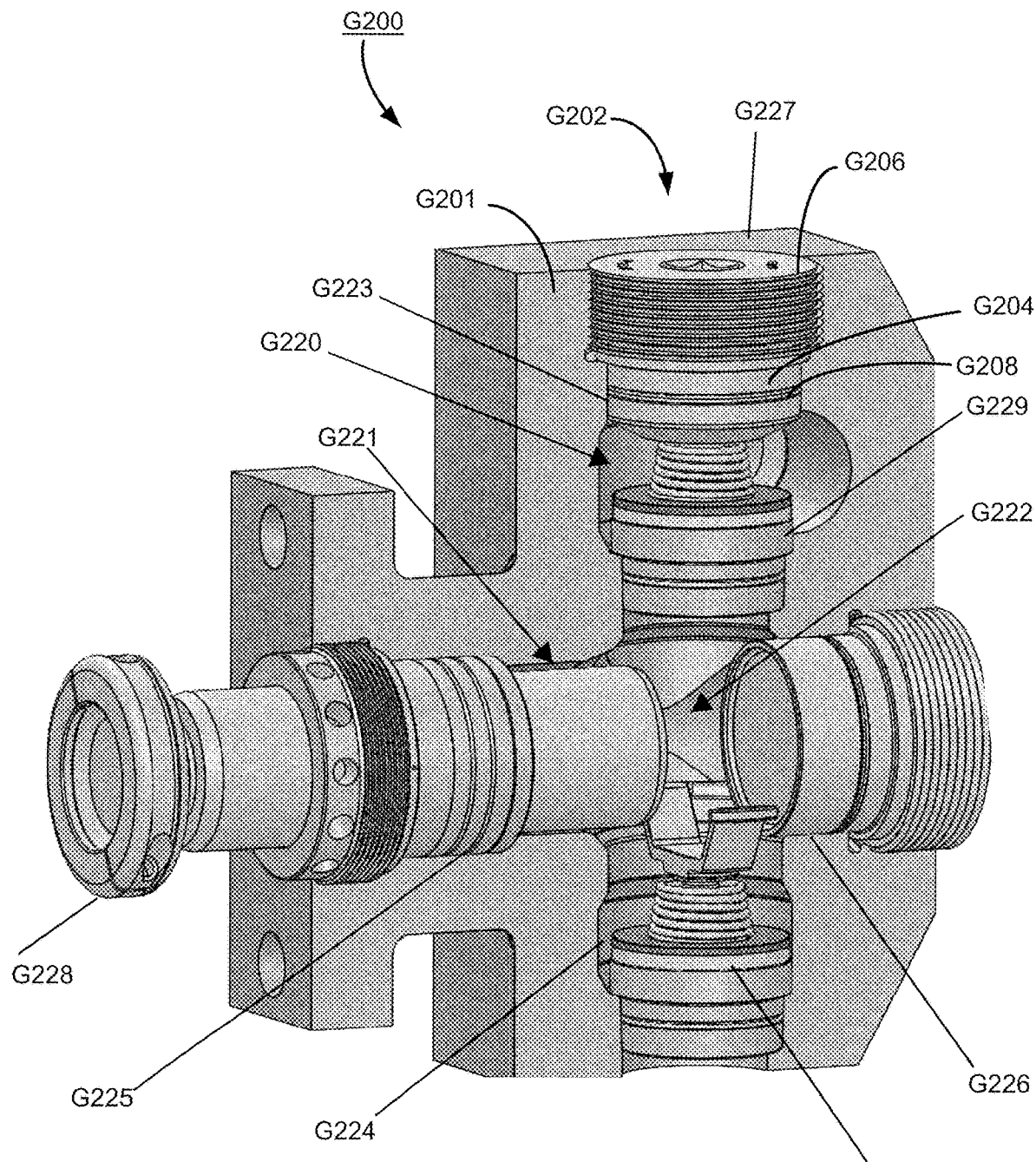

FIG. 134 is an isometric depiction of a fluid end that is constructed in accordance with embodiments of this technology.

Figure 135:
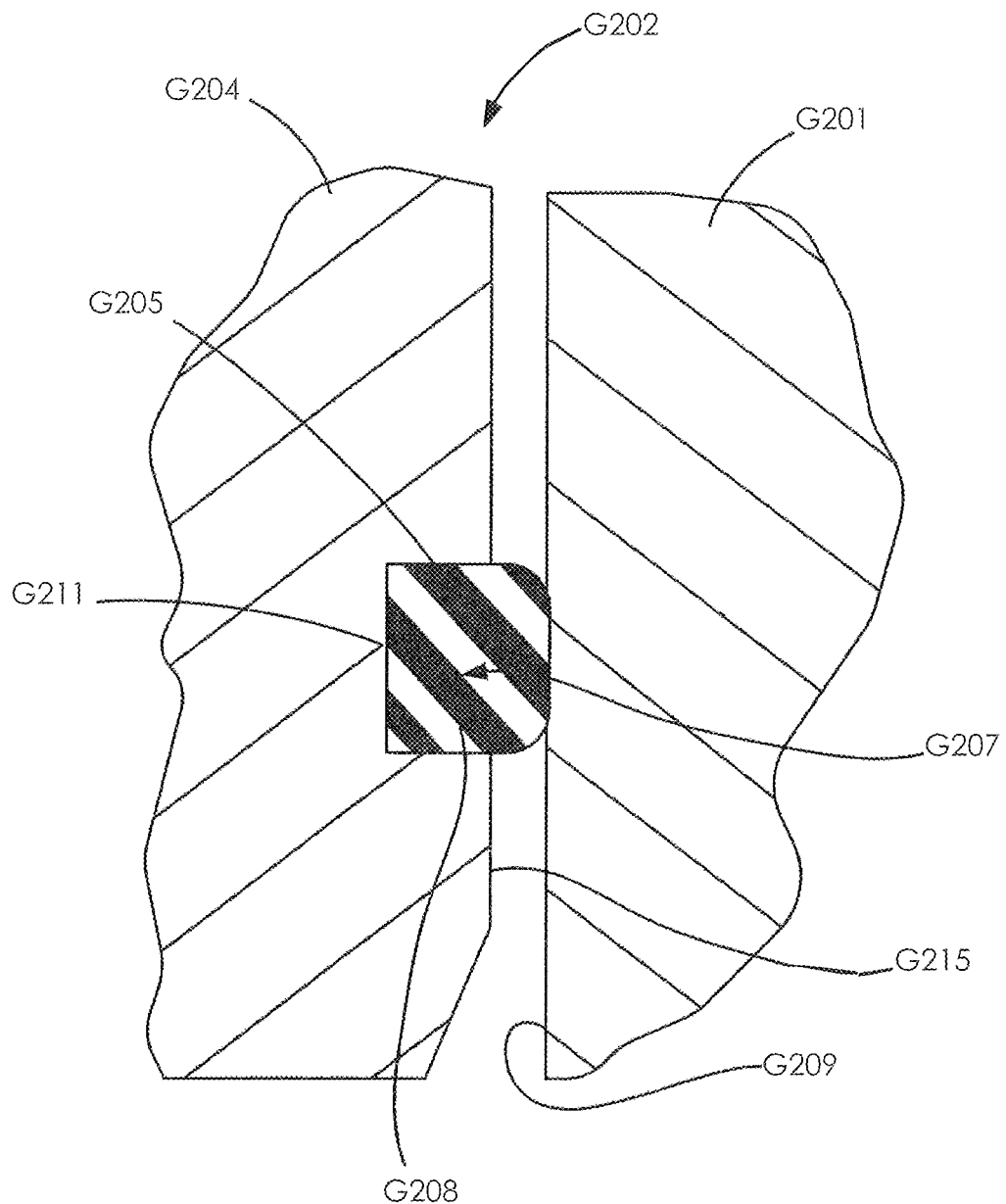

FIG. 135 is an enlarged depiction of a portion of the fluid end of FIG. 88.

Figure 136:
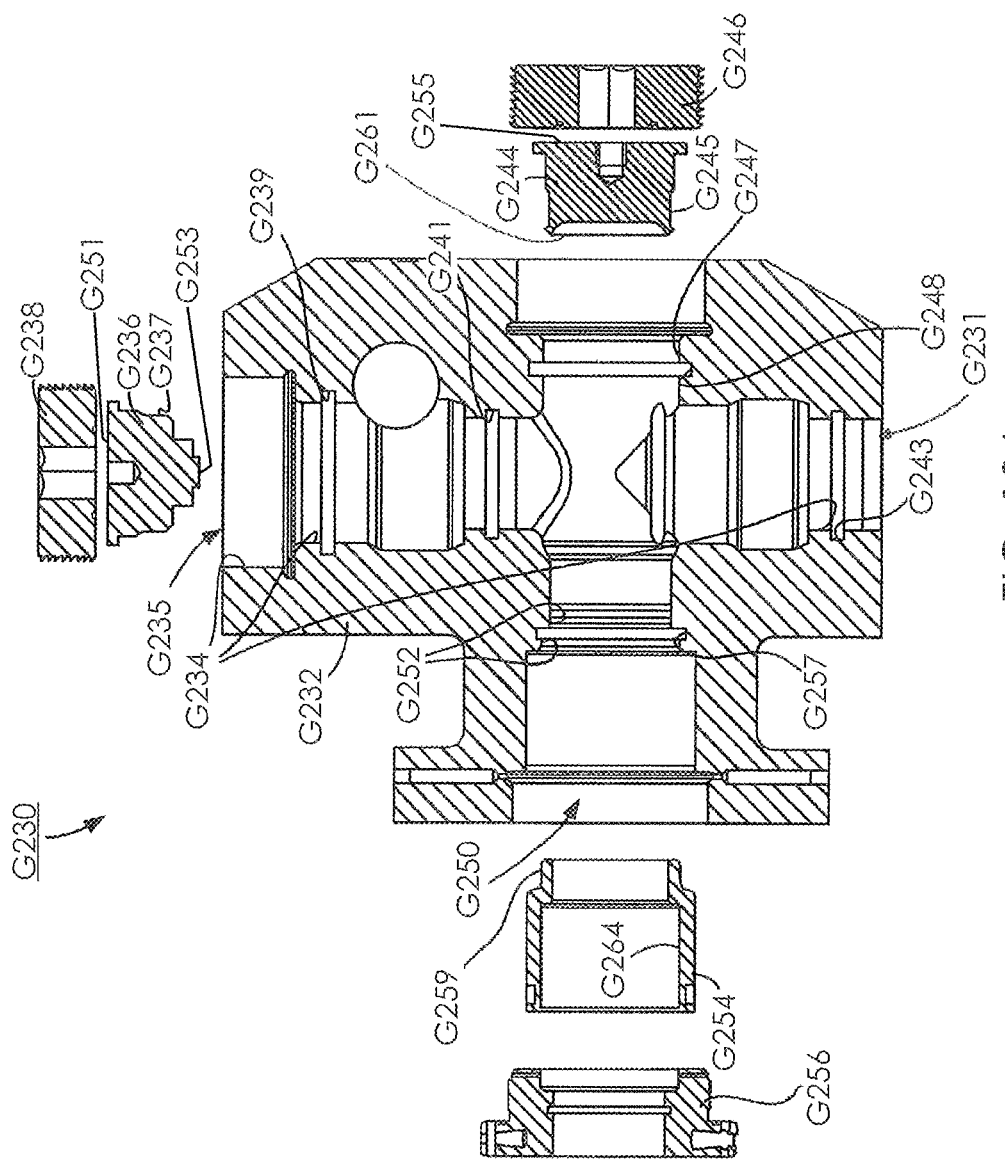

FIG. 136 is an exploded cross-sectional depiction of a fluid end that is constructed in accordance with embodiments of this technology.

Figure 137:
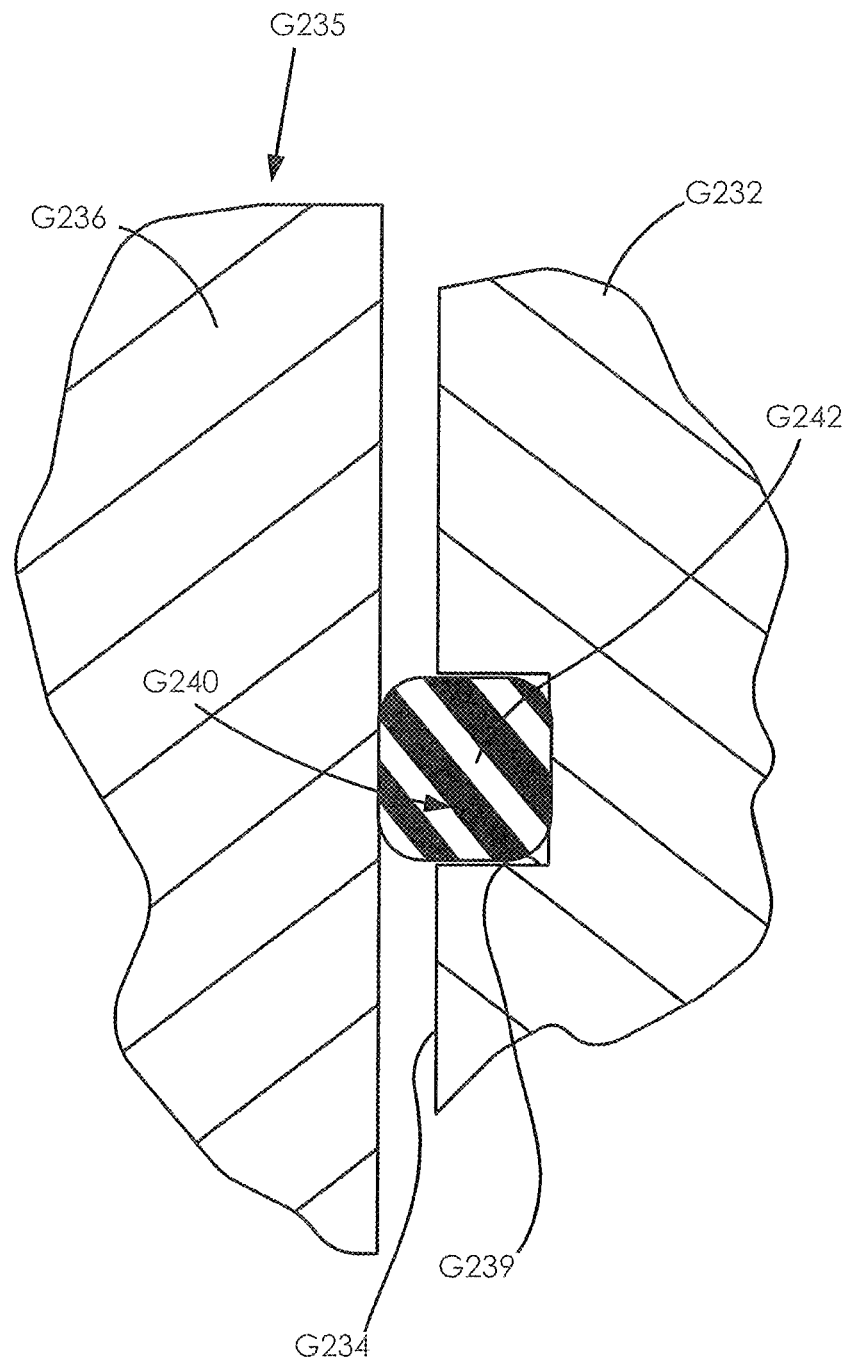

FIG. 137 is an enlarged depiction of portions of the fluid end of FIG. 136.

Figure 138:
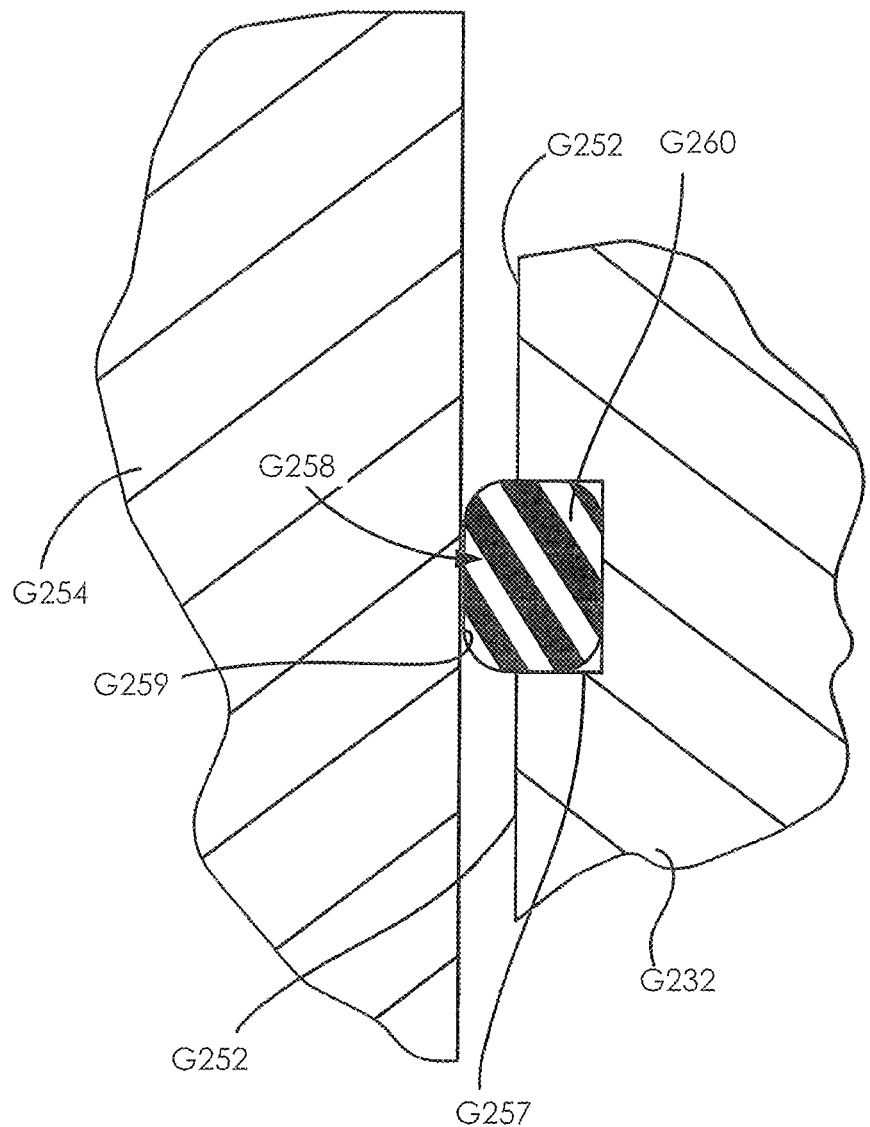

FIG. 138 is an enlarged depiction of portions of the fluid end of FIG. 136.

Figure 139:
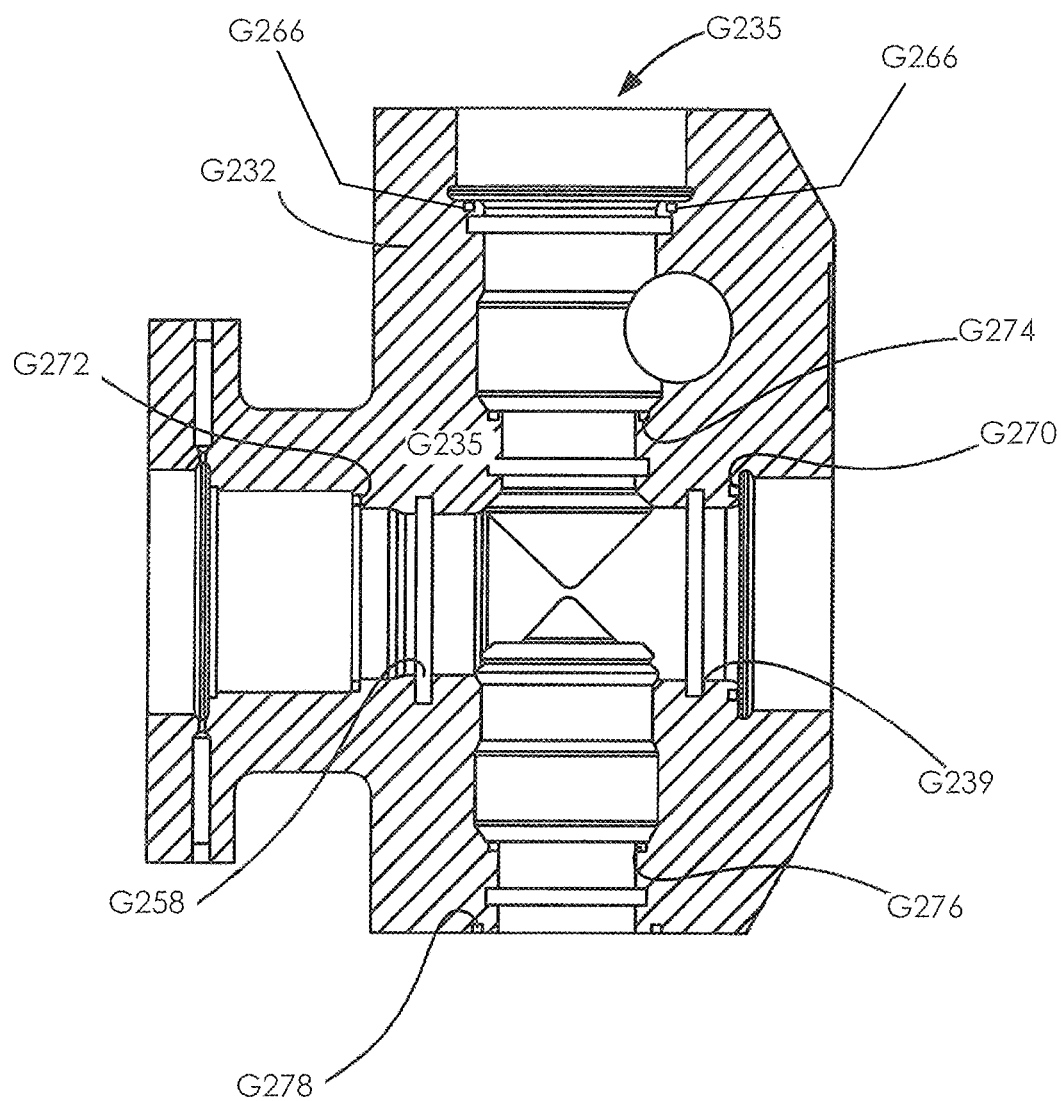

FIG. 139 is a cross-sectional depiction of another fluid end that is constructed in accordance with embodiments of this technology.

Figure 140:
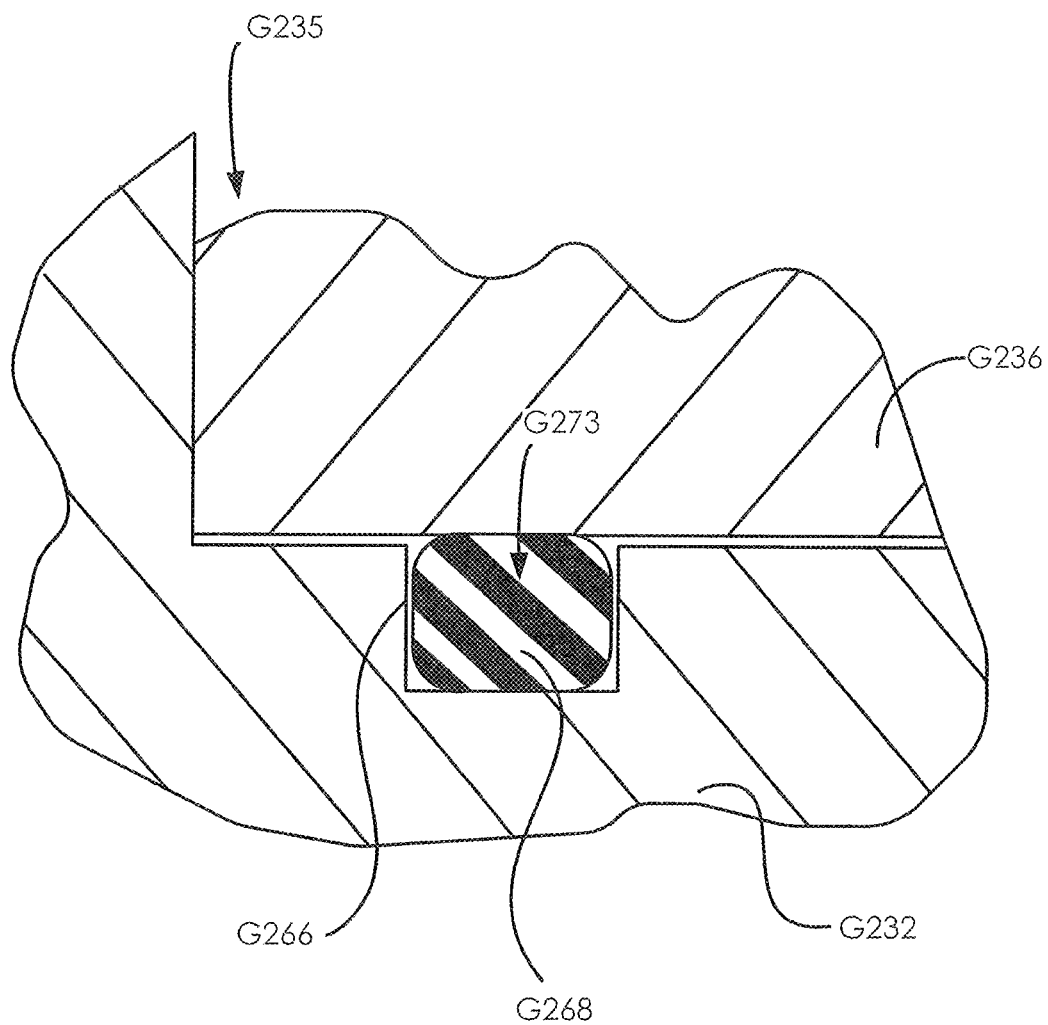

FIG. 140 is an enlarged depiction of portions of the fluid end of FIG. 139.

Figure 141:
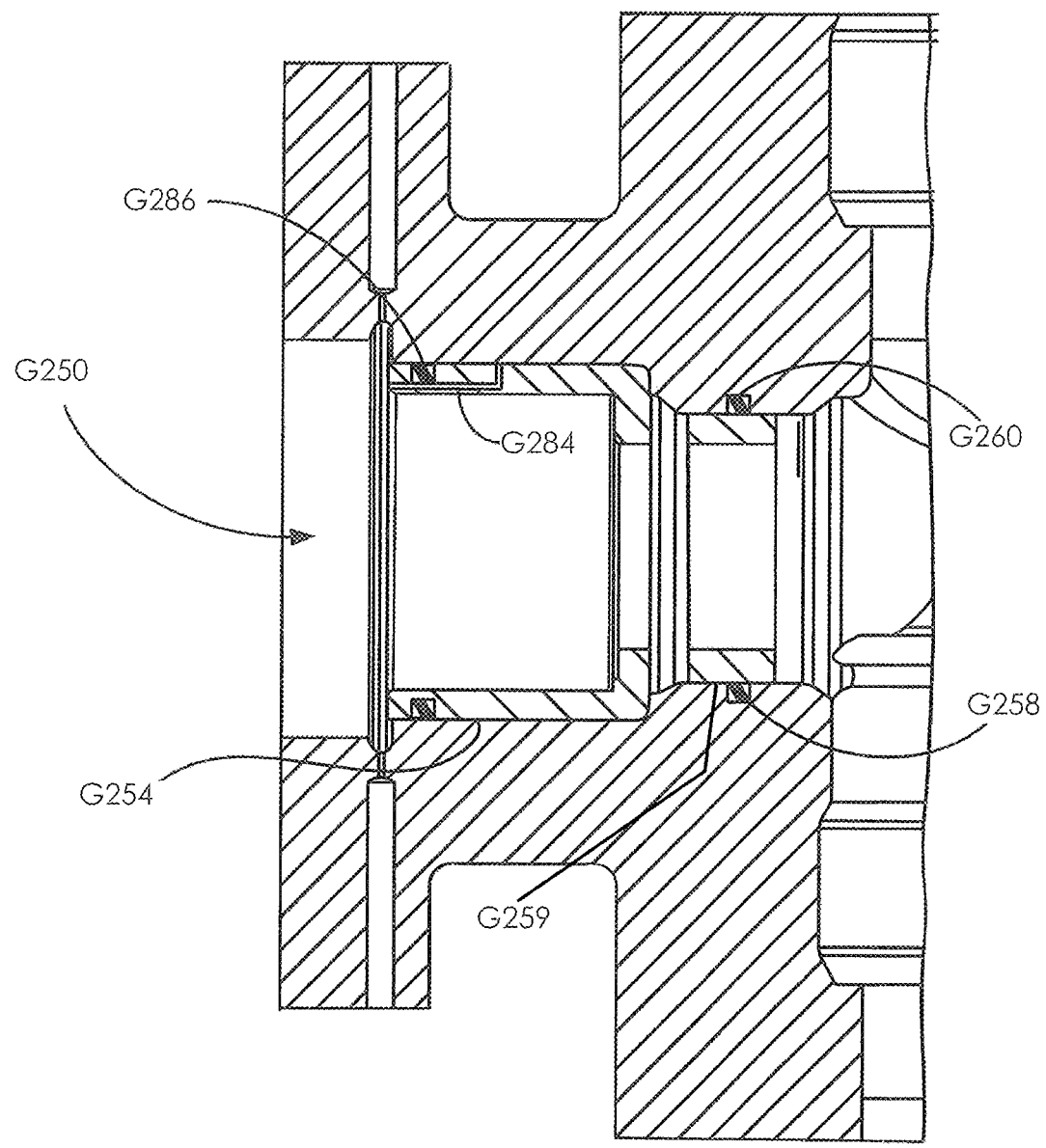

FIG. 141 is an enlarged depiction of portions of the fluid end of FIG. 139.

Figure 142:
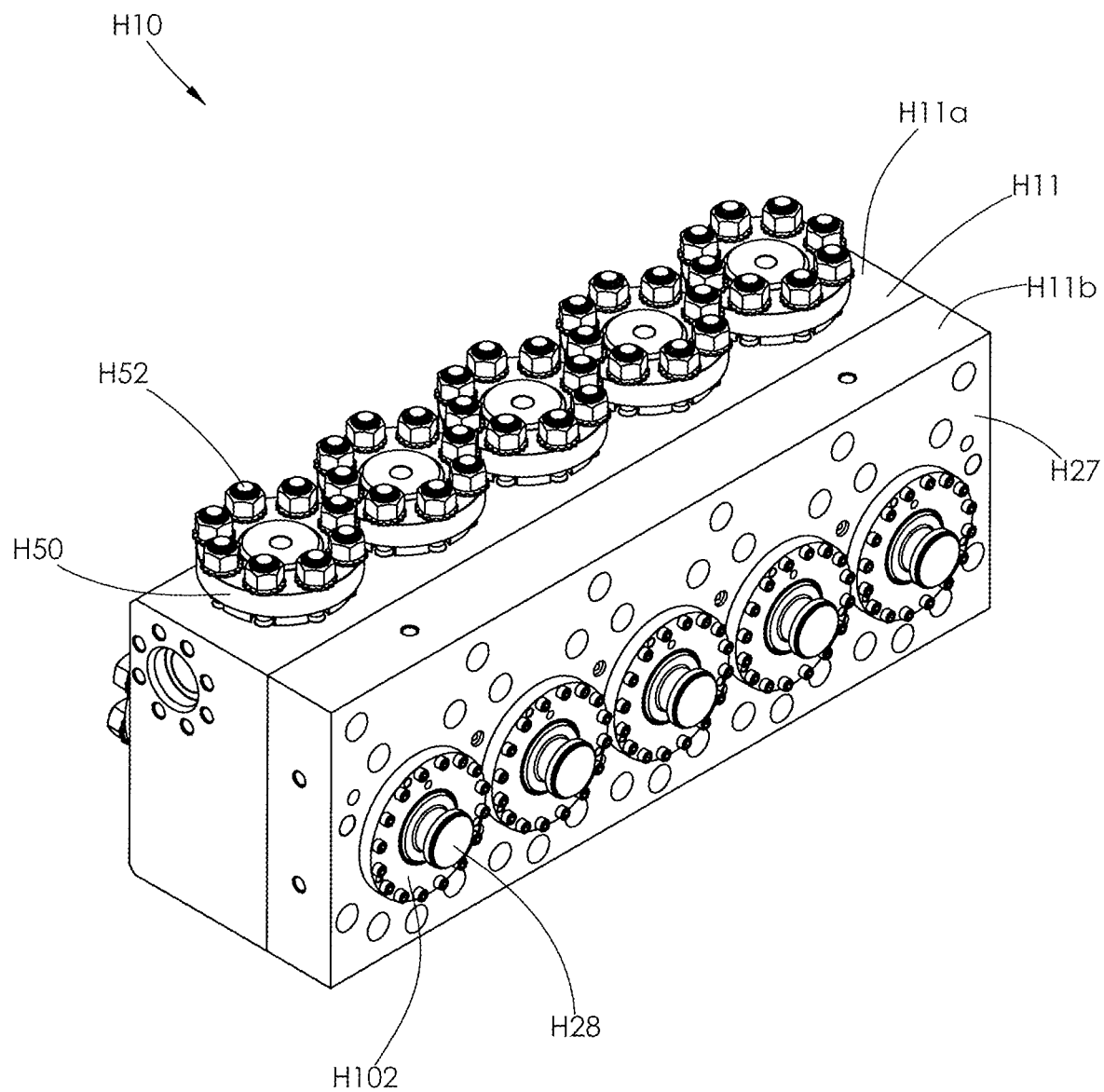

FIG. 142 is a top front right perspective view of a fluid end.

Figure 143:
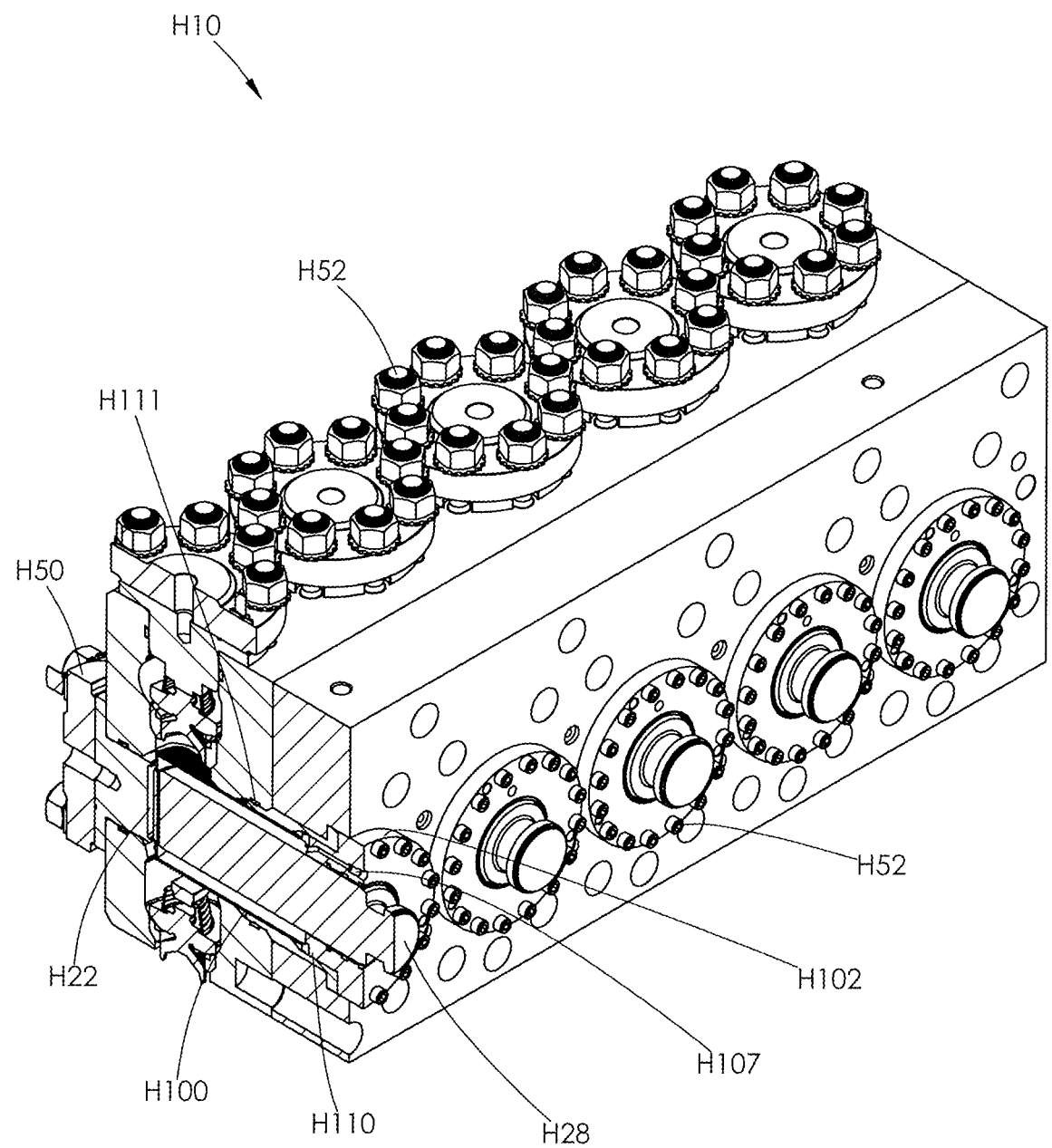

FIG. 143 is a top front right sectional view of the fluid end of FIG. 142.

Figure 144:
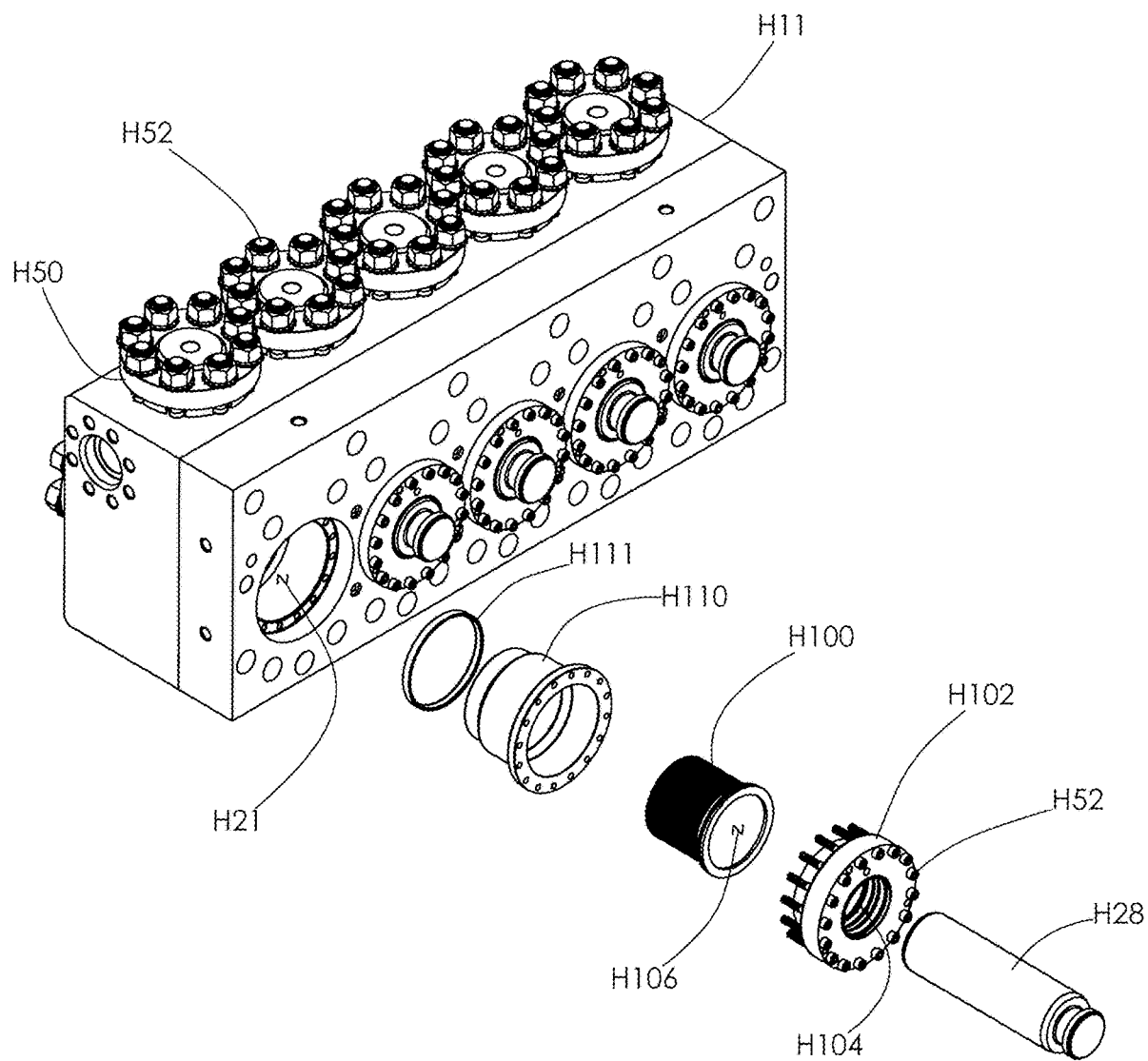

FIG. 144 an exploded view of the fluid end shown in FIG. 142.

Figure 145:
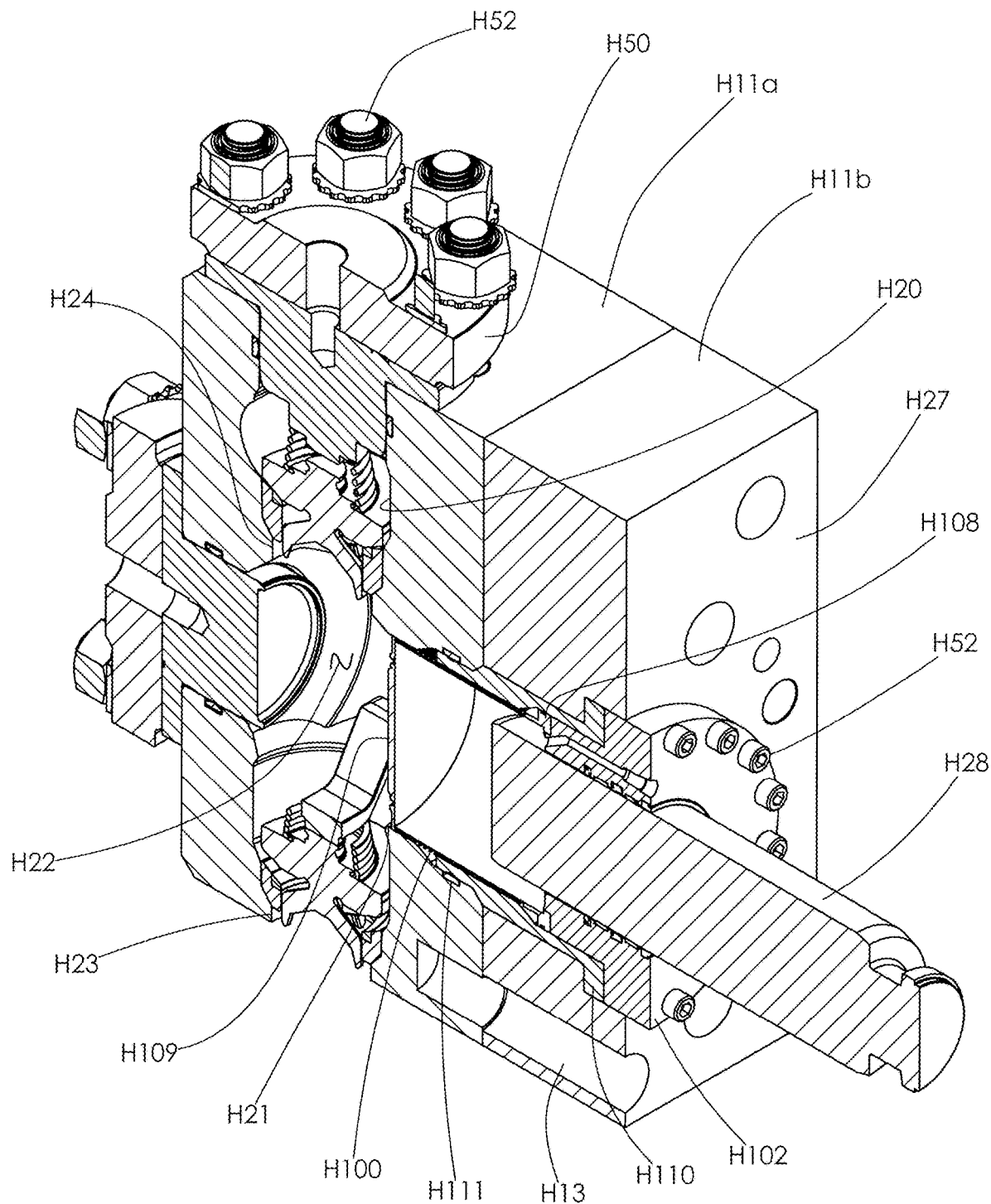

FIG. 145 is a top front right sectional view of one section of the fluid end of FIG. 142.

Figure 146:
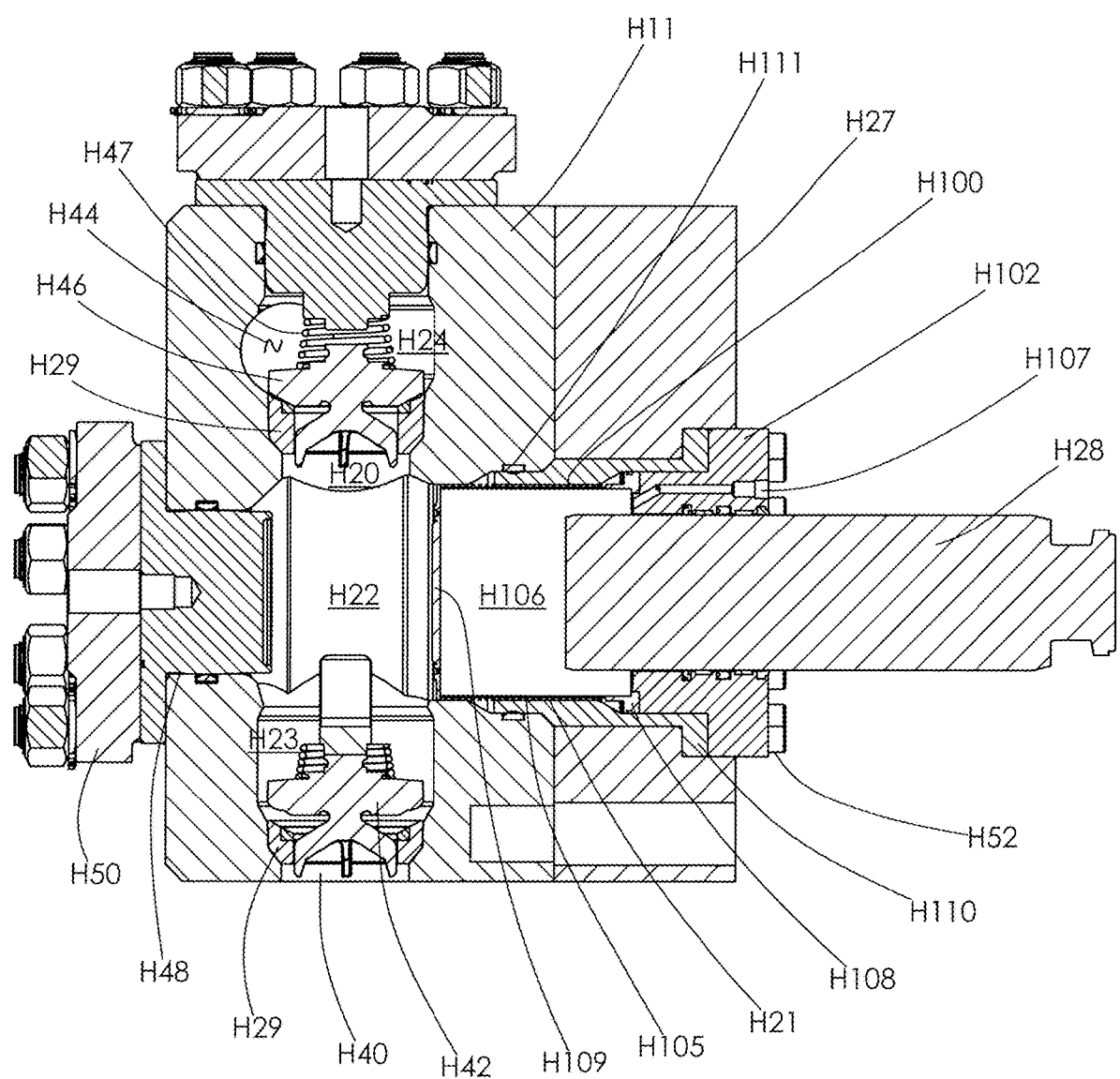

FIG. 146 is a side sectional view of a fluid end with the bellows in a retracted position.

Figure 147:
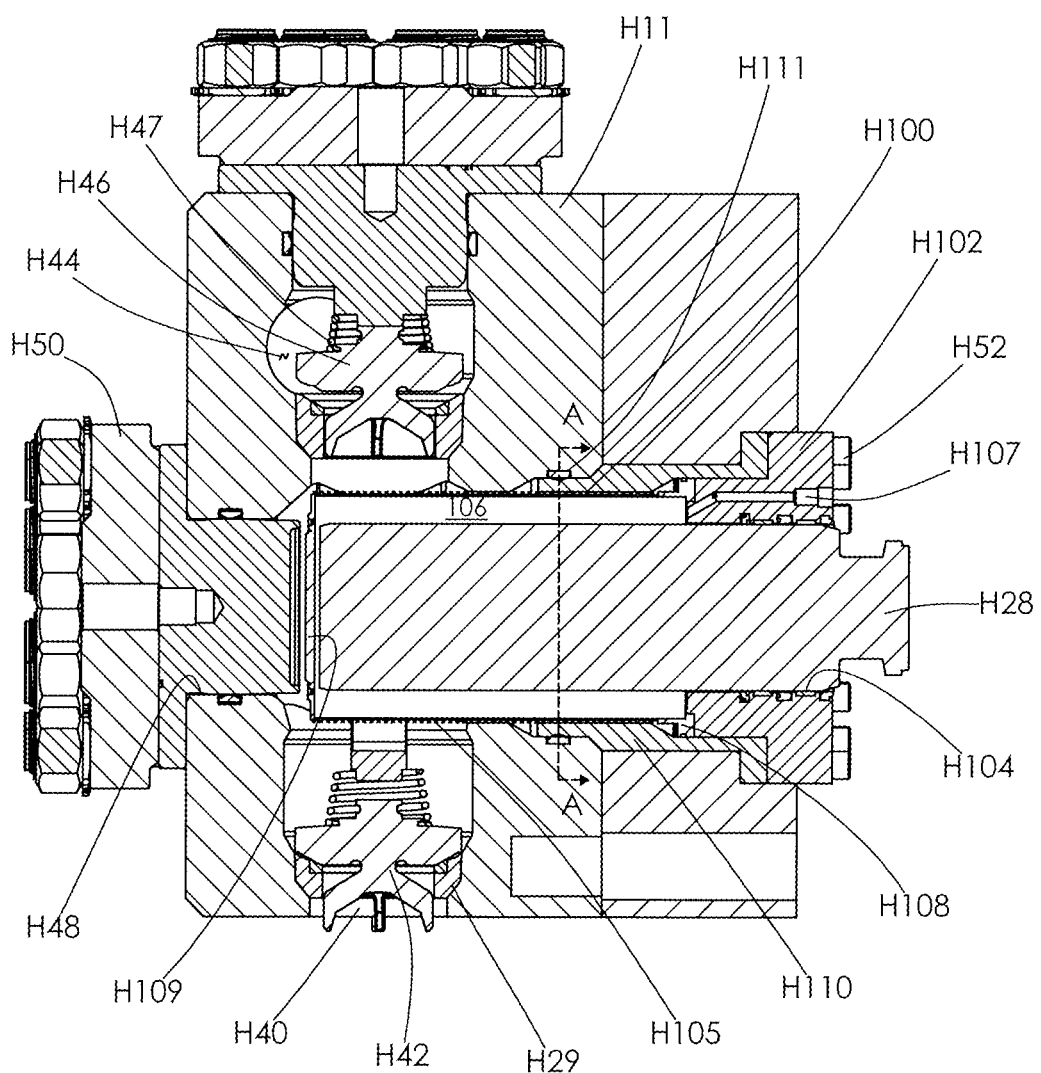

FIG. 147 is a side sectional view of the fluid end of FIG. 146 with the bellows in an extended position.

Figure 148:
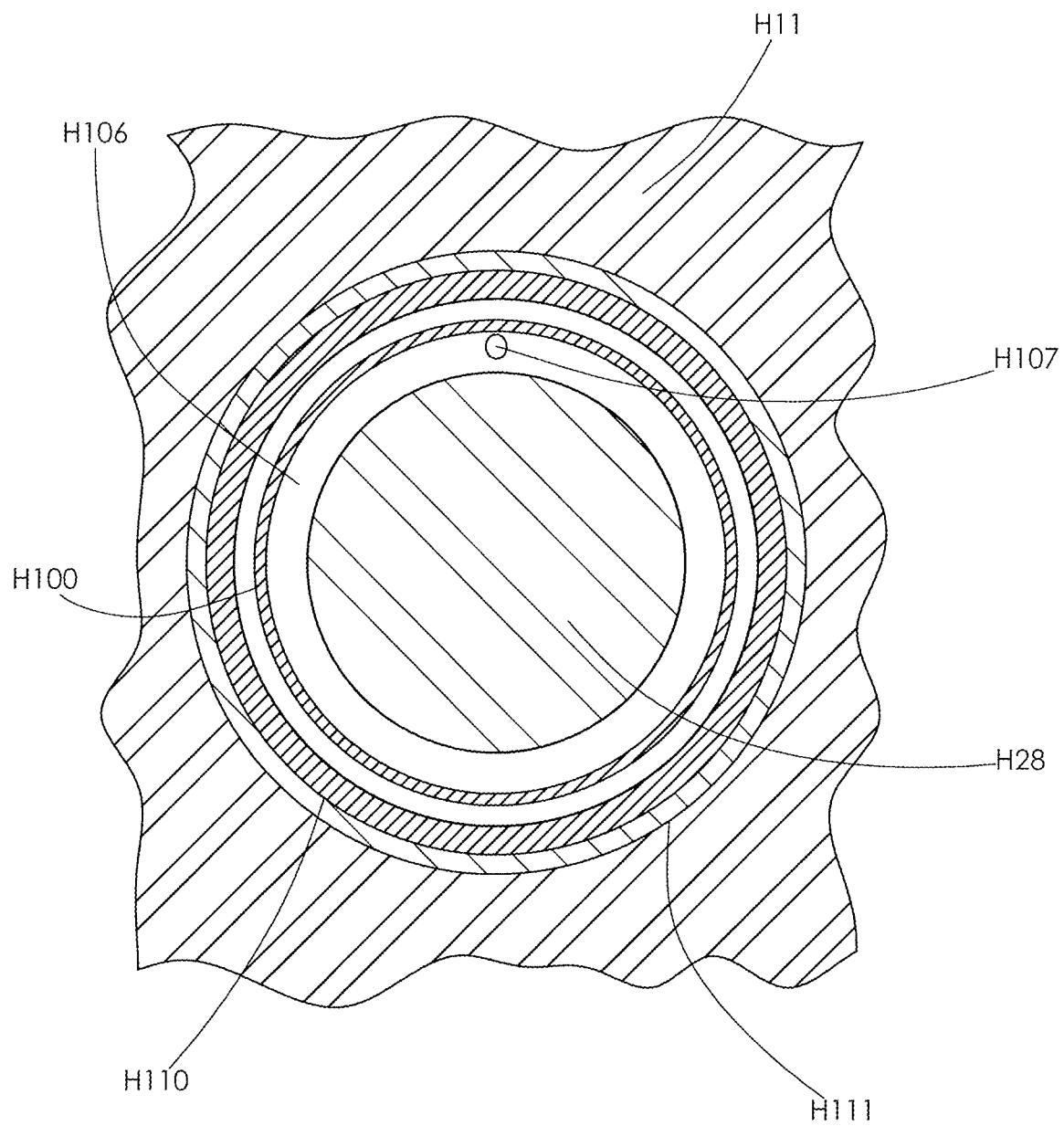

FIG. 148 is a rear sectional view of the fluid end of FIG. 147 taken along section A-A.

Figure 149:
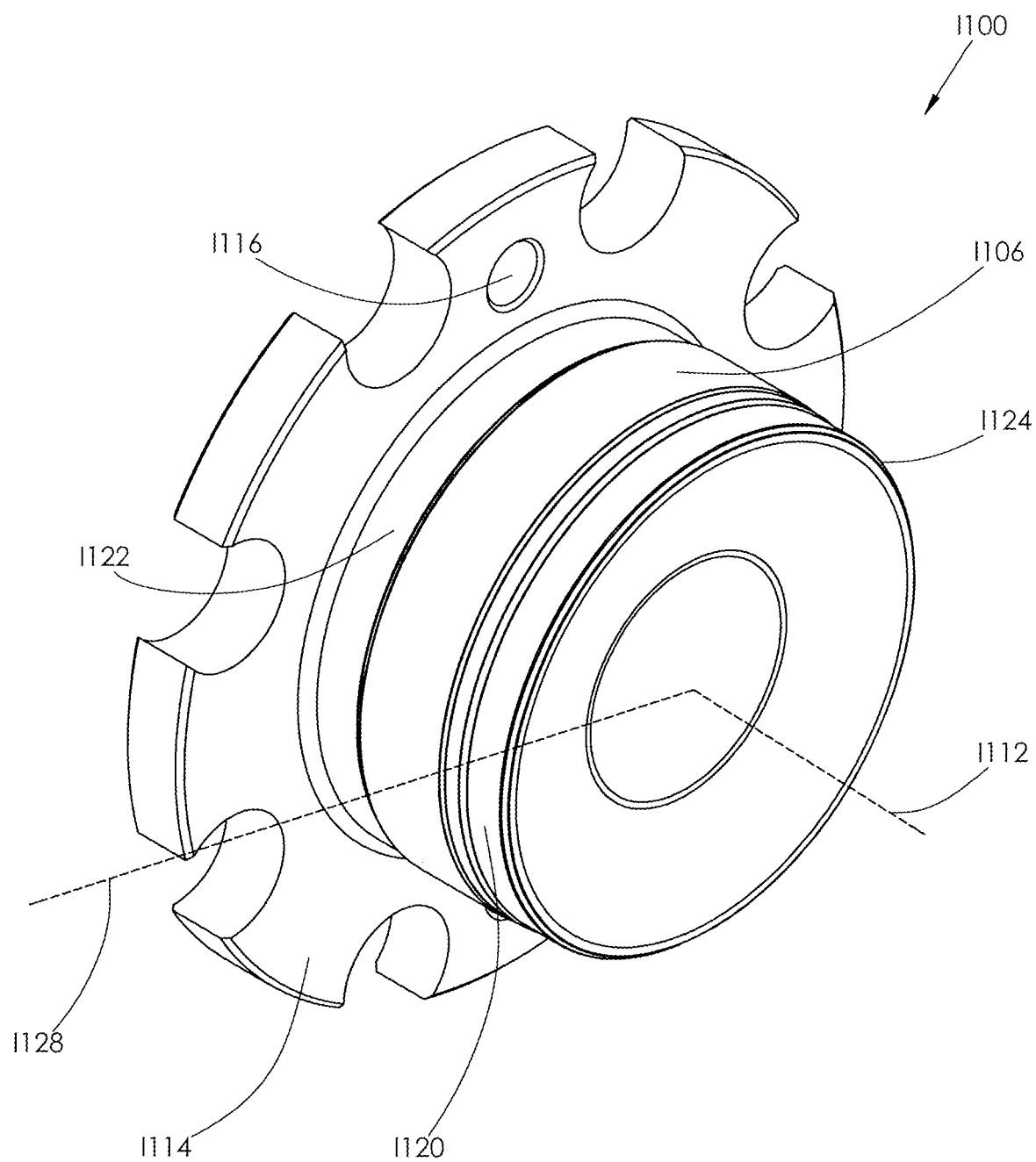

FIG. 149 is a perspective view of a suction plug.

Figure 150:
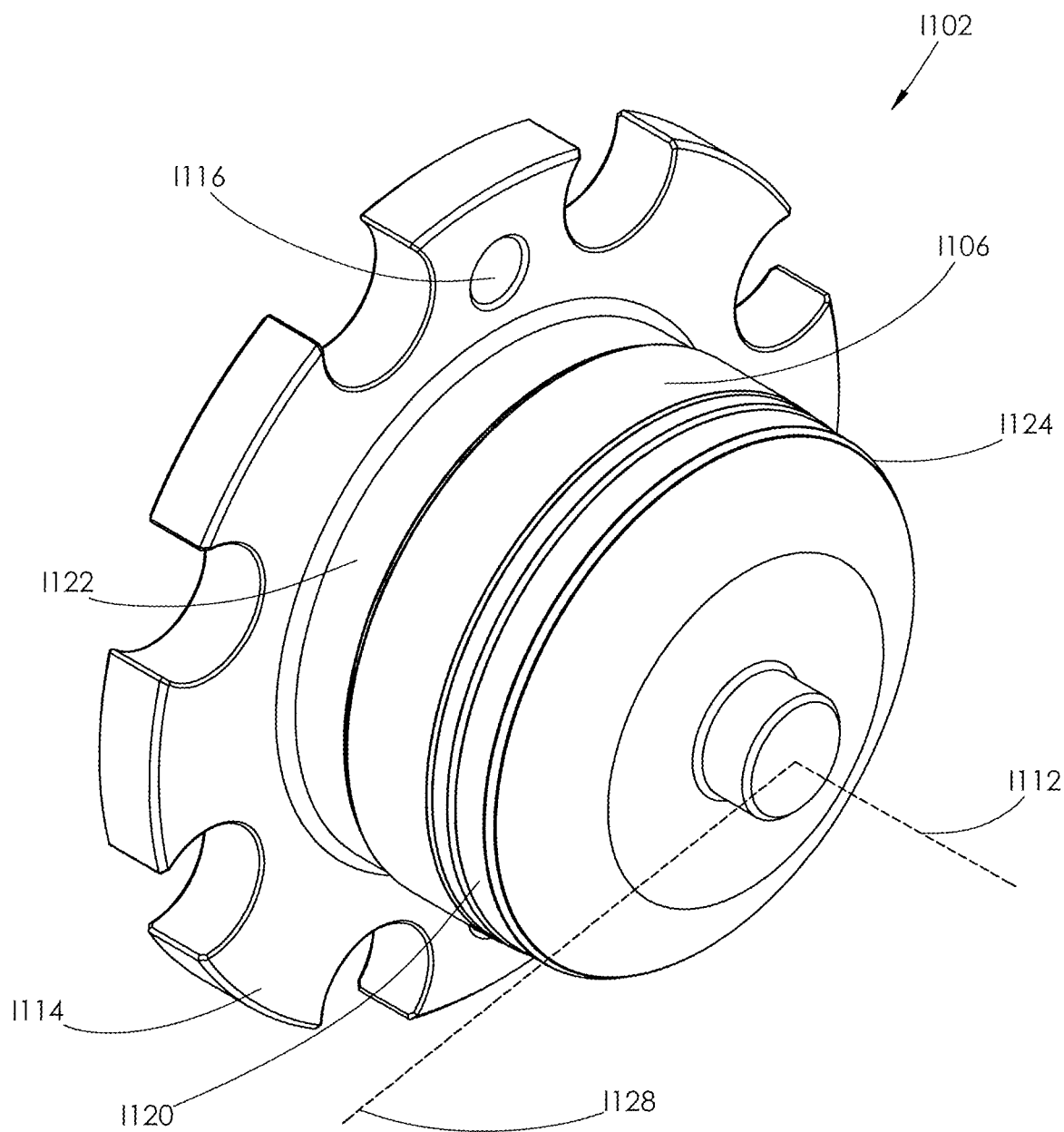

FIG. 150 is a perspective view of a discharge plug.

Figures 151, 152:
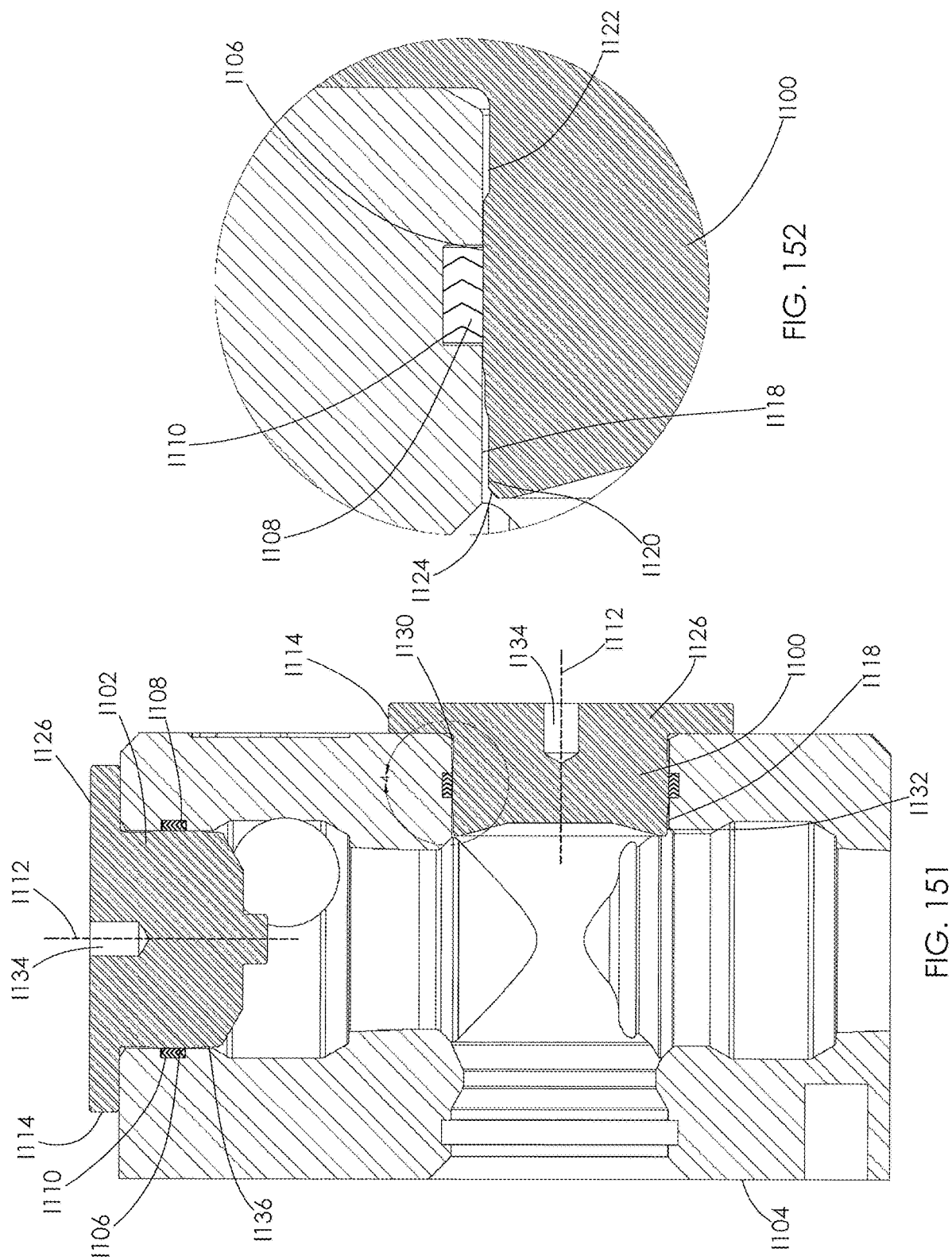

FIG. 151 is a cross-sectional view of a fluid end.

FIG. 152 is a detail view of area B from FIG. 151.

Figure 153:
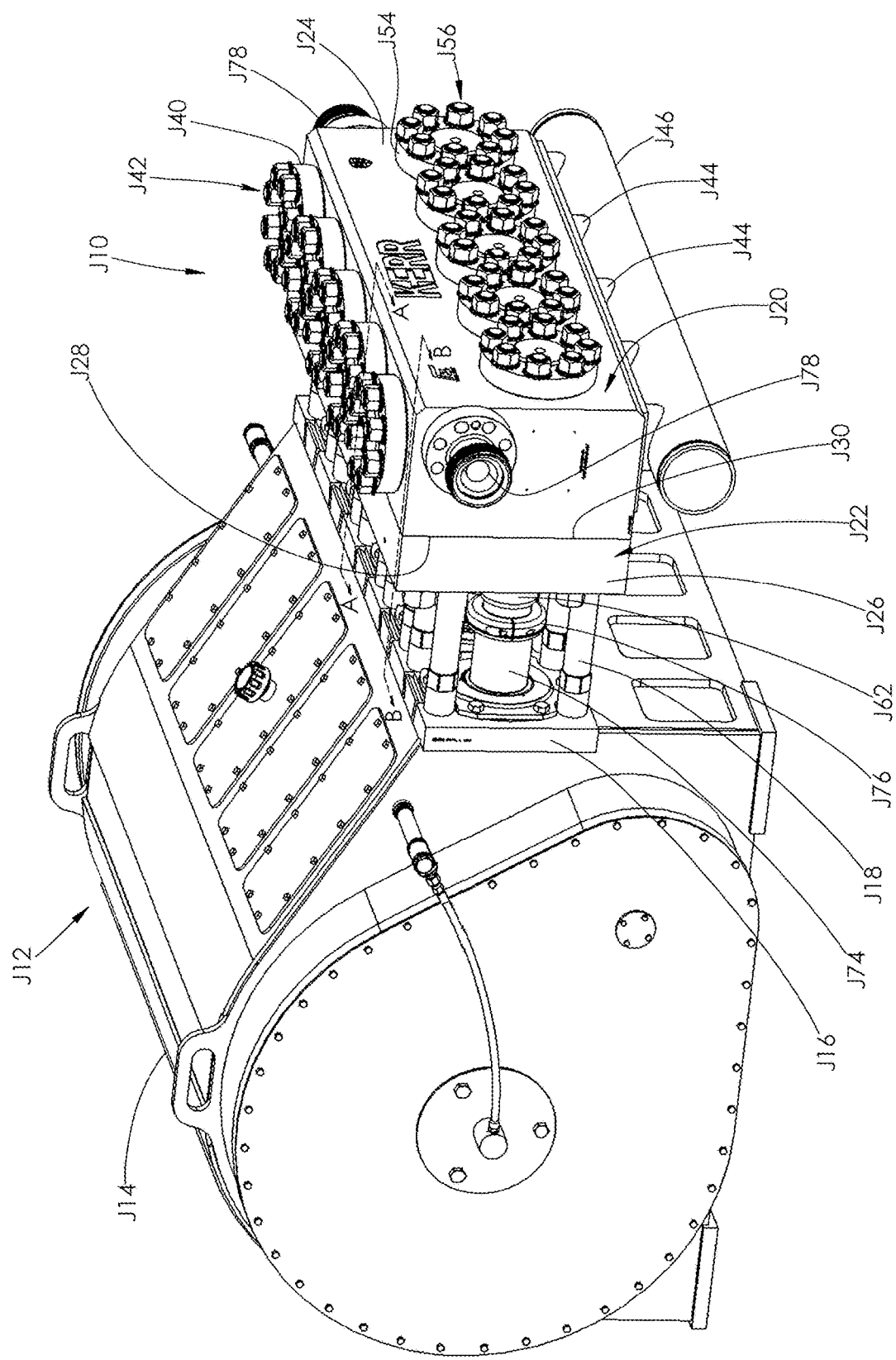

FIG. 153 is a perspective view of a fluid end attached to a power end.

Figure 154:
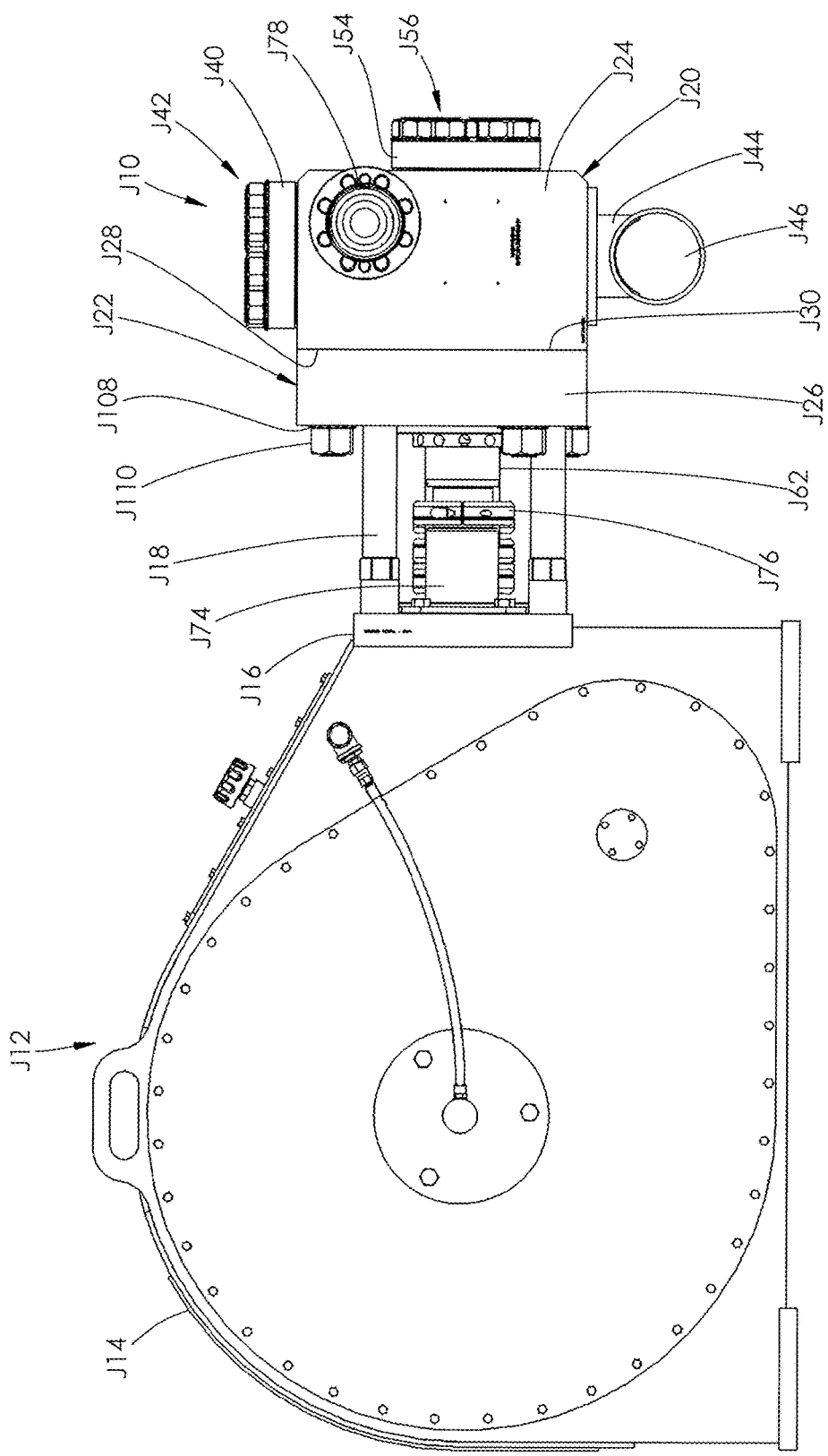

FIG. 154 is a side elevation view of the fluid end and power end shown in FIG. 80.

Figure 155:
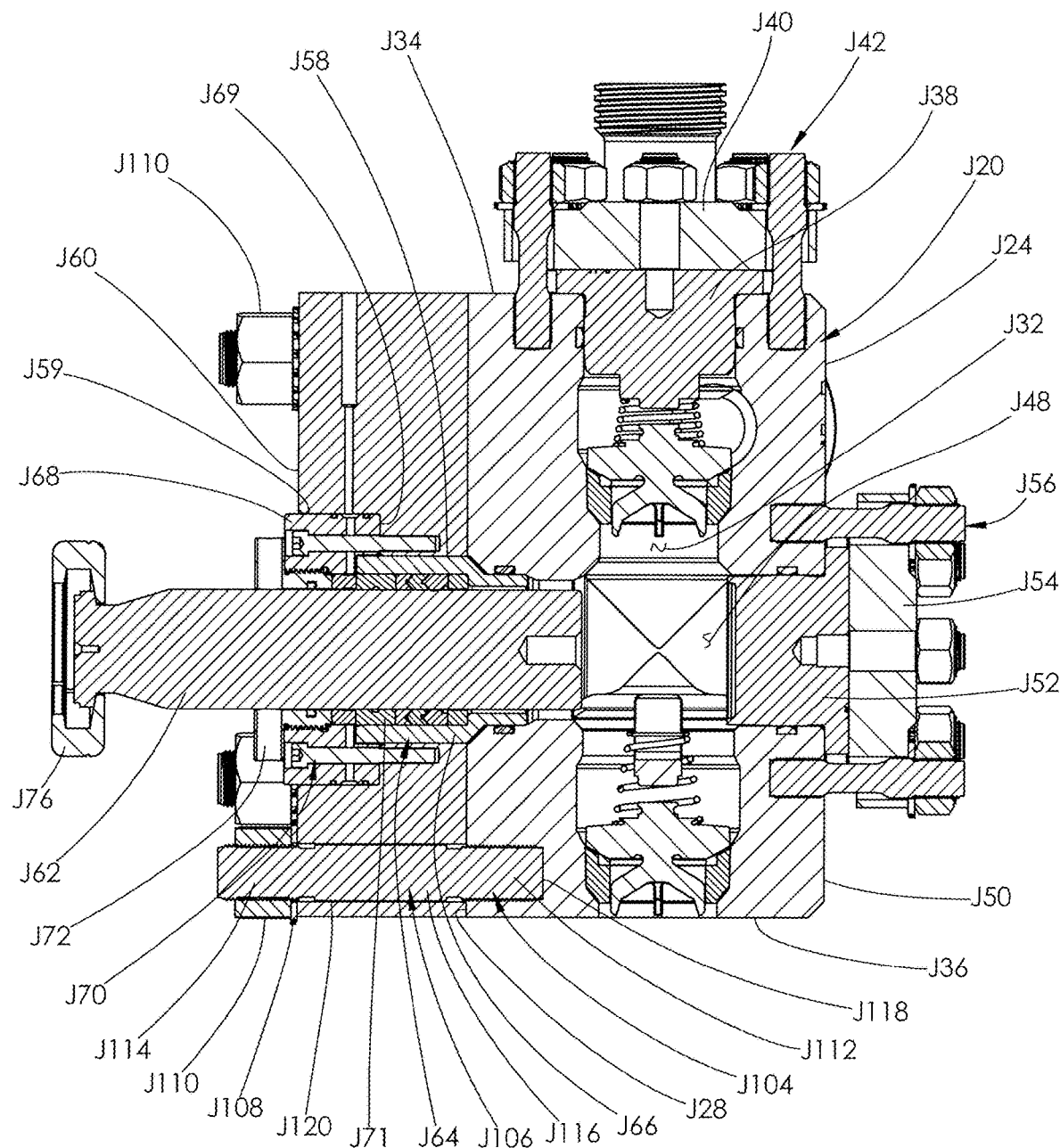

FIG. 155 is a cross-sectional view of the fluid end shown in FIG. 153, taken along line A-A. The inlet manifold has been removed for clarity.

Figure 156:
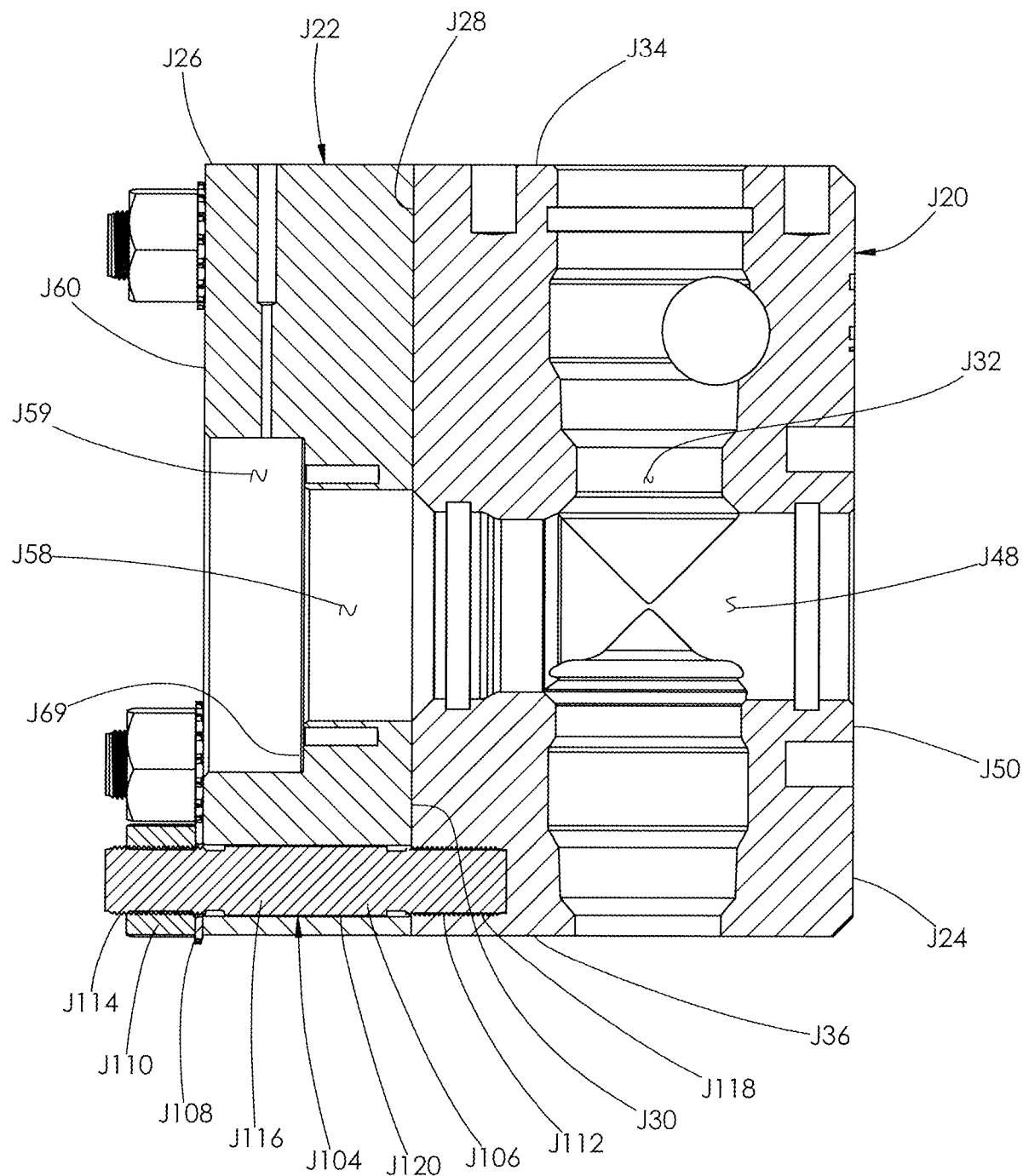

FIG. 156 is a cross-sectional view of the fluid end shown in FIG. 155. The inner and outer components of the fluid end have been removed for clarity.

Figure 157:
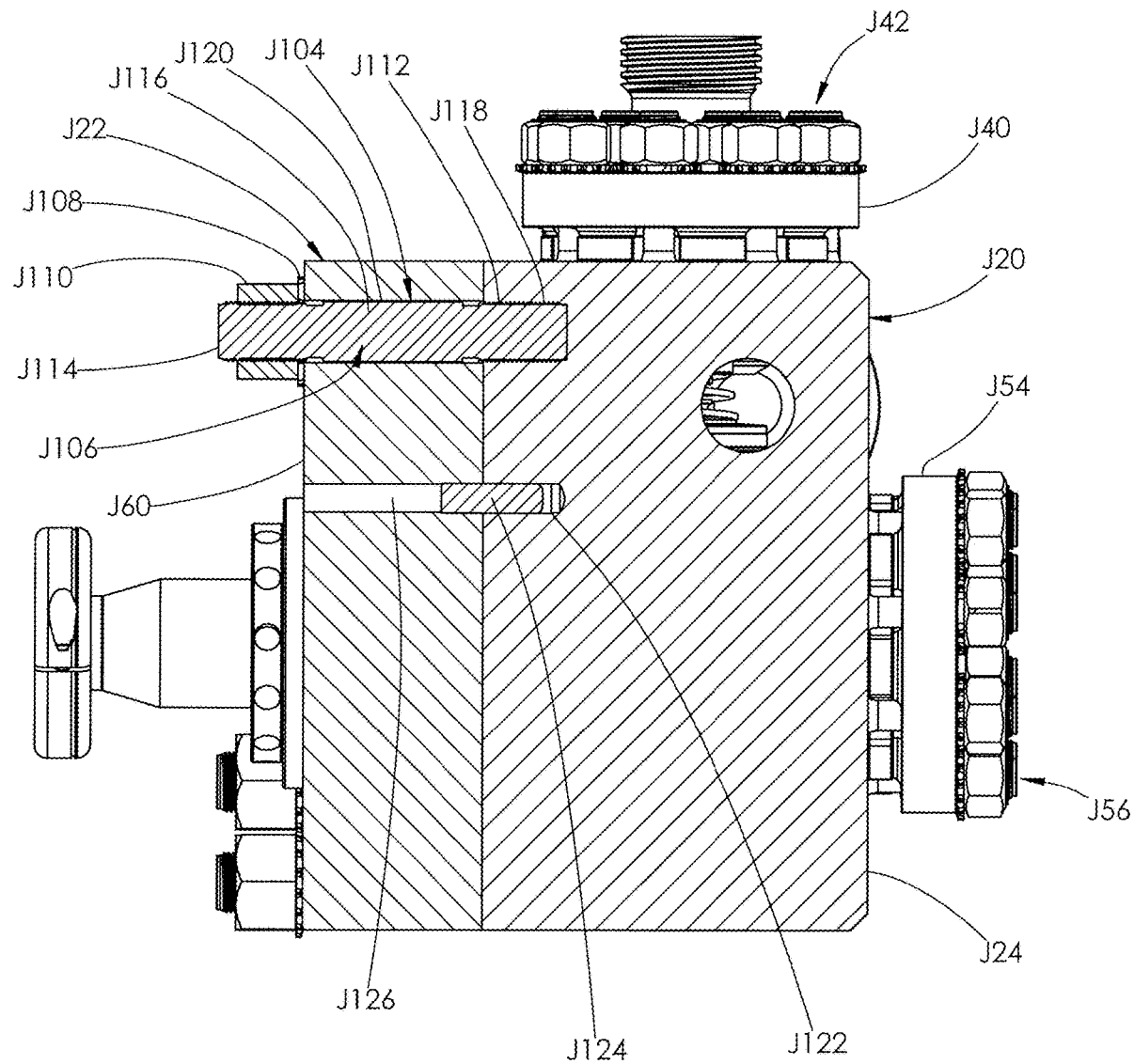

FIG. 157 is a cross-sectional view of the fluid end shown in FIG. 153, taken along line B-B. The inlet manifold has been removed for clarity.

Figure 158:
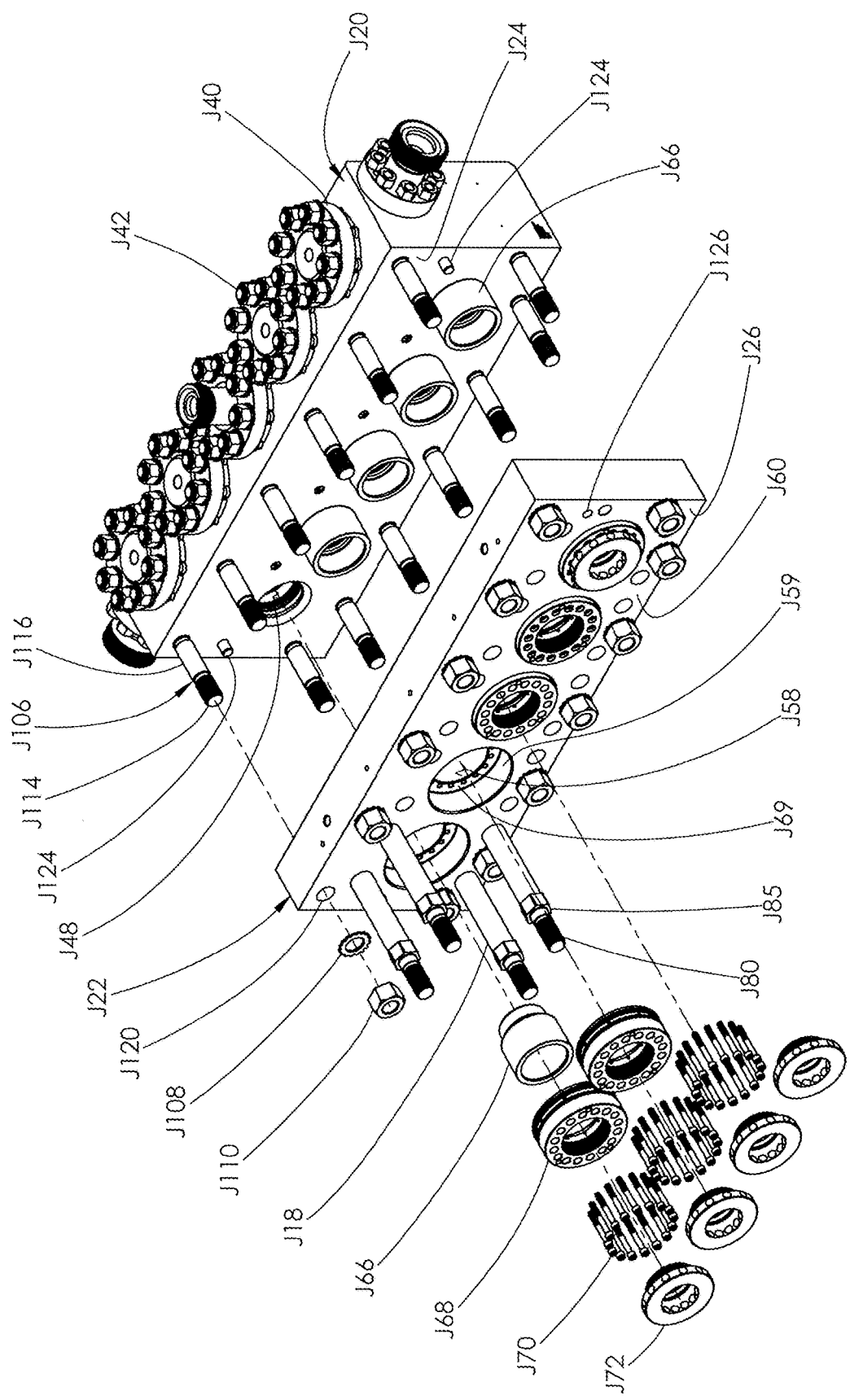

FIG. 158 is a partially exploded perspective view of a back side of the fluid end. A plurality of stay rods used to attach the fluid end to the power end are shown installed within a second body of the fluid end.

Figure 159:
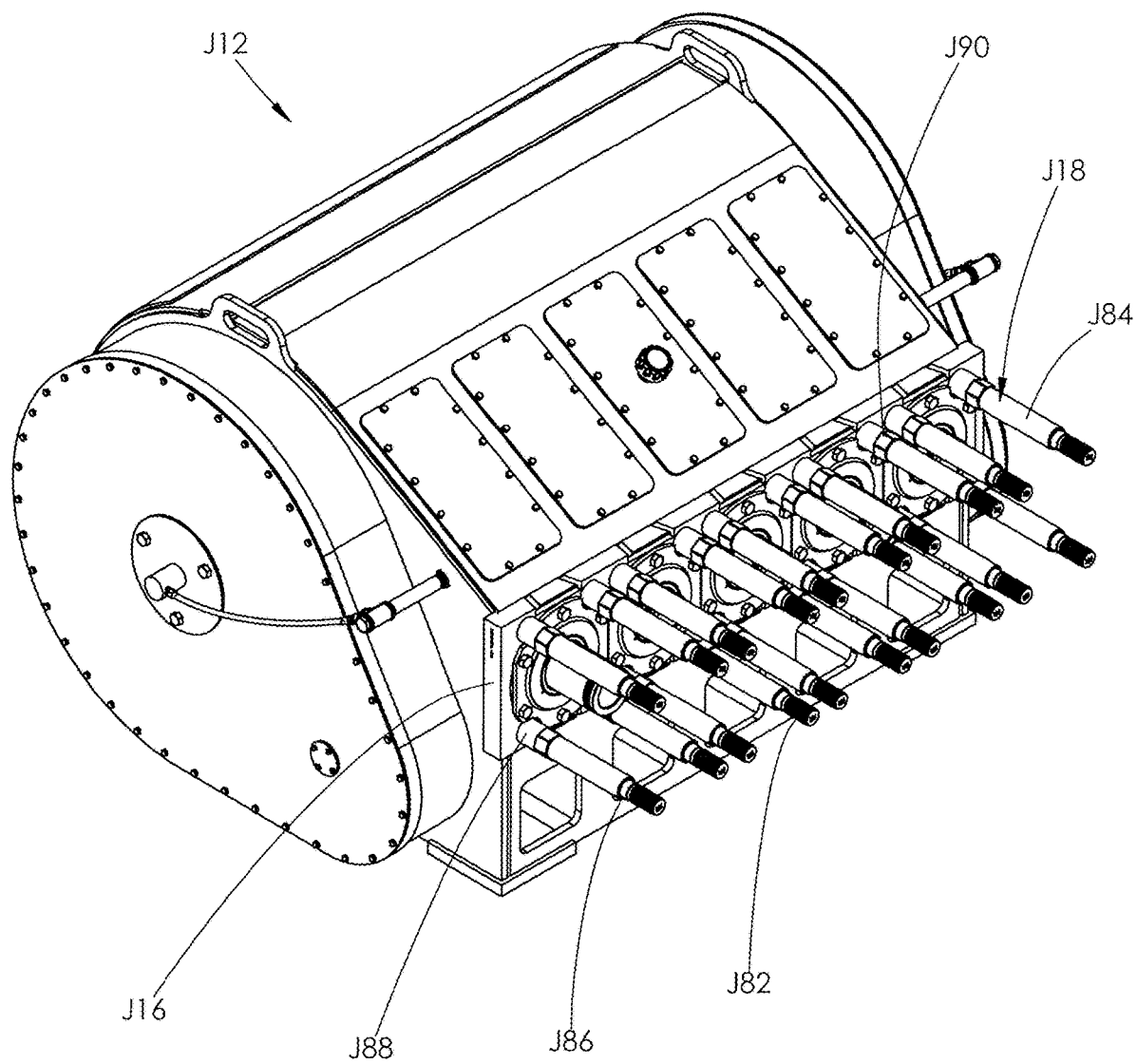

FIG. 159 is a perspective view of the power end shown in FIG. 153 with the stay rods attached thereto. The fluid end has been removed for clarity.

Figure 160:
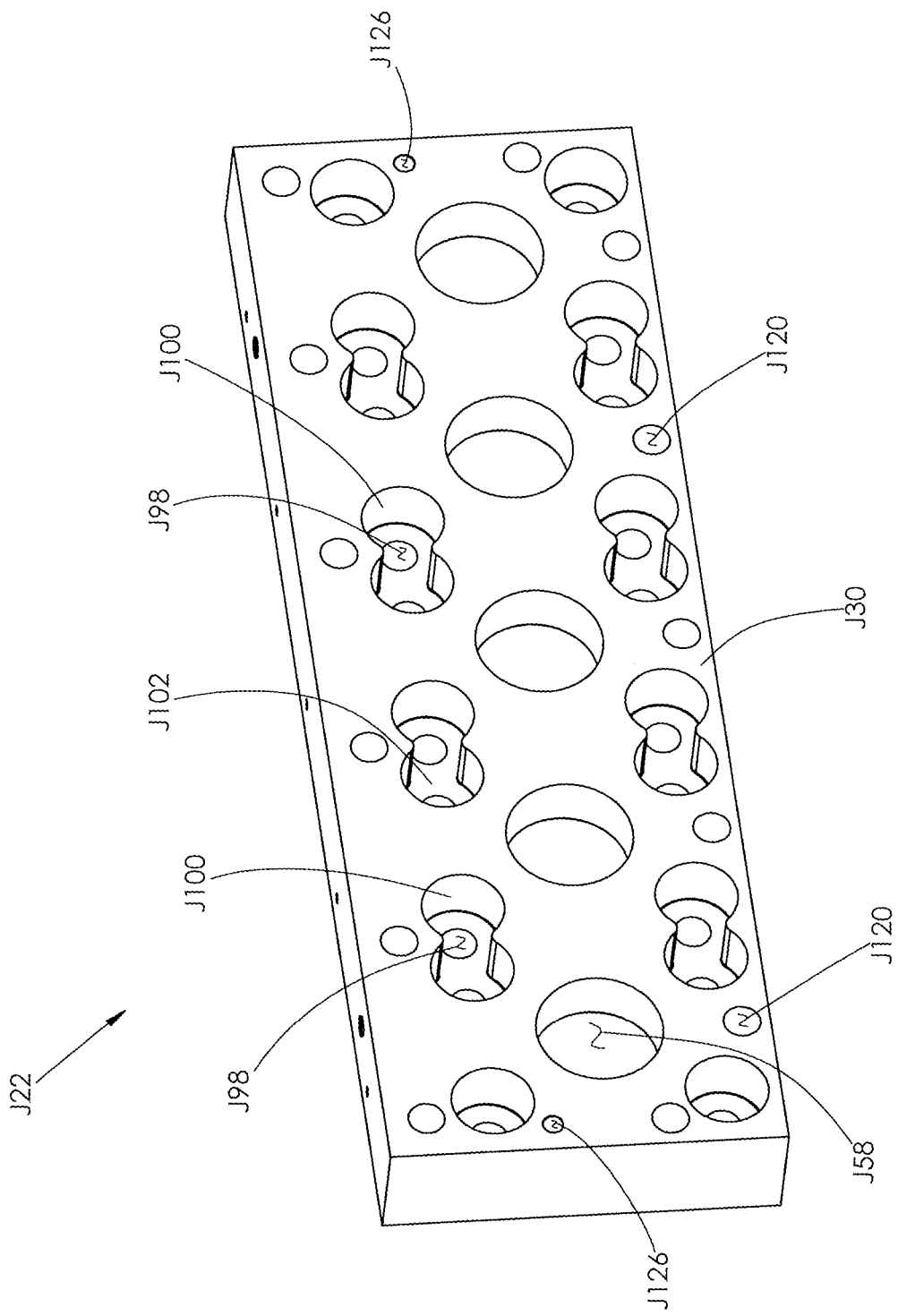

FIG. 160 is a perspective view of a front side of the second body of the fluid end shown in FIG. 158. The components installed within the second body have been removed for clarity.

Figure 161:
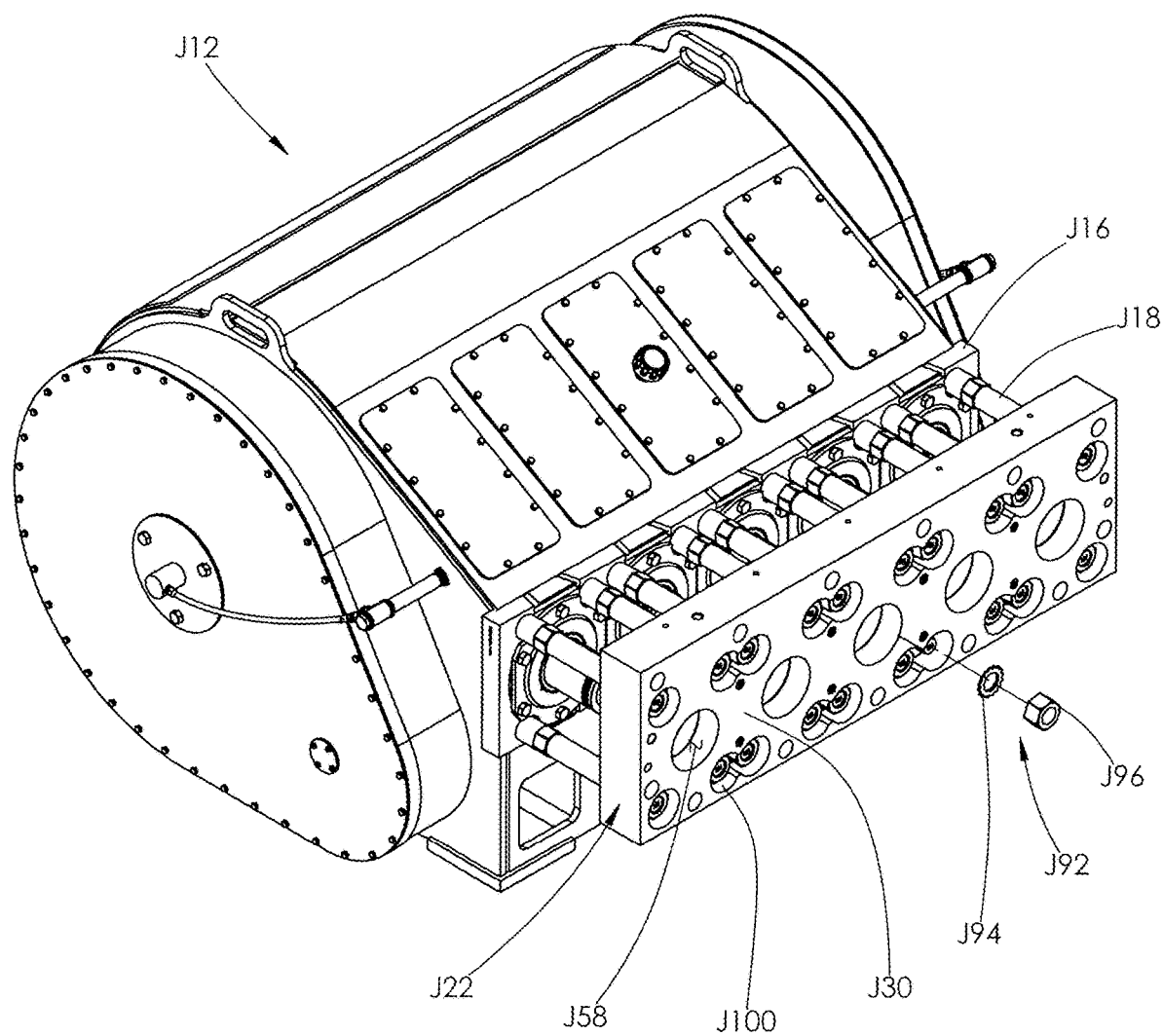

FIG. 161 is a perspective view of the power end of FIG. 159 with the second body of FIG. 160 attached thereto. The first body of the fluid end has been removed for clarity. A portion of the fastening system used to secure the second body to the power end is shown exploded for reference.

Figure 162:
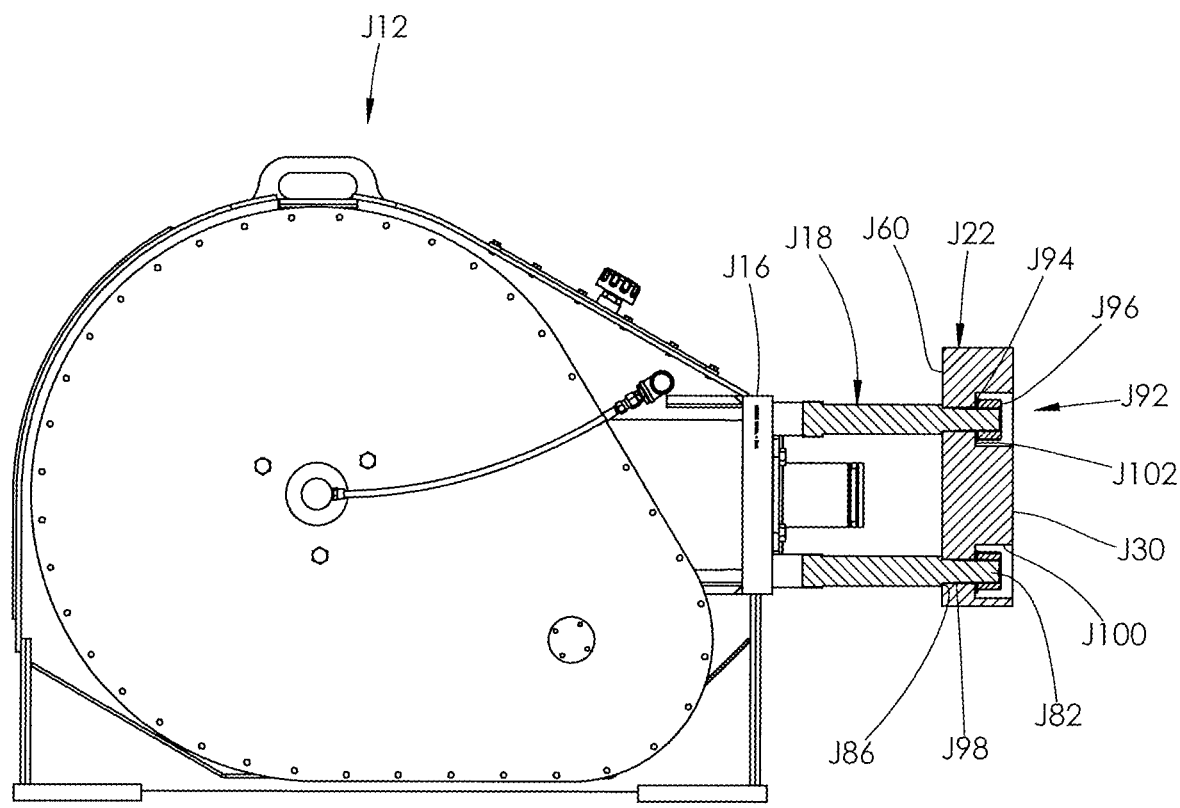

FIG. 162 is a side elevation view of the power end and attached second body shown in FIG. 161. The second body and stay rods attaching the second body to the power end are shown in cross-section.

Figure 163:
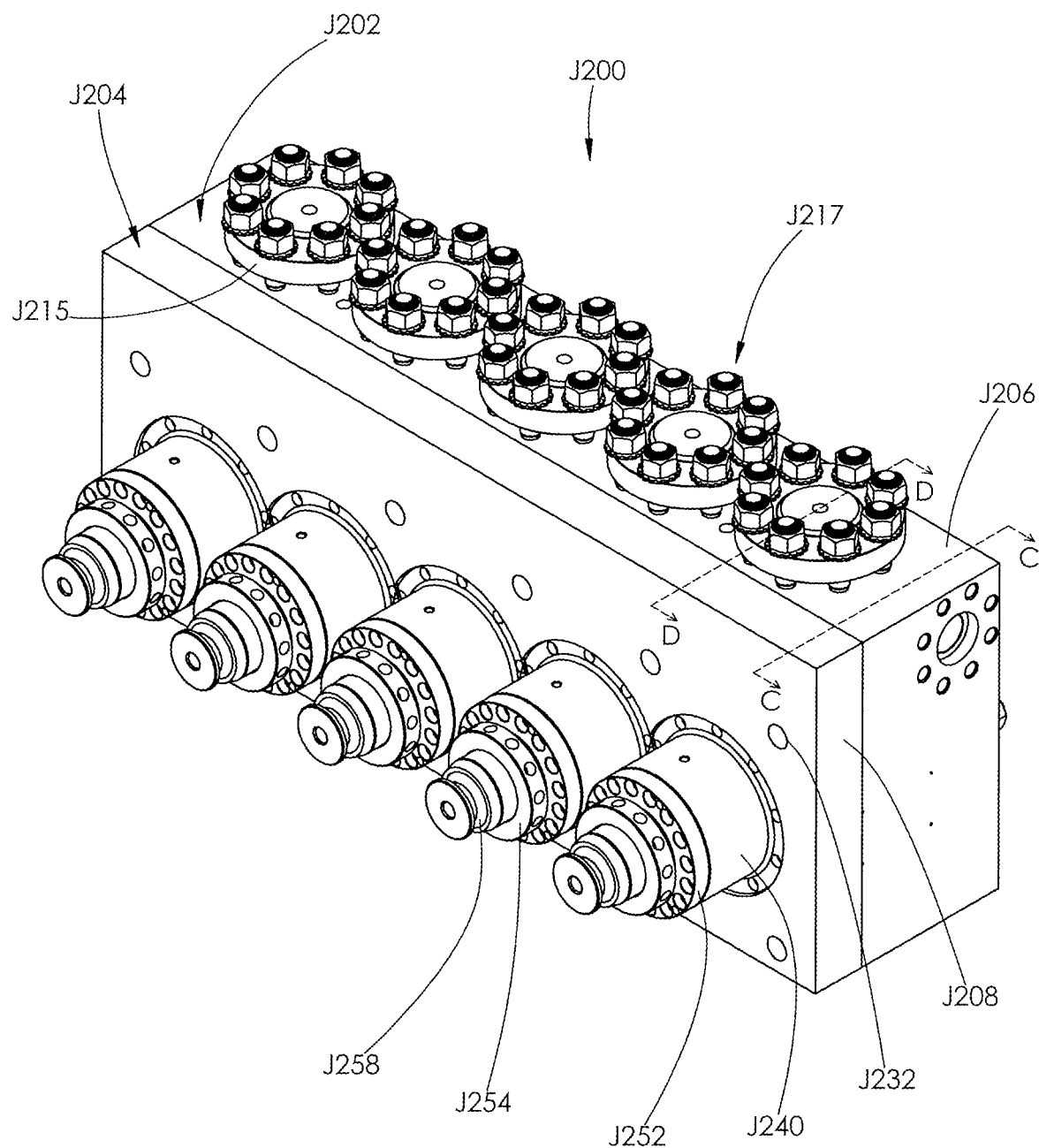

FIG. 163 is a perspective view of a back side of an alternative embodiment of a fluid end.

Figure 164:
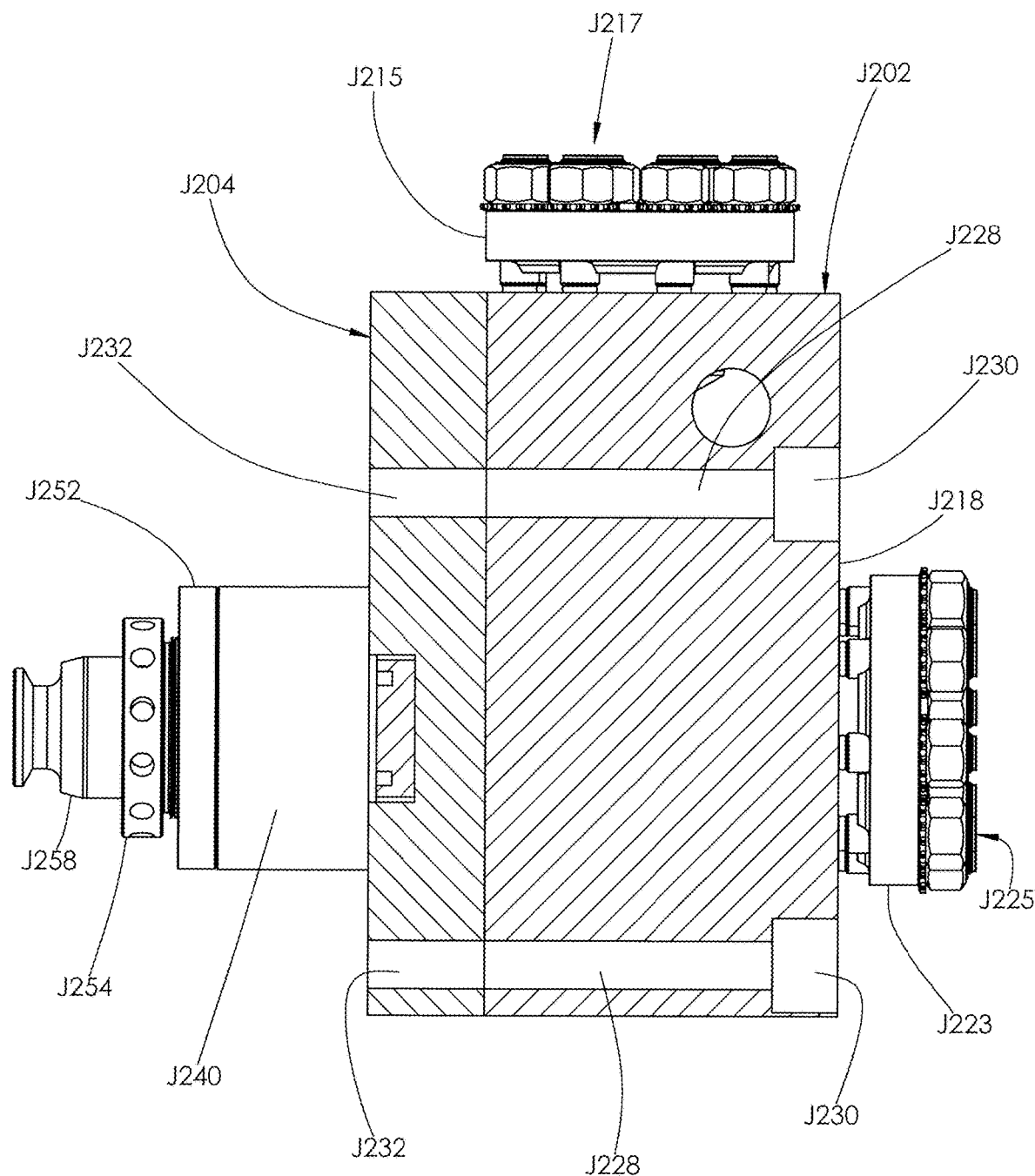

FIG. 164 is a cross-sectional view of the fluid end shown in FIG. 163, taken along line C-C.

Figure 165:
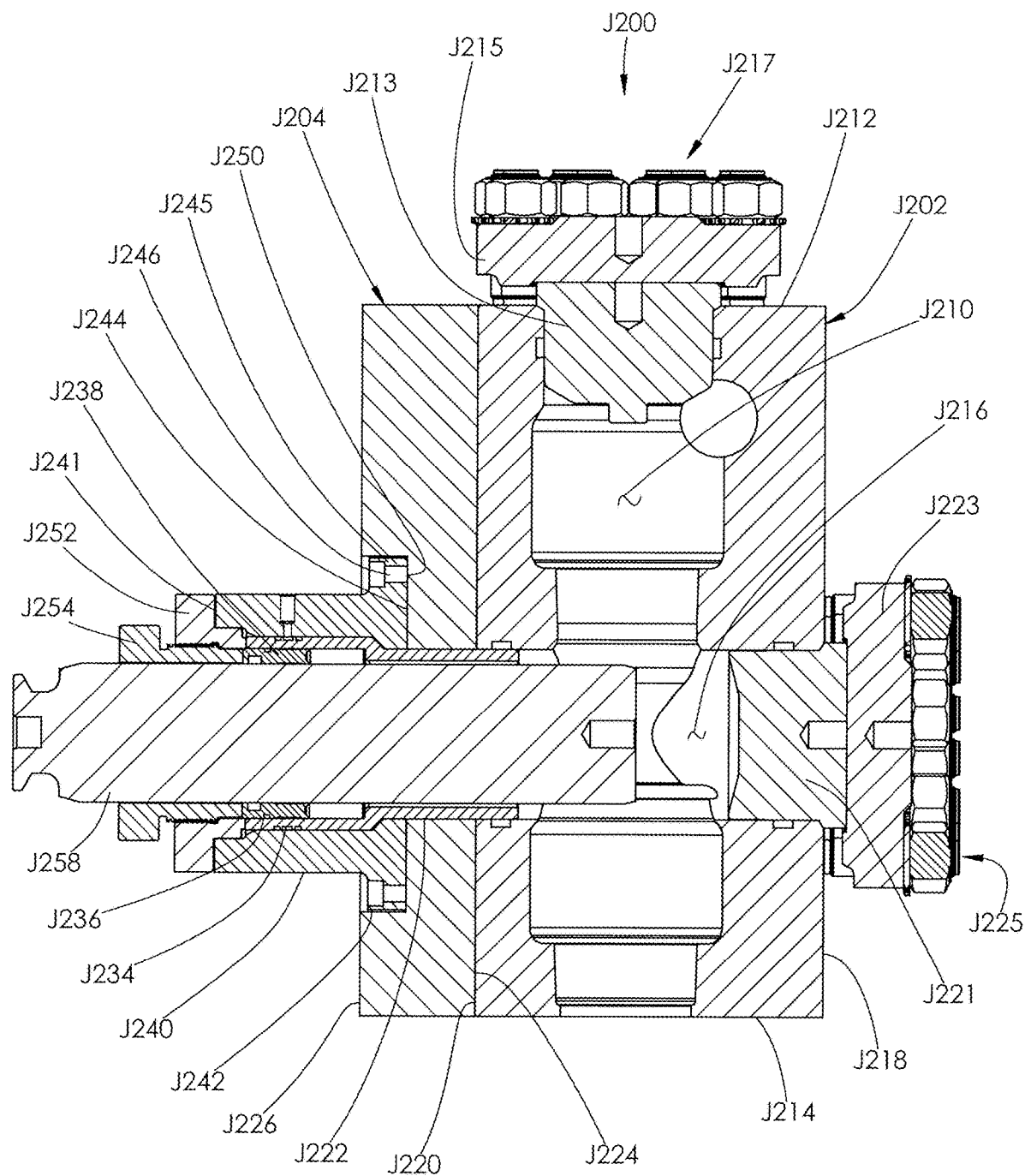

FIG. 165 is a cross-sectional view of the fluid end shown in FIG. 163, taken along line D-D.

Figure 166:
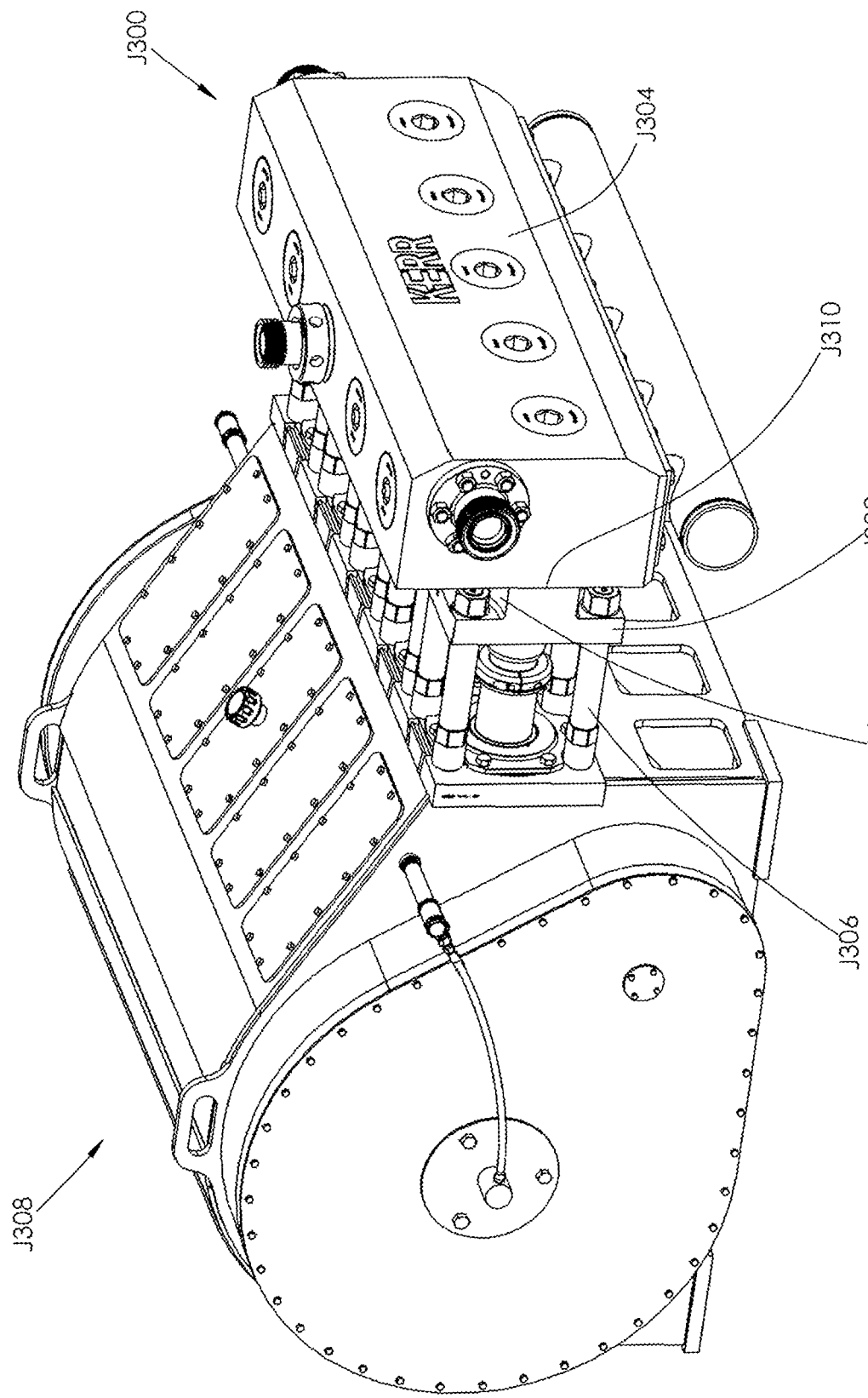

FIG. 166 is a perspective view of a fluid end known in the art attached to a power end.

Figure 167:
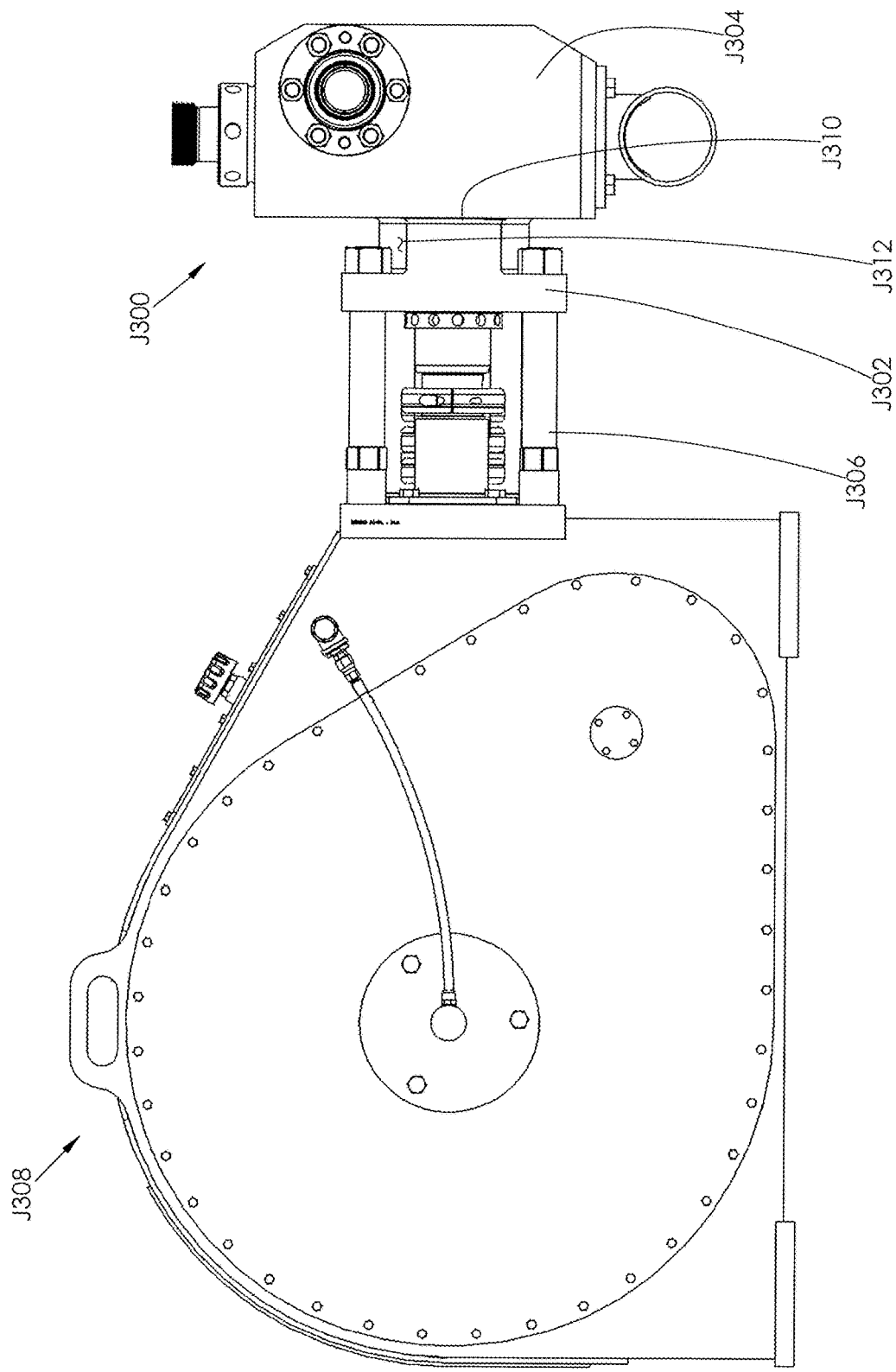

FIG. 167 is a side elevation view of the fluid end and power end shown in FIG. 166.

DETAILED DESCRIPTION

To avoid or significantly delay the failures typically seen in traditional fluid ends and described above, the inventors re-engineered many features of a traditional fluid end. One embodiment of such engineering, a fluid end 100, is shown in FIGS. 7-11. The various features of the fluid end 100 and alternative embodiments of those features are described below.

With reference to FIGS. 7-11, one of the features of a traditional fluid end that the inventors re-engineered was the flange. As discussed above, fatigue failures in fluid ends are commonly found around the flange. Thus, the fluid end 100 has no flange. Without a flange, the moment arm associated with the fluid end 100 is significantly decreased. Therefore, less torque is applied to the fluid end 100 during operation than flanged fluid ends, making the fluid end 100 less susceptible to fatigue failures.

One approach to overcoming the drawbacks of a machined flange would be to remove the flange and attach the power end's stay rods directly to the fluid end body. However, in order to secure the stay rods to the fluid end body, the stay rods must extend entirely through the fluid end body. This construction requires the use of specially designed power ends having longer-than-usual stay rods. An operator may not always have a fleet of such power ends at its disposal.

Figure 7:
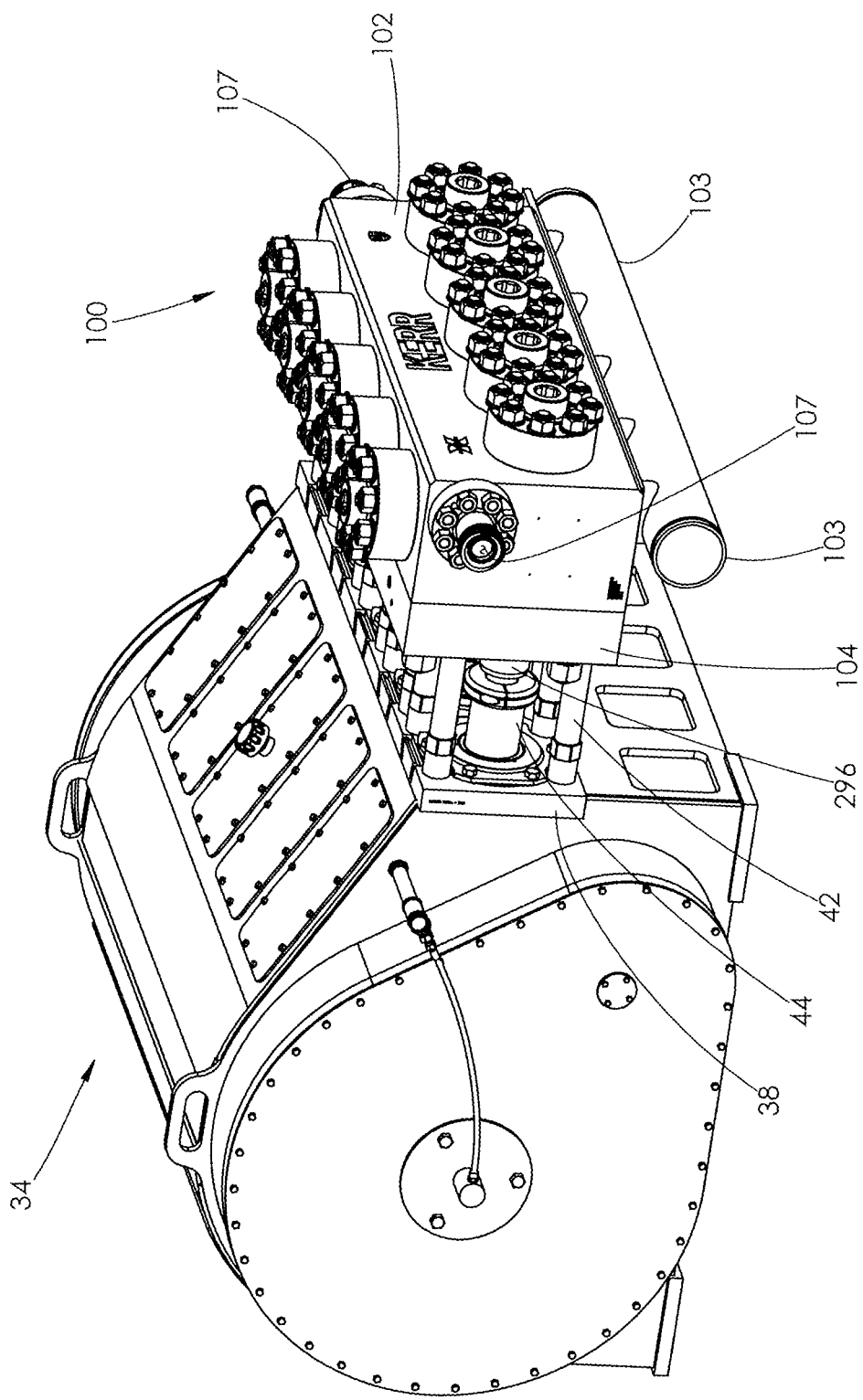
FIG. 7 is a left side perspective view of one embodiment of a fluid end, attached to a power end identical to that shown in FIGS. 3 and 4.
Figure 8:
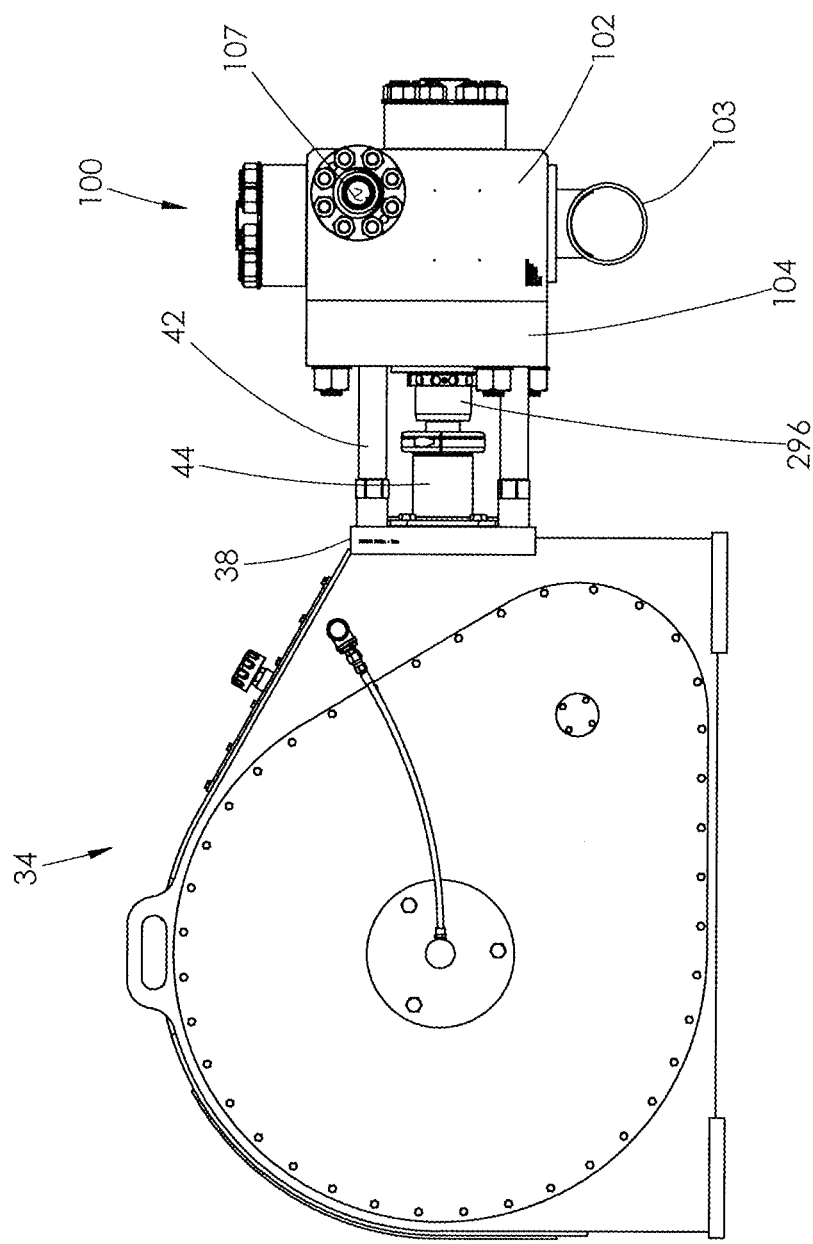
FIG. 8 is a left side elevational view of the fluid end and power end shown in FIG. 7.

The fluid end 100 was designed so that is can be attached to a traditional power end 34, as shown in FIGS. 7 and 8. Such attachment is possible because the fluid end 100 has a multi-piece body design. Instead of extending stay rods entirely through a single fluid end body, the stay rods 42 are attached to one of the pieces of the multi-piece body.

While not a cause of a failure, machining a flange into the fluid end also entails the wastage of a significant amount of removed raw material. Such machining also requires a significant investment of time and labor, thus resulting in increased manufacturing costs. For fluid ends that use a single fluid end body design, extra machining may be needed to help decrease the thickness of the fluid end body. For example, some of the bores may be machined to project from the surface of the fluid end body. Material around the projecting bores may be discarded and wasted. In contrast, the combination of the flangeless and multi-piece body design of the fluid end 100 uses fewer raw materials, reducing material wastage and manufacturing costs.

Continuing with FIGS. 7-11, the fluid end 100 comprises a fluid end body 102 releasably attached to a connect plate 104. The fluid end body 102 and the connect plate 104 are each generally shaped as a rectangular prism and have the same length and height. During operation, fluid is mostly contained within the fluid end body 102. The connect plate 104 serves primarily as a connection point for the stay rods 42. Thus, the connect plate 104, may be thinner than the fluid end body 102 (thickness being measured in FIG. 11 along the line B-B, for example).

When the fluid end body 102 is attached to the connect plate 104, the fluid end 100 has the shape of a rectangular prism. However, one or more of the corners of the prism may be beveled. In alternative embodiments, the width and height of the connect plate may vary from the length and height of the fluid end body. In further alternative embodiments, the connect plate and the fluid end body may have the same thickness.

Figure 10:
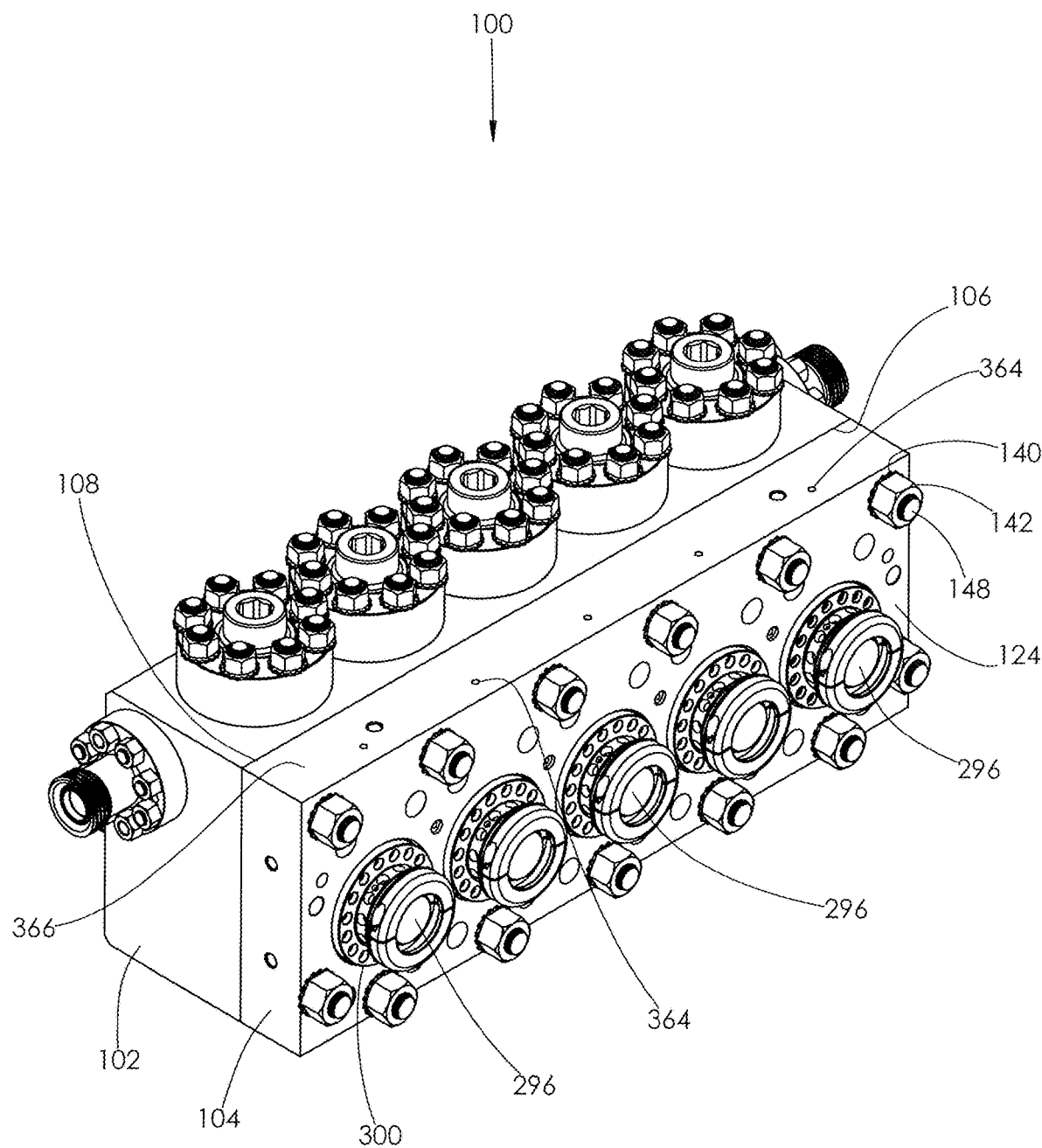
FIG. 10 is a rear perspective view of the fluid end shown in FIG. 9.

Continuing with FIGS. 9-11, the fluid end body 102 is joined to the connect plate 104 such that a rear surface 106 of the fluid end body 102 faces a front surface 108 of the connect plate 104. In some embodiments, the fluid end body 102 and the connect plate 104 are attached such that a portion of the rear surface 106 of the fluid end body 102 is in flush engagement with a portion of the front surface 108 of the connect plate 104.

Figure 12:
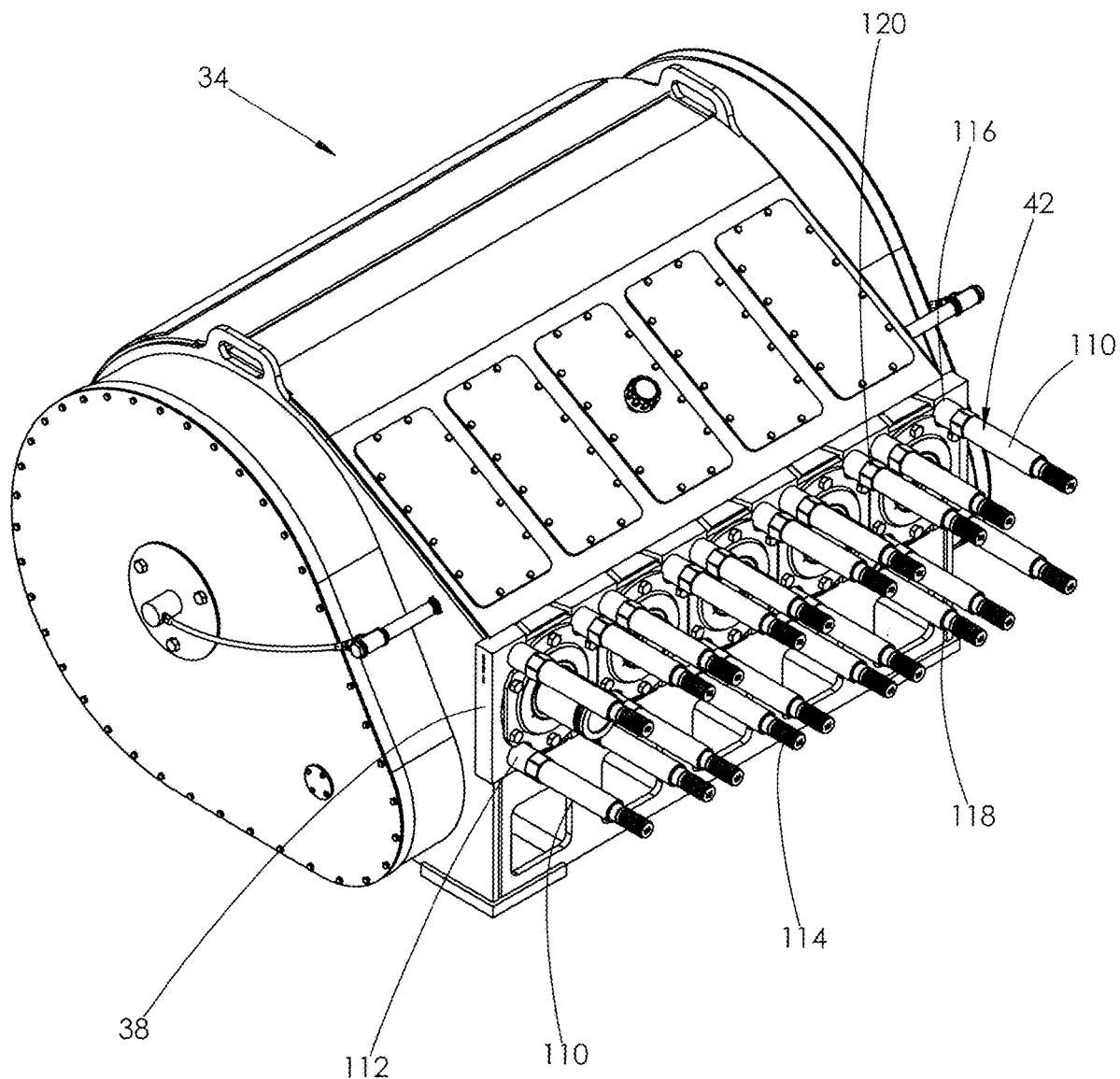
FIG. 12 is a front perspective view of the power end shown in FIGS. 7 and 8. No attached fluid end is shown.
Figure 14:
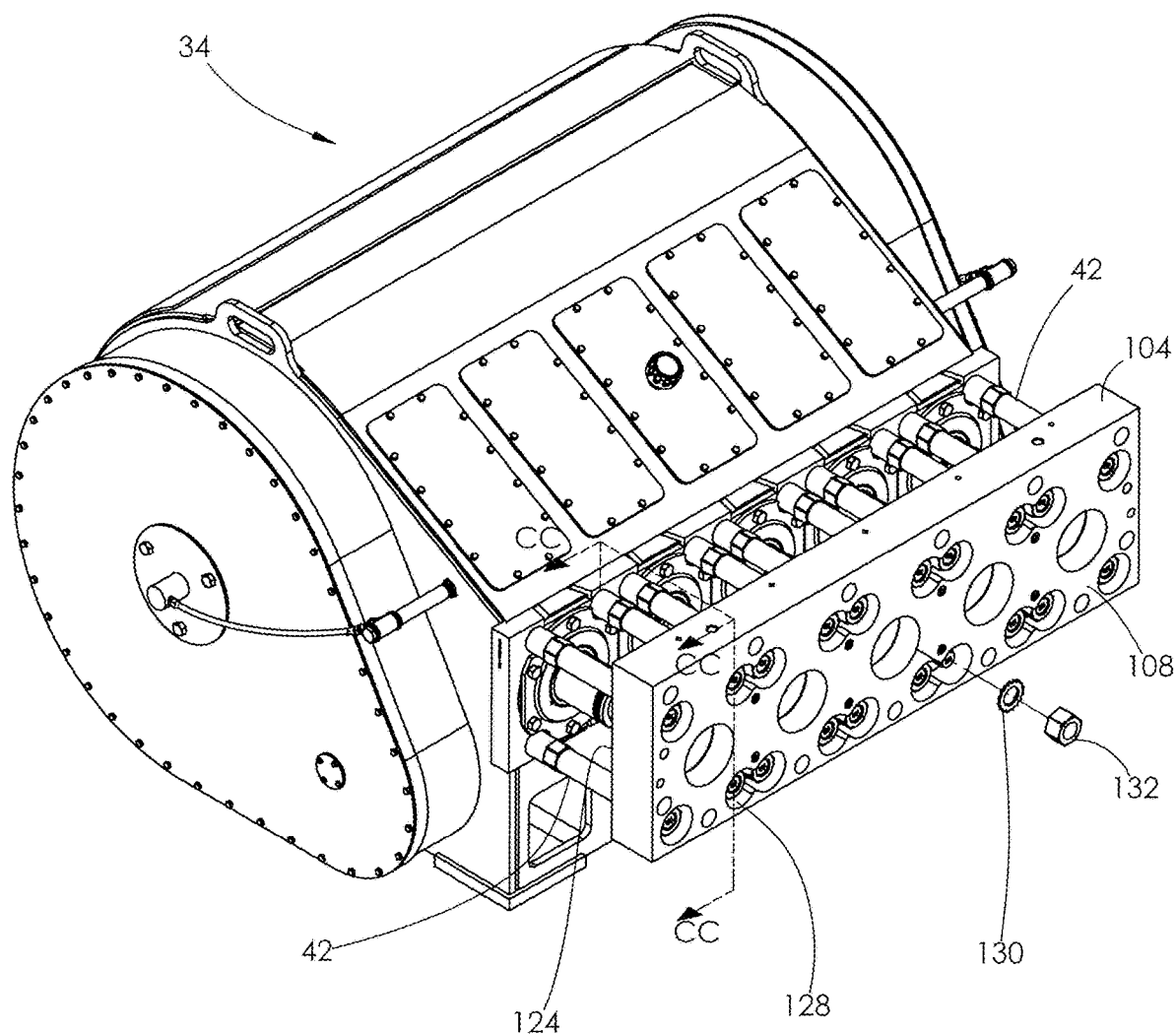
FIG. 14 is a front perspective view showing the power end of FIG. 12, with the connect plate of FIG. 13 installed. A washer and nut used to engage one of the stay rods are shown in exploded form.
Figure 15:
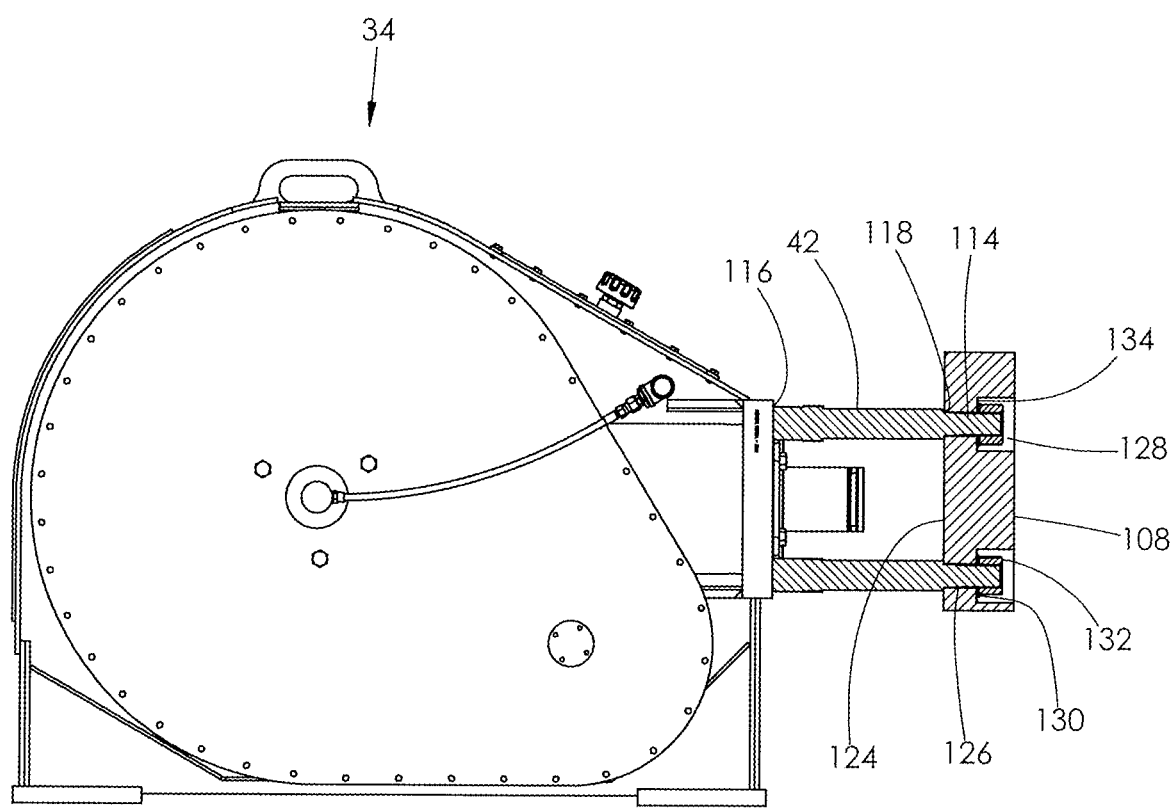
FIG. 15 is a left side elevation view of the power end and connect plate shown in FIG. 14. The connect plate and stay rods are shown in cross-section. The cross-section is taken along a plane that includes line CC-CC from FIG. 14.

With reference to FIGS. 12, 14, and 15, the stay rods 42 rigidly interconnect the connect plate 104 and the power end 34. A traditional stay rod, like the stay rods 42, comprises an elongate body 110 having opposed first and second ends 112 and 114. External threads are formed in the body 110 adjacent each of its ends 112 and 114. These threaded portions of the body 110 are of lesser diameter than the rest of the body 110. A step separates each threaded portion of the body 110 from its unthreaded portion. Step 116 is situated adjacent its first end 112 and step 118 is situated adjacent its second end 114, as shown in FIGS. 12 and 15.

A plurality of internally threaded openings are formed about the periphery of the mounting plate 38. Each threaded opening mates with a threaded first end 112 of one of the stay rods 42 in a one-to-one relationship. An integral nut 120 is formed in each stay rod 42 adjacent its first end 112. The nut 120 provides a gripping surface where torque may be applied to the stay rod 42 when installing the stay rod 42 in the mounting plate 38. Once a stay rod 42 has been installed in the mounting plate 38, the elongate body 110 and second end 114 project from the front surface of the mounting plate 38, as shown in FIG. 12. In alternative embodiments, the stay rods may be installed within threaded connectors supported on the mounting plate.

Figure 13:
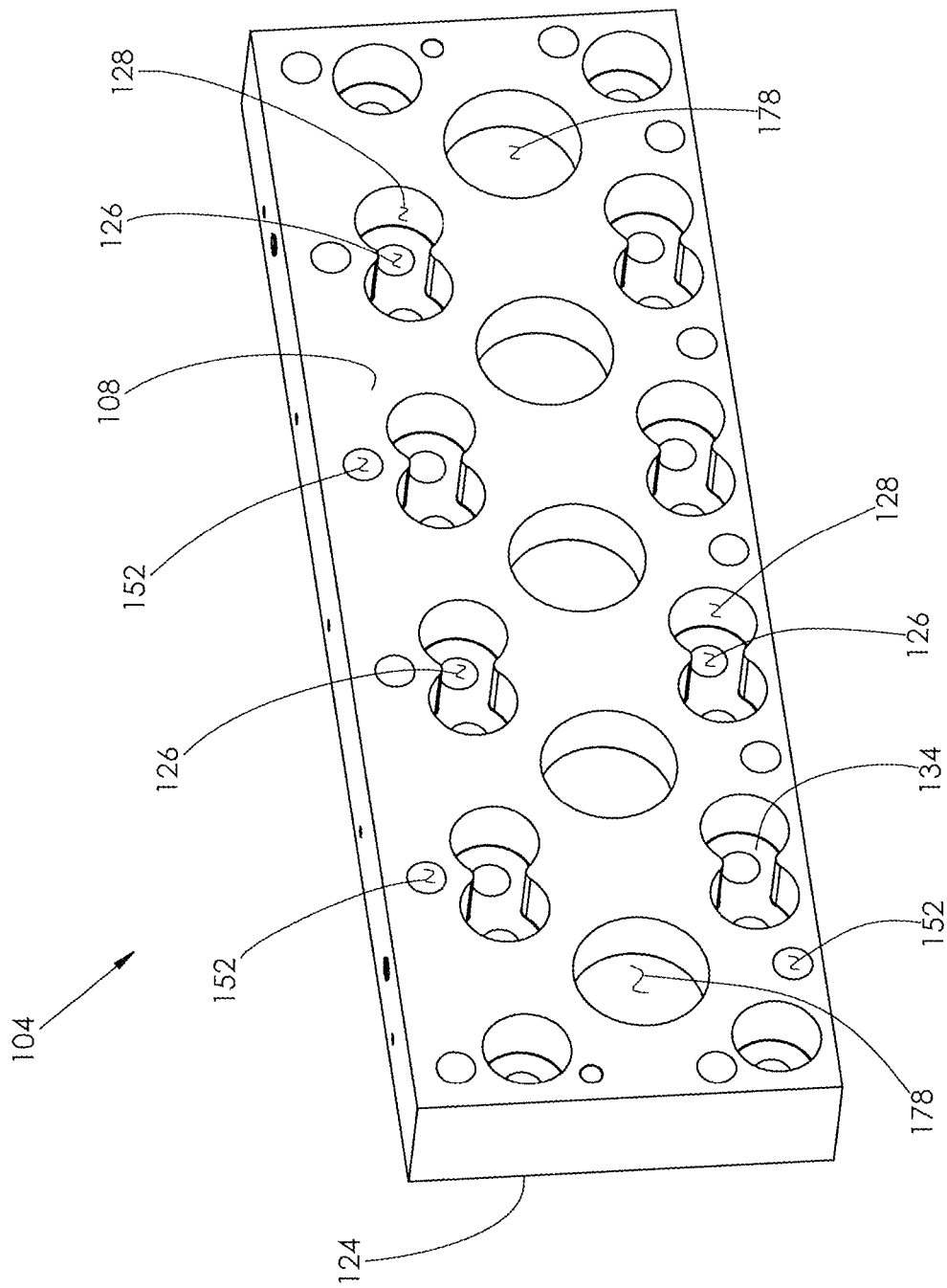
FIG. 13 is a front perspective view of the connect plate of the fluid end shown in FIG. 9.

With reference to FIGS. 13-15, a plurality of bores 126 are formed about the periphery of the connect plate 104 for receiving the second end 114 of each stay rod 42, as shown in FIG. 15. Each of the bores 126 opens on the front surface 108 and rear surface 124 of the connect plate 104. The number of bores 126 is equal to the number of stay rods 42, and the bores 126 are positioned such that they are alignable with the stay rods 42 in a one-to-one relationship. In alternative embodiments, the bores in the connect plate may be spaced so as to match different stay rod spacing configurations used with different power ends.

A counterbore 128 is formed in each bore 126 adjacent the front surface 108 of the connect plate 104. Adjacent counterbores 128 may overlap each other, as shown in FIG. 13. In alternative embodiments, each bore may be spaced from each adjacent bore such that their respective counterbores do not overlap.

Continuing with FIG. 15, a stay rod 42 is installed within one of the bores 126 by inserting its second end 114 into the opening of the bore 126 formed on the rear surface 124 of the connect plate 104. The stay rod 42 is extended into the bore 126 until the step 118 abuts the rear surface 124. When a stay rod 42 is installed, its second end 114 projects within the counterbore 128 of its associated bore 126. To secure each stay rod 42 to the connect plate 104, a washer 130 and nut 132 are installed on the second end 114 of the stay rod 42, as shown in FIGS. 14 and 15. Once installed, each nut 132 and its underlying washer 130 press against a flat bottom 134 of a counterbore 128 within which they are installed. The nut 132 is fully contained within that counterbore 128.

Figure 16:
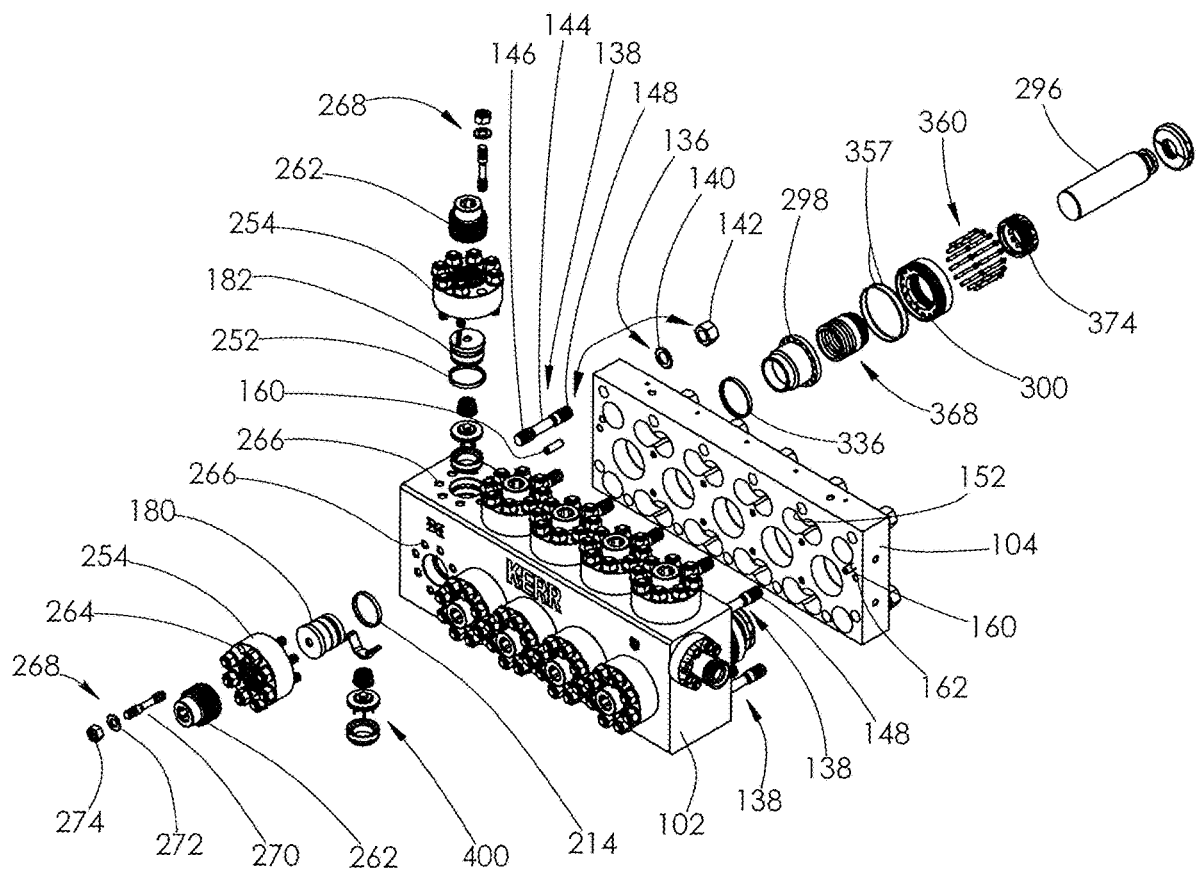
FIG. 16 is an exploded front perspective view of the fluid end shown in FIG. 9. Only a single plunger is shown.
Figure 17:
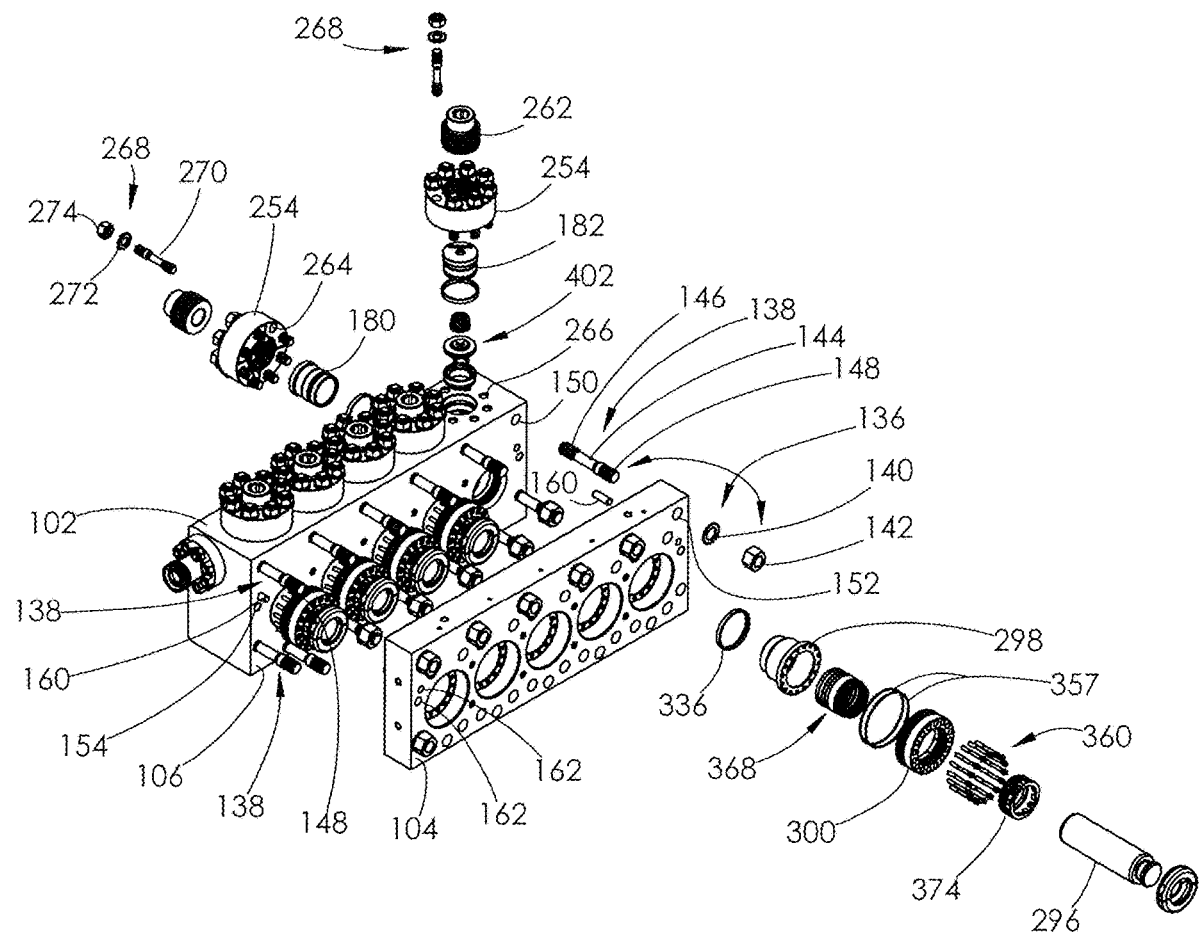
FIG. 17 is an exploded rear perspective view of the fluid end shown in FIG. 10.

Turning to FIGS. 16 and 17, the fluid end body 102 is secured to the connect plate 104 using a fastening system 136. The fastening system 136 comprises a plurality of studs 138, a plurality of washers 140, and plurality of internally threaded nuts 142. Each stud 138 comprises a cylindrical body 144 having a pair of opposed ends 146 and 148. Each of the ends 146 and 148 is externally threaded.

Continuing with FIG. 17, a plurality of internally threaded openings 150 are formed about the periphery of the rear surface 106 of the fluid end body 102. The first end 146 of each stud 138 mates with a corresponding one of the openings 150. Once a stud 138 has been installed in the fluid end body 102, its second end 148 projects from the body's rear surface 106.

With reference to FIGS. 13, 16 and 17, a plurality of through-bores 152 are formed about the periphery of the connect plate 104. The through-bores 152 are alignable with the plural studs 138 projecting from the fluid end body 102.

To assemble the fluid end 100, the plural studs 138 are installed in the plural openings 150 of the fluid end body 102. The fluid end body 102 and installed studs 138 are positioned such that each through-bore 152 formed in the connect plate 104 is aligned with a corresponding stud 138. The fluid end body 102 and the connect plate 104 are then brought together such that each stud 138 is received within a corresponding through-bore 152.

Figure 18:
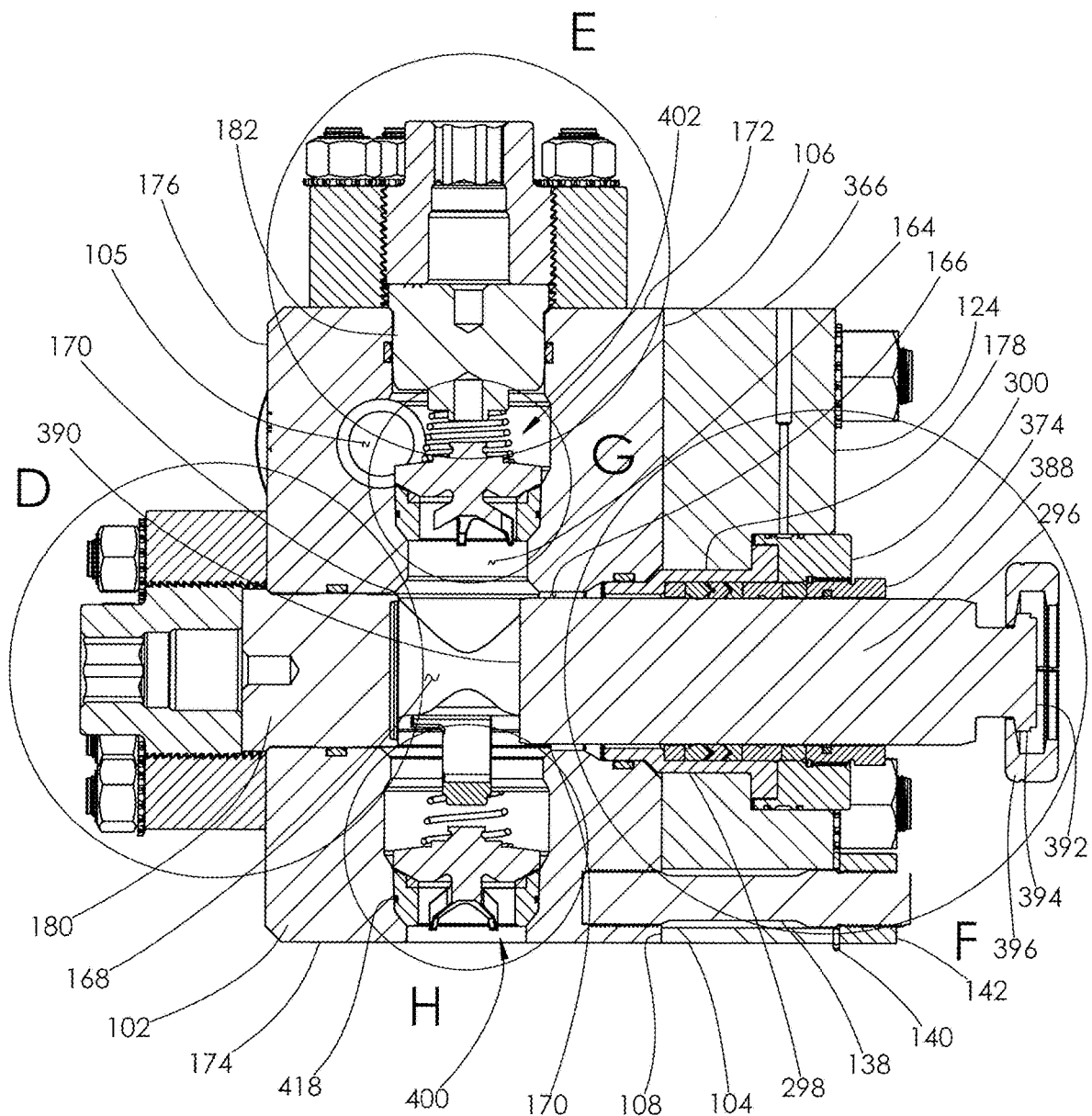
FIG. 18 is a cross-sectional view of the fluid end shown in FIG. 11, taken along line C-C.
Figure 24:
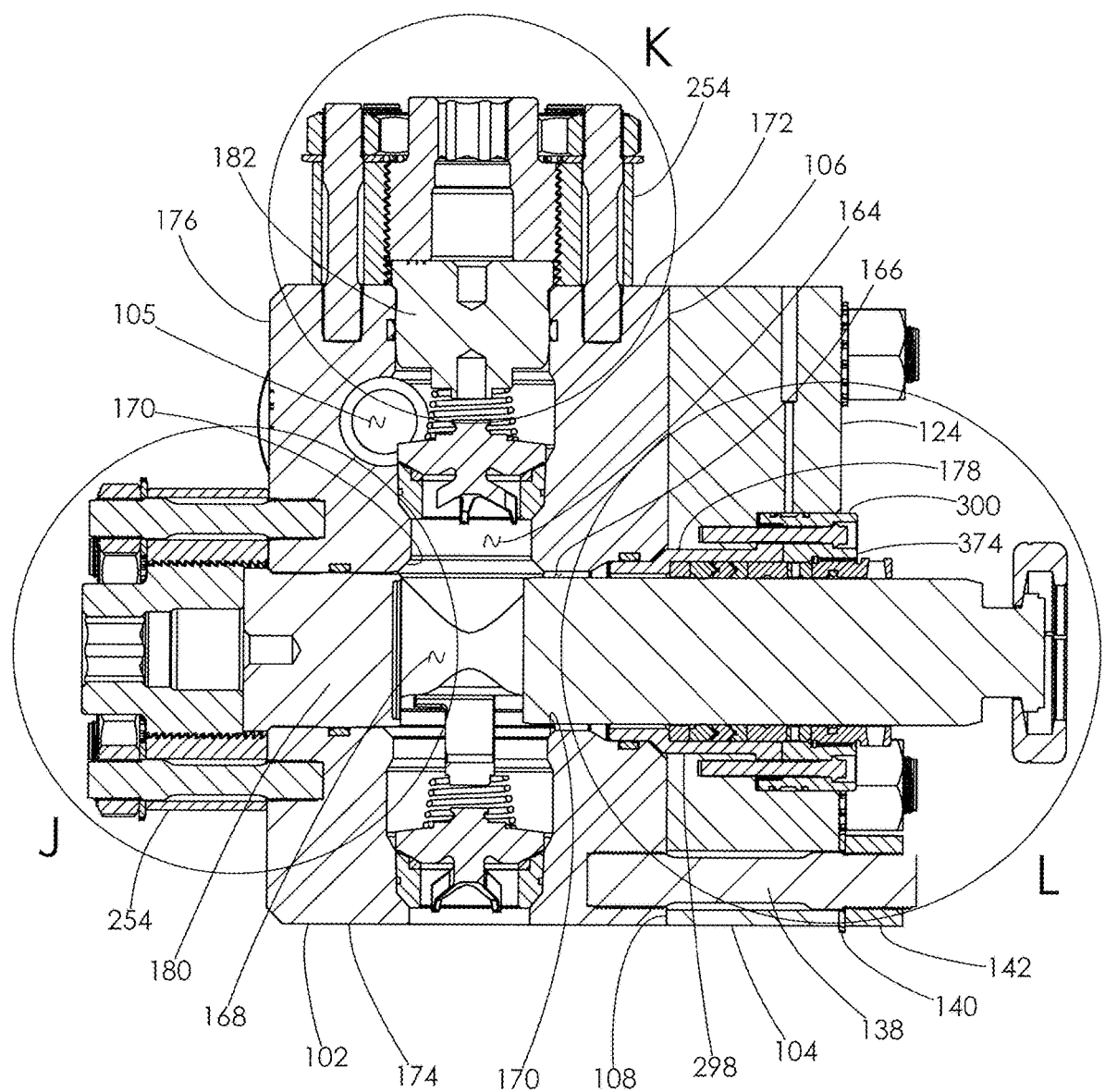
FIG. 24 is a cross-sectional view of the fluid end shown in FIG. 11, taken along line I-I.

When the fluid end body 102 and the connect plate 104 are thus joined, the second end 148 of each stud 138 projects from the rear surface 124 of the connect plate 104, as shown in FIGS. 18 and 24. Finally, the washer 140 and nut 142 are installed on the second end 148 of each stud 138, as shown in FIGS. 10, 11, 18, and 24. The nut 142 is turned until it presses against the rear surface 124 of the connect plate 104, thereby securing the fluid end body 102 and the connect plate 104 together.

Continuing with FIG. 17, one or more pin bores 154 may be formed in the rear surface 106 of the fluid end body 102 adjacent its outer edges. Each pin bore 154 may receive a pin 160 that projects from the rear surface 106 of the fluid end body 102. These pins 160 may be installed within a corresponding bore 162 formed in the connect plate 104, as shown in FIG. 16. The pins 160 help align the fluid end body 102 and the connect plate 104 during assembly of the fluid end 100.

The fluid end body 102 and the connect plate 104 may each be formed from a strong, durable material, such as steel. As discussed above, traditional fluid ends are formed from a high strength alloy steel that tends to erode quickly under of the constant flow of high pressure fluid. In order to extend the life of the fluid end 100, the inventors formed the fluid end body 102 out of stainless steel. Stainless steel erodes at a much slower rate than traditional high strength alloy steel. Stainless steel also has a much longer fatigue life than high strength alloy steel. Thus, by making the fluid end body 102 out of stainless steel, the fluid end 100 is much less susceptible to fatigue cracks. Therefore, the life of the fluid end 100 is significantly increased from that of a traditional fluid end.

In contrast, because the connect plate 104 serves primarily as a connection point for the stay rods 42, it can be formed from a different, lower strength, and less costly material than the fluid end body 102. For example, when the fluid end body 102 is formed from stainless steel, the connect plate 104 can be formed from a less costly alloy steel, such as 1020 alloy steel. Alternatively, the fluid end body 102 and the connect plate 104 may be formed from the same material, such as stainless steel.

In order to manufacture the fluid end 100, the fluid end body 102 and the connect plate 104 are each cut to size from blocks of the chosen steel. The block used to create the fluid end body 102 is preferably a forged block of steel. Multiple fluid end bodies may be formed from the same block. In such case, a block may be divided lengthwise into multiple rectangular pieces, with each piece to form a fluid end body. Because no flanges will be machined from the block, the material formerly dedicated to flanges can be reassigned to other pieces, from which additional fluid end bodies can be formed. Multiple connect plates may likewise be formed from the same block. If the fluid end body and the connect plate are formed from the same material, the fluid end body and connect plate may be formed from the same block.

In alternative embodiments, the flangeless, multi-piece fluid end may be formed in accordance with those embodiments shown in Appendix J.

With reference now to FIGS. 18 and 24, the interior of the fluid end body 100 includes a plurality of longitudinally spaced bore pairs. Each bore pair includes a vertical bore 164 and an intersecting horizontal bore 166. The zone of intersection between the paired bores defines an internal chamber 168.

Figure 6:
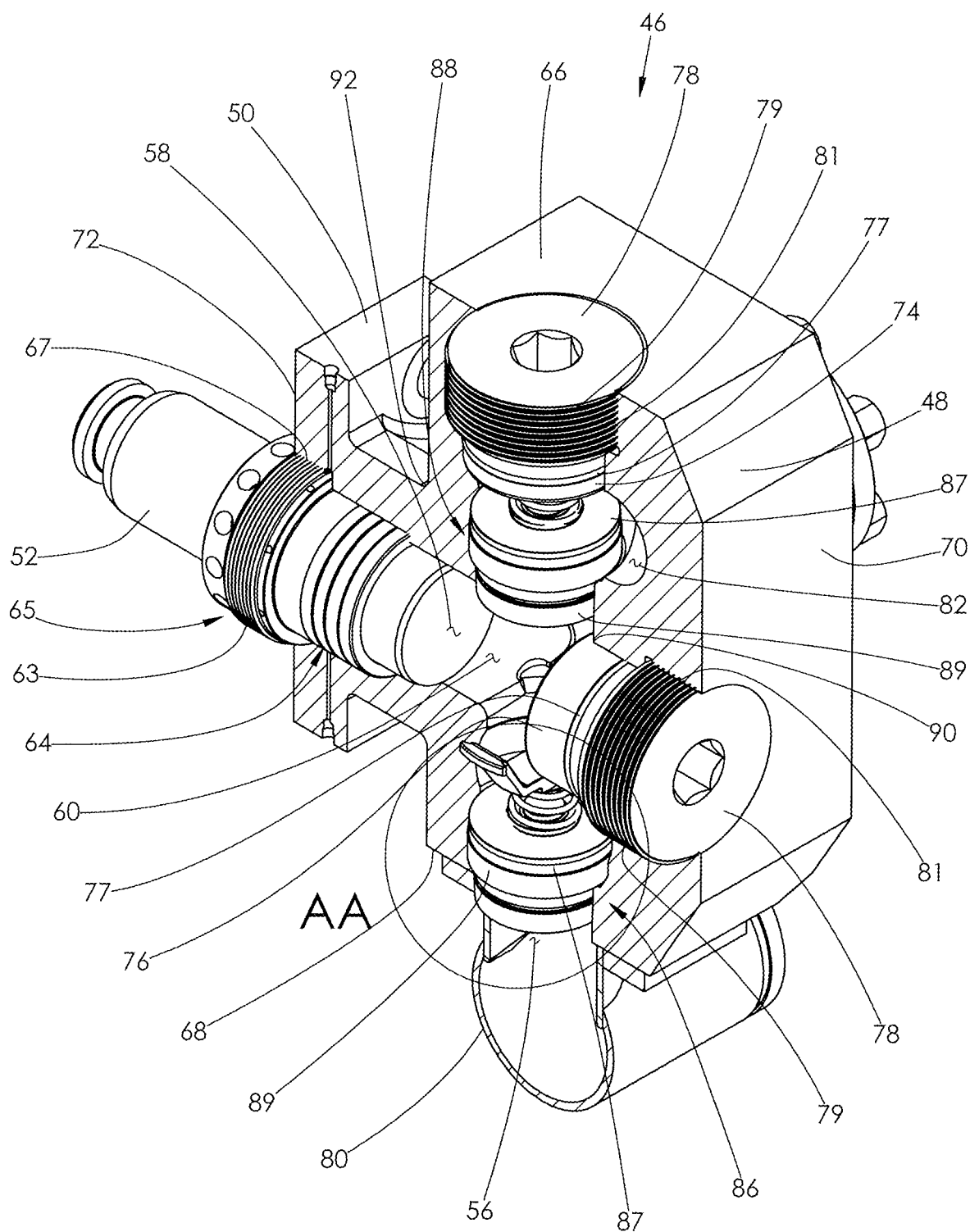
FIG. 6 is a sectional view of the fluid end shown in FIG. 5, taken along line A-A.
Figure 6A:
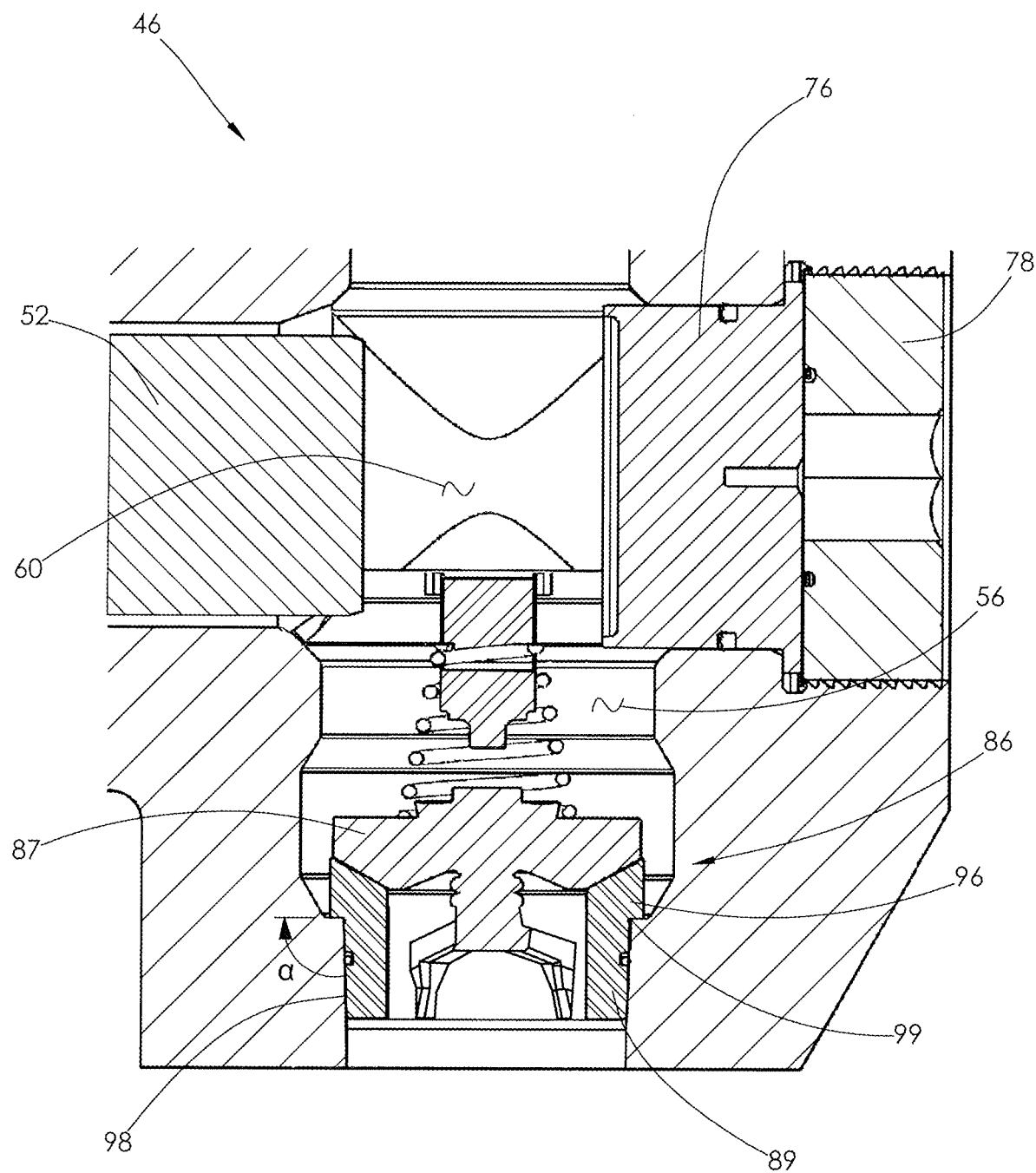
FIG. 6A is an enlarged and cross-sectional view of area AA, shown in FIG. 6.

As previously discussed with regard to FIG. 6, a plurality of corners 90 are formed in the walls surrounding the internal chamber 60 of a traditional fluid end. Such corners 90 experience a high amount of stress and are thus prone to fatigue cracks. The inventors of the fluid end 100 determined that stress concentrations at the corners 90 are significantly reduced if the corners are beveled. Thus, in the fluid end body 102, a plurality of corners 170 surrounding each internal chamber 168 are beveled. More preferably, all of the corners 170 surrounding each internal chamber 168 are beveled.

Continuing with FIGS. 18 and 24, each vertical bore 164 interconnects opposing top and bottom surfaces 172 and 174 of the fluid end body 102. Each horizontal bore 166 interconnects opposing front and rear surfaces 176 and 106 of the fluid end body 102. A plurality of longitudinally spaced horizontal bores 178 are also formed in the connect plate 104, as shown in FIG. 13. The bores 178 interconnect the front and rear surfaces 108 and 124 of the connect plate 104. When the fluid end 100 is assembled, the bores 178 and bores 166 are aligned in a one-to-one relationship.

With reference to FIGS. 16-20, a plurality of suction plugs 180 are arranged in a one-to-one relationship with the horizontal bore 166 formed in the fluid end body 102. Each suction plug 180 seals the opening of its associated horizontal bore 166 at the front surface 176. Likewise, a plurality of discharge plugs 182 are arranged in a one-to-one relationship with the vertical bores 164 formed in the fluid end body 102. Each discharge plug 182 seals the opening of its associated vertical bore 164 at the top surface 172. When installed, the plugs 180 and 182 block the flow of fluid through the bore openings formed in the front and top surface 176 and 172 of the fluid end body 102. The plugs 180 and 182 are each preferably made of metal, such as high strength steel.

As previously discussed with regard to FIG. 6, the seals 77 installed within the plugs 74 and 76 wear against the walls surrounding the bores 56 and 58 during operation of traditional fluid ends. Over time, such wear erodes the walls surrounding the bores 56 and 58, causing fluid to leak around the plugs 74 and 76. The inventors engineered the suction and discharge plugs 180 and 182 and the fluid end body 102 to minimize such erosion.

As also discussed with regard to traditional fluid ends, because the plugs 74 and 76 fit tightly within their corresponding bores 56 and 58, significant forces are required to push or pull the plugs 74 and 76 in and out of the fluid end 46. The inventors engineered the suction and discharge plugs 180 and 182 used with the fluid end 100 to minimize the amount of torque required during the installation and removal process.

With reference to FIGS. 28-30, each of the suction plugs 180 comprises a cylindrical body having opposed top and bottom surfaces 186 and 188. The suction plug 180 is substantially solid with the exception of a threaded hole 190 formed in its top surface 186. The suction plug 180 includes an upper portion 192 joined to a lower portion 194 by a tapered portion 196.

The lower portion 194 has a reduced diameter relative to that of the upper portion 192. The lower portion 194 also includes a plurality of sections along its length, the sections have several different diameters. The section of greatest diameter is situated midway along the length of the lower portion 194, and presents an external sealing surface 198. First and second sections 200 and 202 are formed on opposite sides of the sealing surface 198. Each of the sections 200 and 202 has a reduced diameter relative to that of the sealing surface 198. A third section 204 extends between the second section 202 and the bottom surface 188. The third section 204 has a reduced diameter relative to that of the second section 202.

Figure 19:
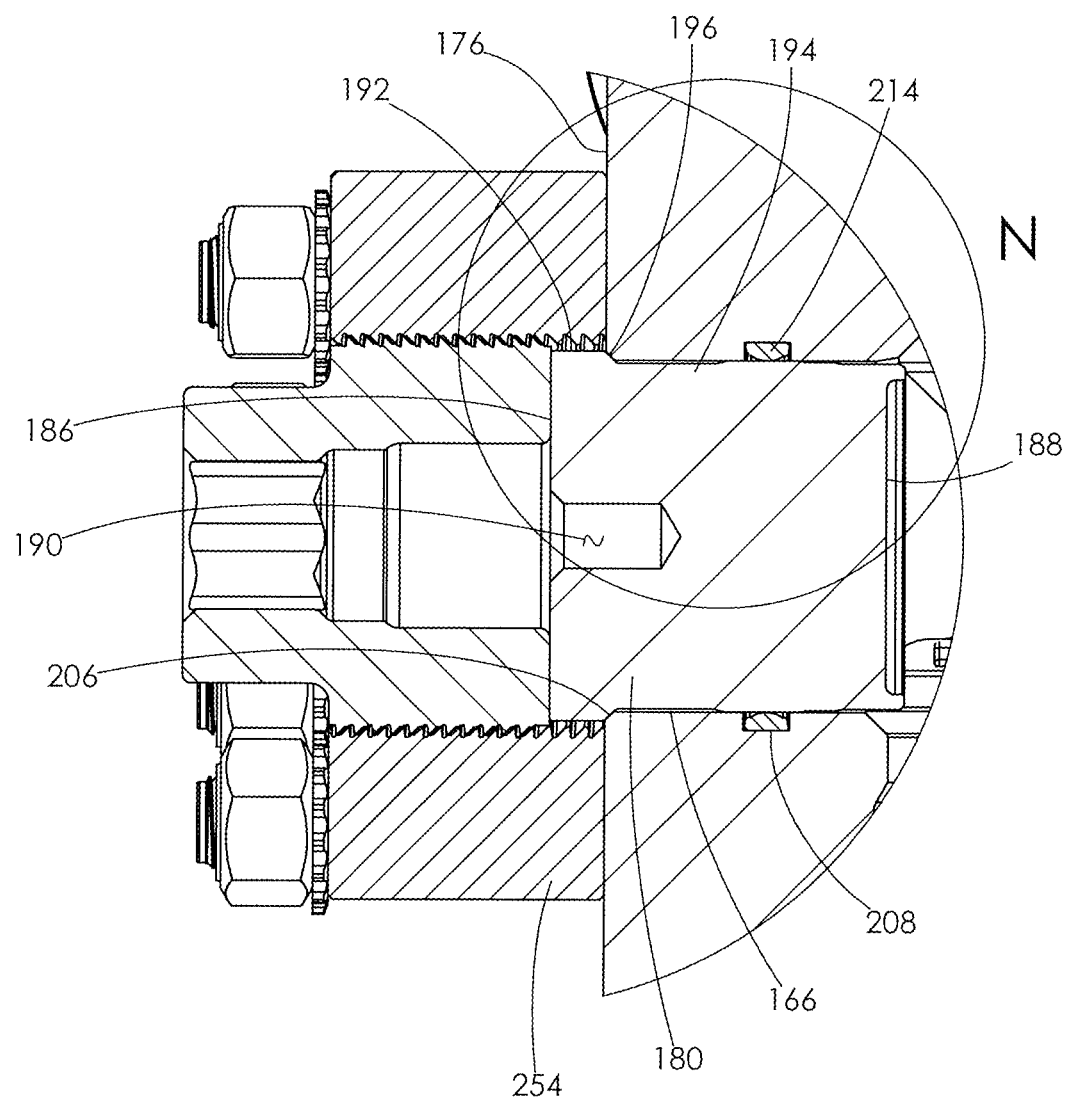
FIG. 19 is an enlarged view of area D from FIG. 18.

With reference to FIG. 19, a plurality of beveled corners 206 are formed in the fluid end body 102 at the intersection of the front surface 176 and the walls surrounding the opening of each horizontal bore 166. When a suction plug 180 is installed within one of the horizontal bores 166, the tapered portion 196 of the plug 180 engages the beveled corners 206. Such engagement prevents further axial movement of the plug 180 within the bore 166. The upper portion 192 of the plug 180 projects from a front surface 176 of the fluid end body 102 when installed within one of the bores 166. In alternative embodiments, the upper portion of the suction plug may engage the front surface of the fluid end body. In further alternative embodiments, axial movement of the suction plug within the bore may be prevented by engagement of the bottom surface of the plug with the walls surrounding the bore.

Figure 31:
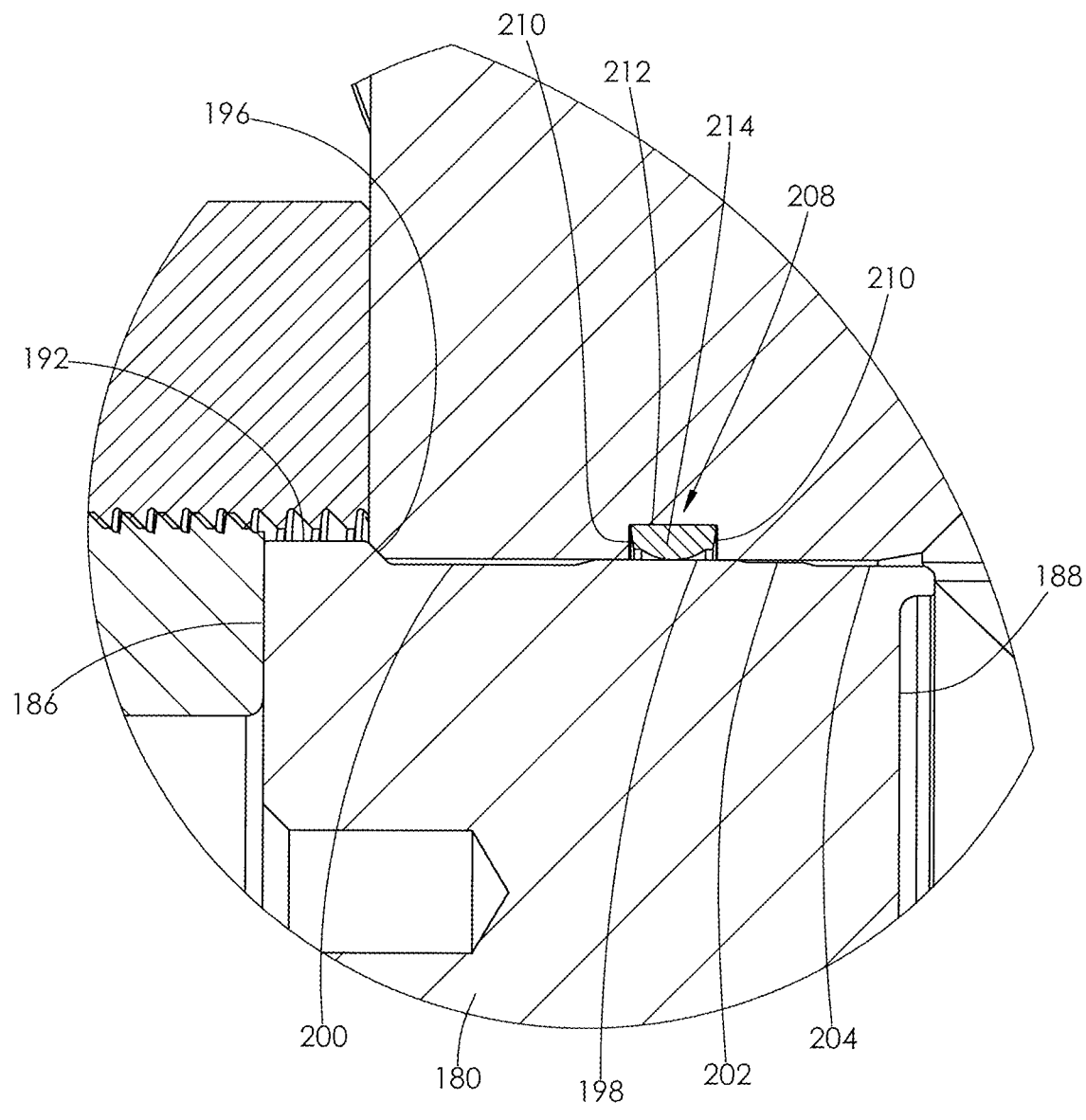
FIG. 31 is an enlarged view of area N shown in FIG. 19.

Turning back to FIGS. 28-30, the outer surface of the plug 180 includes no annular recess for housing a seal. Instead, an annular recess 208 is formed in the walls surrounding each of the horizontal bores 166 adjacent the front surface 176 of the fluid end body 102, as shown in FIGS. 19 and 31. The recess 208 is configured for housing an annular seal 214. Preferably, the seal 214 is a high pressure seal.

With reference to FIG. 31, each recess 208 comprises two sidewalls 210 joined by a base 212. The seal 214 is closely received within the recess 208. After a seal 214 is installed within a corresponding recess 208 within a bore 166, a suction plug 180 is installed within that bore.

When a suction plug 180 is installed within a bore 166, the seal 214 within the bore tightly engages the plug's sealing surface 198. During operation, the seal 214 wears against the sealing surface 198 of the suction plug 180. If the sealing surface 198 on one of the plugs 180 begins to erode, allowing fluid to leak around the plug 180, that plug 180 is removed and replaced with a new plug. The seal 214 may also be removed and replaced with a new seal, if needed.

Continuing with FIG. 31, a small amount of clearance exists between the walls surrounding the bore 166 and the first, second, and third sections 200, 202, and 204 of the installed plug 180. The clearance allows the suction plug 180 to rock back and forth on each side of its sealing surface 198. The rocking motion helps to overcome friction between each of the plugs 180 and the walls surrounding its corresponding bore 166. Thus, less force is required for installation or removal of one of the plugs 180 than is required for a traditional suction plug. Lessor torques mean fewer scrapes and scratches on the walls surrounding the bore, as compared to a traditional suction plug.

The suction plugs 180 may be installed and removed using a tool (not shown), which may be attached to a plug 180 at the threaded hole 190, shown in FIG. 19. For example, a tool having an externally threaded end may mate with the internal threads formed in the threaded hole 190. Once installed, an operator may rock the plug 180 back and forth using the tool while simultaneously pushing or pulling on the plug 180 with the tool.

Turning to FIGS. 32-34, each of the discharge plugs 182 comprises a cylindrical body having opposed top and bottom surfaces 216 and 218. The discharge plug 182 is substantially solid with the exception of two threaded holes. A first threaded hole 220 formed in its top surface 216 and a second threaded hole 222 formed in its bottom surface 218. Each plug 182 includes an upper portion 224 joined to a lower portion 226 by a tapered portion 228.

The lower portion 226 includes a plurality of sections along its length, the sections have several different diameters. The section of the greatest diameter is situated midway along the length of the lower portion 226, and presents an external sealing surface 230. First and second sections 232 and 234 are formed on opposite sides of the sealing surface 230. Each of the sections 232 and 234 has a reduced diameter relative to that of the sealing surface 230. A third section 236 is formed below the second section 234 and has a reduced diameter relative to that of the second section 234. The third section 236 includes a plurality of reduced diameter sections.

Each plug 182 further includes a connection portion 238. The connection portion 238 extends between the third section 236 and the bottom surface 218. The connection portion 238 has a reduced diameter relative to that of the lower portion 226. The second threaded hole 222 extends within the connection portion 238. As will be described later herein, the connection portion 238 is configured for connecting to a spring 438 used with a discharge valve 402, shown in FIGS. 18 and 24.

Figure 20:
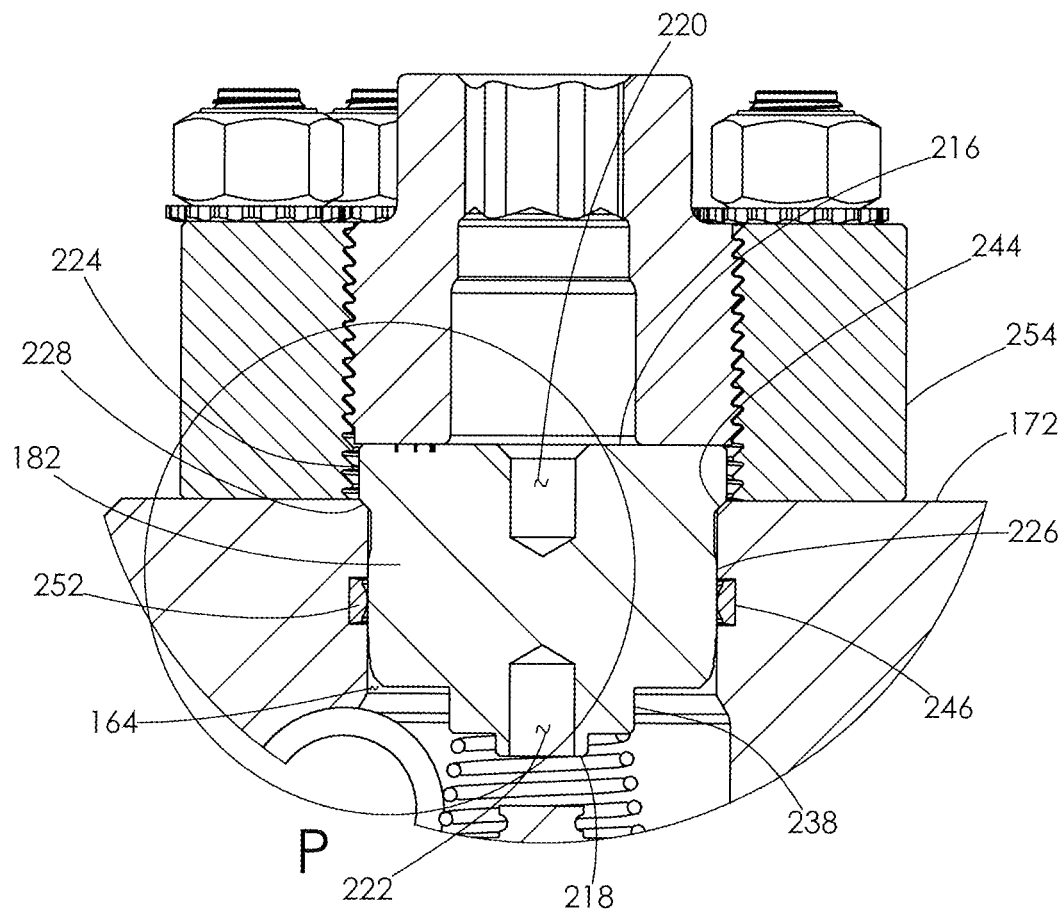
FIG. 20 is an enlarged view of area E from FIG. 18.

With reference to FIG. 20, a plurality of beveled corners 244 are formed in the fluid end body 102 at the intersection of the top surface 172 and the walls surrounding the opening of each vertical bore 164. When a discharge plug 182 is installed within one of the vertical bores 164, the tapered portion 228 of the plug 182 engages the beveled corners 244. Such engagement prevents further axial movement of the plug 182 within the bore 164. The upper portion 224 of the plug 182 projects from the top surface 172 of the fluid end body 102 when installed within one of the bores 164. In alternative embodiments, the upper portion of the discharge plug may engage the top surface of the fluid end body. In further alternative embodiments, axial movement of the discharge plug within the bore may be prevented by engagement of the bottom surface of the plug with the walls surrounding the bore.

Figure 35:
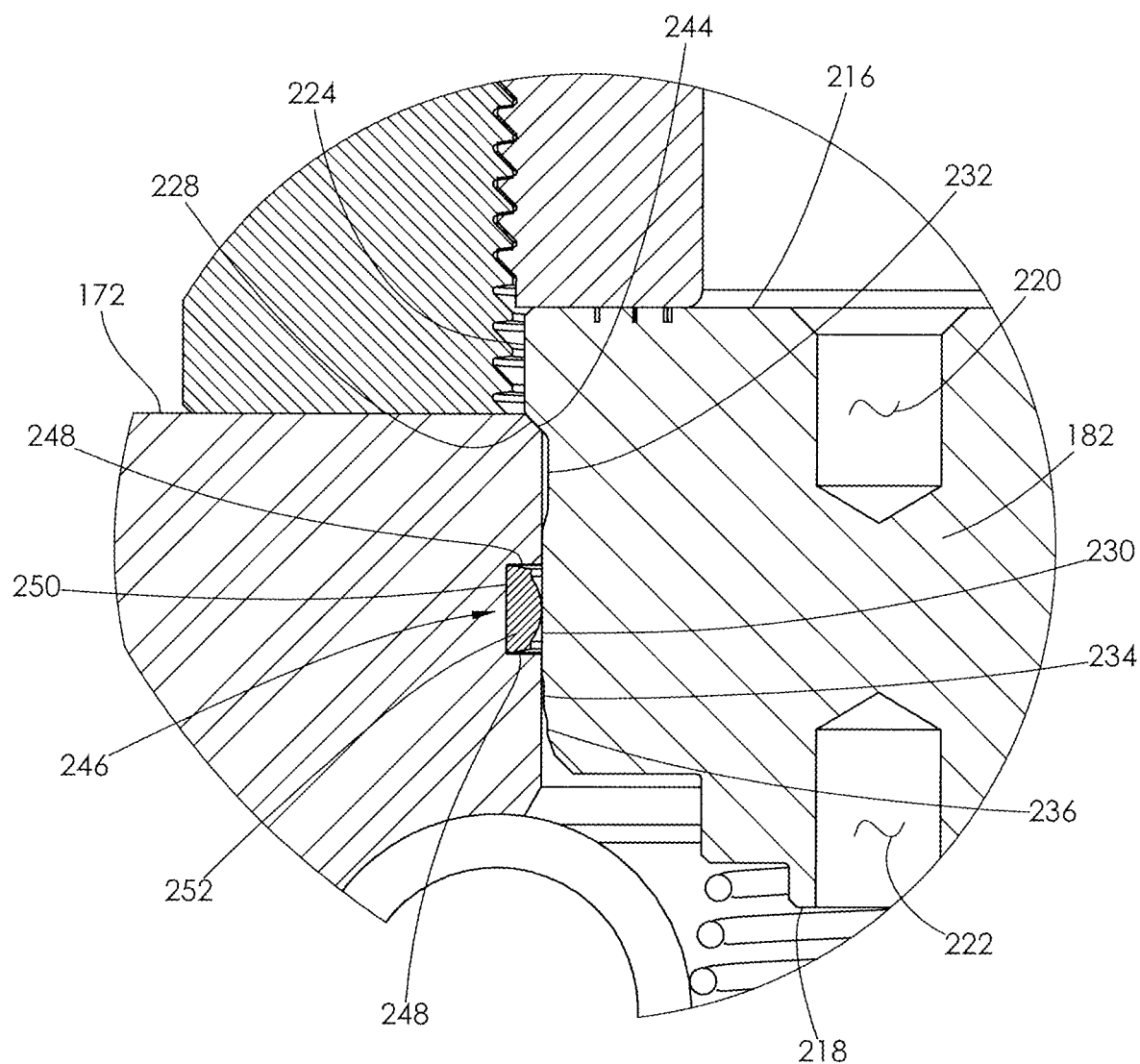
FIG. 35 is an enlarged view of area P shown in FIG. 20.

Turning back to FIGS. 32-34, the outer surface of the plug 182 includes no annular recess for housing a seal. Instead, an annular recess 246 is formed in the walls surrounding each of the vertical bores 164 adjacent the top surface 172 of the fluid end body 102, as shown in FIGS. 20 and 35. The recess 246 is configured for housing an annular seal 252. Preferably, the seal 252 is a high pressure seal.

With reference to FIG. 35, each recess 246 comprises two sidewalls 248 joined by a base 250. The seal 252 is closely received within the recess 246. After a seal 252 is installed within a corresponding recess 246 within a bore 164, a discharge plug 182 is installed within that bore.

When a discharge plug 182 is installed within a bore 164, the seal 252 tightly engages the plug's sealing surface 230. During operation, the seal 252 wears against the sealing surface 230 of the discharge plug 182. If the sealing surface 230 on one of the plugs 182 begins to erode, allowing fluid to leak around the plug 182, that plug 182 is removed and replaced with a new plug. The seal 252 may also be removed and replaced with a new seal, if needed.

Continuing with FIG. 35, a small amount of clearance exists between the walls surrounding the bore 164 and the first, second, and third sections 232, 234, and 236 of the installed plug 182. The clearance allows the discharge plug 182 to rock back and forth on each side of its sealing surface 230. The rocking motion helps to overcome friction between each of the plugs 182 and the walls surrounding its corresponding bore 164. The discharge plugs 182 may be installed and removed using a tool (not shown), which may be attached to a plug 182 at the threaded hole 220, shown in FIG. 20.

In alternative embodiments, the suction and discharge plugs may be formed in accordance with those embodiments described in Appendices A, G, and I.

With reference to FIGS. 19 and 20, when the fluid end 100 is operating, the bottom surfaces 188 and 218 of each of the plugs 180 and 182 will be exposed to the high fluid pressures within the interior of the fluid end 100. The fluid pressure may be high enough to dislodge the suction and discharge plugs 180 and 182 from their respective bores 166 and 164. To keep the plugs 180 and 182 within their respective bores 166 and 164, a plurality of retainers 254 are attached to the fluid end body 102. A retainer 254 is attached to the body 102 above each of the plugs 180 and 182, as shown in FIG. 9.

As previously discussed with regard to FIG. 6, traditional retainers 78 are threaded into the walls surrounding each of the bores 56 and 58 immediately above the plugs 74 and 76. Significant levels of torque can be required to thread and unthread a retainer 78 from a fluid end 46. Such torques can lead to cracking of threads and fluid end failure. The inventors engineered the retainers 254 used with the fluid end 100 to reduce such failures.

Figure 36:
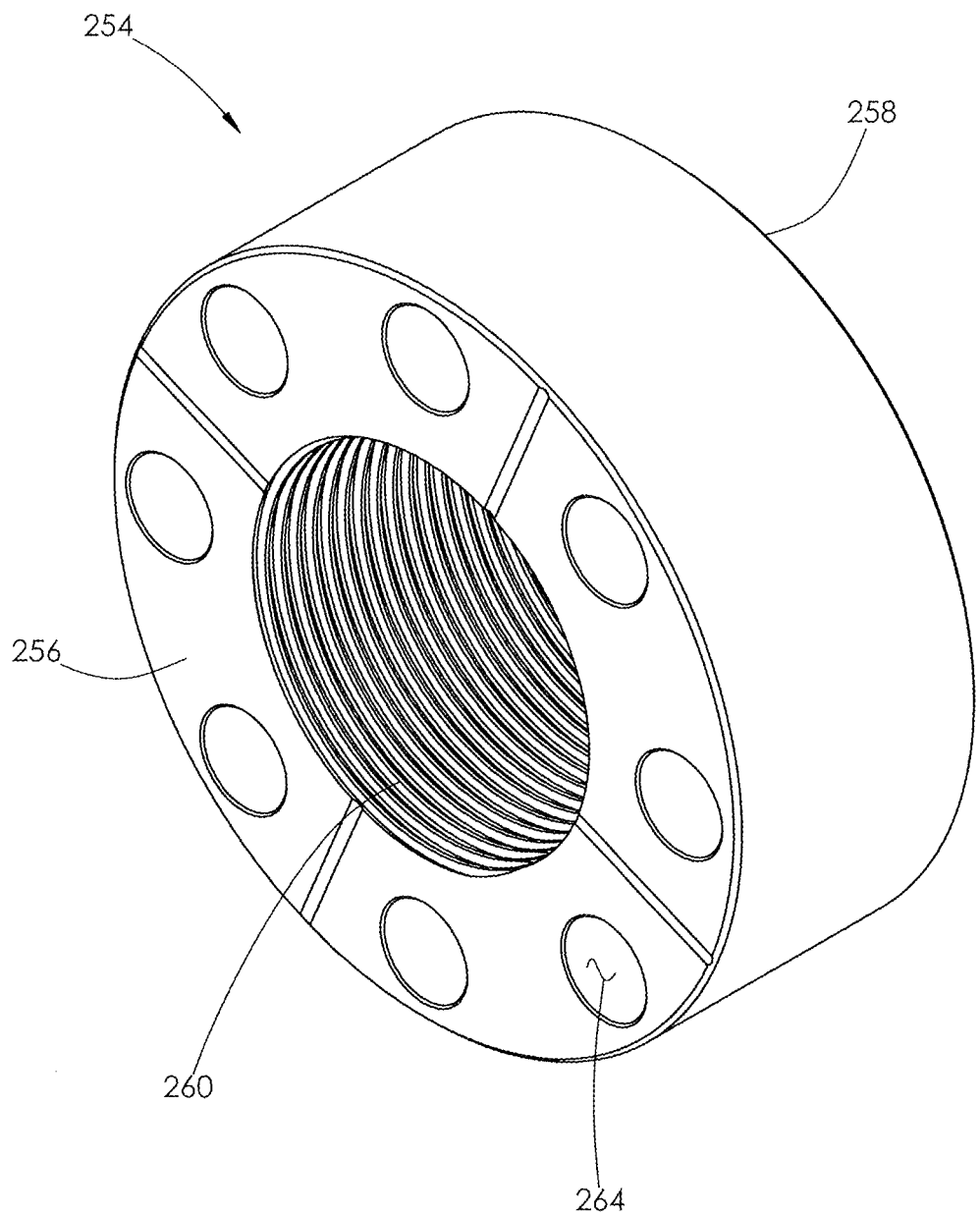
FIG. 36 is a top perspective view of a retainer used with the fluid end shown in FIGS. 18 and 24.
Figure 37:
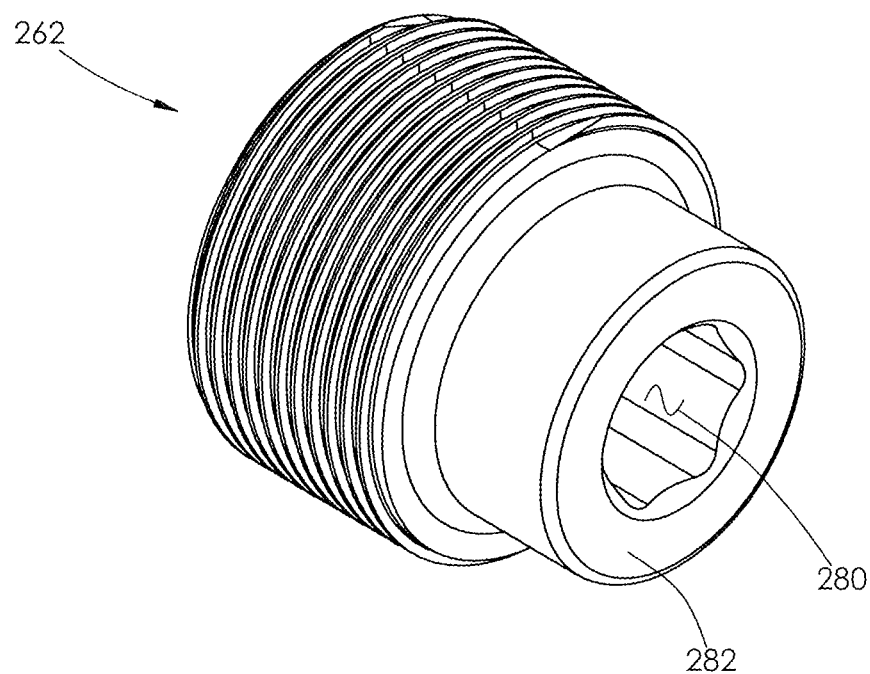
FIG. 37 is a top perspective view of a retainer nut that may be installed within the retainer shown in FIG. 36.
Figure 38:
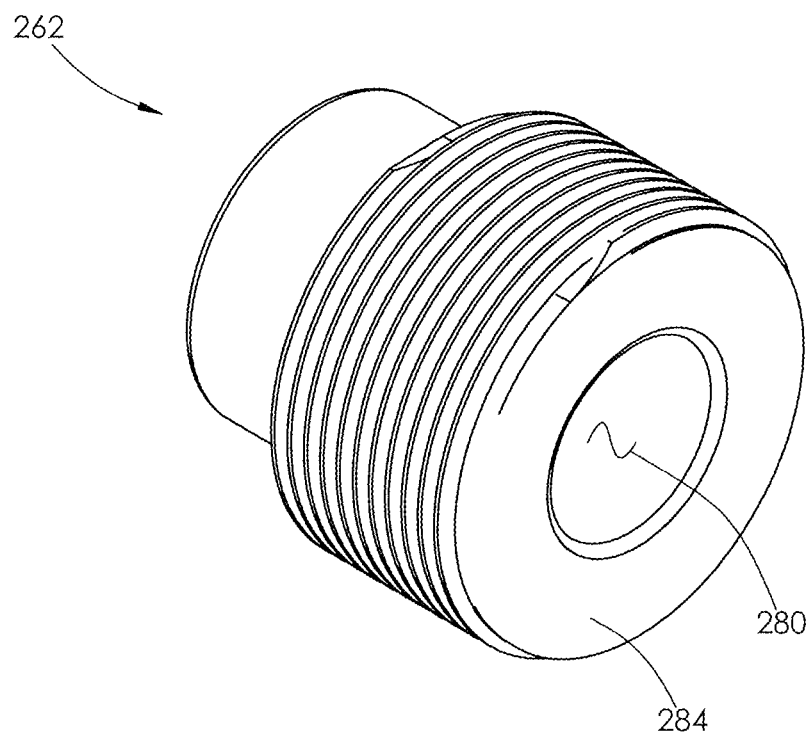
FIG. 38 is a bottom perspective view of the retainer nut shown in FIG. 37.

With reference to FIG. 36, each retainer 254 has a cylindrical body having flat opposing top and bottom surfaces 256 and 258. A threaded central passage 260 is formed in the center of each of retainer 254. The central passage 260 interconnects the top and bottom surfaces 256 and 258. A plurality of peripheral passages 264 are formed in each retainer 254 and surround the central passage 260. Each peripheral passage 264 interconnects the top and bottom surfaces 256 and 258 of each retainer 254.

Figure 25:
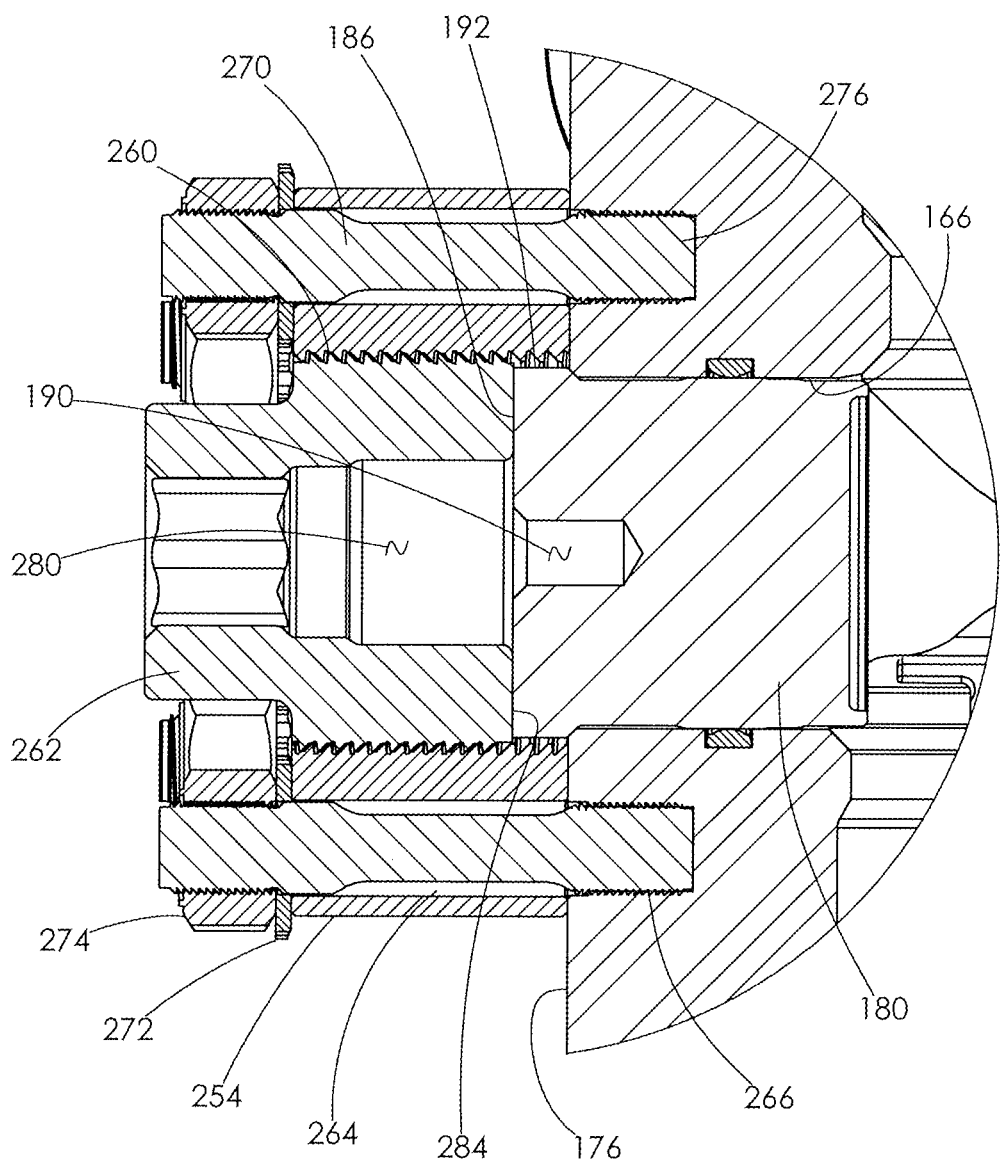
FIG. 25 is an enlarged view of area J from FIG. 24.
Figure 26:
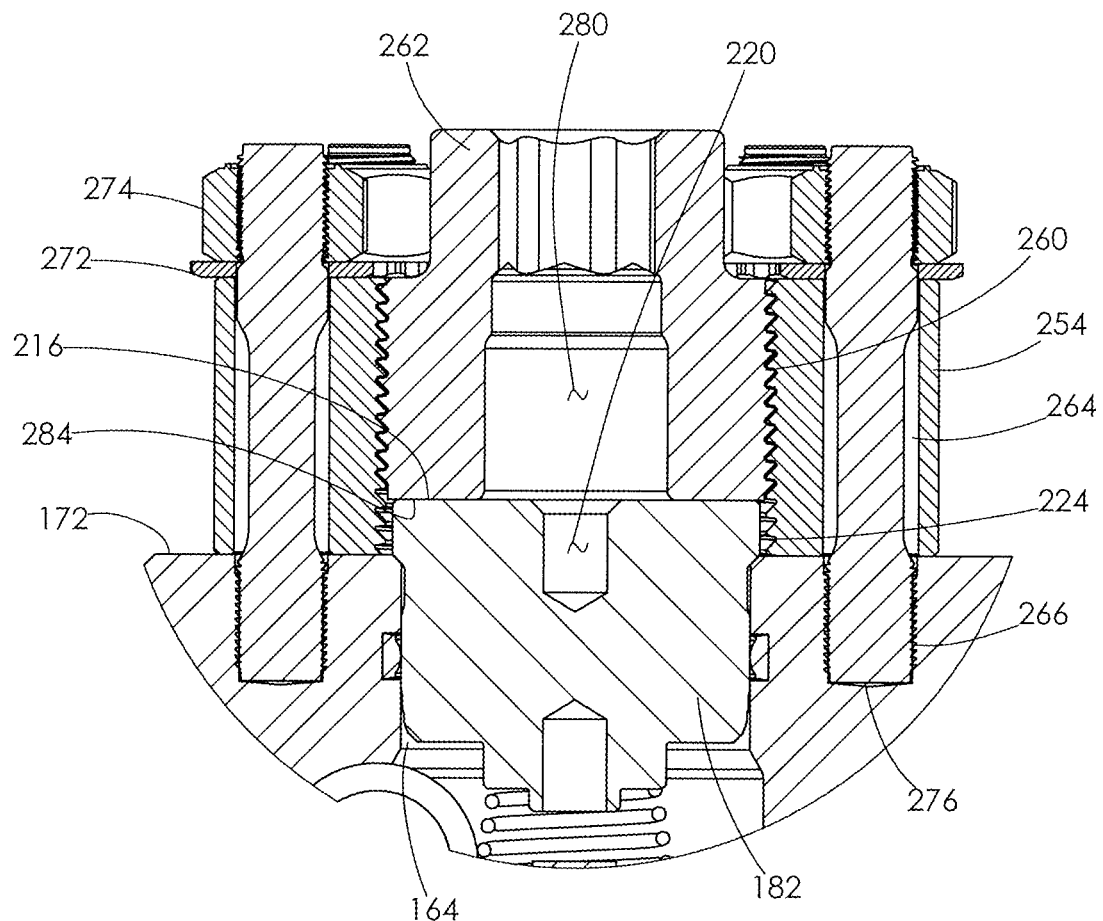
FIG. 26 is an enlarged view of area K from FIG. 24.

With reference to FIGS. 25, 26, 37, and 38, a retainer nut 262 is installed within the central passage 260 of each retainer 254, as shown in FIGS. 25 and 26. A central passage 280 is formed in the retainer nut 262. The central passage 280 interconnects the nut's top and bottom surfaces 282 and 284. External threads are formed on the retainer nut 262 adjacent its bottom surface 284. The external threads are matingly engageable with the internal threads formed in the retainer 254, as shown in FIGS. 25 and 26. The walls surrounding the central passage 280 adjacent the top surface 282 of the retainer nut 262 are shaped to closely receive a hex-shaped tool.

With reference to FIGS. 16, 17, 25, and 26, a plurality of peripheral openings 266 are formed in the fluid end body 102 around each opening of each vertical and horizontal bore 164 and 166. The peripheral passages 264 formed in each retainer 254 are alignable with the peripheral openings 266 formed around each of the bores 164 and 166, in a one-to-one relationship.

Each of the retainers 254 is secured to the fluid end body 102 using a fastening system 268, as shown in FIGS. 16 and 17. The fastening system 268 comprises a plurality of studs 270, a plurality of washers 272, and a plurality of nuts 274. Each stud 270 is externally threaded adjacent its first end 276, while each peripheral opening 266 formed in the fluid end body 102 has internal threads that mate with those of the stud 270, as shown in FIGS. 25 and 26. Studs 270 are threaded into place within each of the peripheral openings 266 within which a retainer 254 is aligned.

Continuing with FIGS. 25 and 26, once a first stud 270 has been installed in the fluid end body 102 at its first end 276, its opposed second end 278 projects from the body's top or front surface 172 or 176. Each peripheral passage 264 formed in each of the retainers 254 receives a corresponding one of the studs 270. Each of the studs 270 receives a washer 272 and nut 274, which hold the retainer 254 against the top and front surface 172 and 176 of the fluid end body 102. Rather than applying a single large torque to a single retainer, the fastening system 268 contemplates distribution of smaller torques among a plurality of studs 270 and nuts 274.

When a retainer 254 is attached to the fluid end body 102, the central passage 260 surrounds the upper portion 192 or 224 of the plug 180 or 182. The retainer nut 262 installed within the retainer 254 is torqued so that its bottom surface 284 tightly engages with the top surface 186 or 216 of the plug 180 or 182. Such engagement maintains the plug 180 or 182 within its corresponding bore 166 or 164. When the retainer nut 262 is engaged with the top surface 186 or 216 of the plug 180 or 182, the threaded hole 190 or 220 formed in the plug 180 or 182 is exposed to the nut's central passage 280.

During operation, an operator may need access to the inside of the fluid end 100 multiple times during a single fracking operation. For example, one of the plugs 180 or 182 may need to be replaced. Removing a retainer 254 to gain such access can be time-consuming, because of the need to remove multiple nuts 274 and washers 272.

To avoid such delays, each retainer 254 includes a removable retainer nut 262. Rather than remove all of the nuts 274 and washers 272, the operator can simply remove the retainer nut 262. When the retainer nut 262 is removed, the operator can access the interior of the fluid end body 102 through the central opening 260 of the retainer 254. The retainer nut 262 may be removed using a hex-shaped tool that mates with the walls surrounding the central passage 280 of the retainer nut 262.

While the fluid end 100 includes a plurality of threaded retainer nuts 262, those retainer nuts 262 are not threaded into the walls surrounding the bores 164 and 166. Thus, even if the threads on one of retainer nuts 262 should crack, the fluid end body 102 remains intact. Only the retainer nut 262 and/or its corresponding retainer 254 need be replaced. The high cost of repairing or replacing the fluid end body 102 is thereby avoided.

Figure 39:
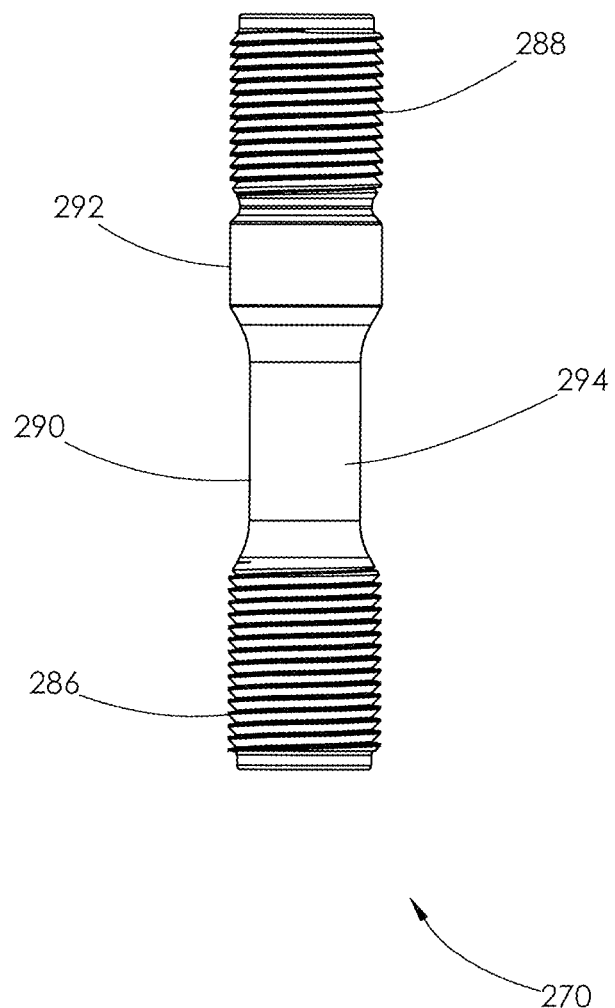
FIG. 39 is a side elevation view of a stud used with the retainer shown in FIG. 36.
Figure 40:
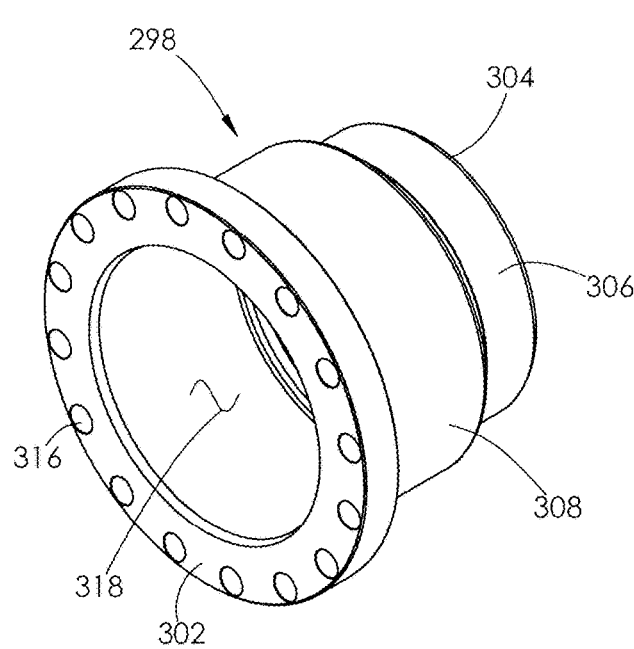
FIG. 40 is a top perspective view of a stuffing box sleeve used with the fluid end in FIGS. 18 and 24.
Figure 43:
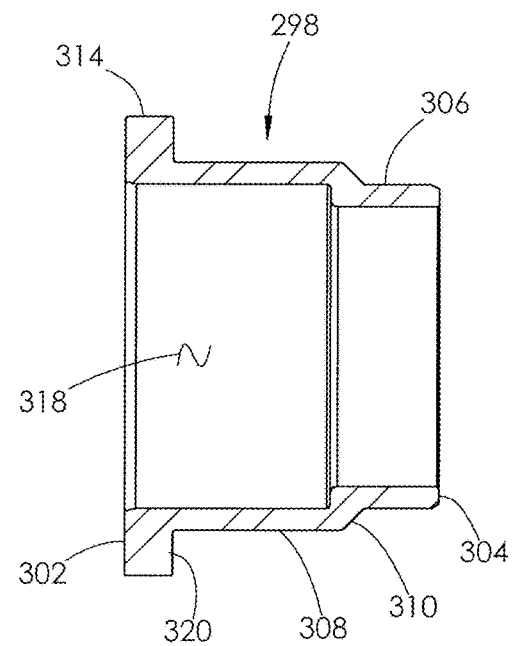
FIG. 43 is a cross-sectional view of the stuffing box sleeve, taken along lines Q-Q in FIG. 42.
Figure 41:
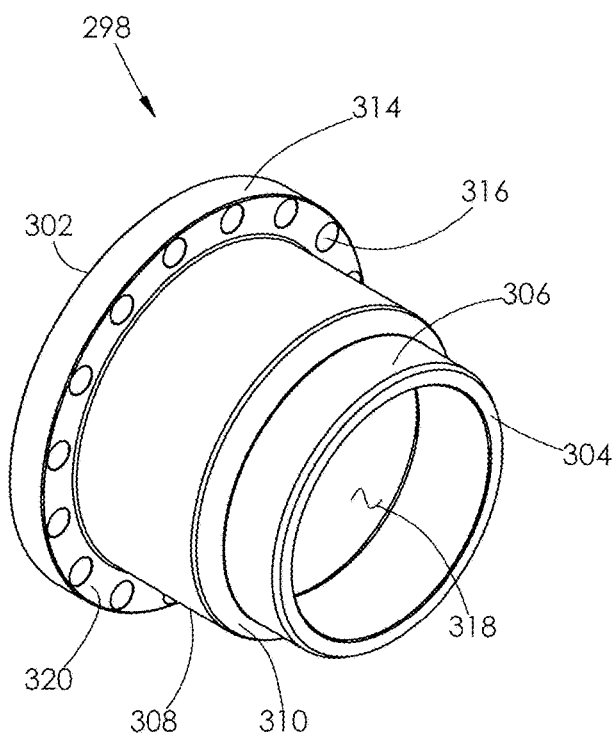
FIG. 41 is a bottom perspective view of the stuffing box sleeve shown in FIG. 40.
Figure 42:
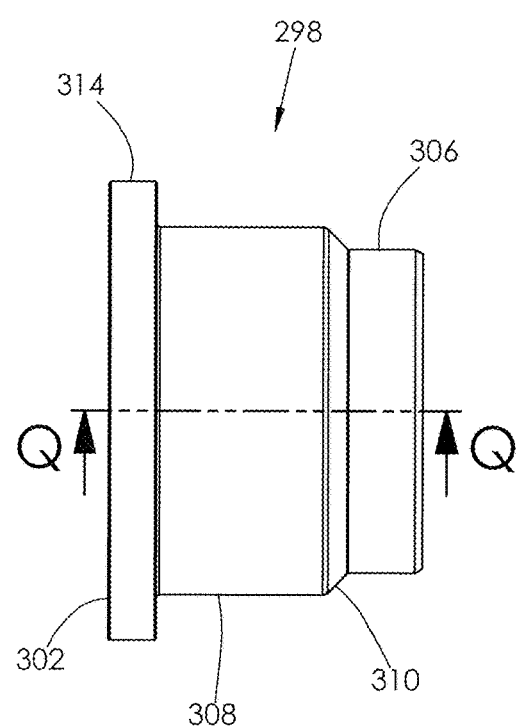
FIG. 42 is a side elevational view of the stuffing box sleeve shown in FIGS. 40 and 41.

Turning to FIG. 39, one of the studs 270 used with the fastening system 268 is shown. The stud 270 has a first threaded section 286 and an opposite second threaded section 288. The threaded sections 286 and 288 are joined by an elongate body 290. The first threaded section 286 is configured for threading into one of the plurality of threaded openings 266 formed in the fluid end body 102. The second threaded section 288 is configured for threading into the threaded opening formed in one of the nuts 274.

The first section 286 may have fewer threads than that of its corresponding opening 266. For example, if the opening 266 has eighteen (18) internal threads, the first section 286 may only have sixteen (16) external threads. This configuration ensures that all of the threads formed on the first section 286 will be engaged and loaded when the first section 286 is threaded into one of the openings 266. Engaging all of the threads helps to increase the fatigue life of the first section 286 of each stud 270. Each stud 270 may also be subjected to shot peening on its non-threaded sections prior to its use to help reduce the possibility of fatigue cracks. Each stud 270 may have a smooth outer surface prior to performing shot peening operations.

Continuing with FIG. 39, the body 290 of each stud 270 comprises an enlarged portion 292 joined to a constricted portion 294. The enlarged portion 292 is positioned adjacent the second section 288, which receives one of the washers 272 and nuts 274. The enlarged portion 292 has a greater diameter than the lower portion 294.

The diameter of the enlarged portion 294 is only slightly smaller than the diameter of the central opening of each washer 272. This sizing allows each washer 272 to closely receive the upper portion 294 of each stud 270. Such engagement operates to center the washer 272 on the stud 270 and center the washer 272 relative to each nut 274. Otherwise, the washer 272 must be manually centered on the stud 270 and nut 274, which can be difficult. If the washer 272 is not properly centered, it may be difficult to effectively torque or un-torque the nut 274 from the corresponding stud 270.

The plurality of washers 272 used with the fastening system 268 may be configured to allow a large amount of torque to be imposed on the nuts 274 without using a reaction arm. Instead, the washer 272 itself may serve as the counterforce needed to torque a nut 274 onto a stud 270. Dispensing with a reaction arm increases the safety of the assembly process. The nuts 274 used with the fastening systems 268 may also comprise a hardened inner layer to help reduce galling between the threads of the nuts and studs during the assembly process.

In alternative embodiments, the retainers and corresponding fastening system may be constructed like those embodiments described in Appendix A.

Continuing with FIGS. 18 and 24, when the connect plate 104 is attached to the fluid end body 102, the horizontal bores 178 formed in the connect plate 104 serve as extensions of the horizontal bores 166 formed in the fluid end body 102. Each pair of aligned bores 166 and 178 receives a single plunger 296, as shown in FIG. 10. Each plunger 296 extends through a pair of horizontal bores 166 and 178 and into its associated internal chamber 168. Like traditional fluid ends, each of the plungers 296 is attached to a pony rod 44 included in the power end 34 in a one-to-one relationship, as shown in FIGS. 7 and 8. Reciprocation of the pony rods 44 reciprocates the plungers 296 within the interior of the fluid end 100.

As previously discussed with regard to FIG. 6, each plunger 52 is installed within a plurality of packing seals 64 in traditional fluid ends. Over time, the seals 64 erode the walls surrounding the bore 58. To combat such erosion, the inventors engineered a stuffing box sleeve 298 to be installed within each bore 58. The sleeve 298 is configured to house a plunger packing 368. The plunger packing 368 comprises a plurality of packing seals 370 and 372. Over time, the seals 370 and 372 wear against the inner surface of the sleeve 298. If leakage occurs, the sleeve 298 may be removed and replaced with a new sleeve. As discussed below, the sleeve 298 was further engineered to combat additional points of erosion.

As also previously discussed with regard to FIG. 6, the threaded retainers 65 used with the packing seals 64 are prone to thread cracking, leading to fluid end failures. The inventors engineered the stuffing box sleeves 298 and their corresponding retainers 300 to reduce such failures.

With reference to FIGS. 40-43, each of the stuffing box sleeves 298 has a central passage 318 that opens on the sleeve's opposed top and bottom surfaces 302 and 304. Each sleeve 298 includes a cylindrical lower portion 306 joined to cylindrical upper portion 308 by a tapered portion 310. An annular internal seat 312 is formed in the walls surrounding the central passage 318 adjacent the tapered portion 310.

The lower portion 306 has a reduced diameter relative to that of the upper portion 308. A flange 314 is formed around the upper portion 308 and serves as an extension of the top surface 302. A plurality of peripheral passages 316 are formed within the flange 314 and surround the central passages 318. Each of the peripheral passages 316 interconnects the sleeve's top surface 302 and a bottom surface 320 of the flange 314. The sleeves 298 are each preferably made of metal, such as high strength steel.

Figure 21:
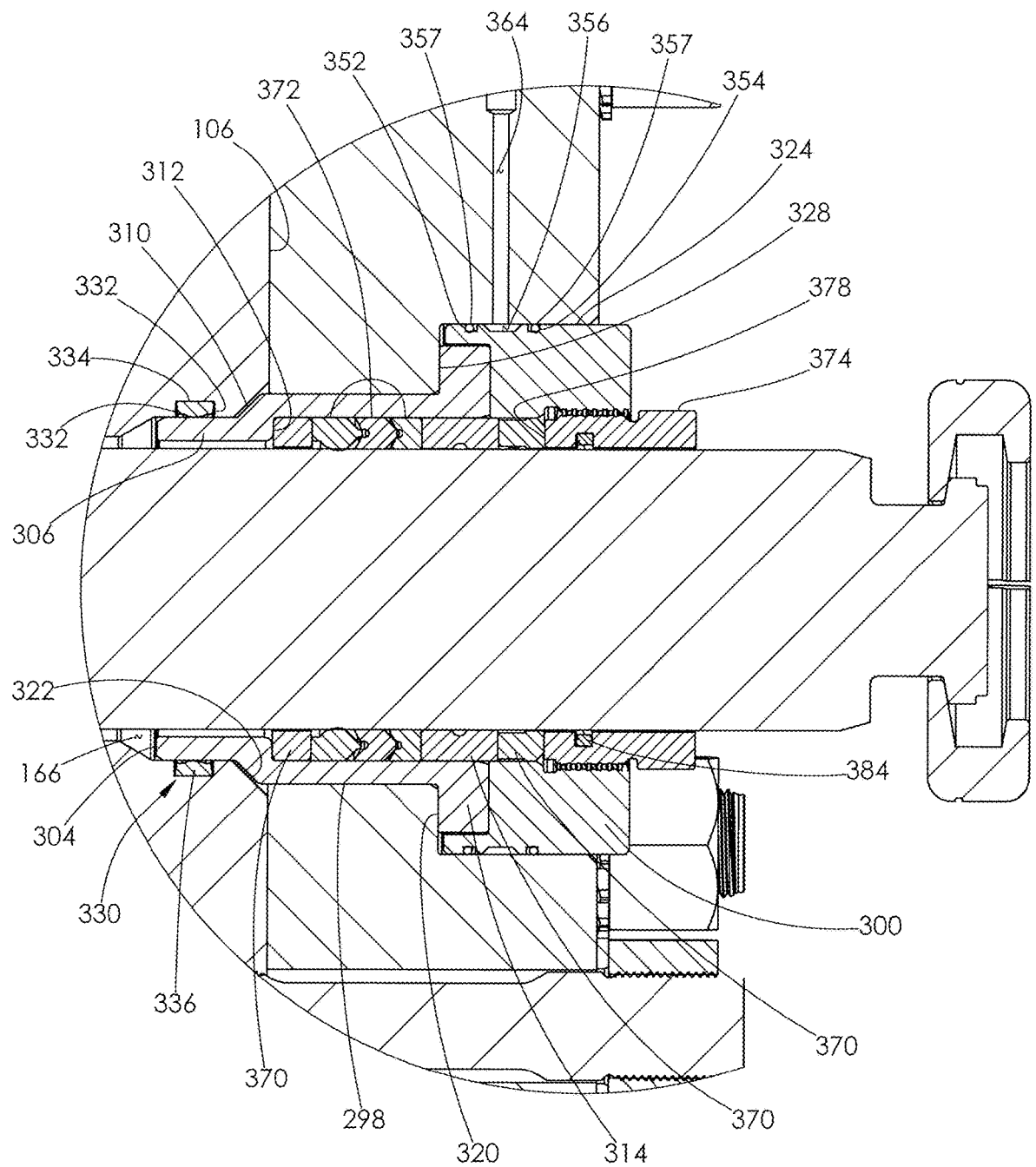
FIG. 21 is an enlarged view of area F from FIG. 18.

With reference to FIG. 21, a plurality of beveled corners 322 are formed in the fluid end body 102 at the intersection of the opening of the horizontal bore 166 and the rear surface 106 of the fluid end body 102. When each sleeve 298 is installed within one of the horizontal bores 166, the sleeve's tapered portion 310 engages the beveled corners 322. Such engagement prevents further axial movement of each sleeve 298 within its corresponding bore 166.

Figure 27:
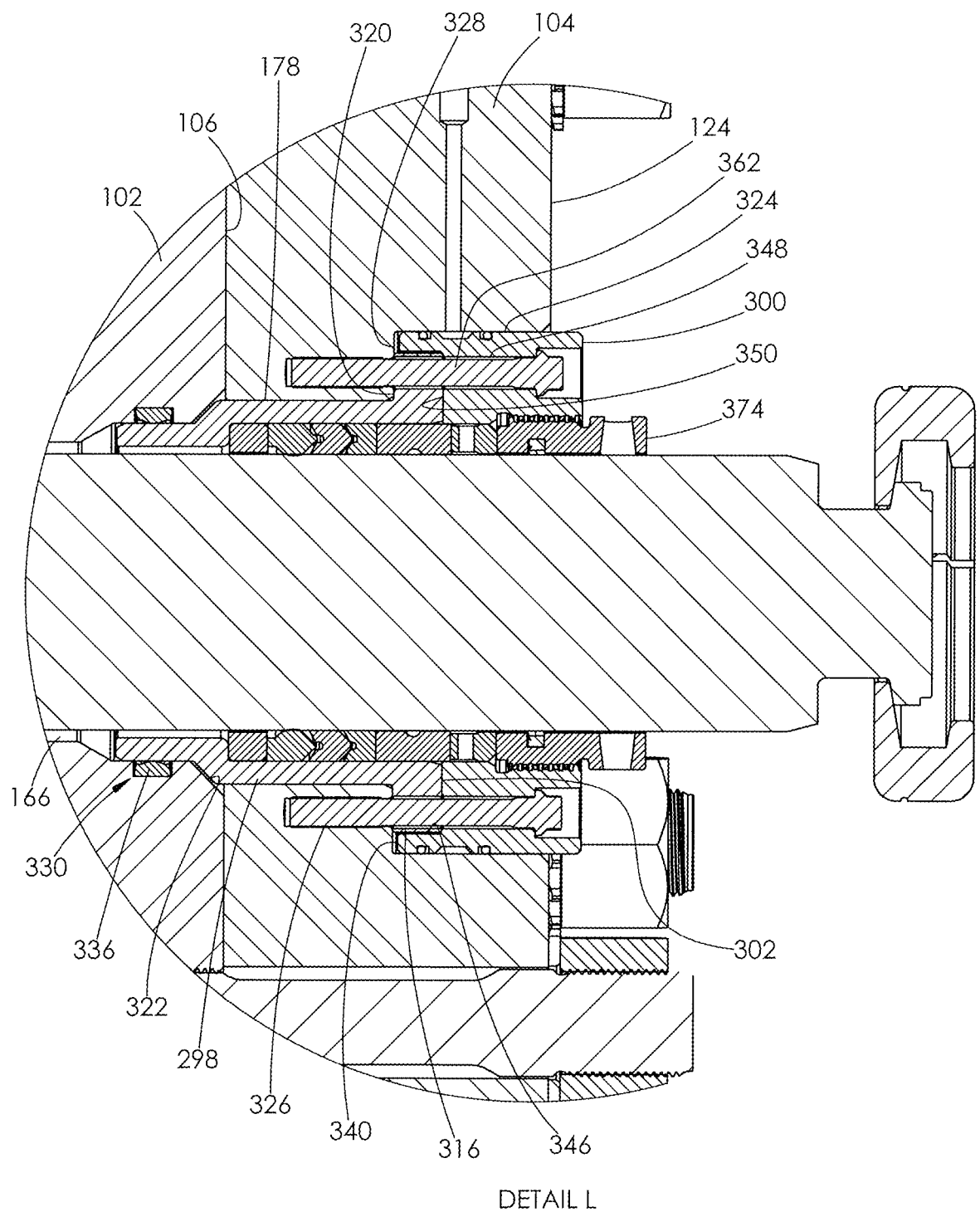
FIG. 27 is an enlarged view of area L from FIG. 24.

With reference to FIG. 27, a counterbore 324 is formed in each of the bores 178 in the connect plate 104 adjacent the plate's rear surface 124. A plurality of threaded peripheral openings 326 are formed within a base 328 of each counterbore 324. The peripheral openings 326 extend into connect plate 104. When each of the sleeves 298 is installed within one of the bores 178, the bottom surface 320 of the sleeve's flange 314 engages with the base 328 of the counterbore 324, as shown in FIG. 21. Each of the peripheral passages 316 formed in the flange 314 align with one of the peripheral openings 326 formed in the base 328 in a one-to-one relationship.

Turning back to FIGS. 40-43, the outer surface of the sleeve 298 includes no annular recess for housing a seal. Instead, an annular recess 330 is formed in the walls surrounding each of the horizontal bores 166 adjacent the rear surface 106 of the fluid end body 102, as shown in FIGS. 21 and 27. The recess 330 is configured to housing an annular seal 336. Preferably, the seal 336 is a high pressure seal.

Continuing with FIG. 21, each recess 330 comprises two sidewalls 332 joined by a base 334. The seal 336 is closely received within the recess 330. After a seal 336 is installed within a recess 330 within one of the bores 166, a sleeve 298 is installed within that bore.

When a sleeve 298 is installed within a bore 166, the seal 336 within the bore tightly engages the outer surface of the sleeve's lower portion 306. During operation, the seal 336 wears against the lower portion 306. If the outer surface of the lower portion 306 begins to erode, allowing fluid to leak around the sleeve 298, that sleeve 298 is removed and replaced with a new sleeve. The seal 336 may also be removed and replaced with a new seal, if needed.

Continuing with FIGS. 21 and 27, the bottom surfaces 304 of the sleeves 298 will be exposed to high fluid pressure within the interior of the fluid end 100. The fluid pressure may be high enough to dislodge a sleeve 298 from its corresponding aligned bores 166 and 178. To keep the sleeves within their corresponding bores 166 and 178, a plurality of retainers 300 are attached to the connect plate 104 above each sleeve 298, as shown in FIG. 10.

Figure 44:
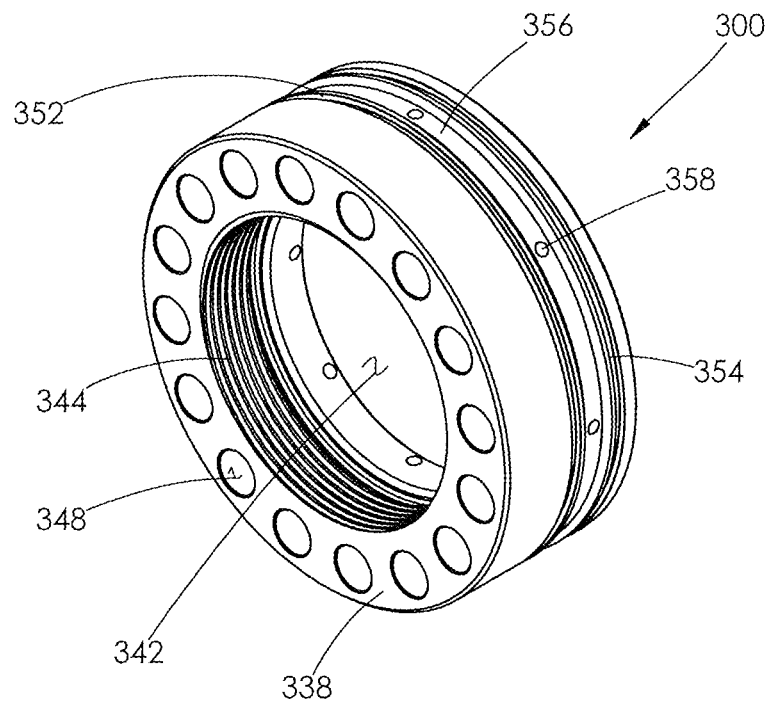
FIG. 44 is a top perspective view of another embodiment of a retainer used with the fluid end shown in FIGS. 18 and 24.
Figure 45:
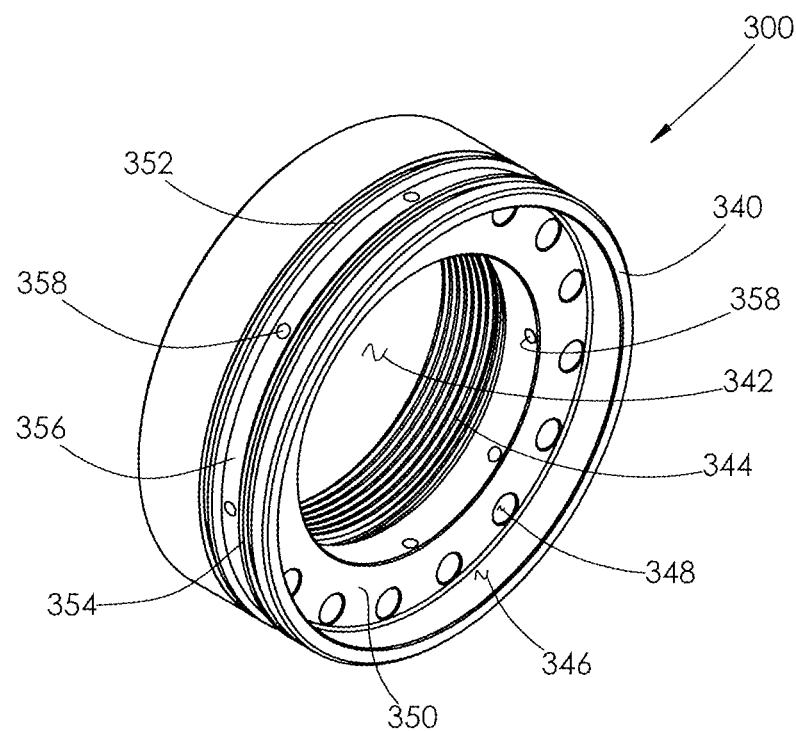
FIG. 45 is a bottom perspective view of the retainer shown in FIG. 44.

With reference to FIGS. 44 and 45, each of the retainers 300 has a cylindrical body having opposed top and bottom surfaces 338 and 340. A central passage 342 is formed in the interior of each retainer 300. Internal threads 344 are formed in the walls surrounding the central passage 342 adjacent the retainer's top surface 338. A counterbore 346 is formed in the central passage 342 adjacent the retainer's bottom surface 340. A plurality of peripheral passages 348 are formed in each retainer 300 and surround each central passage 342. Each peripheral passage 348 interconnects the retainer's top surface 338 and a base 350 of each counterbore 346. The retainers 300 are each preferably made of metal, such as high strength steel.

A plurality of annular recesses are formed in the outer surface of each retainer 300 adjacent its bottom surface 340. A first and a third annular recess 352 and 354 are each configured for housing a seal 357, shown in FIG. 21. Preferably, the seal 357 is an O-ring. The first and third recesses 352 and 354 are formed on opposite sides of a second annular recess 356. A plurality of passages 358 are formed in the second annular recess 356. The passages 358 interconnect the inner and outer surfaces of the retainer 300.

With reference to FIG. 27, each retainer 300 is sized to be closely received within one of the counterbores 324 in the connect plate 104, in a one-to-one relationship. When each retainer 300 is installed within the connect plate 104, the bottom surface 340 of each retainer 300 engages the base 328 of each counterbore 324. Each sleeve's flange 314 is sized to be closely received within each counterbore 346 formed in each retainer 300. When assembled, the top surface 302 of each sleeve 300 engages with the base 350 of each counterbore 346.

Each of the retainers 300 is secured to the connect plate 104 using a fastening system 360, shown in FIGS. 16 and 17. The fastening system 360 comprises a plurality of threaded screws 362. The screws 362 are preferably socket-headed cap screws. Each of the screws 362 is received within one of the openings 326 formed in each counterbore's base 328, one of the passages 316 formed in each flange 314, and one of the passages 348 formed in each retainer 300, in a one-to-one relationship.

The screws 362 are rotated until they tightly attach each of the retainers 300 to the connect plate 104 and securely hold each sleeve 298 within each set of aligned bores 166 and 178. Because each of the retainers 300 is attached to the connect plate 104 using the fastening system 360, no external threads are formed on the outer surface of each retainer 300. Likewise, no internal threads are formed within the walls of each pair of aligned horizontal bores 166 and 178.

Turning back to FIG. 21, when a retainer 300 is installed within one of the counterbores 324, the retainer's second annular recess 356 aligns with a weep hole 364 formed in the connect plate 104. The weep hole 364 is a bore that interconnects a top surface 366 of the connect plate 104 and one of the counterbores 324. A plurality of weep holes 364 are formed in the connect plate 104, as shown in FIG. 10. Each weep hole 364 opens into one of the counterbores 324 in a one-to-one relationship.

During operation, small amounts of fluid may leak around each of the plungers 296, the seal 336 or the plunger packing 368. The fluid may pass through the openings 358 in each retainer 300 and into the second annular recess 356. From the second annular recess 356, the fluid may flow into the corresponding weep hole 364 and eventually exit the fluid end 100. Thus, each second annular recess 356 and each corresponding weep hole 364 serve as a fluid flow path for excess fluid to exit the fluid end 100.

Prior to installing a plunger 296 within one of the sleeves 298, the plunger packing 368, shown in FIGS. 16 and 17, is installed within central passage 318 of the sleeve 298, as shown in FIG. 21. The plunger packing 368 prevents high pressure fluid from passing around the plunger 296 as the plunger reciprocates. Each plunger packing 368 comprises a plurality of annular seals compressed together and having aligned central passages. The outer seals 370 may be made of metal and compress the inner pressure seals 372, as shown in FIG. 21. The inner pressure seals 372 are preferably high pressure seals.

With reference to FIGS. 21 and 27, when a plunger packing 368 is installed within a sleeve 298, one of the outer seals 370 engages the sleeve's internal seat 312. The plunger packing 368 is secured within the sleeve 298 by a packing nut 374.

Figure 46:
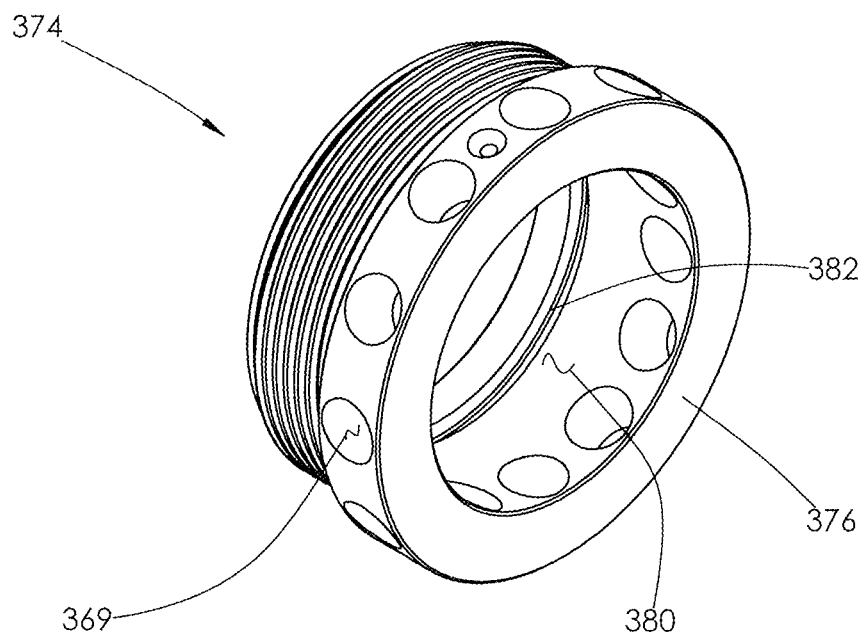
FIG. 46 is a top perspective view of a packing nut used with the fluid end shown in FIGS. 18 and 24.
Figure 47:
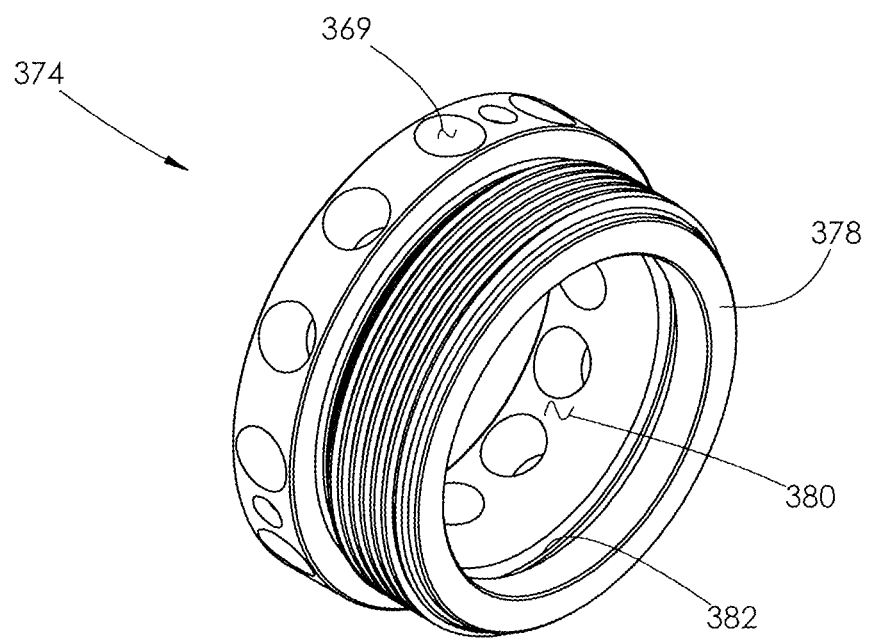
FIG. 47 is a bottom perspective view of the packing nut shown in FIG. 46.

With reference to FIGS. 46 and 47, each packing nut 374 comprises a cylindrical body having a central passage 380 formed therein. The central passage 380 interconnects the packing nut's top and bottom surfaces 376 and 378. An annular recess 382 is formed within the walls surrounding the central passage 380 and houses a seal 384, as shown in FIG. 21. Preferably, the seal 384 is a lip seal. The seal 384 helps prevent fluid from leaking around the packing nut 374 during operation. The outer surface of each packing nut 374 is threaded adjacent its bottom surface 378. The external threads on each packing nut 374 are matingly engageable with the internal threads formed in each retainer 300. The packings nuts 374 are each preferably made of metal, such as high strength steel.

Turning back to FIGS. 21 and 27, when a packing nut 374 is installed within one of the retainers 300, the bottom surface 378 of the packing nut 374 engages with one of the outer seals 370 of the plunger packing 368. Such engagement compresses the plunger packing 368, creating a tight seal. When installed within the retainer 300, the packing nut's central passage 380 aligns with the central passages formed in each plunger packing 368.

A plurality of peripheral passages 369 are formed in the outer surface of each packing nut 374 adjacent its top surface 376. The passages 369 interconnect central passage 380 and the outer surface of each packing nut 374. The passages 369 serve as connection points for a spanner wrench. When assembling the fluid end 100, the spanner wrench is used to tightly thread each packing nut 374 into its corresponding retainer 300.

Once a sleeve 298, plunger packing 368, retainer 300, and packing nut 374 are installed within a pair of aligned horizontal bores 166 and 178, a plunger 296 is then installed within those bores. Alternatively, the plunger 296 may be installed prior to installing the packing nut 374. When a plunger 296 is installed within the fluid end 100, the components installed within each pair of aligned bores 166 and 178 surround the outer surface of the plunger 296. During operation, the plunger 296 moves relative to the fluid end 100 and the components installed within the aligned bores 166 and 178.

With reference to FIG. 18, each of the plungers 296 is preferably made of metal, such as high strength steel, and comprises an elongate cylindrical body 388 having opposed first and second ends 390 and 392. The first end 390 of each plunger 296 is flat and a flange 394 is machined into the second end 392 of each plunger 296. The flange 394 is configured to receive a clamp 396. The clamp 396 is used to secure each plunger 296 to one of the pony rods 44 included in the power end 34, as shown in FIGS. 7 and 8. As each plunger 296 reciprocates, the effective volume of fluid within each corresponding internal chamber 168 continually changes. Force applied to the fluid by each plunger 296 pressurizes the fluid.

In alternative embodiments, the components installed within the fluid end and surrounding the plunger may be constructed like those embodiments described in Appendix A.

Continuing with FIGS. 18 and 24, an intake and discharge valve 400 and 402 are installed within each vertical bore 164 on opposite sides of the internal chamber 168. The intake valve 400 prevents backflow in the direction of a manifold 103, shown in FIGS. 7 and 8. The discharge valve 402 prevents backflow in the direction of the internal chamber 168. The valves 400 and 402 each comprise a valve body 406 that seals against a valve seat 404.

As previously discussed with regard to FIG. 6, a corner 99 is formed in the walls surrounding the vertical bore 56 adjacent the valve seats 89 in a traditional fluid end. The corner 99 is configured for engaging with the upper flange 96 formed on the each valve seat 89. During operation, the corners 99 are prone to fatigue cracks. The inventors engineered the valve seats 404 and the walls of the fluid end 100 surrounding the valve seats 404 to combat such failures.

With reference to FIGS. 48-51, each of the valve seats 404 is preferably made of metal, such as high strength steel, and has a cylindrical body having a central passage 412 formed therein. The central passage 412 interconnects the seat's top and bottom surfaces 408 and 410. When a valve seat 404 installed within one of the vertical bores 164, the seat's central passage 412 is in fluid communication with the bore 164.

An upper flange is not formed on the valve seat 404. Instead, the outer surface of the valve seat 404 has an upper section 411 that joins a tapered section 414. The tapered section 414 is formed between the upper section 411 and the seat's bottom surface 410. The upper section 411 has a uniform diameter with the exception of an annular recess 416. The annular recess 416 is configured to house a seal 418, as shown in FIG. 18. Preferably, the seal 418 is an O-ring. The seal 418 helps prevent fluid from leaking between the outer surface of the valve seat 404 and the walls surrounding the vertical bore 164.

Figure 22:
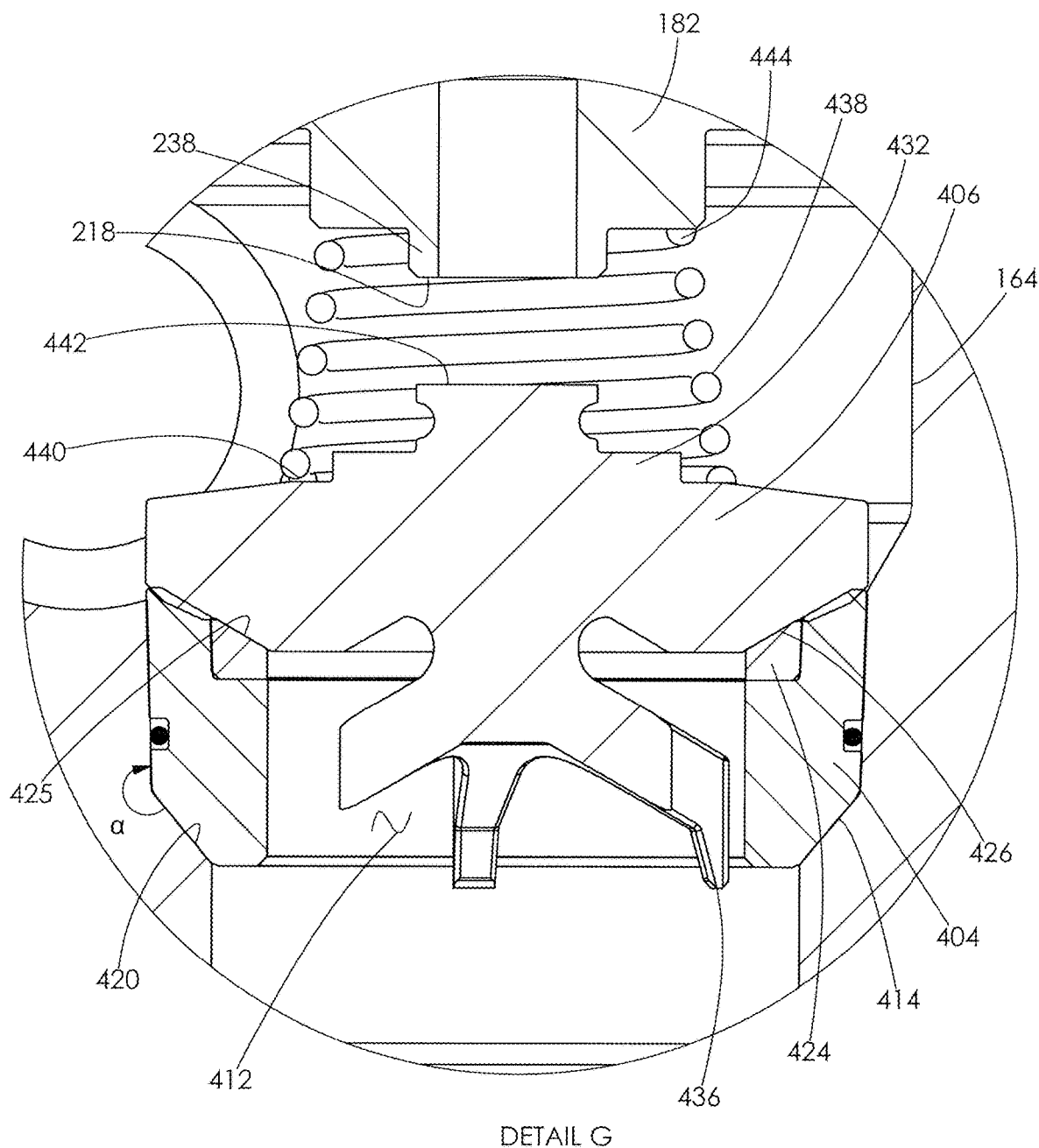
FIG. 22 is an enlarged view of area G from FIG. 18.
Figure 23:
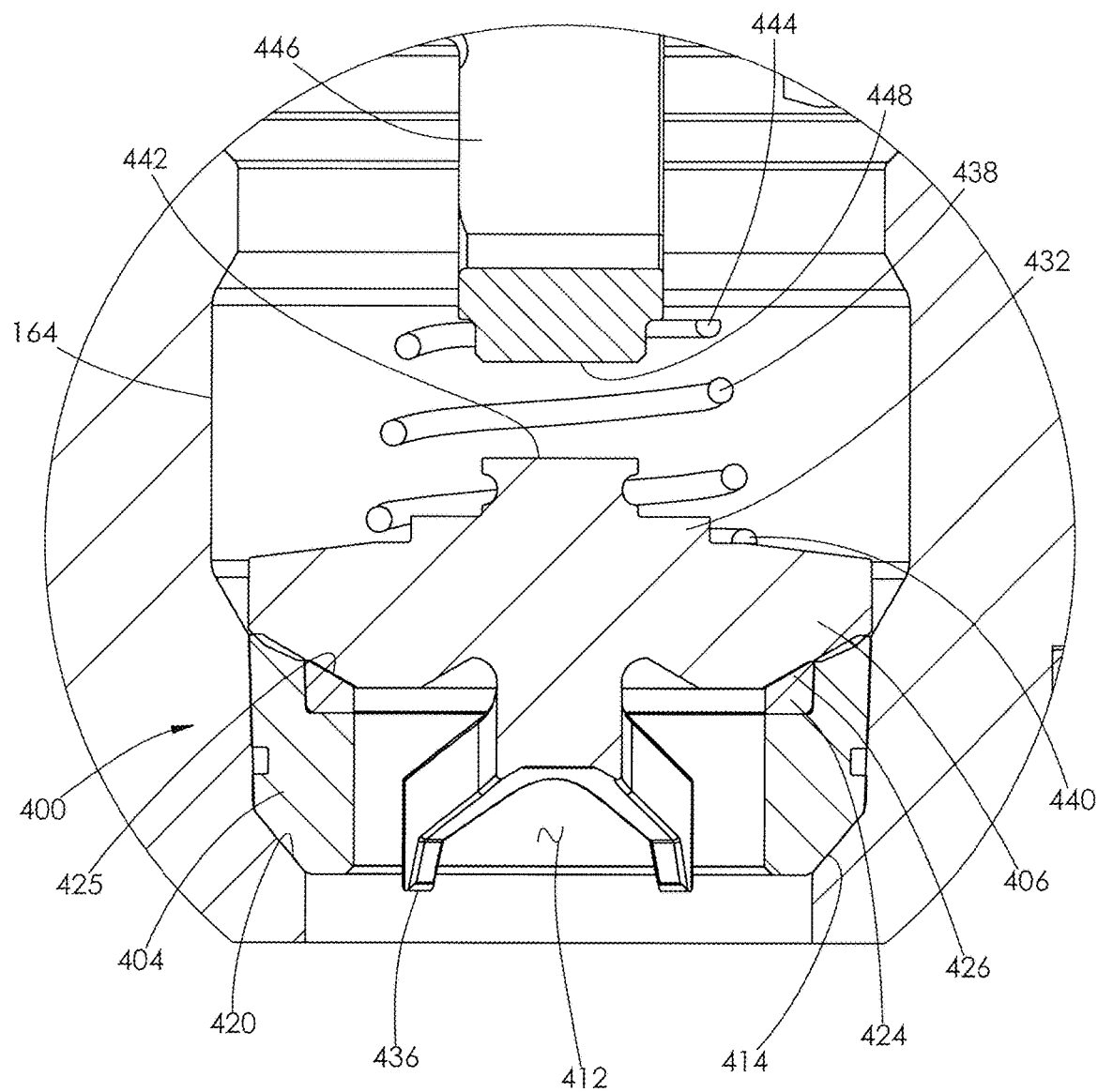
FIG. 23 is an enlarged view of area H from FIG. 18.

With reference to FIGS. 22 and 23, a taper 420 corresponding with the taper 414 is formed in the walls surrounding each vertical bore 164 adjacent each valve seat 404. When a valve seat 404 is installed within one of the bores 164, the corresponding tapers 420 and 414 engage and prevent further axial movement of the valve seat 404 within the bore 164.

In contrast to the corner 99 formed in the walls of the fluid end 46, shown in FIG. 6, the angle α of the taper 420 is greater than 180 degrees, as shown in FIG. 22. Increasing the size of the angle α significantly decreases the stress concentrations applied to the walls of each vertical bore 164 during operation, thereby increasing the life of the fluid end 100.

As previously discussed with regard to FIG. 6, during operation of the fluid end 46, the sealing surface on the valve seat 86 may wear and eventually erode, allowing the valves to leak. The inventors engineered the valve seats 404 to combat such erosion.

Turning back to FIGS. 48-51, an annular recess 422 is formed in the top surface 408 of each valve seat 404. The location of the recess 422 corresponds with the area of the valve seat 404 known to erode over time. The recess 422 is configured for housing a hardened insert 424. The insert 424 is preferably made of a hardened material, such as tungsten carbide. Such material resists wear and erosion, significantly extending the life of the valve seat 404. The insert 424 is sized to be closely received with the recess 422. The top surface of the insert 424 is characterized by a taper 425.

Figure 52:
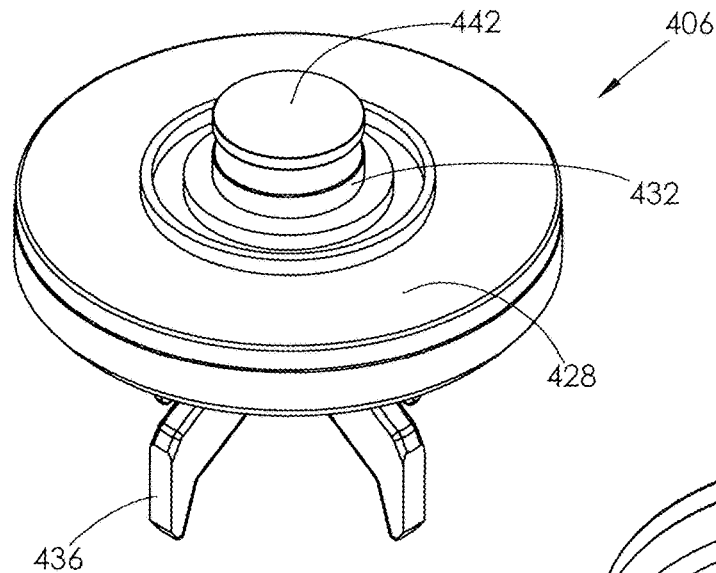
FIG. 52 is a top perspective view of a valve body used with the fluid end shown in FIGS. 18 and 24.
Figure 53:
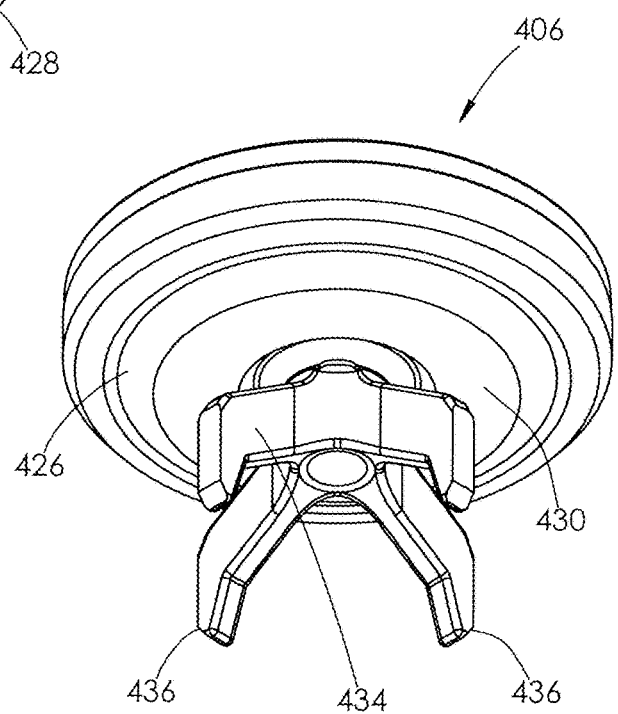
FIG. 53 is a bottom perspective view of the valve body shown in FIG. 52.
Figure 54:
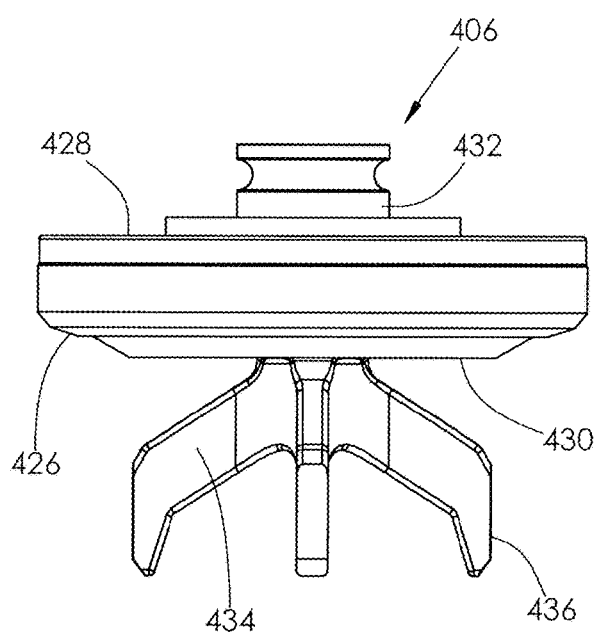
FIG. 54 is a side elevation view of the valve body in FIGS. 52 and 53.

With reference to FIGS. 52-54, each valve body 406 is preferably made of metal, such as high strength steel, and has a cylindrical body having opposed top and bottom surfaces 428 and 430. A sealing surface 426 is formed on the bottom surface 430 of each valve body 406. The sealing surface 426 is characterized by a taper that corresponds with the taper 425 formed in the top surface of the insert 424. During operation, the sealing surface 426 engages the insert's taper 425, as shown in FIGS. 22 and 23. Such engagement blocks the flow of fluid around the valve body 406.

Each valve body 406 further includes an upper spring connection 432 projecting from its top surface 428 and a lower aligning element 434 projecting from its bottom surface 430. Each lower aligning element 434 comprises a plurality of downwardly extending legs 436. In operation, the legs 436 engage with the interior walls of each valve seat 404 and help ensure proper alignment of the sealing element 426 with the top surface 408 of the valve seat 404.

Each valve body 406 is held against a corresponding valve seat 404 by a spring 438, shown in FIGS. 22 and 23. Each spring connection 432 is configured to attach to a first end 440 of one of the springs 438. Each spring connection 432 also includes a flat retaining surface 442.

Continuing with FIG. 23, a valve retainer 446 is installed within the walls surrounding the bores 164 above each intake valve 400. The valve retainer 446 is a U-shaped piece that extends the width of the vertical bore 164. Opposed ends of the valve retainer 446 are positioned within recesses formed in the walls surrounding each bore 164. A flat retaining surface 448 is formed at the apex of the valve retainer 446 on its bottom surface. The retaining surface 448 is aligned with the retaining surface 442 formed in the spring connection 432. A second end 444 of each spring 438 is attached to one of the valve retainers 446.

In operation, the spring 438 holds the valve body 406 against the valve seat 404. Fluid pressure applied to the bottom surface 430 of the valve body 406, forces the valve body 406 to move upwards, compressing the spring 438. As the valve body 406 moves upwards, further movement of the valve body 406 is prevented by the engagement of the retaining surfaces 448 and 442.

With reference to FIG. 22, the second end 444 of the spring 438 used with one of the discharge valves 402 is attached to the spring connection portion 238 of each discharge plug 182. As the discharge valve's valve body 406 moves upwards, further movement of the valve body 406 is prevented by the engagement of the retaining surface 442 with the bottom surface 218 of the discharge plug 182.

Turning back to FIGS. 7 and 8, during operation, fluid is delivered to the fluid end 100 through the manifold 103. The manifold 103 is attached to the bottom surface 174 of the fluid end body 102 and is in fluid communication with each of the vertical bores 164. As each of the plungers 296 reciprocates within the fluid end 100, fluid is drawn from the manifold 103 into each of the internal chambers 168 as the intake valves 400 repeatedly open and close.

Figure 2:
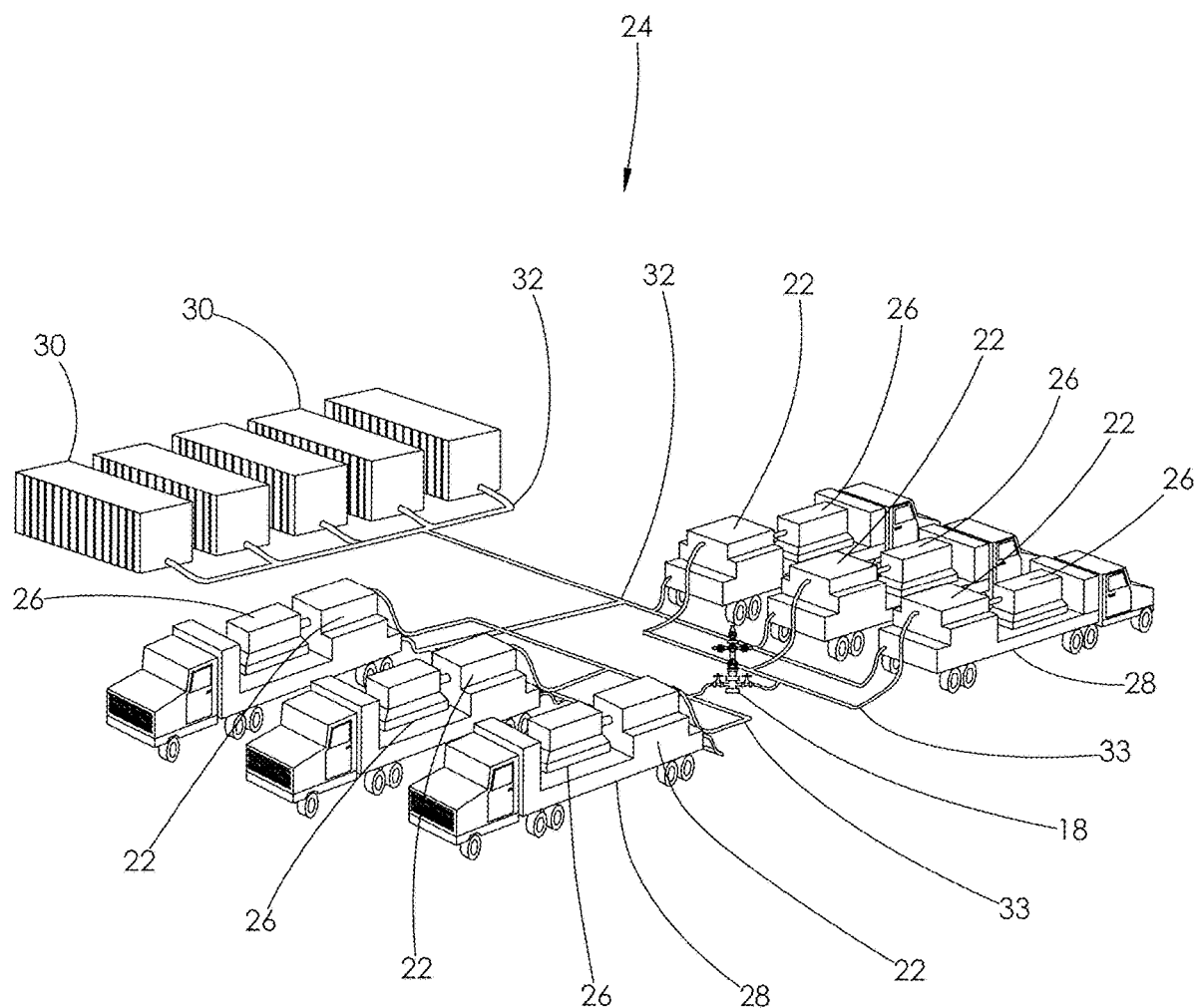
FIG. 2 illustrates above-ground equipment used in a hydraulic fracturing operation.
Figure 3:
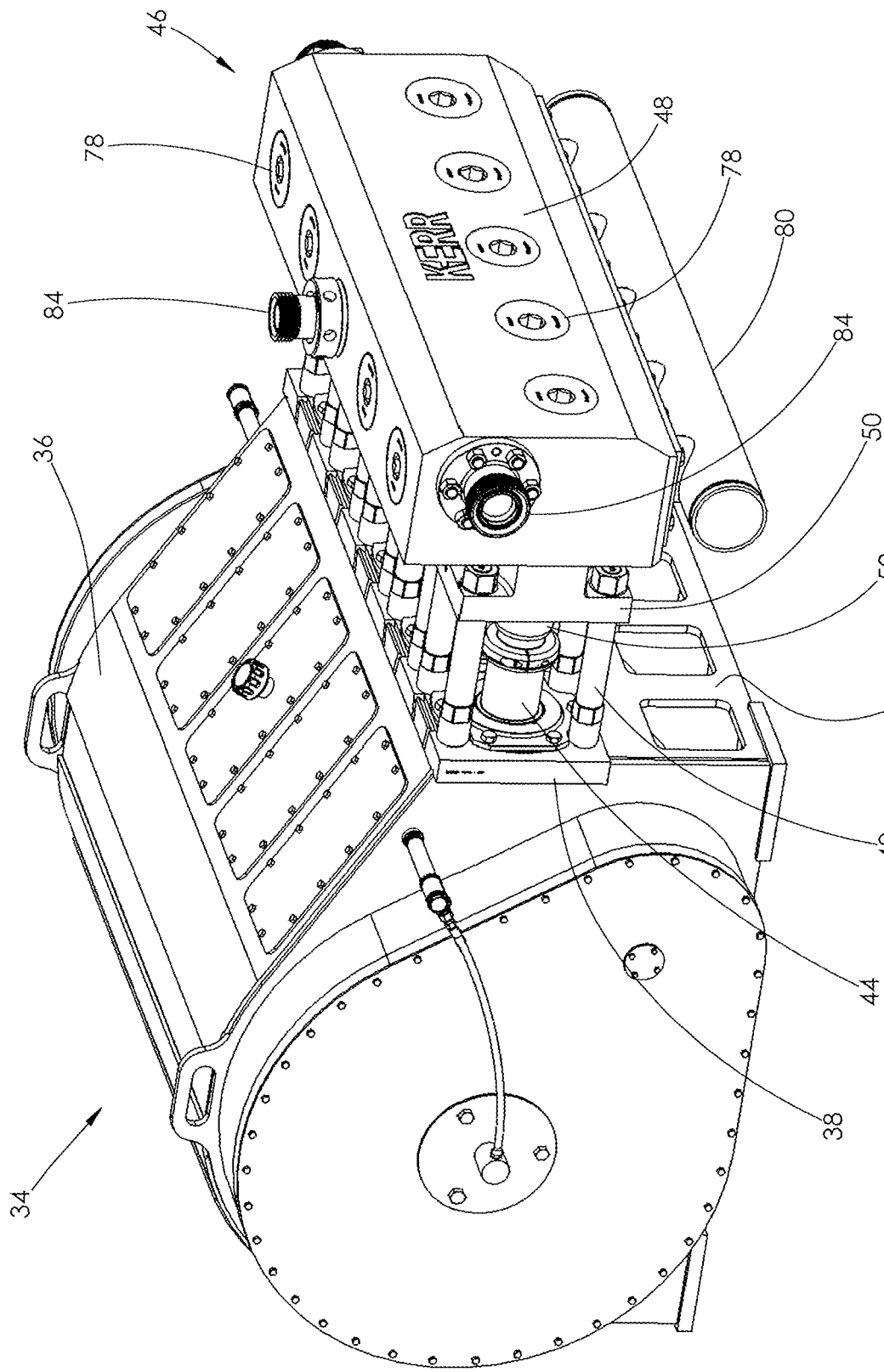
FIG. 3 is a left side perspective view of a traditional fluid end attached to a traditional power end.
Figure 4:
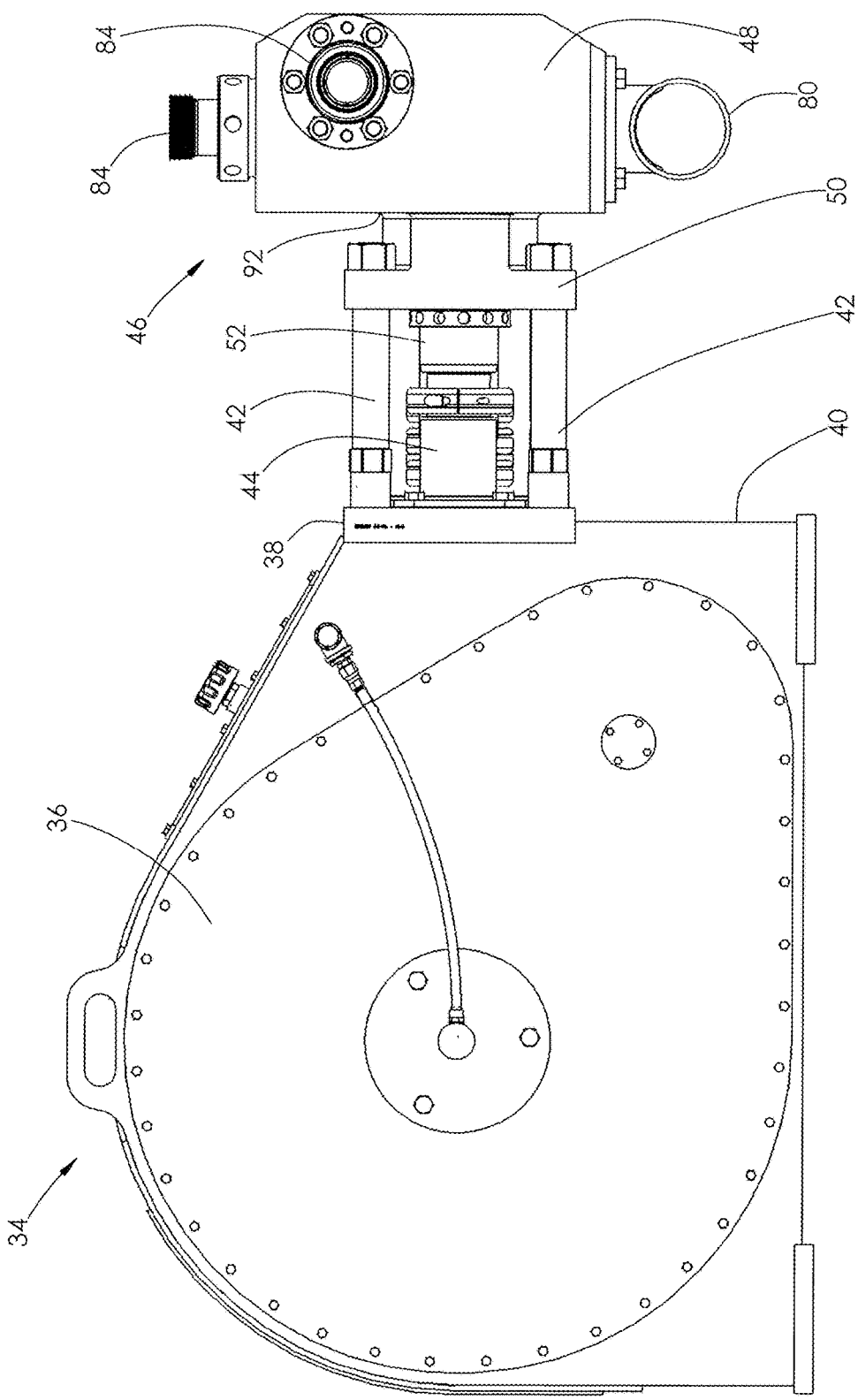
FIG. 4 is a left side elevational view of the fluid end and power end shown in FIG. 3.
Figure 5:
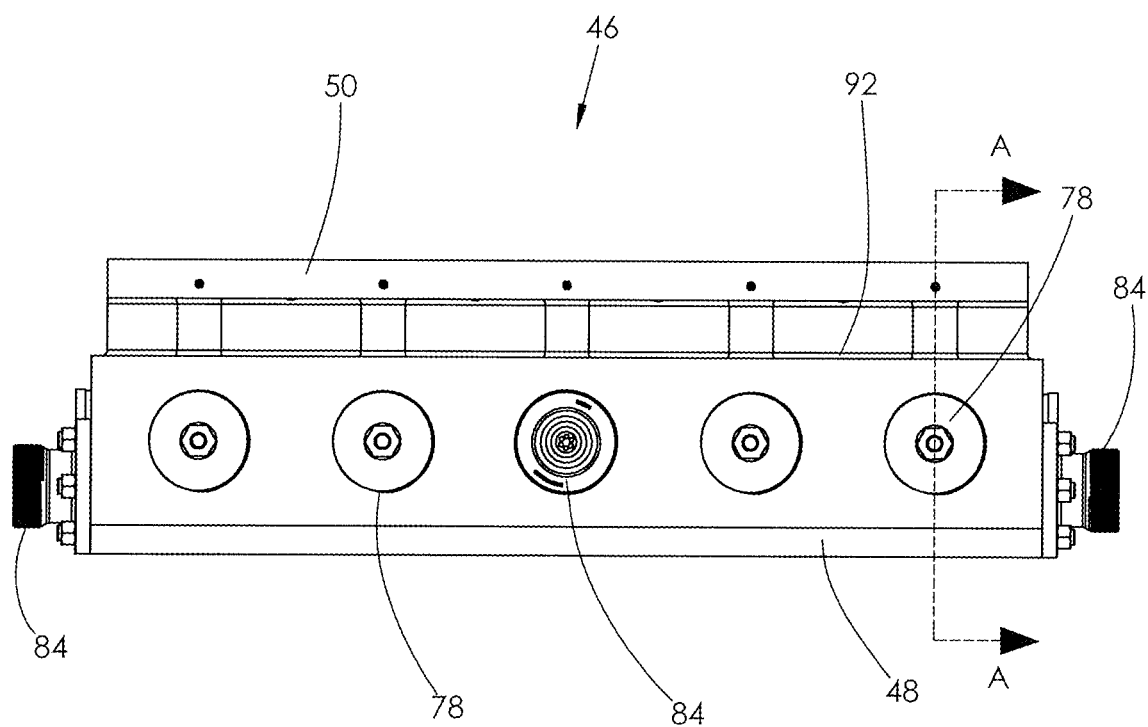
FIG. 5 is a top plan view of the fluid end shown in FIGS. 3 and 4.

Pressurized fluid is forced into a discharge conduit 105, shown in FIGS. 18 and 24, as the discharge valves 402 repeatedly open and close. Fluid exits the fluid end 100 through one or more discharge openings 107, which are in fluid communication with the discharge conduit 105. The fluid end 100 may be attached to intake and discharge piping systems, like those shown in FIG. 2.

In some fluid ends, the vertical bore may be longer than that shown in FIGS. 18 and 24. In such case, the spring 438 may not span the distance between the valve body 406 and the bottom surface 218 of the discharge plug 182. A valve retainer 450 may be used to decrease the distance between the valve body 406 and the plug 182, as shown in FIG. 70.

Figure 70:
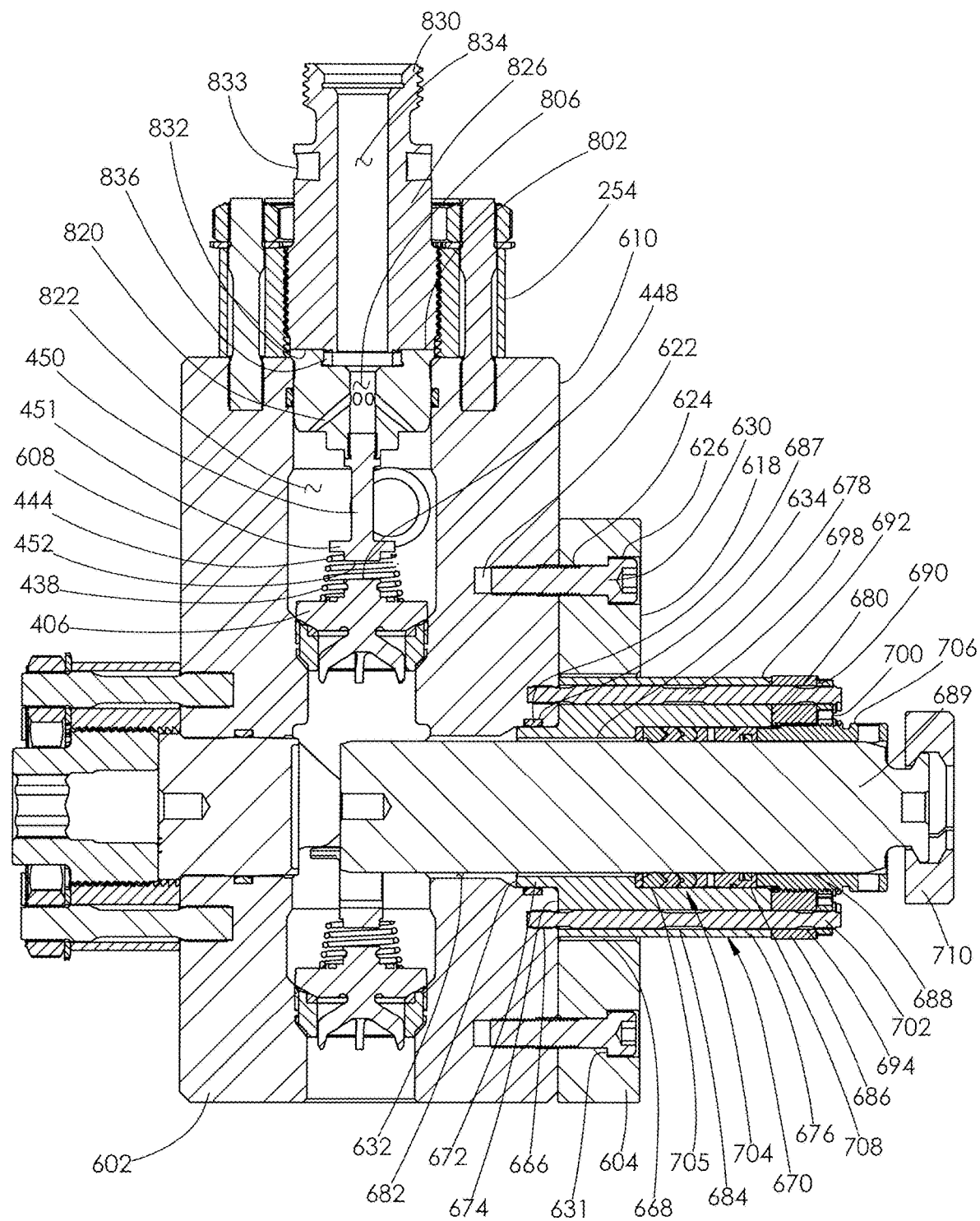
FIG. 70 is a cross-sectional view of the fluid end shown in FIG. 67, taken along line U-U.

Continuing with FIG. 70, each valve retainer 450 comprises an elongate body. A bottom surface of the elongate body is characterized by a spring connection portion 451 and a retaining surface 452. A top surface of the elongate body is installed in the second threaded hole 222 formed in the connection portion 238 of one of the discharge plugs 182. When installed, the valve retainer 450 extends downwards towards its corresponding valve body 406. The second end 444 of the spring 438 is attached to the retainer's spring connection portion 451. As the discharge valve's valve body 406 moves upwards, further movement of the valve body 406 is prevented by the engagement of the retaining surfaces 448 and 452.

In alternative embodiments, the intake and discharge valves may be constructed like those embodiments described in Appendices B, C, D, E, and F.

Continuing with FIGS. 7-27, with regards to manufacturing the fluid end 100, after the fluid end body 102 and connect plate 104 are formed, the bores and openings described herein are machined into the fluid end body 102 and the connect plate 104. The studs 138 as well as the internal components shown in FIGS. 18 and 24, including the valves 400 and 402, springs 438, valve retainers 446, seals 214, 252 and 336, plugs 180 and 182, retainers 254 and fastening system 268 are next installed in the fluid end body 102. After the necessary bores have been formed in the connect plate 104, the stuffing box sleeves 298, retainers 300, plunger packings 368, packing nuts 374 fastening system 360, and plungers 296 described herein are installed. Prior to operation, the connect plate 104 is attached to the power end 34, and the fluid end body 102 is attached to the connect plate 104.

Turning now to FIGS. 55-58, an alternative embodiment of a fluid end 500 is shown. The fluid end 500 may be used with the same power end 34 shown in FIGS. 7 and 8. The fluid end 500 comprises a fluid end body 502 releasably attached to a connect plate 504. The fluid end body 502 is attached to the connect plate 504 in the same manner as the fluid end body 102 and the connect plate 104 shown in FIGS.

7-11. Except as described hereafter, the fluid end 500 is identical to the fluid end 100. A removable stuffing box sleeve 506 installed within the fluid end 500 has a different shape than the sleeve 298 installed within the fluid end 100. As a result, the areas of the fluid end body 502 and connect plate 504 that receive the sleeve 506 have a different shape than those areas in the fluid end body 102 and connect plate 104.

Figure 58:
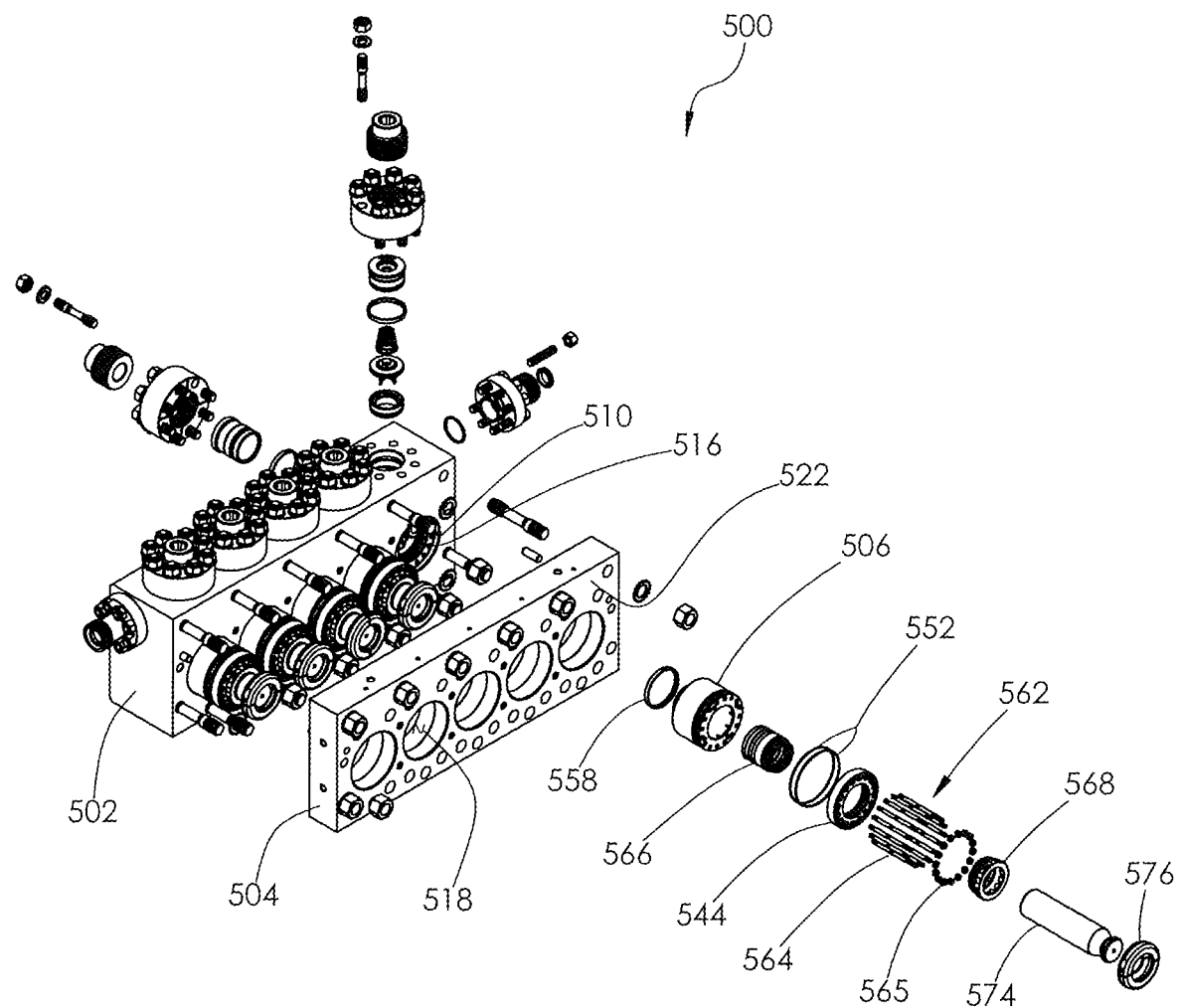
FIG. 58 is a rear perspective view of the fluid end shown in FIG. 57.
Figure 59:
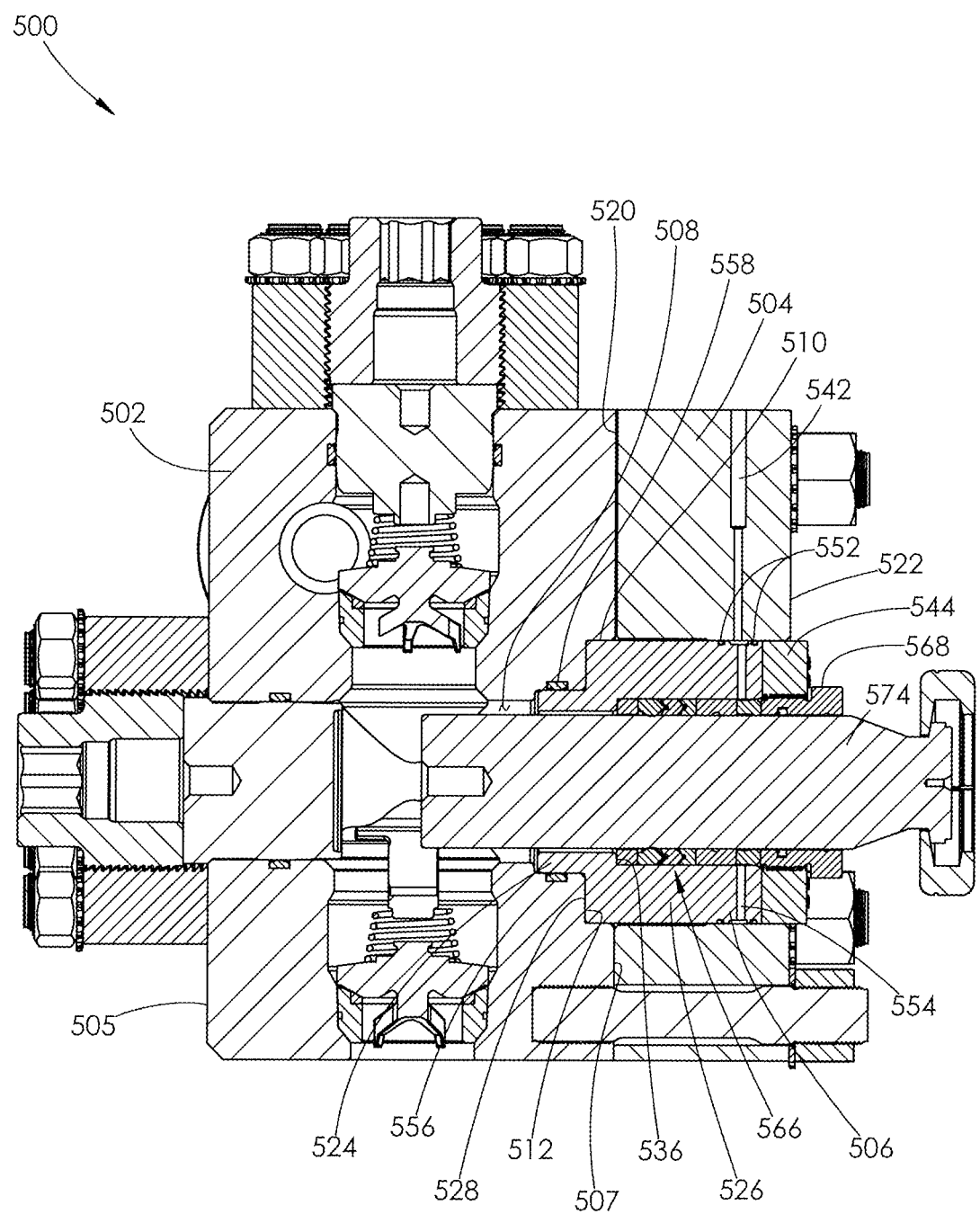
FIG. 59 is a cross-sectional view of the fluid end shown in FIG. 56, taken along line S-S.
Figure 60:
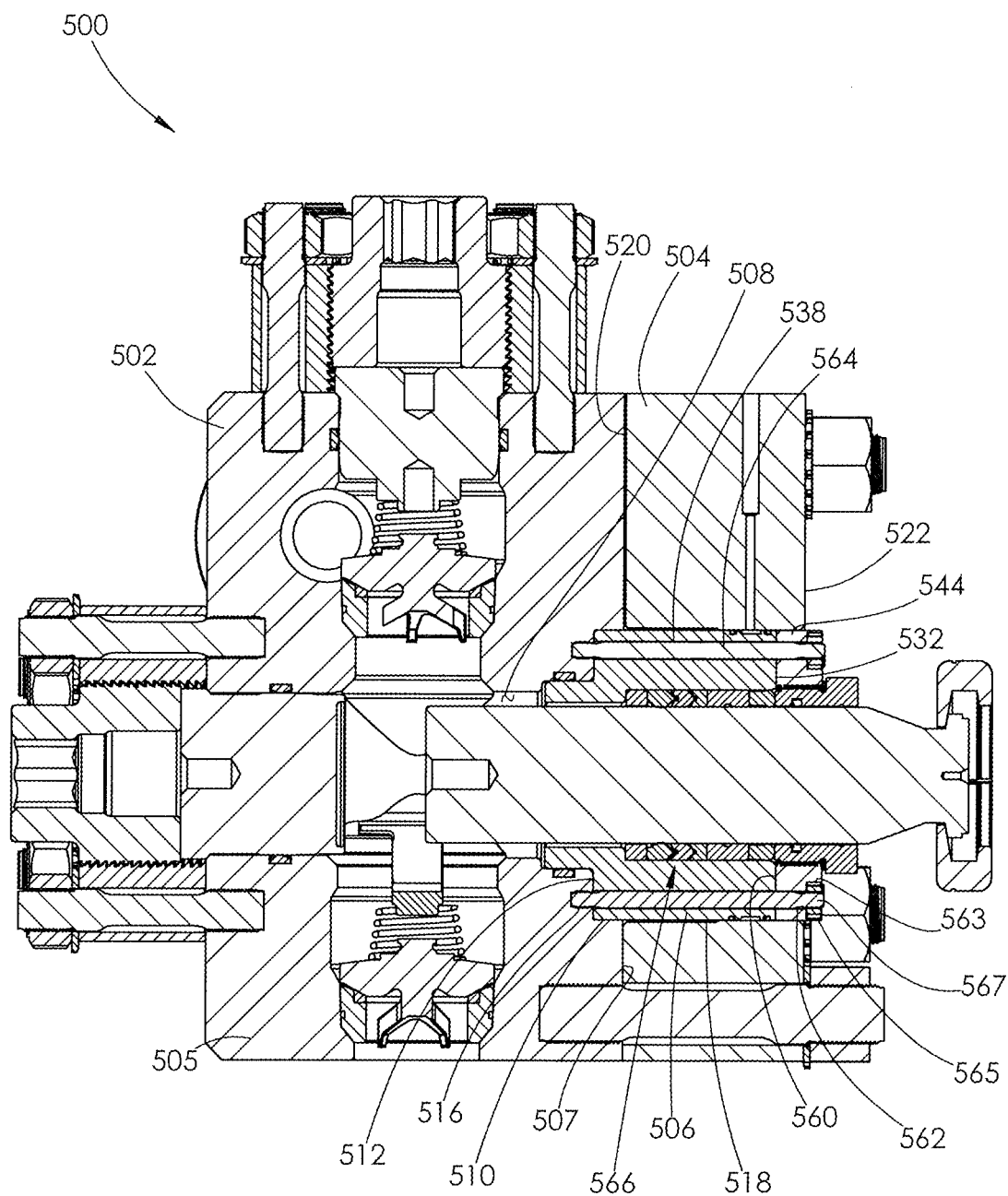
FIG. 60 is a cross-sectional view of the fluid end shown in FIG. 56, taken along line T-T.

With reference to FIGS. 59 and 60, a plurality of longitudinally spaced horizontal bores 508 are formed in the fluid end body 502. The bores 508 interconnect opposed front and rear surfaces 505 and 507 of the fluid end body 502. Each bore 508 includes a counterbore 510, as also shown in FIG. 58. Each counterbore 510 has a base 512 and opens on the rear surface 507 of the fluid end body 502. A plurality of internally threaded peripheral openings 516 are formed in the base 512, as shown in FIGS. 58 and 60. The openings 516 surround the bores 508 and extend into the fluid end body 502.

A plurality of longitudinally spaced horizontal bores 518 are formed in the connect plate 504, as shown in FIG. 58. The bores 518 interconnect the front and rear surfaces 520 and 522 of the connect plate 504. The bores 518 do not include any counterbores. Instead, each bore 518 has a generally uniform diameter between the front and rear surfaces 520 and 522. The diameter of each bore 518 matches with the diameter of each counterbore 510 formed in the fluid end body 502, as shown in FIGS. 59 and 60. When the fluid end 500 is assembled, the counterbores 510 and bores 518 align in a one-to-one relationship.

Figure 61:
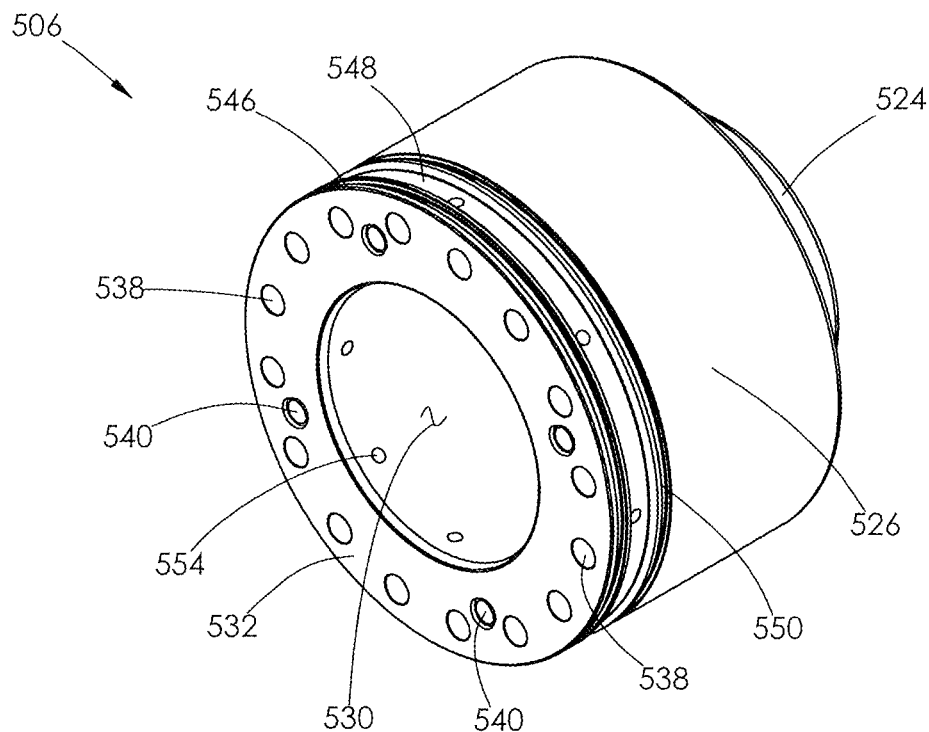
FIG. 61 is a top perspective view of a stuffing box sleeve used with the fluid end shown in FIGS. 59 and 60.
Figure 62:
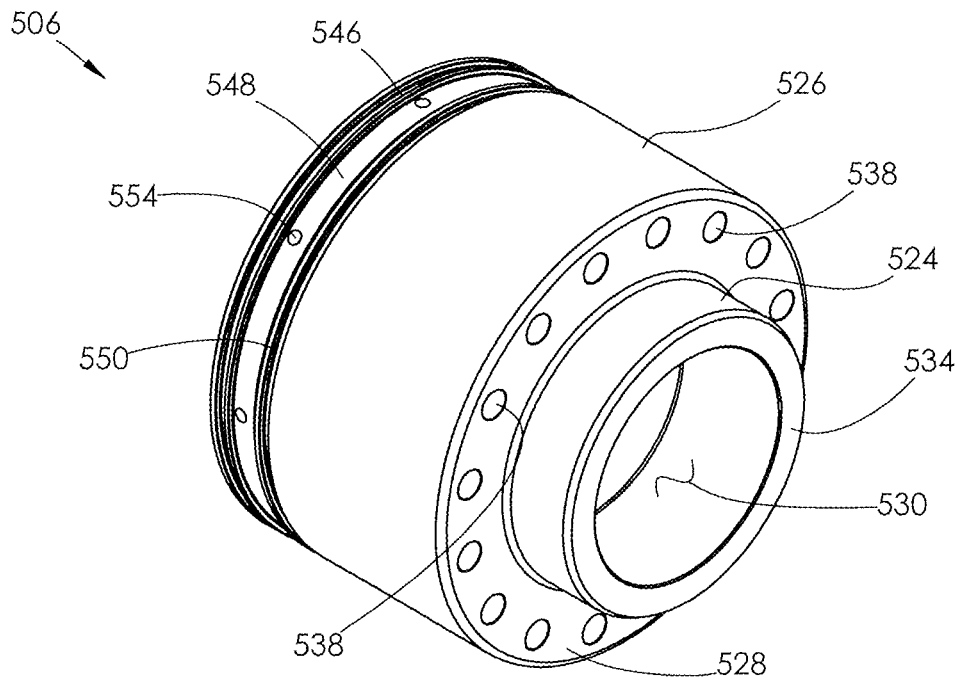
FIG. 62 is a bottom perspective view of the stuffing box sleeve shown in FIG. 61.

With reference to FIGS. 61 and 62, the sleeve 506 has a cylindrical lower portion 524 joined to a cylindrical upper portion 526. The lower portion 524 has a lesser diameter than that of the upper portion 526. Unlike the sleeve 298 shown in FIGS. 40-43, the sleeve 506 does not include a tapered portion. Instead, the lower portion 524 is joined directly to a bottom surface 528 of the upper portion 526. A central passage 530 extends through the sleeve 506 and interconnects the sleeve's top and bottom surfaces 532 and 534. An internal seat 536 is formed in the walls surrounding the central passage 530 adjacent the bottom surface 528 of the upper portion 526, as shown in FIG. 59.

Unlike the sleeve 298 shown in FIGS. 40-43, the upper portion 526 does not include a flange. Instead, the upper portion 526 has a generally uniform outside diameter along its length. A plurality of peripheral passages 538 are formed in the upper portion 526 and surround the central passage 530. The passages 538 interconnect the sleeve's top surface 532 and the bottom surface 528 of the upper portion 526.

A plurality of threaded openings 540 are formed in the top surface 532 of the sleeve 506. The threaded openings 540 allow use of a tool for gripping the sleeve 506 while it is being installed or removed.

Turning back to FIG. 59, the upper portion 526 of the sleeve 506 has a greater length than the upper portion 308 formed in the sleeve 298. When the sleeve 506 is installed within the fluid end 500, a weep hole 542 formed in the connect plate 504 faces the sleeve 506. In contrast, in the fluid end 100, with its shorter sleeve 298, the weep hole 364 faces the retainer 300.

Because of the alignment between the weep hole 542 and the sleeve 506, first, second, and third annular recess 546, 548, and 550 are formed in an outer surface of the sleeve 506, as shown in FIGS. 61 and 62. Each of the first and third recesses 546 and 550 are configured to house a seal 552, as shown in FIG. 59. Preferably, the seal 552 is an O-ring. The second recess 548 underlies the weep hole 542, and is interconnected with the sleeve's central passage 530 by a plurality of spaced passages 554. Any fluid leaking around the sleeve 506 flows from the central passage 530, through the passages 554, into the second recess 548, and then into the weep hole 542.

Turning back to FIGS. 61 and 62, the outer surface of the sleeve 506 includes no annular recess for housing a high pressure seal. Instead, an annular recess 556, configured to house an annular seal 558, is formed in the walls surrounding each bore 508 adjacent each counterbore 510, as shown in FIG. 59. Preferably, the seal 558 is a high pressure seal.

Continuing with FIG. 59, each recess 556 is identical to the recess 330 shown in FIG. 21. The seal 558 is closely received within the recess 556. After a seal 558 is installed within a recess 556 within one of the bores 508, a sleeve 506 is installed within that bore.

When a sleeve 506 is installed within a bore 508, the seal 558 within the bore tightly engages the outer surface of the sleeve's lower portion 524. During operation, the seal 558 wears against the lower portion 524. If the outer surface of the lower portion 524 begins to erode, allowing fluid to leak around the sleeve 506, that sleeve 506 can be removed and replaced with a new sleeve. The seal 558 may also be removed and replaced with a new seal, if needed.

Continuing with FIG. 59, when a sleeve 506 is installed within the aligned bores 508 and 518, the bottom surface 528 of the upper portion 526 engages the base 512 of the counterbore 510. Such engagement prevents further movement of the sleeve 506 within the fluid end body 502. The sleeve 506 is positioned within the aligned bores 508 and 518 such that its peripheral passages 538 and the peripheral openings 516 formed in the base 512 are aligned in a one-to-one relationship, as shown in FIG. 60.

Figure 63:
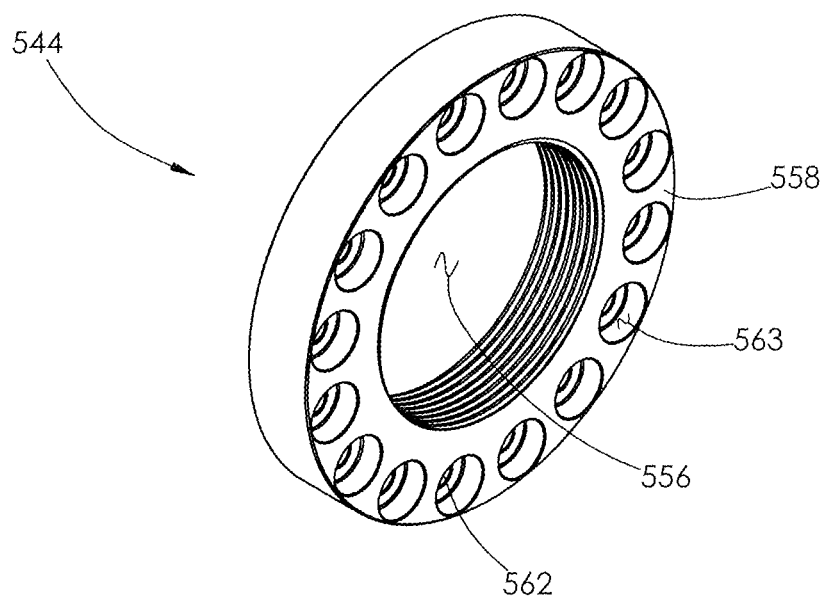
FIG. 63 is a top perspective view of a retainer used with the fluid end shown in FIGS. 59 and 60.
Figure 64:
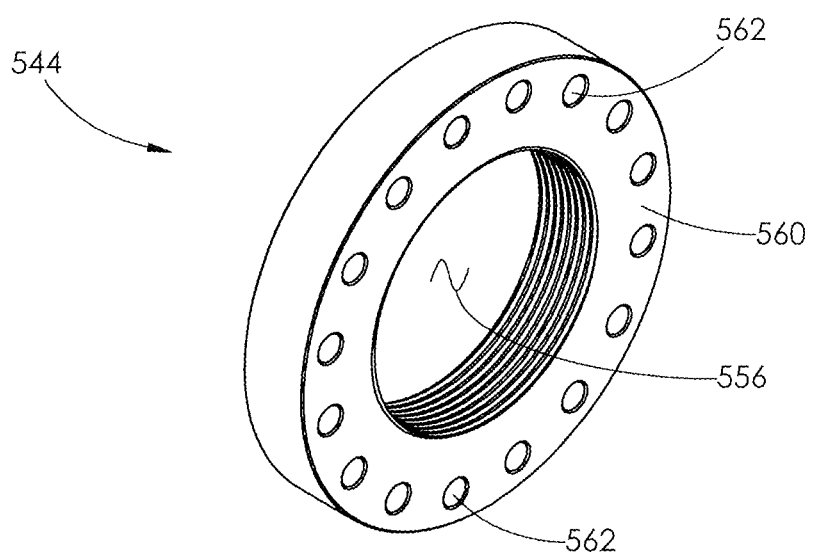
FIG. 64 is a bottom perspective view of the retainer shown in FIG. 63.
Figure 65:
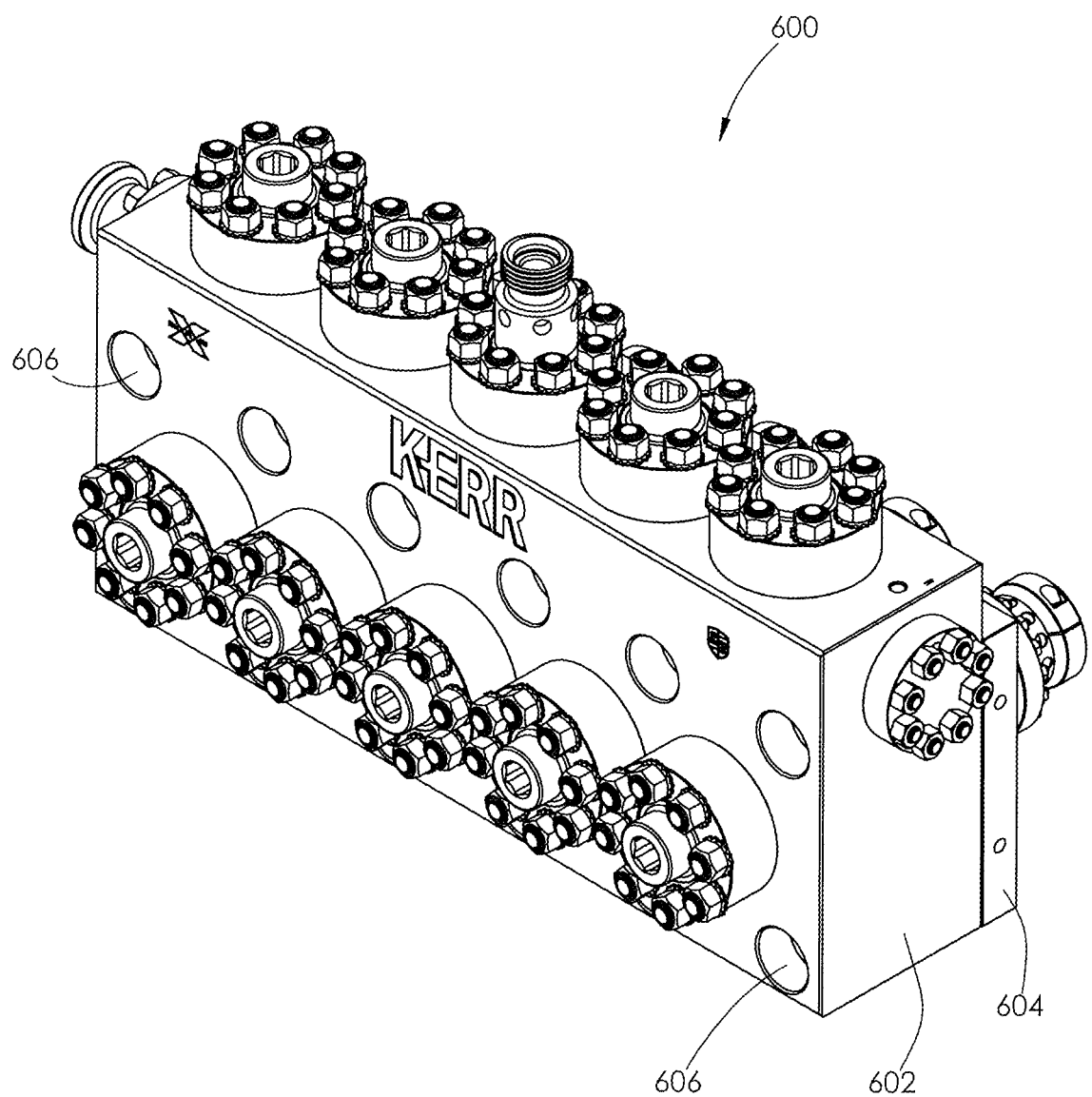
FIG. 65 is a front perspective view of another embodiment of a fluid end.

With reference to FIGS. 63 and 64, a retainer 544 prevents the sleeve 506 from being dislodged from the aligned bores 508 and 518. The retainer 544 comprises a cylindrical body having an internally threaded central passage 556. The central passage 556 interconnects the retainer's top and bottom surfaces 558 and 560. A plurality of peripheral passages 562 surround the central passage 556 and interconnect the retainer's top and bottom surfaces 558 and 560. A counterbore 563 is formed within each passage 562, adjacent the top surface 558 of the retainer 544.

With reference to FIG. 60, the retainer 544 is installed within the counterbore 510 so that its bottom surface 560 engages the top surface 532 of the sleeve 506. The retainer 544 is installed over the sleeve 506 such that the peripheral passages 562 and the peripheral passages 538 are aligned in a one-to-one relationship.

Unlike the fluid end 100, each of the retainers 544 is secured to the fluid end body 502, instead of to the connect plate 504. Each of the retainers 544 is secured using a fastening system 562 shown in FIGS. 57 and 58. The fastening system 562 comprises a plurality of studs 564 and a plurality of nuts 565. Each of the studs 564 is received within a corresponding one of the openings 516 formed in the base 512. From the base 512, each stud 564 extends through a corresponding one of the passages 538 in the sleeve 506, and through a corresponding one of the passages 562 in the retainer 544.

A first end 567 of each stud 564 is positioned within one of the counterbores 563 formed in the retainer 544. A nut 565 is then placed on the end 567 of each stud 564, and turned until it tightly engages the base of the counterbore 563. In alternative embodiments, the fastening system may comprise a plurality of screws instead of studs and nuts. The screws are preferably socket-headed cap screws.

Attaching the retainer 544 to the fluid end body 502 also helps ensure the sleeve 506 remains tightly in place during operation. Because each of the retainers 544 is attached to the fluid end body 502 using the fastening system 562, no external threads are formed on the outer surface of each of the retainer 544. Likewise, no internal threads are formed within the walls of each set of aligned bores 508 and 518.

Continuing with FIG. 59, a plunger packing 566 is installed within the central passage 530 of each sleeve 506. When installed the plunger packing 566 engages the sleeve's internal seat 536. The plunger packing 566 is identical to the plunger packing 368, shown in FIG. 21.

The plunger packing 566 is held within the sleeve 506 by a packing nut 568. The packing nut 568 is generally identical to the packing nut 374 shown in FIGS. 46 and 47. However, the packing nut 568 may vary slightly in size from the packing nut 374 in order to properly fit within the retainer 544 and sleeve 506. External threads formed on the outer surface of the packing nut 568 matingly engage the internal threads formed in the retainer 544.

When a packing nut 568 is installed within one of the retainers 544, a bottom surface 378 of the packing nut 568 engages one of the plunger packings 566. Such engagement compresses the plunger packing 566, creating a tight seal. After a packing nut 568 has been installed within a retainer 544, a central passage within that packing nut 568 will be aligned with a central passage in a plunger packing 566.

Figure 55:
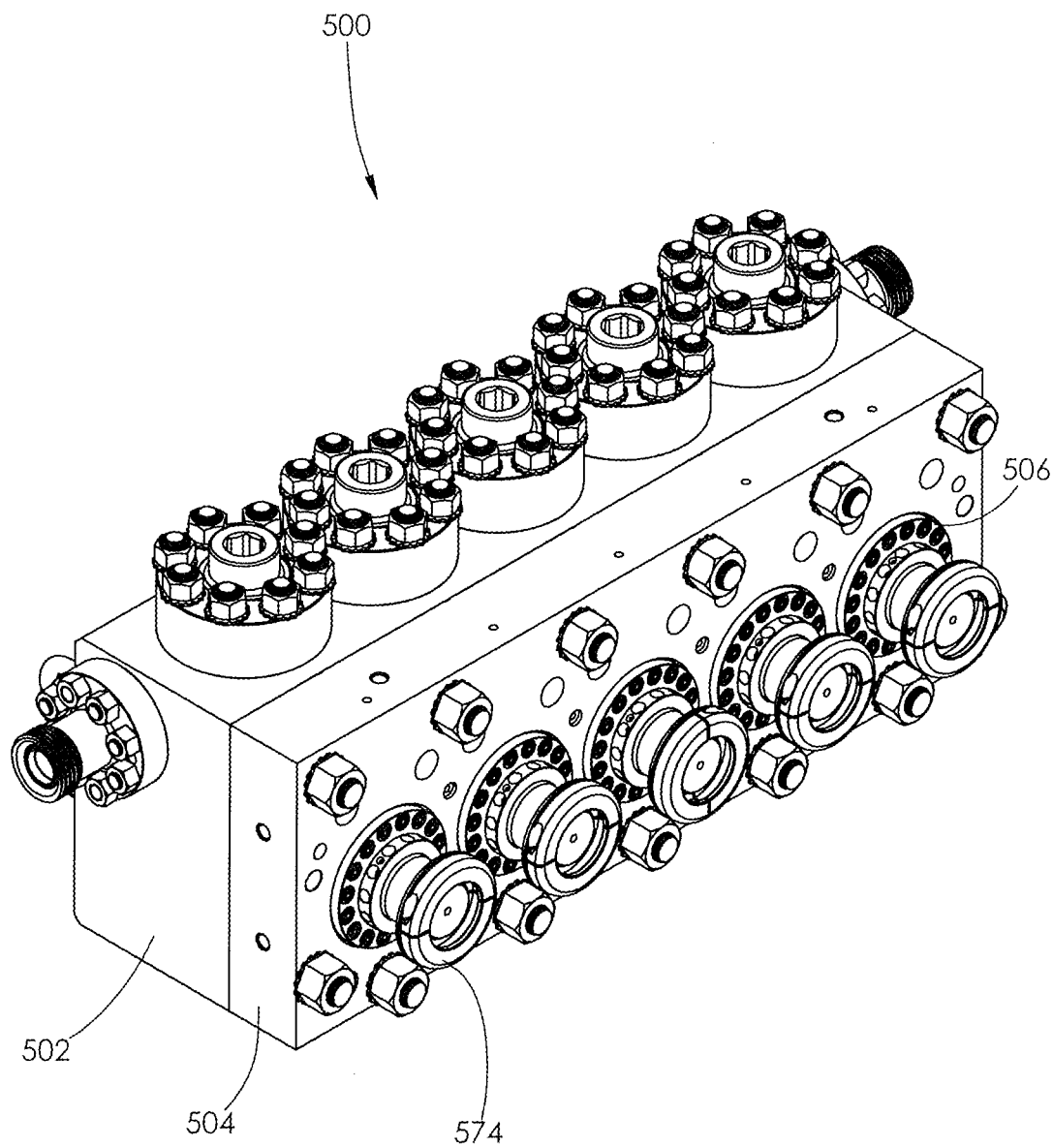
FIG. 55 is a rear perspective view of another embodiment of a fluid end.
Figure 56:
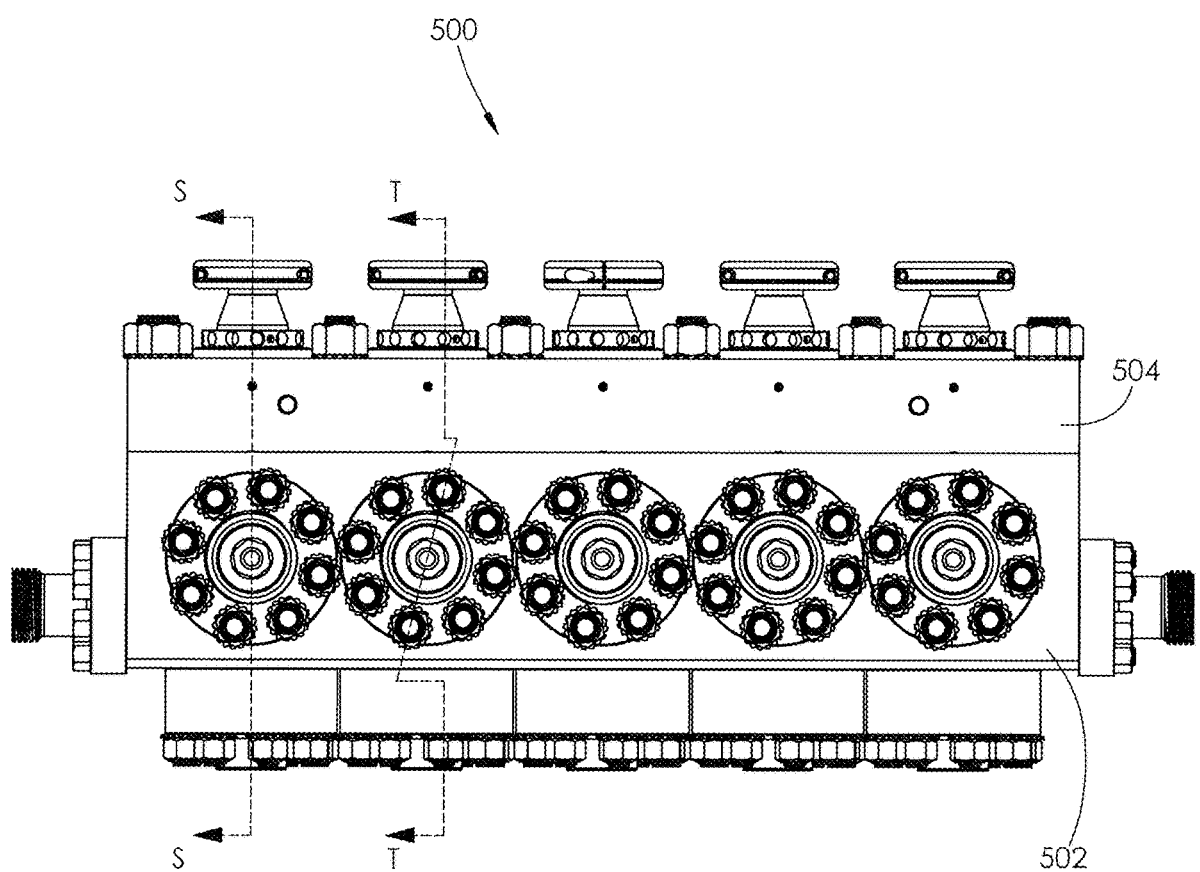
FIG. 56 is a top plan view of the fluid end shown in FIG. 55
Figure 57:
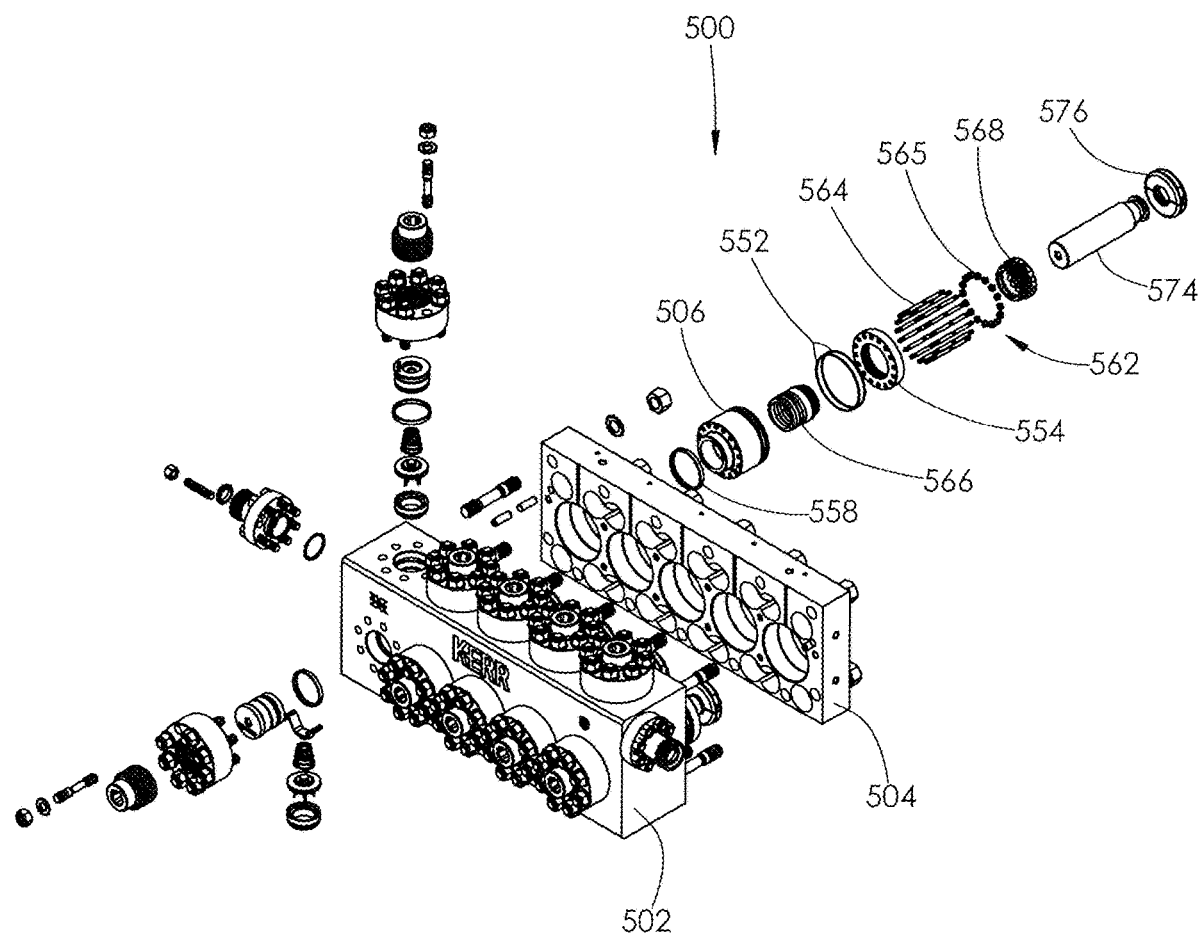
FIG. 57 is an exploded front perspective view of the fluid end shown in FIG. 55. Only a single plunger is shown.

Once a sleeve 506, plunger packing 566, retainer 544, and packing nut 568 are installed within a pair of aligned horizontal bores 508 and 518, a plunger 574 is next installed, as shown in FIG. 55. Alternatively, the plunger 574 may be installed prior to installing the packing nut 568. Once installed, the plunger 574 is surrounded by the other components within the aligned bores 508 and 518. During operation, the plunger 574 moves relative to the fluid end 500 and the components installed within the aligned bores 508 and 518.

The plunger 574 is identical to the plunger 296 shown in FIG. 18. A clamp 576 is attached to the end of each plunger 574. The clamp 576 secures its plunger 574 to one of the pony rods 44, show in FIGS. 7 and 8.

Turning to FIGS. 65-69, another embodiment of a fluid end 600 is shown. As discussed above, some fluid ends operate with power ends having longer-than-usual stay rods. These stay rods extend through the entire fluid end body, rather than through just a machined flange. The fluid end 600 is constructed for use with such power ends.

Figure 68:
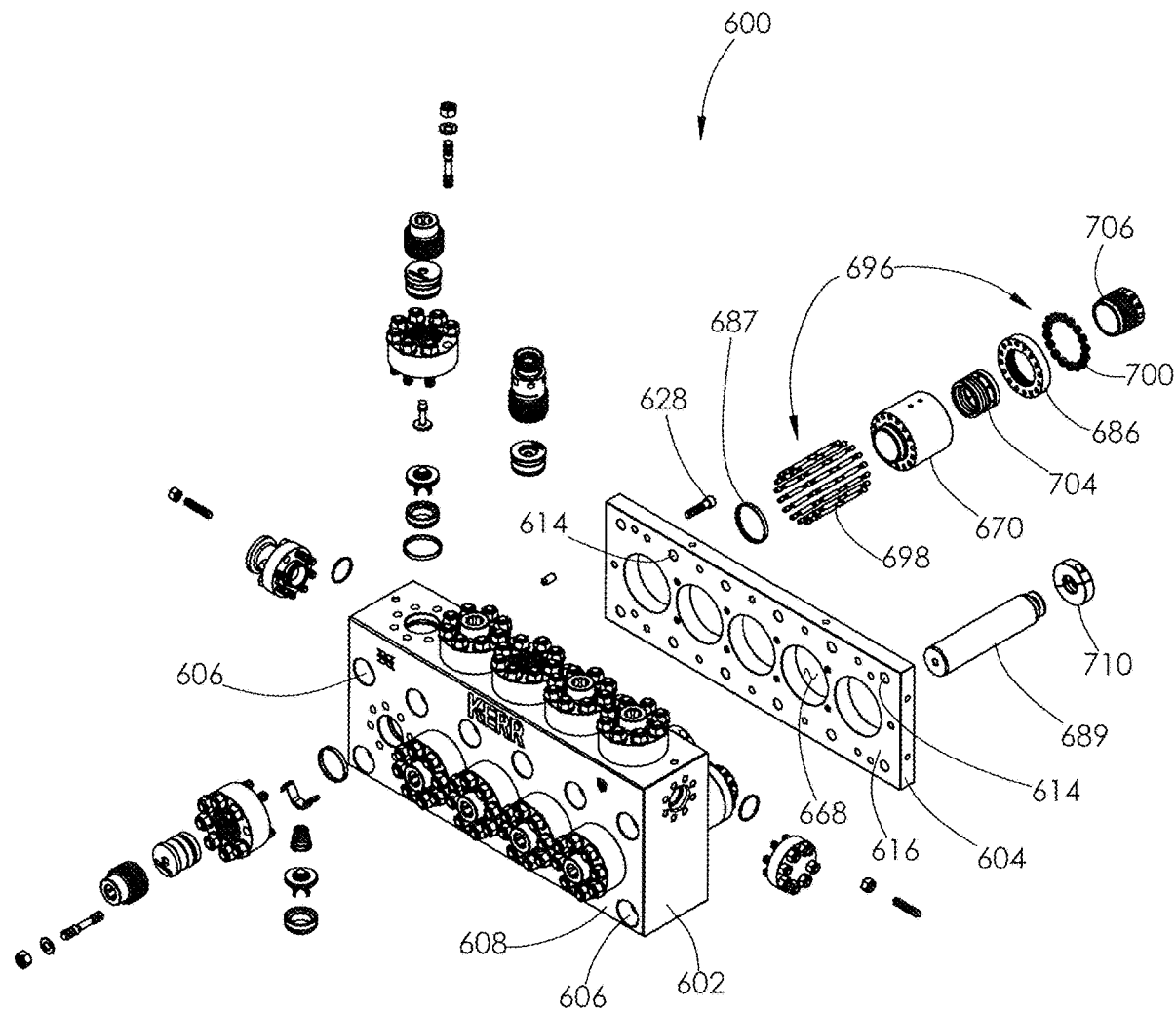
FIG. 68 is an exploded front perspective view of the fluid end shown in FIG. 65. Only a single plunger is shown.
Figure 69:
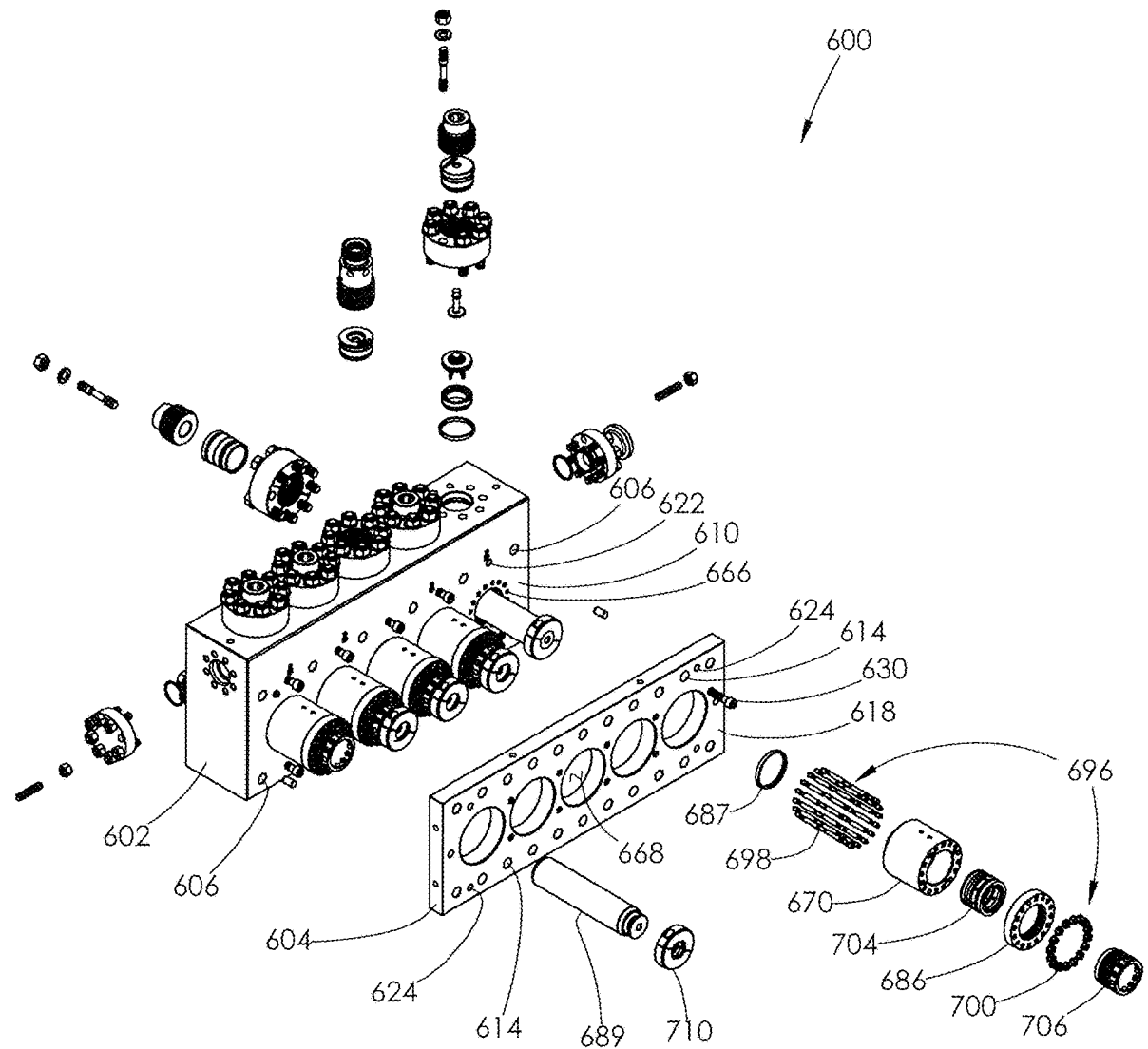
FIG. 69 is a rear perspective view of the fluid end shown in FIG. 68.
Figure 71:
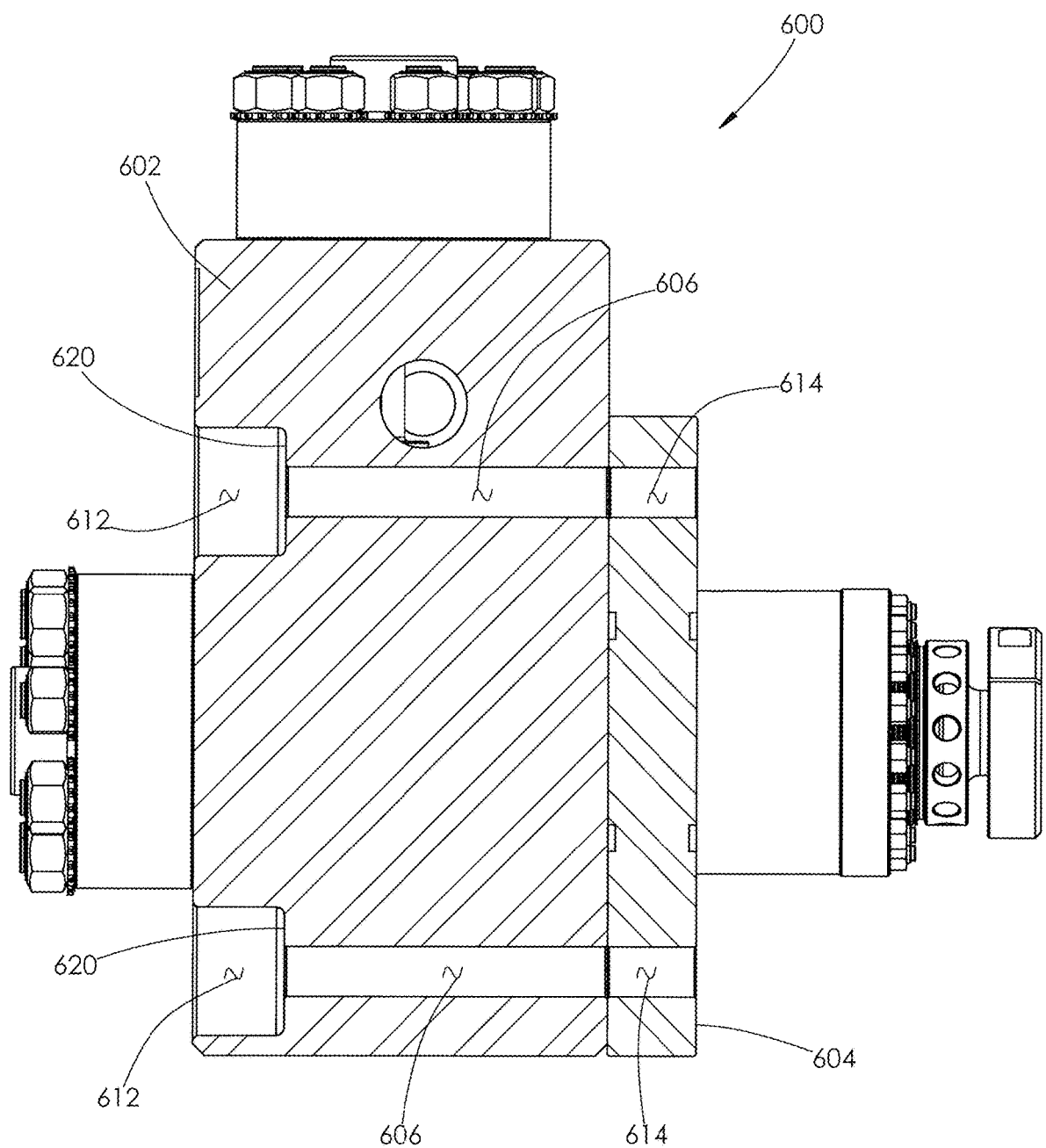
FIG. 71 is a cross-sectional view of the fluid end shown in FIG. 67, taken along line V-V.

The fluid end 600 comprises a fluid end body 602 releasably attached to a connect plate 604. A plurality of horizontal bores 606 are formed around the periphery of the fluid end body 602, as shown in FIGS. 68 and 69. The bores 606 interconnect the fluid end body's front and rear surfaces 608 and 610. Each bore 606 includes a counterbore 612 that opens on the front surface 608, as shown in FIG. 71.

A plurality of horizontal bores 614 are formed around the periphery of the connect plate 604, as shown in FIGS. 68 and 69. The bores 614 interconnect the plate's front and rear surfaces 616 and 618. The bores 614 and the bores 606 are aligned in a one-to-one relationship, as shown in FIG. 71. Each pair of aligned bores 614 and 606 receives a corresponding one of the stay rods (not shown) of the power end.

When the stay rods are installed in the fluid end 600, a threaded end of a stay rod projects into each counterbore 612. A nut and washer are installed on the projecting end of each stay rod. The nut is turned until it presses against a base 620 of the counterbore 612, shown in FIG. 71, thereby securing the fluid end 600 to that stay rod. Like the stay rods 42 shown in FIG. 12, each stay rod may include a step. The step of an installed stay rod engages the rear surface 618 of the connect plate 604.

With reference FIGS. 69 and 70, a plurality of internally threaded openings 622 are formed about the periphery of the rear surface 610 of the fluid end body 602. The openings 622 are registerable with a plurality of passages 624 formed about the periphery of the connect plate 604. Each of the passages 624 includes a counterbore 626 that opens on the rear surface 618 of the connect plate 604, as shown in FIG. 70.

The connect plate 604 is secured to the fluid end body 602 using a fastening system 628 shown in FIGS. 68 and 70. The fastening system 628 comprises a plurality of threaded screws 630, which are preferably socket-headed cap screws. Each screw 630 extends through a corresponding passage 624 in the connector plate 604 and into a corresponding opening 622 in the fluid end body 602, as shown in FIG. 70. Each screw 630 is turned until it tightly engages the base 631 of its respective counterbore 626, thereby securing the connect plate 604 to the fluid end body 602.

Continuing with FIG. 70, a plurality of longitudinally spaced horizontal bores 632 are formed in the fluid end body 602. Each bore 632 interconnects the front and rear surface 608 and 610 of the fluid end body 602. In contrast to the fluid end body 102, the fluid end body 602 features horizontal bores with unbeveled corners at the rear surface 610. More specifically, the walls surrounding the horizontal bores 632 form a roughly 90 degree angle with the rear surface.

In contrast to the fluid end body 502, the fluid end body 602 features bores 632 that lack any counterbore corresponding to the counterbore 510 shown in FIG. 60. A plurality of internally threaded openings 666 are formed in the rear surface 610 of the fluid end body 602. The openings 666 surround the openings of the bores 632, as shown in FIG. 69.

Continuing with FIGS. 68 and 69, a plurality of longitudinally spaced horizontal bores 668 are formed in the connect plate 604. Each bore 668 interconnects the front and rear surfaces 616 and 618 of the connect plate 604. The bores 668 and the horizontal bores 632 are aligned in a one-to-one relationship. However, each of the bores 668 has a greater diameter than that of each of the bores 632. When the connect plate 604 is installed on the fluid end body 602, the peripheral openings 666 formed in the fluid end body 602 are exposed to the bores 668 formed in the connect plate 604, as shown in FIG. 70.

As shown by a comparison of the fluid end 600 shown in FIG. 70 with the fluid end 500 shown in FIG. 60, the fluid end body 602 and connect plate 604 are respectively thinner than the fluid end body 502 and connect plate 504. The fluid end 600 uses a thinner fluid end body 602 and connect plate 604 so that the stay rods have a lesser distance to traverse. The height of the connect plate 604 is reduced relative to the height of the fluid end body 602, thereby eliminating unnecessary material.

Continuing with FIG. 70, a removable stuffing box sleeve 670 is installed within each pair of aligned bores 632 and 668. The sleeve 670 includes a lower portion 672 joined directly to a bottom surface 674 of an upper portion 676. A central passage 678 interconnects the top and bottom surfaces 680 and 682 of the sleeve 670.

A plurality of longitudinal passages 684 are formed in the sleeve 670. Each passage 684 interconnects the top and bottom surfaces 680 and 674 of the sleeve's upper portion 676. The longitudinal passages 684 extend parallel to, and are arranged peripherally about, the central passage 678. The sleeve 670 is generally identical to the sleeve 506 shown in FIG. 60, except that no annular recesses are formed in its outer surface adjacent its top surface 680. The sleeve 670 may have a longer and wider upper portion 676 than that of the sleeve 506.

Figure 66:
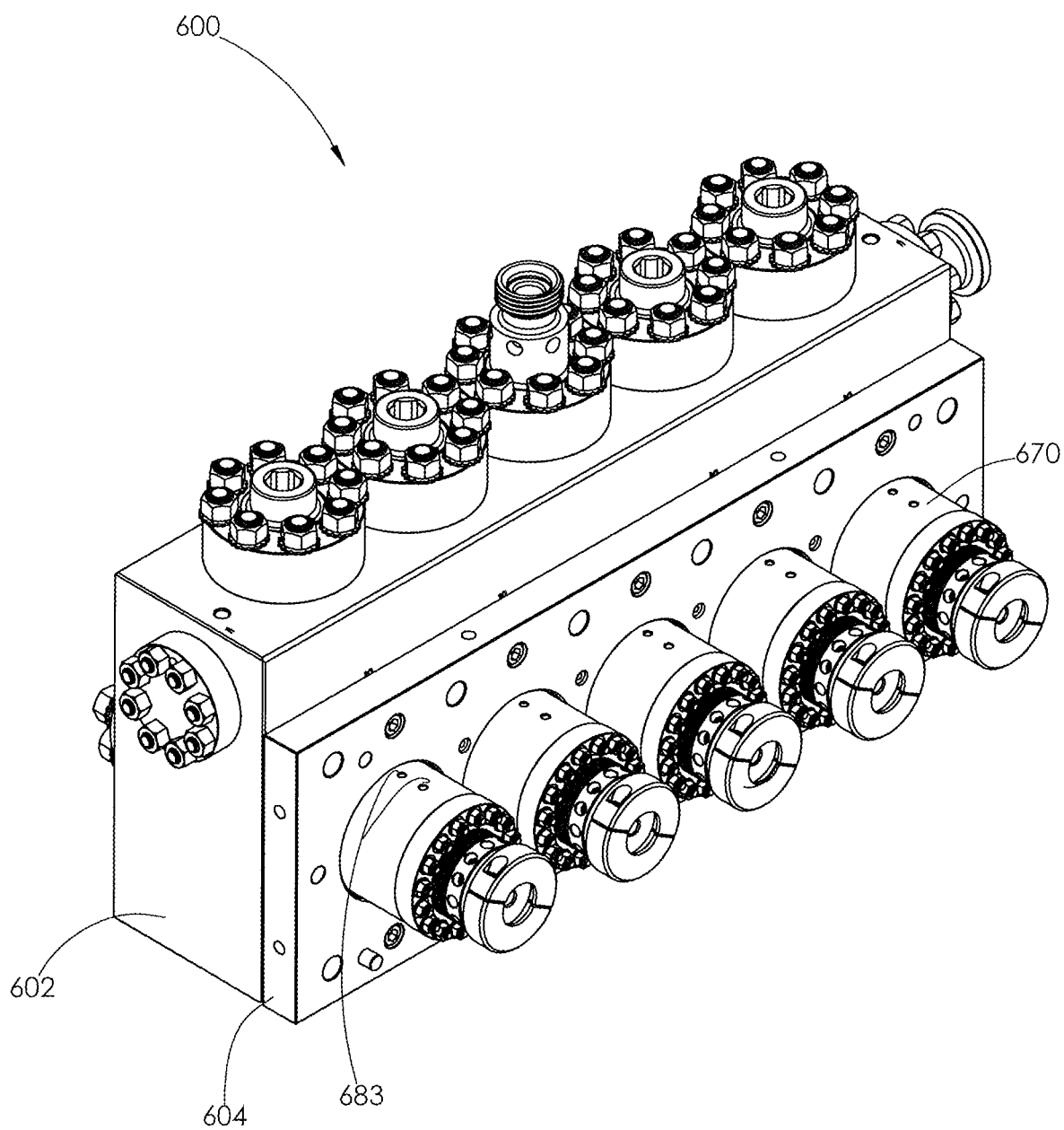
FIG. 66 is a rear perspective view of the fluid end shown in FIG. 65.
Figure 67:
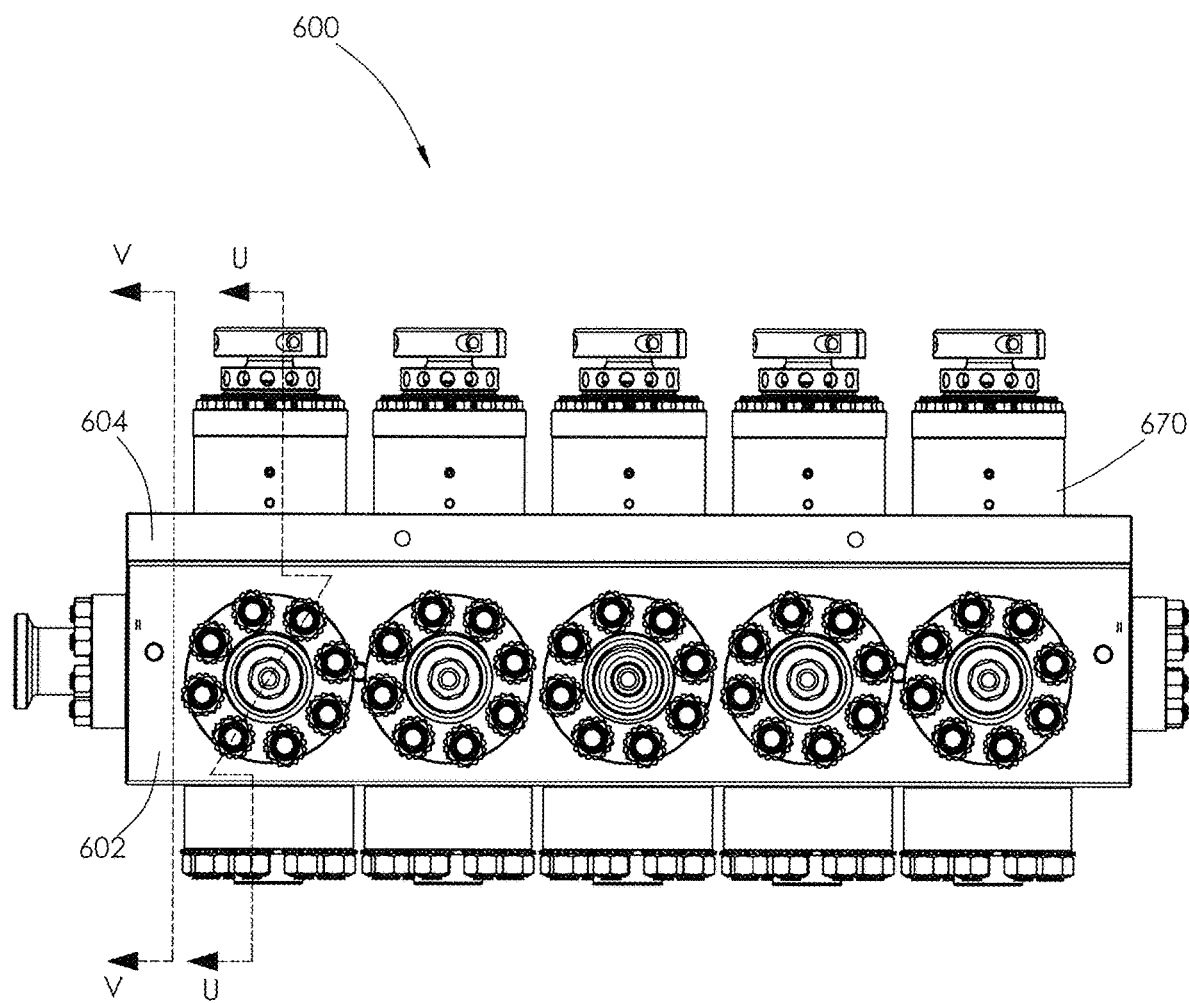
FIG. 67 is a top plan view of the fluid end shown in FIG. 65.

A plurality of spaced passages 683, preferably two in number, are formed in the sleeve 670, as shown in FIG. 66. The passages 683 are preferably formed near the midway position along the length of the upper portion 676. Each passage 683 interconnects the central passage 678 of the sleeve 670 with its outer surface.

An annular recess 634 is formed in the walls surrounding the horizontal bore 632. The recess 634 receives an annular seal 687. When the sleeve 670 is installed, the lower portion 672 is situated within the bore 632, where it is surrounded and engaged by the seal 687. The seal 687 and recess 634 are identical to the seal 558 and recess 556 shown in FIG. 59.

When the sleeve 670 is installed, the bottom surface 674 of its upper portion 676 engages the rear surface 610 of the fluid end body 602. The upper portion 676 projects from the connect plate 604, with the passages 683 positioned outside the rear surface 618. Peripheral passages 684 in the sleeve 670 and peripheral openings 666 in the body 602 are aligned in a one-to-one relationship. Fluid leaking around an installed plunger 689 may exit the sleeve 670 through the passages 683.

The sleeve 670 is secured within the aligned bores 632 and 668 by a retainer 686. Each retainer 686 has a cylindrical body having a central passage 688 that interconnects the retainer's top and bottom surfaces 690 and 692. A plurality of peripheral passages 694 surround and extend parallel to, the central passage 688. The passages 694, which do not include any counterbore, interconnect the top and bottom surfaces 690 and 692 of the retainer 686. The passages 694 and the passages 684 formed in the sleeve 670 are alignable in a one-to-one relationship.

Continuing with FIG. 70, each of the retainers 686 is secured to the fluid end body 602 using a fastening system 696 shown in FIGS. 68 and 69. The fastening system 696 comprises a plurality of studs 698 and a plurality of nuts 700. Each of the studs 698 is received within a corresponding one of the openings 666 formed in the fluid end body 602. From the body 602, each stud 698 extends through a corresponding one of the passages 684 in the sleeve 670, and through a corresponding one of the passages 694 in the retainer 686.

A first end 702 of each stud 698 projects from the retainer's top surface 690. A nut 700 is then placed on the first end 702 of each stud 698, and turned until it tightly engages the top surface 690 of the retainer 686. In alternative embodiments, the fastening system may comprise a plurality of screws instead of studs and nuts. The screws are preferably socket-headed cap screws.

Because each of the retainers 686 is attached to the fluid end body 602 using the fastening system 696, no external threads are formed on the outer surface of each of the retainer 686. Likewise, no internal threads are formed within the walls of each set of aligned bores 632 and 668.

Continuing with FIG. 70, a plunger packing 704 is installed within the central passage 678 of each sleeve 670. When installed, the plunger packing 704 engages an internal seat 705 formed in the sleeve 670. The plunger packing 704 is identical to the plunger packing 368, shown in FIG. 21.

The plunger packing 704 is held within the sleeve 670 by a packing nut 706. The packing nut 706 is generally identical to the packing nut 374 shown in FIGS. 46 and 47. However, the packing nut 706 may vary slightly in size from the packing nut 374 in order to properly fit within the retainer 686 and sleeve 670. External threads formed on the outer surface of the packing nut 706 matingly engage the internal threads formed in the retainer 686.

When a packing nut 706 is installed within one of the retainers 686, a bottom surface 708 of the packing nut 706 engages one of the plunger packings 704. Such engagement compresses the plunger packing 704, creating a tight seal. After a packing nut 706 has been installed within a retainer 686, a central passage within that packing nut 706 will be aligned with a central passage in a plunger packing 704.

Once a sleeve 670, plunger packing 704, retainer 686, and packing nut 706 are installed within a pair of aligned horizontal bores 632 and 668, a plunger 689 is next installed, as shown in FIG. 66. Alternatively, the plunger 689 may be installed prior to installing the packing nut 706. Once installed, the plunger 689 is surrounded by the other components within the aligned bores 632 and 668. During operation, the plunger 689 moves relative to the fluid end 600. More particularly, the plunger 689 moves relative to those components installed within the aligned bores 632 and 668 and the sleeve 670. The plunger 689 is identical to the plunger 296 shown in FIG. 18. A clamp 710 is attached to the end of each plunger 689. The clamp 710 secures its plunger 689 to one of the pony rods used with the power end.

Figure 72:
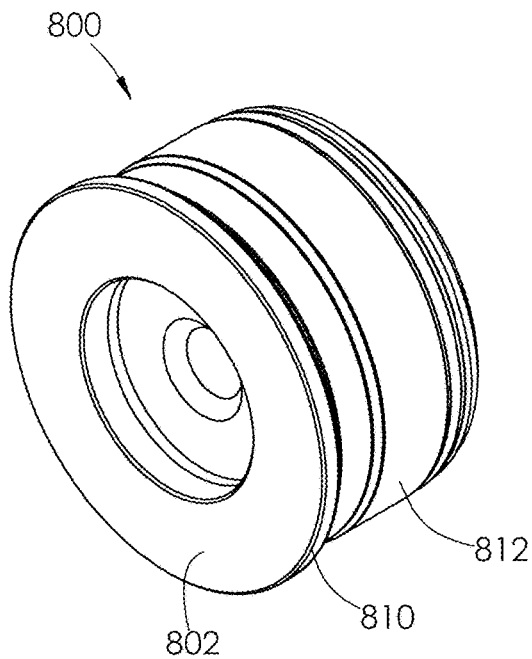
FIG. 72 is a top perspective view of a discharge plug shown installed in the fluid end in FIG. 70.
Figure 75:
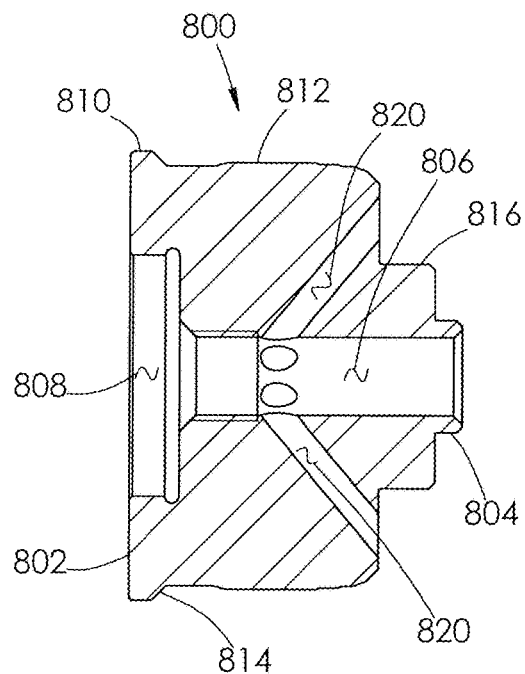
FIG. 75 is a cross-sectional view of the discharge plug shown in FIG. 74, taken along line W-W.
Figure 73:
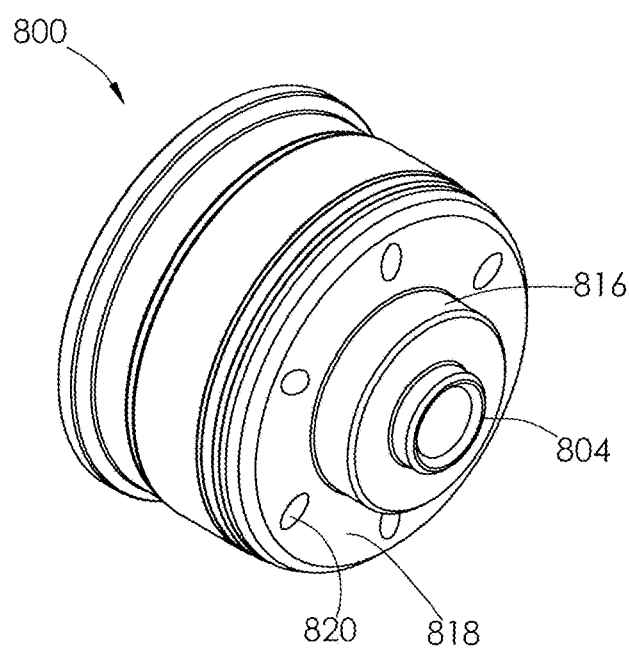
FIG. 73 is a bottom perspective view of the discharge plug shown in FIG. 72.
Figure 74:
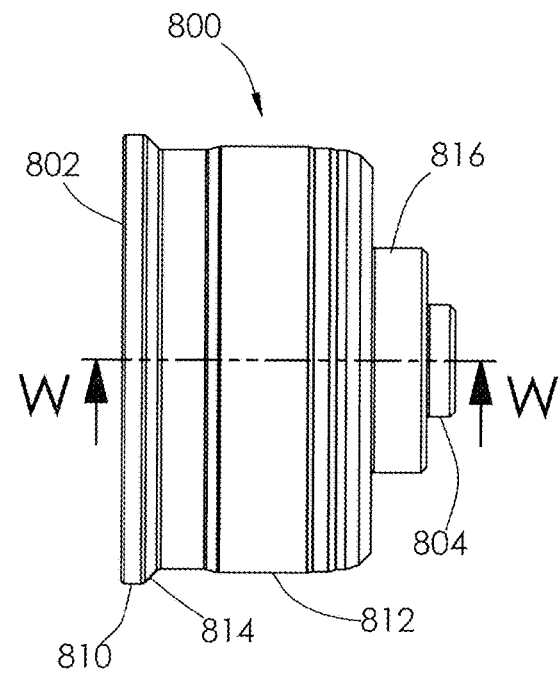
FIG. 74 is a side elevation view of the discharge plug shown in FIGS. 72 and 73.

With reference to FIGS. 72-74, an alternative embodiment of a discharge plug 800 is shown. The discharge plug 800 may be used in any of the fluid ends 100, 500, and 600. The discharge plug 800 may replace one of the discharge plugs 182 installed within the fluid end 100, 500, or 600. As described below, the discharge plug 800 is configured to form an interface with a pressure transducer (not shown). The pressure transducer may be used to measure the magnitude of fluid pressure within an operating fluid end.

The discharge plug 800 comprises a cylindrical body having opposed top and bottom surfaces 802 and 804. The surfaces 802 and 804 are interconnected by a central bore 806. Apart from its internal bores, the discharge plug 800 is of generally solid construction. The bore 806 is threaded adjacent the bottom surface 804 so that it may receive the previously-discussed valve retainer 450. The bore 806 includes a counterbore 808 that opens on the plug's top surface 802.

The plug 800 has the same external shape as the discharge plug 182 described with reference to FIGS. 32-34. It includes an upper portion 810, a lower portion 812, a tapered portion 814 and a connection portion 816. The lower portion 812 has a bottom surface 818. A plurality of satellite bores 820 interconnect the central bore 806 with the bottom surface 818 of the lower portion 812. The satellite bores 820 are rectilinear, and surround the central bore 806, preferably at a uniform angular spacing. The longitudinal axis of the central bore 806 and the longitudinal axis of each satellite bore 820 define an acute angle in the direction of the bottom surface 804. None of the satellite bores 820 traverses the connection portion 816.

Figure 76:
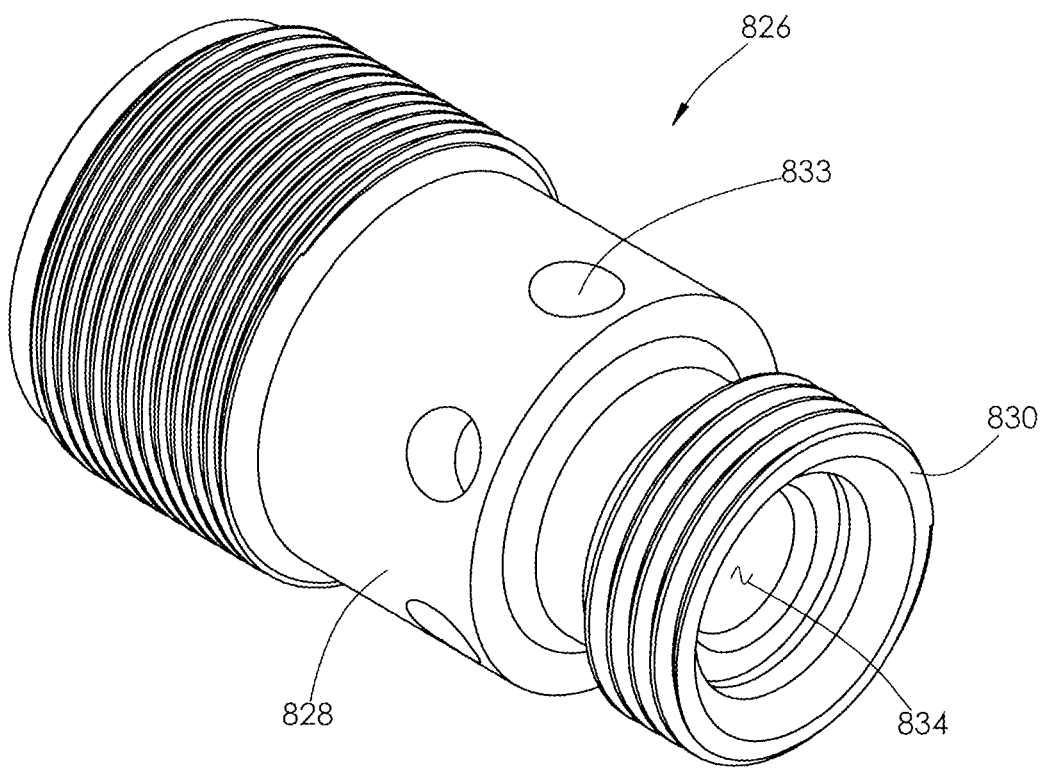
FIG. 76 is a top perspective view of a retainer used with the discharge plug shown in FIG. 72.
Figure 77:
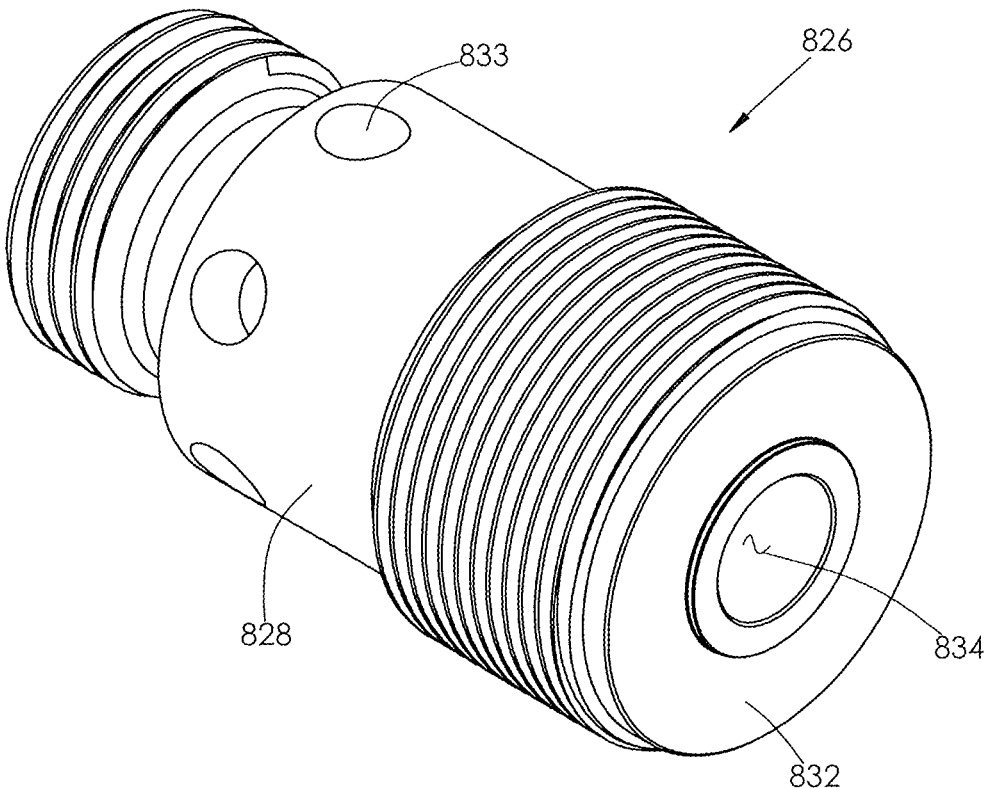
FIG. 77 is a bottom perspective view of the retainer shown in FIG. 76.

The plug 800 is installed within a fluid end in the same manner as the plug 182 described with reference to FIGS. 32-34. The plug 800 is shown in FIG. 70, installed within a vertical bore 822 formed in the fluid end body 602. The plug 800 is held in place by the retainer 254 described with reference to FIG. 36. However, in place of a retainer nut 262, the retainer is equipped with a gauge port 826, shown in FIGS. 76 and 77.

The gauge port 826 has an elongate body 828 having opposed top and bottom surfaces 830 and 832. External threads are formed in the outer surface of the body 828 adjacent its top and bottom surfaces 830 and 832. The external threads adjacent its bottom surface 832 are matingly engageable with the internal threads formed in the retainer 254. A central passage 834 penetrates the body 828 and interconnects the top and bottom surface 830 and 832.

A plurality of openings 833 are formed around the periphery of the body 828, near the longitudinal midpoint of the body 828. The openings 833 do not communicate with the central passage 834. The openings 833 allow use of a tool for gripping the body 828 while the gauge port 826 is being installed or removed.

Turning back to FIG. 70, when the gauge port 826 is installed within the retainer 254, its bottom surface 832 engages a top surface 802 of the discharge plug 800. When engaged, the central passage 834 aligns with the bore 806 formed in the plug 800. To prevent leakage of fluid, a seal 836 may be positioned at the junction of the passage 834 and the bore 806. Fluid pressure within the body 602 is transferred, by way of central bore 806 and central passage 834, to the gauge port 826.

The top surface 830 of the gauge port 826 may be placed in engagement with a pressure transducer. The pressure transducer measures pressure of fluid within the central passage 834 of the gauge port 826, which equals pressure within the discharge portion of the fluid end 600. The pressure transducer may be attached to the gauge port 826 using a hammer union.

Figure 78:
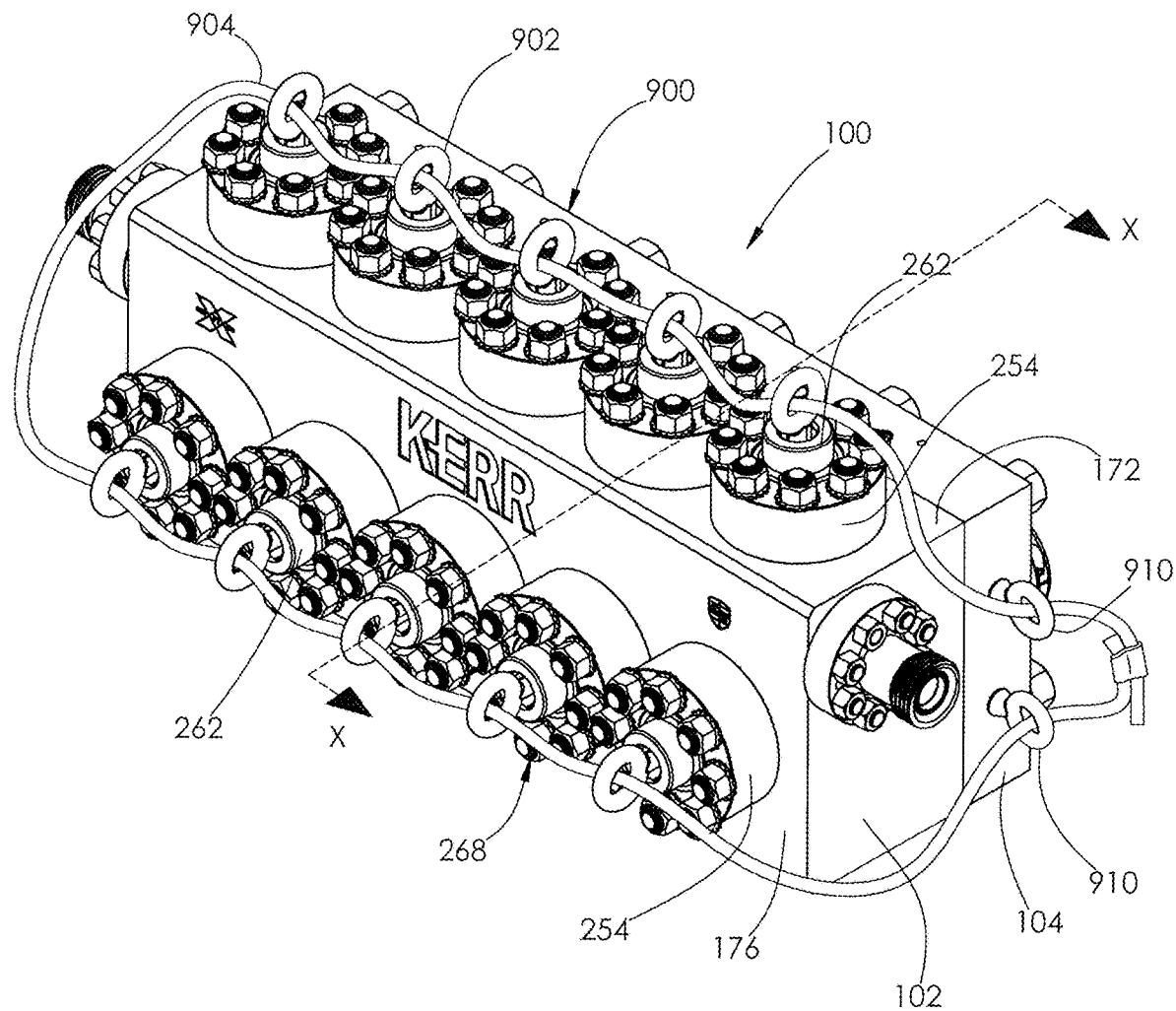
FIG. 78 is the front perspective view of the fluid end shown in FIG. 9, with an installed safety system.
Figure 79:
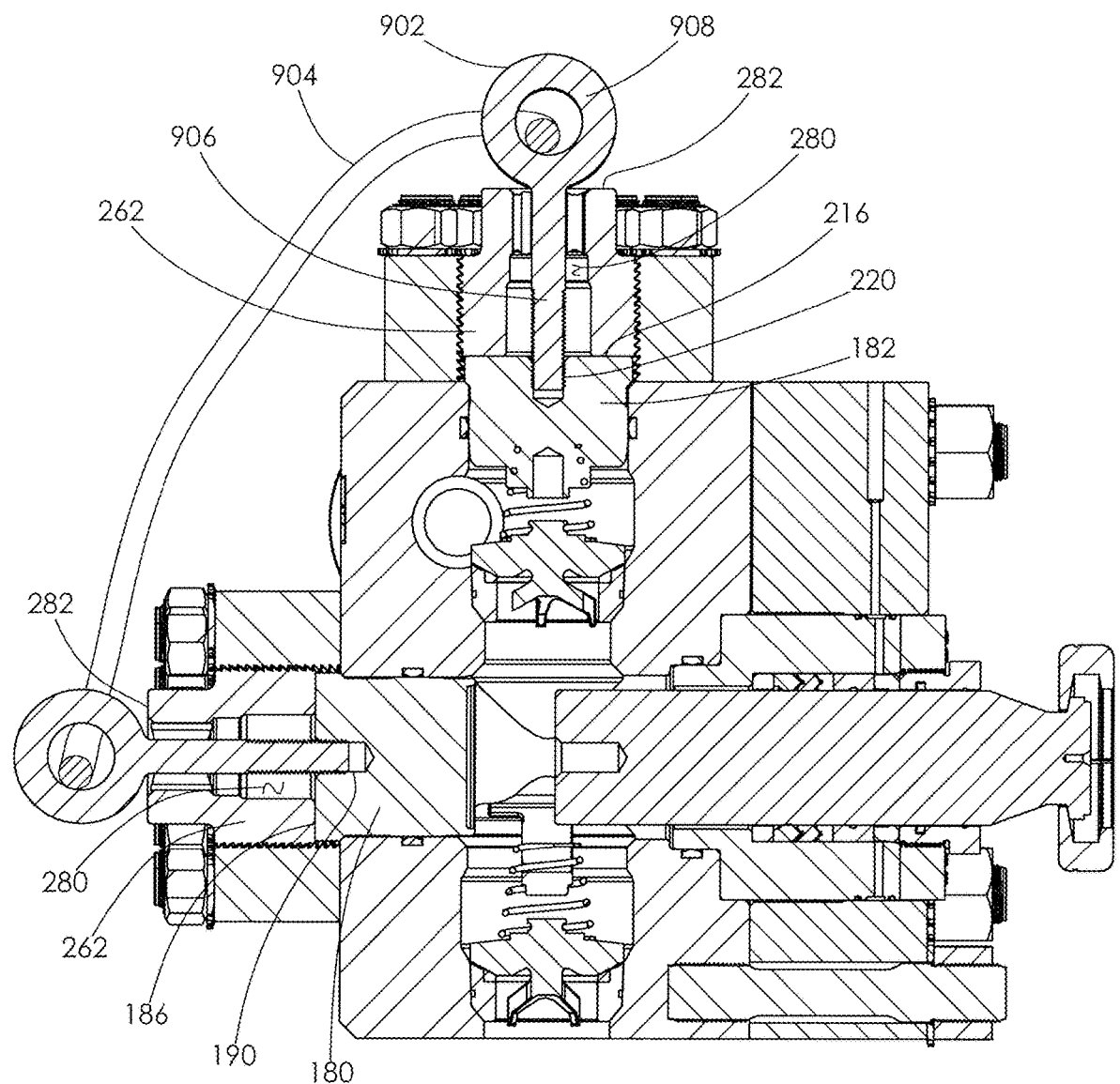
FIG. 79 is a cross-sectional view of the fluid end and safety system shown in FIG. 78, taken along a plane that includes line X-X.

With reference now to FIGS. 78 and 79, the fluid end 100 is shown with a safety system 900 installed on the front and top surfaces 176 and 172 of the fluid end body 102. If a failure occurs, high fluid pressure may propel installed or attached components away from the fluid end 100 at high speeds. The safety system 900 tethers the retainer 254, retainer nut 262, plug 180 or 182 and fastening system 268 to the fluid end body 102. Should a failure occur, the safety system 900 helps to prevent these components from becoming potentially airborne projectiles. The safety system 900 may also be used with the fluid end 500 or 600.

The safety system 900 comprises a plurality of eyebolts 902 and a cable 904. The eyebolts 902 each comprise a threaded end 906 and an opposed looped end 908, as shown in FIG. 79. The threaded end 906 of each eyebolt 902 is installed in the threaded hole 190 of each suction plug 180, and within the threaded hole 220 of each discharge plug 182. The threaded holes 190 and 220 are reached by way of the central opening 290 formed in each retainer nut 262. When installed, the looped ends 908 of the eyebolts 902 project above the top surface 282 of the retainer nuts 262.

A cable 904 is threaded through the looped ends 908 of the eyebolts 902. The cable 904 is preferably made of a strong and tough material, such as high-strength nylon or steel. The cable 904 may also be threaded through eyebolts 910 attached to the side surface of the fluid end 100, as shown in FIG. 78. The ends of the cable 904 may be secured together, as shown in the Figures, or each end may be secured to an eyebolt attached to the side surface of the fluid end 100.

Several kits are useful for assembling the fluid end 100, 500, or 600. A first kit comprises one of the fluid end bodies and connect plates described herein. The first kit may also comprise one of the fastening systems described herein for securing one of the fluid end bodies to one of the connect plates. Finally, the first kit may further comprise one of the discharge plugs, suction plugs, seals, retainers, retainer nuts, gauge port, fastening systems, removable stuffing box sleeves, plunger packings, packing nuts, plungers, clamps, safety system and/or any other components described herein.

The concept of a "kit" is described herein due to the fact that fluid ends are often shipped or provided unassembled by a manufacturer, with the expectation that an end customer will use components of the kit to assemble a functional fluid end. Accordingly, certain embodiments within the present disclosure are described as "kits," which are unassembled collections of components. The present disclosure also describes and claims assembled apparatuses and systems by way of reference to specified kits, along with a description of how the various kit components are actually coupled to one another to form the apparatus or system.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed. Changes may be made in the construction, operation and arrangement of the various parts, elements, steps and procedures described herein without departing from the spirit and scope of the invention as described in the following claims.

APPENDIX

Appendix Introduction

The various fluid end assemblies discussed herein in connection to FIGS. 1-79 may include various features discussed in Appendices A-J below. Each of these Appendices discuss different features that may be used alone or in combination in various embodiments of field ends. For example, in various embodiments, a fluid end includes one or more bolt-on retainers (discussed in connection to Appendix A), one or more tapered valve seats (discussed in connection to Appendix B), one or more valve seats having carbide inserts (discussed in connection to Appendix D and E), seals and sealing surfaces (discussed in connection to Appendix G), one or more plug configured to provide bore clearance (discussed in connection to Appendix I), and that has two-piece construction (discussed in connection to Appendix J).

Appendix A: Fluid End with Bolt-on Retainers

Fluid end assemblies are typically used in oil and gas operations to deliver highly pressurized corrosive and/or abrasive fluids to piping leading to the wellbore. The assemblies are typically attached to power ends run by engines. The power ends reciprocate plungers within the assemblies to pump fluid throughout the fluid end. Fluid may be pumped through the fluid end at pressures that range from 5,000-15,000 pounds per square inch (psi). Fluid used in high pressure hydraulic fracturing operations is typically pumped through the fluid end at a minimum of 8,000 psi; however, fluid will normally be pumped through the fluid end at pressures around 10,000-15,000 psi during such operations.

In fluid end assemblies known in the art, the fluid flow passages or bores formed within the fluid end body are typically sealed by inserting a plug into each bore. A large retaining nut is then installed into each bore above the plug. The retaining nuts typically thread into internal threads formed in the walls of each bore.

In operation, the high level of fluid pressure pumping throughout the fluid end may cause the retaining nuts to back off or unthread from their installed position. When a retaining nut unthreads from its installed position, the plug it was retaining may be displaced by fluid pressure. Displacement of the plug allows fluid to leak around the plug and erode the walls of the bore. The internal threads formed in the bores for engagement with the retaining nuts are also known to crack over time. Erosion of the bore walls or cracking of the internal threads typically requires repair or replacement of the fluid end.

A plurality of different fluid ends have bores sealed without threading retaining nuts into the walls of each bore. As a result, the fluid ends do not have internal threads formed in their bores proximate the bore openings. Removal of the internal threads eliminates the problems associated with the internal thread failures and the retaining nuts becoming unthreaded from the bores.

With reference to FIGS. 80 and 82, a fluid end 100 is shown. The fluid end A100 comprises a fluid end body A102 having a flat external surface A104 and a plurality of first and second bores A106, A108 formed adjacent one another therein, as shown in FIG. 80. The number of first bores 106 equals the number of second bores A108. Each first bore 106 intersects its paired second bore A108 within the fluid end body A102 to form an internal chamber A112, as shown in FIG. 82.

FIG. 80 shows five first and second bores A106, A108. In alternative embodiments, the number of sets of paired first and second bores in the fluid end body may be greater than five, or less than five. Thus, FIG. 83 shows a fluid end body that includes three sets of paired first and second bores. Each bore of each set of paired bores A106 and A108 terminates in a corresponding opening A110 formed in the external surface A104. The bores A106 and A108 and openings A110 exist in one-to-one relationship. A plurality of internally threaded openings A144 are formed in the body A102 and uniformly spaced around each bore opening A110, as shown in FIG. 80.

With reference to FIG. 82, each second bore A108 may have an intake opening A118 formed proximate the bottom end of the fluid end body A102. Each intake opening A118 is connected in one-to-one relationship to a corresponding coupler or pipe. These couplers or pipes are fed from a single common piping system (not shown). A pair of valves A120 and A122 are positioned within each second bore A108. The valves A120, A122 route fluid flow within the body A102. The intake valve A120 blocks fluid backflow through the intake opening A118. The discharge valve A122 regulates fluid through one or more discharge openings A126. A plurality of couplers A127 may be attached to each discharge opening A126 for connection to a piping system (not shown), as shown in FIG. 80.

With reference again to FIGS. 80-94, and the reference characters used there in, each of the components A128 and A130 comprises a first section A138 joined to a second section A140. The first section A138 has a footprint sized to cover the bore opening A110 and the second section A140 is configured for removable receipt within one of the bores A106, A108. In one embodiment, the first section A138 is an enlarged plate and the second section A140 is a plug sized to be closely received within one of the bores A106, A108. When the component A128 or A130 is installed within one of the bores A106, A108, the first section A138 engages with the external surface A104 of the body A102. This engagement prevents longitudinal movement of the second section A140 within the bore A106 or A108 as shown in FIG. 82.

With reference to FIG. 80, the first section A138 may be formed as a circular structure having a plurality of notches A142 cut from its outer periphery. When each of the first sections A138 is engaged with the external surface A104 of the body A102, each of the notches A142 partially surrounds one of the openings A144 spaced around each bore opening A110.

Continuing with FIGS. 80 and 82, once each component A128, A130 is installed in the fluid end body A102, each of the components A128, A130 is secured in place by a retainer element A132 in a one-to-one relationship. Each retainer element A132 has a footprint sized to fully cover the first section A138 of the components A128 and A130. The retainer elements A132 shown in FIG. 80 are flat and cylindrical. A plurality of openings A146 are formed about the periphery of each retainer element A132. Each opening A146 is alignable with a corresponding one of the openings A144 in a one-to-one relationship.

Each of the retainer elements A132 is secured to the fluid end body A102 using a fastening system A134. The fastening system comprises a plurality of studs A148, a plurality of washers A150, and a plurality of nuts A152. Each stud A148 is externally threaded adjacent its first end A149, while each opening A144 has internal threads that mate with those of the stud A148. Each stud A148 may be threaded into place within a corresponding one of the openings A144, in a one-to-one relationship.

Once a first stud A148 has been installed in the body A102 at its first end A149, its opposed second end A151 projects from the body's external surface A104. When each component A128 is positioned within its bore A106, each of its notches A142 at least partially surrounds a corresponding one of the studs A148. Likewise, when each component A130 is positioned within its bore A108, each of its notches A142 at least partially surrounds a corresponding one of the studs A148.

Each peripheral opening A146 formed in each of the retainer elements A132 is registerable with a corresponding one of the studs A148. The plurality of washers A150 and nuts A152 may be installed and torqued on each one of the studs A148. The plurality of washers A150 and nuts A152 hold the retainer element A132 against the first section A138 of the components A128, A130 and hold the first section A138 against the external surface A104 of the fluid end body A102. Because each of the retainer elements A132 is attached to the fluid end body A102 using the fastening system A134, no external threads are formed on the outer surface of each retainer element A132. Likewise, no internal threads are formed within the walls of each bore A106, A108.

With reference to FIGS. 81 and 82, a plunger end A154 of the fluid end A100 is shown. The plurality of first bores A106 terminate at openings A156 formed on the external surface A104 of the plunger end A154. An internal seat A159 is formed in the walls of each of the bores A106 proximate each of the bore openings A156. A plurality of threaded openings A161 are formed in each of the internal seats A159, as shown in FIG. 81.

A component A158 is positioned within each first bore A106 through each of the openings A156. Each of the components A158 is tubular and sized to be closely received within each bore A106. In one embodiment, the components A158 are stuffing box sleeves.

With reference to FIG. 82, each of the components A158 may have a first section A160 that joins a second section A162 via a tapered section A164. The first section A160 may have a larger diameter than the second section A162. When each of the components A158 are installed within each of the bores A106, the tapered section A164 engages a tapered seat A166 formed in the walls of each bores A106. This engagement prevents longitudinal movement of each component A158 within each bore A106. A seal A167 is positioned around the outer surface of the second section A162 of each of the components A158 in order to block fluid from leaking from the bores A106.

Once installed within the body A102, each component A158 is secured in place by a retainer element A170 in a one-to-one relationship. Each of the retainer elements A170 is sized to be closely received within each bore A106 and engage a top surface A171 of each component A158, as shown in FIG. 82. Each of the retainer elements A170 shown in FIG. 81 has a cylindrical body and a threaded central opening A172. A plurality of openings A174 are formed about the periphery of each of the retainer elements A170. The openings A174 are uniformly spaced around each central opening A172.

A plurality of ports A175 may be formed in an outer surface of each retainer element A170 that are orthogonal to the plurality of openings A174. At least one seal A176 may also be disposed around the outer surface of each of the retainer elements A170. The seal A176 helps block fluid from leaking from the bores A106.

Each of the retainer elements A170 is secured to the fluid end body A102 using a fastening system A178. The fastening system A178 comprises a plurality of threaded screws A180. The screws A180 may be socket-headed cap screws.

The fastening system A178 secures each retainer element A170 to each internal seat A159. When each retainer element A170 is positioned within each bore A106, each of the peripheral openings A174 is alignable with a corresponding one of the openings A161 in a one-to-one relationship. Each of the screws A180 is registerable within one of the openings A161 in the seat A159 and one of the peripheral openings A174 in the retainer element A170.

The screws A180 may be torqued as desired to tightly attach each of the retainer elements A170 to each internal seat A159 and securely hold each component A158 within each bore A106. Because each of the retainer elements A170 is attached to the fluid end body A102 using the fastening system A178, no external threads are formed on the outer surface of each of the retainer elements A170. Likewise, no internal threads are formed within the walls of each bore A106 on the plunger end A154 of the body A102.

Continuing with FIGS. 81-82, a plurality of packing seals A181 may be positioned within each of the components A158 and each of the retainer elements A170 to prevent fluid from leaking from the bores A106. At least one of the packing seals A181 may have a plurality of ports A179 formed in its outer periphery, as shown in FIG. 81. The ports A179 provide an exit for fluid trapped within the packing seals A181. Fluid exiting the ports A179 may exit the retainer element A170 through the ports A175.

A packing nut A182 may also be threaded into the central opening A172 of each of the retainer elements A170 in a one-to-one relationship. The packing nut A182 has a threaded section A183 joined to a body A184. The body A184 shown in FIG. 81 is cylindrical. However, the body A184 may also be square or rectangular shaped. A central passage A185 extends through the threaded section A183 and the body A184. The threaded section A183 of the packing nut A182 is threaded into the central opening A172 of the retainer element A170.

When installed within each of the retainer elements A170, each of the packing nuts A182 engages with and compresses the packing seals A181 installed within each component A158 and retainer element A170, as shown in FIG. 82. Compression of the packing seals A181 helps prevent fluid from leaking past the seals A181. A seal A186 may also be positioned within the central passage A185 of each of the packing nuts A182 to further seal fluid from leaking from the bores A106.

A plurality of holes A187 are formed around the outer surface of each of the packing nut bodies A184. The holes A187 serve as connection points for a spanner wrench that may be used to tightly thread the packing nut A182 into the central opening A172 of each of the retainer elements A170.

A plunger A188 may also be installed within each bore A106 in a one-to-one relationship. When a plunger A188 is installed within a bore A106, the plunger A188 is positioned within the component A158, the retainer element A170, and the packing nut A182, as shown in FIG. 82. Each of the plungers A188 projects from the plunger end A154 of the fluid end body A102 and is attached to a separate power end. As discussed above, the power end reciprocates each of the plungers A188 within the fluid end body A102 so as to pump fluid throughout the body. Each of the plungers A188 may be attached to the power end via a clamp A190 in a one-to-one relationship.

Several kits are useful for assembling the fluid end A100. A first kit comprises a plurality of the components A128 or A130, a plurality of the retainer elements A132, and the fastening system A134. A second kit may comprise the plurality of components A158, a plurality of the retainer elements A170, and the fastening system A178. The second kit may further comprise a plurality of the packing seals A181, a plurality of the packing nuts A182, and a plurality of the plungers A188. Each of the kits may be assembled using the fluid end body A102.

With reference to FIGS. 83 and 85, a second embodiment of a fluid end A200 is shown. The fluid end A200 comprises a fluid end body A202 having a flat external surface A204 and a plurality of first and second bores A206, A208 formed adjacent one another therein, as shown in FIG. 83. Each bore of each set of paired bores A206 and A208 terminates in a corresponding opening A210 formed in the external surface A204. A plurality of threaded openings A211 are formed in the body A202 and uniformly spaced around each opening A210. The internal functions of the fluid end A200 are identical to those described with reference to fluid end A100, shown in FIG. 82.

The fluid end A200 further comprises a plurality of sets of components A212 and A214. The number of sets may equal the number of set of paired first and second bores A206 and A208 formed in the body A202. The component A212 is positioned within a first bore A206, and the component A214 is positioned within its paired second bore A208. In one embodiment, the component A212 is a suction plug and the component A214 is a discharge plug.

Each of the components A212 and A214 is substantially identical in shape and construction, and is sized to fully block fluid flow within the respective bore A206, A208. A seal A216 is positioned around the outer surface of each component A212, A214 to block fluid from leaking from the bores A206, A208.

As shown in FIG. 83, a top surface A213 of each component A212, A214 may sit flush with the external surface A204 of the body A202 when installed within a respective bore A206, A208. Each of the components A212 and A214 may engage with internal seats (not shown) formed in the walls of each of the bores A206, A208. Such engagement helps prevent longitudinal movement of the components A212, A214 within the respective bore A206, A208.

Once installed within the fluid end body A202, each component A212 and A214 is secured in place by a retainer element A218 in a one-to-one relationship. Each of the retainer elements A218 has a footprint sized to cover a single bore opening A210. The retainer elements A218 shown in FIG. 83 are flat and cylindrical. A plurality of openings A220 are formed about the periphery of each retainer element A218. Each peripheral opening A220 is alignable with a corresponding one of the openings A211 in a one-to-one relationship, as shown in FIG. 83.

The retainer elements A218 are secured to the external surface A204 of the fluid end body A202 by a fastening system A222. The fastening system A222 comprises a plurality of externally threaded studs A224, a plurality of washers A226, and a plurality of internally threaded nuts A228. Each stud A224 is externally threaded adjacent its first end A230, while each opening A211 has internal threads that mate with those of the stud A224. Each stud A224 may be threaded into place within a corresponding one of the openings A211, in a one-to-one relationship.

Once a first stud A224 has been installed in the body A202 at its first end A230, its opposed second end A232 projects from the body's external surface A204. Each peripheral opening A220 formed in the retainer elements A218 is registerable with a corresponding one of the studs A224. The plurality of washers A226 and nuts A228 may be installed and torqued on each of the studs A224. The plurality of washers A226 and nuts A228 hold the retainer elements A218 against the external surface A204 of the fluid end body A202. Because each of the retainer elements A218 is attached to the fluid end body A202 using the fastening system A222, no external threads are formed on the outer surface of each retainer element A218. Likewise, no internal threads are formed within the walls of each bore A206 and A208.

With reference to FIGS. 84-85, a plunger end A234 of the fluid end A200 is shown. The plurality of first bores A206 terminate at openings A236 formed on the external surface A204 of the plunger end A234. The plunger end A234 of the fluid end body A202 is similar to the plunger end A154 of fluid end body A102, shown in FIGS. 81-82, except that an internal seat A159 is not formed within each bore A206. Instead, a plurality of internally threaded openings A238 are formed in the external surface A204 of the fluid end body A202 that are uniformly spaced around each bore opening A236.

A component A240 is positioned within each first bore A206 through each of the openings A236 in a one-to-one relationship. Each of the components A240 is tubular and sized to be closely received within each bore A206. In one embodiment, the components A240 are stuffing box sleeves.

With reference to FIG. 85, each of the components A240 may have a first section A242 that joins a second section A244 via a tapered section A246. The first section A242 may have a larger diameter than the second section A244. When each of the components A240 are installed within each of the bores A206, the tapered section A246 engages a tapered seat A248 formed in the walls of each bore A206. This engagement prevents longitudinal movement of each component A240 within each bore A206. A seal A250 is positioned around the outer surface of the second section A244 of each of the components A240 to block fluid from leaking from the bores A206.

Once installed within the body A202, a top surface A252 of each of the components A240 may sit flush with the external surface A204 of the body A202. Each of the components A240 is secured in place within each bore A206 by a retainer element A254 in a one-to-one relationship. The retainer elements A254 shown in FIG. 84 have a cylindrical body and a threaded central opening A256. A plurality of openings A258 are formed about the periphery of each of the retainer elements A254. The openings A258 are uniformly spaced around each central opening A256.

The retainer elements A254 are secured to the external surface A204 of the fluid end body A202 using a fastening system A260. The fastening system A260 comprises a plurality of threaded screws A262. The screws A262 may be socket-headed cap screws. When each retainer element A254 is positioned over each bore opening A236, each of the peripheral openings A258 is alignable with a corresponding one of the openings A238 in a one-to-one relationship. Each of the screws A262 is registerable within one of the openings A238 in the body A202 and one of the peripheral openings A258 in each of the retainer elements A254.

The screws A262 may be torqued as desired to tightly attach each of the retainer elements A254 to the body A202 and securely hold each of the components A240 within each bore A206. Because each of the retainer elements A254 is attached to the fluid end body A202 using the fastening system A260, no external threads are formed on the outer surface of each retainer element A254. Likewise, no internal threads are formed within the walls of each bore A206 on the plunger end A234 of the body A202.

Similar to the plunger end A154 shown in FIG. 81, a plurality of packing seals A264 may be positioned within each of the components A240. A packing nut A266 may thread into the central opening A256 of each retainer element A254 and compress the packing seals A264. A seal A267 may also be positioned within each packing nut A266. Additionally, a plurality of plungers A268 may be disposed within each component A240, retainer element A254, and packing nut A266. Each of the plungers A268 may be attached to a power end via a clamp A270.

In alternative embodiments, the components A212, A214, and A240 may not be flush with the external surface A204 of the body A202 when installed in the respective bores A206, A208. In such case, a flange or ledge may be formed on each of the retainer elements A218 or A254 on its side facing the component A212, A214, or A240. The flange or ledge may be installed within the bores A206, A208 so that it tightly engages the top surface A213 or A252 of the components A212, A214, or A240.

Likewise, if the components A212, A214, or A240 project from the external surface A204 of the body A202 when installed within the respective bores A206, A208, the retainer elements A218 or A254 can be modified to accommodate the component A212, A214, or A240. For example, a cut-out may be formed in the retainer element A218 or A254 for closely receiving the portion of the component A212, A214, or A240 projecting from the body A202. The area of the retainer element A218 or A254 surrounding the cut-out will engage the external surface A204 of the body A202.

Several kits are useful for assembling the fluid end A200. A first kit comprises a plurality of the components A212 or A214, a plurality of retainer elements A218, and the fastening system A222. A second kit may comprise the plurality of components A240, a plurality of the retainer elements A254, and the fastening system A260. The second kit may further comprise a plurality of packing seals A264, a plurality of packing nuts A266, and a plurality of plungers A268. Each of the kits may be assembled using the fluid end body A202.

Turning now to FIG. 86, a third embodiment of a fluid end A300 is shown. The fluid end A300 comprises a fluid end body A302 having a flat external surface A304 and a plurality of first and second bores A306, A308 formed adjacent one another therein. Each bore of each set of paired bores A306 and A308 terminates in a corresponding opening A310 formed in the external surface A304. A plurality of threaded openings A311 are formed in the body A302 and uniformly spaced around each bore opening A310. The internal functions of the fluid end A300 are identical to those described with reference to fluid end A100, shown in FIG. 82.

The fluid end A300 further comprises a plurality of sets of components A312 and A314. The number of sets, in some embodiments, equals the number of sets of paired first and second bores A306 and A308 formed in the body A302. The component A312 is positioned within a first bore A306, and the component A314 is positioned within its paired second bore A308. In one embodiment, the component A312 is a suction plug and the component A314 is a discharge plug. A seal A315 is positioned around each of the components A312, A314 to block fluid from leaking from the respective bores A306, A308.

The components A312 and A314 have the same shape and construction as the components A212 and A214 shown in FIGS. 83 and 85. Each of the components A312 and A314 may engage with internal seats (not shown) formed in the walls of each of the bores A306, A308. Such engagement helps prevent longitudinal movement of the components A312, A314 within the respective bores A306, A308.

Once installed within the body A302, a top surface A313 of each of the components A312, A314 may sit flush with the external surface A304 of the body A302. Each of the components A312, A314 is secured within each respective bore A306, A308 by a retainer element A316. Each of the retainer elements A316 shown in FIG. 86 is a large rectangular plate having a footprint sized to cover a plurality of adjacent bore openings A310 at one time. A plurality of openings A318 are formed in each retainer element A316 that are alignable with a corresponding one of the openings A311 in a one-to-one relationship.

Each of the retainer elements A316 is secured to the external surface A304 of the fluid end body A302 by a fastening system A320. The fastening system A320 comprises a plurality of externally threaded studs A322, a plurality of washers A324, and a plurality of internally threaded nuts A326. The fastening system A320 secures each of the retainer elements A316 on the fluid end body A302 in the same way as described with reference to the fastening system A222 used with the fluid end A200.

Because each of the retainer elements A316 is attached to the fluid end body A302 using the fastening system A320, no external threads are formed in the retainer element A316. Likewise, no internal threads are formed within the walls of each bore A306 and A308.

When the retainer elements A316 are installed on the fluid end body A302, the edges of the retainer element A316 may extend far enough so as to sit flush with the edges of the fluid end body A302. In alternative embodiments, the retainer element A316 may have different shapes or sizes. For example, the retainer element A316 may be large enough so as to cover an entire side surface of the fluid end body A302. Alternatively, the retainer elements A316 may have rounded edges, as shown in FIG. 87.

Turning to FIG. 87, a plunger end A330 of the fluid end A300 is shown. The plurality of first bores A306 terminate at openings A332 formed on the external surface A304 of the plunger end A330. A plurality of internally threaded openings A334 are formed in the external surface A304 that are uniformly spaced around each bore opening A332.

A component A336 is positioned within each first bore A306 through each of the openings A332. Each of the components A336 is tubular and sized to be closely received within each bore A306. In one embodiment, the components A336 are stuffing box sleeves. The components A336 have the same shape and construction as the components A240, shown in FIGS. 84-85.

Once installed within the body A302, a top surface A346 of each of the components A336 may sit flush with the external surface A304 of the body A302. Each of the components A336 is secured within each bore A306 by a single retainer element A348. The retainer element A348 shown in FIG. 87 is a large oval plate having a footprint sized to cover a plurality of adjacent bore openings A332 formed on the plunger end A330 of the fluid end body A302. A plurality of openings A350 are formed in the retainer element A348 that are alignable with a corresponding one of the openings A334 in a one-to-one relationship.

In alternative embodiments, the retainer element A348 may have different shapes or sizes. For example, the retainer element A348 may be large enough so as to cover an entire side surface of the fluid end body A302. Alternatively, the retainer element A348 may have squared edges, as shown in FIG. 86.

The retainer element A348 is secured to the external surface A304 of the fluid end body A302 by a fastening system A352. The fastening system A352 comprises a plurality of screws A354. The fastening system A352 secures the retainer element A348 on the fluid end body A302 in the same way as described with reference to the fastening system A260 used with the fluid end A200 and shown in FIGS. 84-85.

Because the retainer element A348 is attached to the fluid end body A302 using the fastening system A352, no external threads are formed in the retainer element A348. Likewise, no internal threads are formed within the walls of each bore A306.

A central threaded opening A356 is formed in the center of each grouping of openings A350 in the retainer element A348. The openings A356 are alignable with each bore opening A332 in a one-to-one relationship. A single packing nut A358 may thread into each central opening A356. A seal A359 may be positioned within each packing nut A358.

Similar to the plunger end A234 shown in FIGS. 84-85, a plurality of packing seals A360 may be positioned within each component A336. Each of the packing nuts A358 may compress the packing seals A360 when installed within the retainer element A348. A plurality of plungers A362 may be disposed within each component A336, the retainer element A348, and each packing nut A358. Each of the plungers A362 may be connected to a power end via a clamp A364. A cross-sectional view of the fluid end A300 looks identical to the cross-sectional view of the fluid end A200, shown in FIG. 85.

Several kits are useful for assembling the fluid end A300. A first kit comprises a plurality of the components A312 or A314, a retainer element A316, and the fastening system A320. A second kit may comprise a plurality of the components A336, a retainer element A348, and the fastening system A352. The second kit may further comprise a plurality of the packing seals A360, a plurality of the packing nuts A358, and a plurality of the plungers A362. Each of the kits may be assembled using the fluid end body A302.

With reference to FIGS. 88 and 90, a fourth embodiment of a fluid end A400 is shown. The fluid end A400 comprises a fluid end body A402 having a flat external surface A404 and a plurality of first and second bores A406, A408 formed adjacent one another therein, as shown in FIG. 88. Each bore of each set of paired bores A406 and A408 terminates in a corresponding opening A410 formed in the external surface A404. A plurality of threaded openings A411 are formed in the body A402 and uniformly spaced around each opening A410. The internal functions of the fluid end A400 are identical to those described with reference to fluid end A100, shown in FIG. 82.

The fluid end A400 further comprises a plurality of sets of components A412 and A414. The number of sets equals the number of set of paired first and second bores A406 and A408 formed in the body A402. The component A412 is positioned within a first bore A406, and the component A414 is positioned within its paired second bore A408. In one embodiment, the component A412 is a suction plug and the component A414 is a discharge plug. A seal A415 is positioned around the outer surface of each of the components A412, A414 to block fluid from leaking from the respective bores A406, A408.

The components A412 and A414 have substantially the same shape and construction as the components A212 and A214 shown in FIGS. 83 and 85. However, in contrast to the components A212, A214, each of the components A412 and A414 is joined to a single retainer element A416.

The components A412, A414 may be welded or fastened to the center of the back surface of each retainer element A416. Alternatively, each of the components A412 or A414 and a corresponding retainer element A416 may be machined as a single piece, as shown in FIG. 90. Each of the retainer elements A416 secures each of the components A412, A414 within the respective bores A406, A408. The retainer elements A416 also prevent the components A412, A414 from moving longitudinally within the respective bores A406, A408.

A plurality of openings A418 are formed about the periphery of each retainer element A416. Each peripheral opening A418 is alignable with a corresponding one of the openings A411 in a one-to-one relationship, as shown in FIG. 88.

The retainer elements A416 are secured to the external surface A404 of the body A402 using a fastening system A420. The fastening system A420 comprises a plurality of externally threaded studs A422, a plurality of washers A424, and a plurality of internally threaded nuts A426. The fastening system A420 secures the retainer elements A416 to the fluid end body A402 in the same way as described with reference to the fastening system A222 used with the fluid end A200.

Because the retainer elements A416 are attached to the fluid end body A402 using the fastening system A420, no external threads are formed in the retainer elements A416. Likewise, no internal threads are formed within the walls of each bore A406 and A408.

Turning now to FIGS. 89-90, a plunger end A430 of the fluid end A400 is shown. The plurality of first bores A406 terminate at openings A432 formed on the external surface A404 of the plunger end A430. A plurality of internally threaded openings A434 are formed in the external surface A404 that are uniformly spaced around each bore opening A432.

A component A436 is positioned within each first bore A406 through each of the openings A432. Each of the components A436 is tubular and sized to be closely received within each bore A406. In one embodiment, the components A436 are stuffing box sleeves. The components A436 have substantially the same shape and construction as the components A240, shown in FIGS. 84-85. However, in contrast to the components A240, each of the components A436 is joined to a single retainer element A438.

The components A436 may be welded or fastened to the center of the back surface of each retainer element A438. Alternatively, each of the components A436 and a corresponding retainer element A438 may be machined as a single piece, as shown in FIG. 90. Each of the retainer elements A438 secures each of the components A436 within the bores A406. The retainer elements A438 also prevent the components A436 from moving longitudinally within the bores A406.

A threaded central opening A440 is formed within each retainer element A438. A plurality of threaded openings A442 are formed about the periphery of each of the retainer elements A438 and are uniformly spaced around each central opening A440. Each peripheral opening A442 is alignable with a corresponding one of the openings A434 in a one-to-one relationship, as shown in FIG. 89.

The retainer elements A438 are secured to the external surface A404 of the body A402 using a fastening system A444. The fastening system A444 comprises a plurality of screws A446. The fastening system A444 secures the retainer elements A438 to the fluid end body A402 in the same way as described with reference to the fastening system A260 used with the fluid end A200 and shown in FIGS. 84-85.

Because the retainer elements A438 are attached to the fluid end body A402 using the fastening system A444, no external threads are formed in the retainer elements A416. Likewise, no internal threads are formed within the walls of each bore A406 on the plunger end A430 of the body A402.

Like the plunger end A330 of fluid end A300, the fluid end A400 may also comprise a plurality of packing seals A448, a plurality of packing nuts A450, each housing a seal A454, and a plurality of plungers A456. Each plunger A456 may be connected to a power end via a clamp A458.

Several kits are useful for assembling the fluid end A400. A first kit comprises a plurality of the components A412 or A414, a plurality of the retainer elements A416, and the fastening system A420. A second kit may comprise a plurality of the components A436, a plurality of the retainer elements A438, and the fastening system A444. The second kit may further comprise a plurality of the packing seals A448, a plurality of the packing nuts A450 and a plurality of the plungers A456. Each of the kits may be assembled using the fluid end body A402.

With reference to FIGS. 91-92, a fifth embodiment of a fluid end A500 is shown. The fluid end A500 comprises a fluid end body A502 having a flat external surface A504 and a plurality of first and second bores A506, A508 formed adjacent one another therein, as shown in FIG. 91. Each bore of each set of paired bores A506 and A508 terminates in a corresponding opening A510 formed in the external surface A504. A plurality of threaded openings A511 are formed in the body A502 and uniformly spaced around each opening A510. The internal functions of the fluid end A500 are identical to those described with reference to fluid end A100, shown in FIG. 82.

The fluid end A500 further comprises a plurality of sets of components A512 and A514. The number of sets equals the number of set of paired first and second bores A506 and A508 formed in the body A502. The component A512 is positioned within a first bore A506, and the component A514 is positioned within its paired second bore A508. In one embodiment, the component A512 is a suction plug and the component A514 is a discharge plug. The components A512 and A514 have the same shape and construction as the components A212 and A214 shown in FIGS. 83 and 85. A seal A516 is positioned around the outer surface of each component A512, A514 to block fluid from leaking from the bores A506, A508.

As shown in FIG. 91, a top surface A513 of each of the components A512, A514 may sit flush with the external surface A504 of the body A502 when installed within a respective bore A506, A508. Each of the components A512 and A514 may engage with internal seats (not shown) formed in the walls of each of the bores A506, A508. Such engagement helps prevent longitudinal movement of the components A512, A514 within the respective bore A506, A508.

Once installed within the fluid end body A502, each component A512 and A514 is secured in place by a retainer element A518 in a one-to-one relationship. Each of the retainer elements A518 has a footprint sized to cover a single bore opening A510. The retainer elements A518 shown in FIG. 91 are flat and cylindrical and each have a central threaded opening A519. A plurality of openings A520 are formed about the periphery of each retainer element A518 and are uniformly spaced around each central opening A519. Each peripheral opening A520 is alignable with a corresponding one of the openings A511 in a one-to-one relationship, as shown in FIG. 91.

The retainer elements A518 are secured to the external surface A504 of the fluid end body A504 by a fastening system A522. The fastening system A522 comprises a plurality of externally threaded studs A524, a plurality of washers A526, and a plurality of internally threaded nuts A528. The fastening system A522 secures the retainer elements A518 to the fluid end body A502 in the same way as described with reference to the fastening system A222 used with the fluid end A200 shown in FIGS. 83 and 85.

Each central opening A519 formed in each retainer element A518 is alignable with each corresponding bore opening A510 in a one-to-one relationship. A retaining nut A530 may thread into each central opening A519 to cover each bore opening A510. Using a threaded retaining nut A530 with the retainer element A518 allows access to each bore opening A510 without having to remove the retainer elements A518 from the fluid end body A502.

While the fluid end A500 uses a threaded retaining nut A530, the retaining nut A530 is not threaded into the walls of the bores A506, A508. Thus, any failures associated with the retaining nut A530 may be experienced in the retainer element A518, which is easily replaceable. This similar configuration is used on the plunger end A234 of the fluid end A200 shown in FIGS. 84-85. Such configuration is shown again on a plunger end A532 of the fluid end body A502 in FIG. 92.

A kit is useful for assembling the fluid end A500. The kit may comprise a plurality of the components A512 or A514, a plurality of the retainer elements A518, and the fastening system A522. The kit may further comprise a plurality of retaining nuts A530. The kit may be assembled using the fluid end body A502.

Turning now to FIG. 93, a sixth embodiment of a fluid end A600 is shown. The fluid end A600 comprises a fluid end body A602 having a flat external surface A604 and a plurality of first bores (not shown) and second bores A608 formed adjacent one another therein. Each bore of each set of paired bores terminates in a corresponding opening A610 formed in the external surface A604. A plurality of threaded openings A611 are formed in the body A602 and uniformly spaced around each opening A610. The internal functions of the fluid end A600 are identical to those described with reference to fluid end A100, shown in FIG. 82.

The fluid end A600 further comprises a plurality of sets of components A614. The component A614 is positioned within a second bore A608. The components positioned within each first bore are not shown in FIG. 93. However, such components are identical in shape and construction to the components A614.

The number of sets of components equals the number of set of paired first bores (not shown) and second bores A608 formed in the body A602. In one embodiment, the component positioned within a first bore is a suction plug, and the component A614 is positioned within its paired second bore A608 is a discharge plug. The components A614 have a substantially similar shape and construction as the components A212 and A214 shown in FIGS. 83 and 85, except that a threaded hole A616 is formed in a top surface A613 of each component A614. A seal A618 is positioned around the outer surface of each component A614 to block fluid from leaking from the bores A608.

The top surface A613 of each component A614 may sit flush with the external surface A604 of the body A602 when installed within a bore A608. Each of the components A614 may engage with internal seats (not shown) formed in the walls of each of the bores A608. This engagement helps prevent longitudinal movement of the components A614 within the bore A608. Likewise, the components positioned within the first bores (not shown) may engage internal seats formed within the walls of the first bores.

Once installed within the fluid end body A602, each component A614 is secured by a retainer element A620 in a one-to-one relationship. Likewise, the components positioned within the first bores (not shown) are each secured by one of the retainer elements A620. Each of the retainer elements A620 has a footprint sized to cover a single bore opening A610. The retainer elements A620 shown in FIG. 93 are flat and cylindrical and each have a central threaded opening A622. A plurality of openings A624 are formed about the periphery of each retainer element A620 and are uniformly spaced around each central opening A622. Each peripheral opening A624 is alignable with a corresponding one of the openings A611 in a one-to-one relationship.

The retainer elements A620 are secured to the external surface A604 of the fluid end body A602 by a fastening system A626. The fastening system A626 comprises a plurality of externally threaded studs A628, a plurality of washers (not shown), and a plurality of internally threaded nuts A630. The fastening system A626 secures the retainer elements A620 to the fluid end body A602 in the same way as described with reference to the fastening system A222 used with the fluid end A200 shown in FIGS. 83 and 85.

The fastening system A626 may further comprise a plurality of eye bolts A632, a plurality of handles A634, and a cable A636. Each eye bolt A632 has external threads A638 formed on its first end and an eye A640 formed on its opposite second end. The threaded end A638 of each eye bolt A632 threads into each hole A616 formed in each component A614 in a one-to-one relationship. Once installed within each hole A614, the eye A640 of each eyebolt A632 projects through the central opening A622 formed in each retainer element A620.

Each of the handles A634 has a threaded section A642 joined to a cylindrical body A644. A central passage A646 extends through the threaded section A642 and the body A644. Each of the threaded sections A642 may be installed within the central opening A622 of each of the retainer elements A620 such that each eye bolt A632 is disposed within the central passage A646. Once one of the handles A634 is installed in a retainer element A620, the eye bolt A632 projects from the handle A634. The handle A634 helps support the eye bolt A632 and provides a grip to assist in installation or removal of a retainer element A620 on the fluid end body A602.

The cable A636 may be disposed through each eye A640 of each eye bolt A632. Each of the eye bolts A632 may be oriented to facilitate the passage of the cable A636 through each eye A640. The ends of the cable A636 may be attached to the external surface A604 of the fluid end body A602 using eye bolts A650 and clamps A652. The cable A636 may be made of a stiff and tough material, such as high-strength nylon or steel.

In operation, the eyebolts A632 and cable A636 tether each of the retaining elements A620 and components A614, in case of failure of the retainer elements A620, a portion of the fastening system A626, or the fluid end body A602. When a failure occurs, the large pressure in the fluid end body A602 will tend to force the components A614 out of their respective bores A608 with a large amount of energy. The cable A636 helps to retain the components A614 within the bores A608 in the event of a failure. The cable A636 also helps to retain the retainer elements A620 in position in the event of a failure. The fastening systems A134, A222, A320, A420, and A522 used with fluid ends A100, A200, A300, A400, and A500 may also be configured for use with the eye bolts A632, handles A634 and cable A636.

In alternative embodiments, the handles A634 may not be used. A single eye bolt A632 may also be formed integral with a single component A614. A single cable A636 may also be used through each of the eyebolts A632. Each cable A636 would independently attach to the external surface 604 of the fluid end body A602.

Several kits are useful for assembling the fluid end A600. A first kit comprises a plurality of the components 614, a plurality of the retainer elements A620, and the fastening system A626. The kit may be assembled using the fluid end body A602.

With reference to FIGS. 80-93, a single fluid end body may use any combination of the kits described herein. The fluid end bodies, components, and retainer elements described herein may be made of high strength steel.

While the fluid end bodies A102, A202, A302, A402, and A502 shown in FIGS. 80-92 are substantially rectangular in shape, the kits described herein may also be used with any shape of a fluid end body, such as that shown in FIG. 93. Likewise, the retainer elements described herein may vary in shape and size, as desired. For example, the circular retainer elements described herein may be square or rectangular shaped.

The fastening systems A134, A222, A320, A420, and A522 described herein each use eight studs around each bore opening. In alternative embodiments, more than eight studs or less than eight studs may be used to secure each retainer element over each bore opening. For example, FIG. 93 only shows six studs securing each retainer element A620 over each bore opening A610. Likewise, fewer than 16 or more than 16 screws may be used with the fastening systems A178, A260, A352, and A444. The number of peripheral openings formed in each retainer element described herein may correspond with the number of openings formed around each bore opening in each fluid end body and the number of studs or screws being used.

The fastening systems described herein reduce the amount of torque required to secure each retainer element to the fluid end bodies. Rather than having to torque one large retaining nut, the torque is distributed throughout the plurality of studs, nuts, or screws. Decreasing the amount of torque required to seal the bores increases the safety of the assembly process.

Turning to FIG. 94, a stud A700 is shown. The stud A700 may be used with the fastening systems A134, A222, A320, A420, A522, and A626 shown in FIGS. 80, 83, 86, 88, 90, and 93. For exemplary purposes, the stud A700 will be described with reference to fluid end A100, shown in FIG. 80.

The stud A700 has a first threaded section A702 and an opposite second threaded section A704. The threaded sections A702 and A704 are joined by an elongate, cylindrical body A706. The first threaded section A702 is configured for threading into one of the plurality of threaded openings A144 formed in the fluid end body A102. The second threaded section A704 is configured for threading into the threaded opening formed in one of the nuts A152.

The first section A702 may have fewer threads than that of the opening A144. For example, if the opening A144 has 18 internal threads, the first section A702 of the stud A700 may only have 16 external threads. This configuration ensures that all of the threads formed on the first section A702 will be engaged and loaded when the first end A702 is threaded into the opening A144. Engaging all of the threads helps increase the fatigue life of the first end A702 of the stud A700. Likewise, the second section A704 may have fewer external threads than there are internal threads formed in the nut A152. The stud A700 may also be subjected to shot peening on its non-threaded sections prior to its use to help reduce the possibility of fatigue cracks. The stud A700 may have a smooth outer surface prior to performing shot peening operations.

The body A706 of the stud A700 comprises a first section A708 and a second section A710. The first section A708 has a smaller diameter than the second section A710. The retainer element A132 is primarily held on the first section A708 of the stud A700. The diameter of the second section A710 is enlarged so that it may center the washer A150 on the stud A700.

The diameter of the second section A710 is configured so that it is only slightly smaller than the diameter of the central opening of the washer A150. This sizing allows the washer A150 to closely receive the second section A710 of the stud A700 when the washer A150 is positioned on the stud A700. When the washer A150 is positioned on the second section A710, the washer A150 is effectively centered on the stud A700. The washer A150 is also effectively centered against the nut A152, once the nut A152 is installed on the stud A700.

Without placing the washer A150 on the second section A710, the washer may have to be manually centered on the stud A700 prior to installing the nut A152. If the washer A150 is not properly centered on the stud A700 or against the nut A152, it may be difficult to effectively torque or un-torque the nut A152 from the stud A700, depending on the type of washer used.

Figure 1:
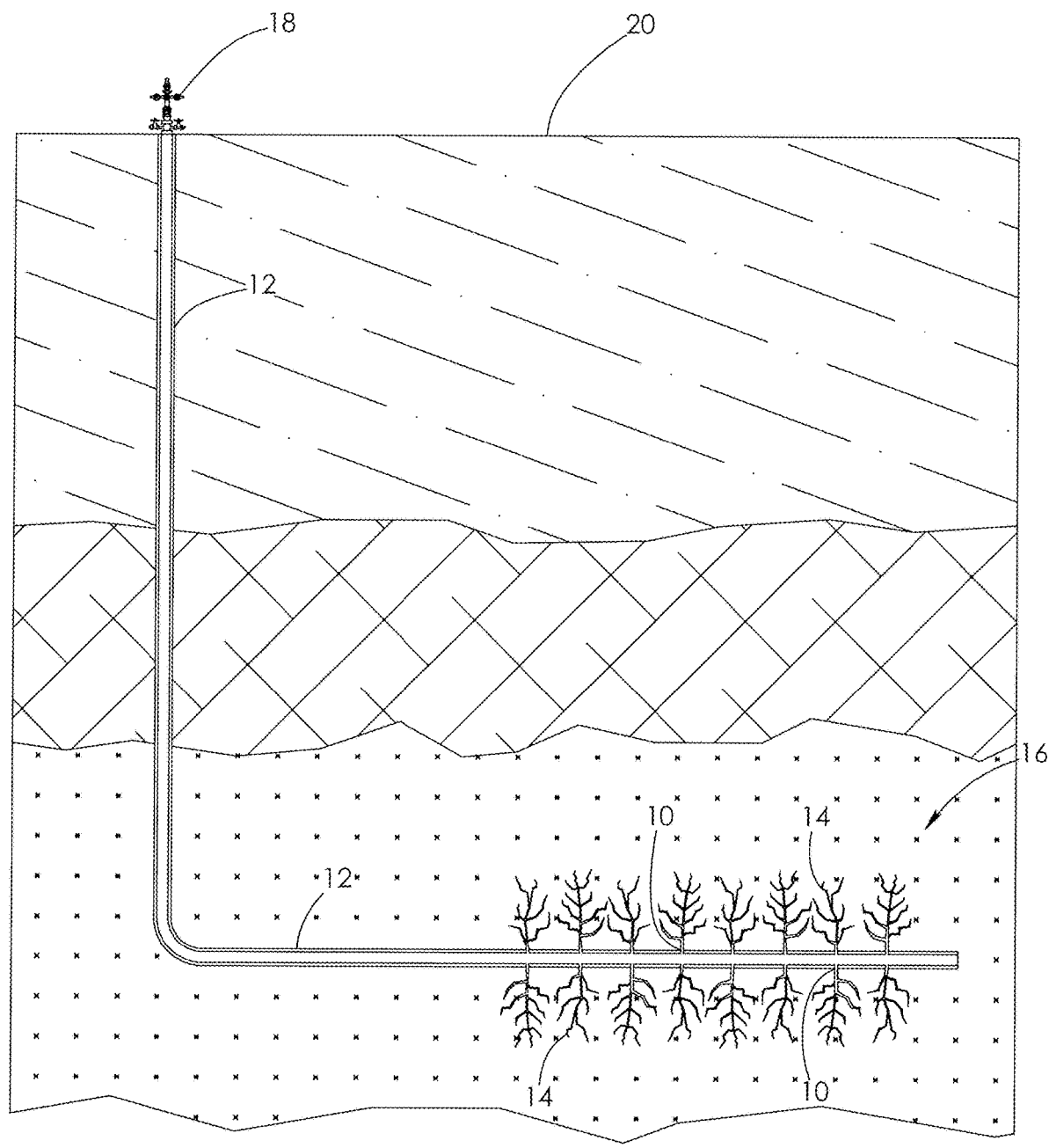
FIG. 1 is an illustration of the underground environment of a hydraulic fracturing operation.

FIGS. 95-102 illustrated another fluid end configuration, aspects of which may be employed in combination with the embodiments of FIGS. 1-94. Reference is made here to the reference indicators used in FIGS. 80-82, but the embodiments discussed below are also applicable to the corresponding portions of FIGS. 83-94. Like embodiments discussed above, the configuration shown in FIGS. 95-102 includes removable retainer elements A132 that are secured to the fluid end body A102 with a fastening system that includes, for example, eight nuts A152 and washers A150 arranged around the perimeter of the retainer element A132. As can be seen with respect to FIG. 101, however, the retainer elements A132 respectively include internally-threaded bores A106 and A108 configured to receive respective externally-threaded retainer nuts.

In this embodiment, to access a given fluid end bore A106, A108 (e.g., to perform field maintenance), a technician may first attempt to remove the retainer nut. If the retainer nut can successfully be removed and replaced, then interior access to the fluid end A100 may be accomplished without having to remove and replace the several fastening elements that hold the retainer element A132 in place. Accordingly, accessing the fluid end interior via the retainer nut rather than by removing the retainer element may take less time and may provide fewer opportunities for technician error (e.g., by reducing opportunities to incorrectly thread or apply incorrect torque to the fasteners).

As with many surfaces exposed to the harsh interior environment of the fluid end A100, however, the surfaces between the retainer nut and the retainer element A132 may become a point of failure. For example, the threads may foul during operation such that the retainer nut cannot readily be removed in the field, or erosion may cause leakage to occur around the threads. If the retainer nut were threaded directly into the body of the fluid end, such a failure would likely not be repairable in the field-necessitating transport of the fluid end for service—and in the worst case, could result in the loss of the entire fluid end. By threading the retainer nut into the removable retainer element A132, however, many instances of thread failure can be repaired by simply removing and replacing the retainer element A132 and retainer nut. Such an operation could readily be performed in the field, reducing fluid end downtime. Moreover, the cost of replacing the removable retainer element A132 and retainer nut is considerably less than replacing the entire fluid end A100, reducing cost of operations.

Appendix B: Tapered Valve Seats

The following paragraphs will discuss valve seats for use, for example, with the fluid end of FIGS. 80-94. For the purposes of the following description of FIGS. 103-110, reference numerals exclusive to those Figures will be used.

With reference to FIGS. 103, 104 and 107, shown therein is a fluid end B100. A fluid end B100 is the flow control sub-assembly of a high-pressure reciprocating piston pump. Pumps of this type are used in the oil industry to provide high pressure for tasks such as drilling, formation stimulation, also known as fracking, and completed well servicing. They are often referred to as high pressure hydraulic fracturing pumps. The most common design of such a pump includes two sub-assemblies, the power end (not shown) and the fluid end 100.

The power end converts the rotational input of a drive source to the reciprocating linear motion of pistons B170, usually with a crankshaft arrangement. The internal components of the power end are enclosed in a relatively clean, lubricated environment and have a much longer service life than the components of the fluid end.

The fluid end B100 controls the flow of the fluid pressurized by the pistons B170. The pistons B170 are attached to the crank rods of the power end. The sealing integrity of fluid ends must withstand not only high operating fluid pressures, presently 15,000 pounds per square inch and higher, but also must do so while controlling the flow of corrosive and/or abrasive fluids that are notorious for eroding the internal components of typical fluid ends. This abrasiveness and/or corrosiveness, combined with high flow rates used in standard service, dramatically shorten the life of typical fluid ends when compared to that of typical power ends.

Fluid ends B100 typically have from two to five or more identical sections consisting of components that accomplish the purpose described above. Each fluid end comprises valves B104. The valves B104 control the inlet of low pressure fluid and outlet of high pressure fluid from each fluid end B100 section.

The valves B104 are typically identical and are an assembly that has a body B120, a return mechanism, such as a spring B112, and a sealing face B114 formed on the body. The valves B104 are positioned within the inlet and outlet sections to control fluid flow in and out of the fluid end B100. As shown in FIGS. 94, 103 and 107, the valve B104 is in an inlet section B102 of the fluid end B100.

Each sealing face B114 seals against a valve seat. A valve seat is typically a tube that has been hardened, or is made of harder material than the fluid end, that is installed in the inlet and outlet sections of the fluid end. The valve seat and provides a hardened sealing surface for the sealing face B114 of the valve B104 to seal against. Without the hardened sealing surface of the valve seat the area would quickly erode reducing the service life of the fluid end.

Recent developments in the energy exploration industry require an increased maximum sustained pressure in pumps from around 8,000 psi to 15,000 psi or more with expected maximum spikes up to 22,500 psi. This increase in maximum pressure causes failures in components not seen at lower pressures. Typical failures now include the failure of valves due to erosion of the valve sealing face 114 and seat sealing face 118 which is accelerated by the large closing forces of the valve sealing face against the valve seat sealing face. When either sealing face fails leakage occurs around the component. Leakage reduces the maximum pressure and flow capabilities of the system. Leakage of an abrasive fluid at such high pressures quickly erodes the area requiring repair or replacement of the entire fluid end. A fractured fluid end body is always a catastrophic failure requiring replacement.

Efforts to eliminate the erosion of the valve sealing face have included hardening both sealing faces. The mating hardened surfaces provide an improved seal and allow the system to operate as desired. However, the impact of the hardened valve sealing face against the valve seat sealing face increases the erosion rate of both surfaces due to the closing force imparted to the valve by the valve return spring and the internal pressures of the fluid end. This failure occurs in an unacceptably short time requiring repair or replacement of the valve and/or the valve seat. Improvements are needed in the internal sealing of fluid ends to increase operating life while reducing downtime and operating cost.

With reference to FIG. 103, fluid end B100 comprises a prior art valve seat B108. The inlet passage, or port B102 is shown with the valve B104 in the closed position. The valve B104 body B120 has an alignment structure B106 and a protrusion B110. The alignment structure B106 assists in maintaining proper valve B104 orientation to a valve seat B108 when in operation. Protrusion B110 centers a coil spring B112 that is typically used to apply a closing force to the valve B104 during operation. When the valve B104 is closed by the coil spring B112, the valve sealing face B114 contacts the valve seat B108.

The valve seat B108 is installed in the inlet port B102. Typically, the valve seat B108 is precisely machined to fit in the fluid end B100. This fit may be close enough to prevent the gap between the seat B108 and fluid end B100 from leaking. It is typical to have a seal located in a seal groove B122 on the outside diameter of the seat B108 to keep the joint from leaking. The valve seat B108 is installed by inserting it into an appropriately sized fluid passage bore B150 in the inlet port B102 of the fluid end B100. The valve seat B108 has a tapered flange B130. The valve seat flange B130 bottoms out on the valve seat bore B150.

The seat B108 defines a sealing surface B118 that is complementary to the sealing surface B114 of the body B120. The valve sealing surface B114 contacts the seat sealing surface B118 stopping fluid flow.

The valve seat flange B130 resists the tendency of the valve seat B108 to be driven deeper into the inlet port B102 by the forces produced by the fluid end. These flanges B130 typically form the upper portion of a valve seat B108. As shown, the flange B130 meets the remainder of the valve seat B108 at a transition point B124. The transition point B124 may be the apex of a ninety degree to one hundred eighty degree external angle on the outer surface of the valve seat B108. In all such valve seats B108, the transition point has an external angle of less than one hundred eighty degrees.

There is a stress concentration at the transition point B124 which is a typical failure point. Attempts to reduce the stress concentration by adding a stress relief groove have been unsuccessful. A sharp transition at the flange additionally produces a stress concentration in the fluid end B100 body and increases the likelihood of cracking the internal wall of the fluid end B100 body in that area. Typically, the wall thickness of the fluid end 100 body has been increased in this area to reduce these failures however size and cost restraints prevent adequate increases in the wall thickness.

The sealing surface B114 may be hardened by a post manufacturing process, such as nitriding or flame hardening, or is manufactured from a hard material such as carbide. It is advantageous to have the hardened valve sealing surface B114 to minimize erosion. Seat B108 may also have the seat sealing surface B118 hardened by a post manufacturing process like those performed on the valve sealing surface B114. However, the press fit or close fit method of installation combined with the residual stresses from the post manufacturing process make it extremely difficult to install the seat B108 without breaking it. Because of these installation difficulties, seat B108 is typically made entirely of carbide or some other hard material thus reducing, but not eliminating, installation difficulties.

A valve insert B116 may be placed in the body B120 at the sealing surface B114, and may be either permanently attached or replaceable. The valve insert B116 can be made of any of a number of elastomeric materials. The purpose of valve insert B116 is to provide more sealing capability for the valve B104. While the primary sealing is accomplished by the metal to metal contact of the valve sealing surface B114 to the seat sealing surface B118, it is advantageous to have the elastomeric material encapsulate and seal around any solids trapped between the valve insert B116 and the seat sealing surface B118.

During operation the valve B104 reciprocates axially between open and closed positions. In the open position fluid flow occurs and in the closed position fluid flow is blocked. As the valve B104 moves from the open position to the closed position the valve insert B116 contacts the seat sealing surface B118 first and deforms around any trapped solids. Once the valve insert B116 deforms, or compresses, axially the valve sealing surface B114 contacts the seat sealing surface B118 and stops moving. Erosion occurs with each cycle in large part due to the impact of the valve sealing surface B114 on the seat sealing surface B118.

The repeated impacts of both sealing surfaces B114, B118 erode only in the area that the two surfaces B114, B118 contact each other and are typically the point of failure. Repair of the fluid end B100 requires the replacement of both the valve B104 and the seat B108. The replacement cost of a carbide seat B108 is very expensive and the industry can benefit from an improvement that reduces this cost.

With reference to FIG. 104-106B, the fluid end 100 contains an improved valve seat B302. The valve seat B302 has no flange B130 (FIG. 103). Rather, as best shown in FIGS. 105A and 18B, the valve seat has a body B304 with an annular ring portion B306 and a tapered lower portion B312. The annular ring portion B306 has an outer surface B308 that is substantially cylindrical and an inner surface B310 that is substantially complementary to a cylinder. A slight taper may be used on the outer surface B308 of the annular ring portion B306.

A seat sealing surface B314 is disposed at a first extremity of the annular ring portion. The sealing surface B314 is complementary to the valve sealing surface B114 of the valve B104 body B120.

The tapered lower portion B312 generally is defined by a continuation of the inner surface B310, but having a tapered outer surface B316. The internal bore B150 has an internal taper B152 that corresponds to the tapered portion B312 of the valve seat B302 body B304. The tapered outer surface B316 and outer surface B308 meet at a transition point B350. The transition point B350 has an external angle of greater than one hundred eighty degrees. Thus, the transition point B350 has reduced stress as compared to that of the prior art.

The tapered portion B312 terminates at a bottom surface B320 of the valve seat B302. As shown, the bottom surface B320 does not contact the internal bore B150 of the fluid end B100. Thus, the force applied through the valve seat B302 to the fluid end B100 body is provided at the internal taper B152 of the internal bore B150. The geometry of valve seat B302 eliminates any transition that would provide a stress concentration point thus increasing the service life of the valve seat B302. Stress applied through the valve seat B302 is evenly distributed on internal taper B152 and tapered outer surface B316, rather than being concentrated at a transition.

FIGS. 106A and 106B show an alternative valve seat B402. The valve seat B402 is largely identical to seat B302, but the tapered portion B312 has a tapered inside diameter B403. The tapered inside diameter B403 tends to reduce turbulent flow within the valve seat B402, reducing erosion on the inner surface B310 of the seat B402.

With reference to FIG. 107, an alternative valve B204 and valve seat B208 are shown in an inlet port B102 of the fluid end B100. The valve seat B208 has generally the same geometry as valve seats B302, B402. However, valve seat B208 comprises an insert B220 disposed in the seat sealing surface B218.

The valve B204 comprises a valve sealing surface B214. The valve sealing surface B214 may be hardened by a post manufacturing process, such as nitriding or flame hardening, or may alternatively be manufactured from a hard material such as carbide. It is advantageous to have the hardened valve sealing surface B214 to minimize erosion. The area of the valve sealing surface B214 is larger than that of typical valves, such as the previously attempted solution described above. The larger surface B214 distributes the impact force about a greater area, reducing the impact force at any particular point on the two sealing surfaces B214, B218. Distributing the closing force reduces the amount of erosion caused by the impact force.

A valve insert B216, made of a deformable elastomeric material, may be formed on a portion of the valve sealing surface B214. Valve insert B216 may be similarly formed to insert B116 in FIG. 103, or other known inserts.

In one embodiment, the valve seat B208 is made of stainless steel or other corrosion resistant material. Typically, however, such material is not hard enough to adequately protect against erosion. Therefore, the seat insert B220 is made of a hardened material, such as tungsten carbide, to resist erosion at the location of repeated contact with the valve sealing surface B214. Seat insert B220 is installed in seat B208 and retained by interference fit, a taper lock design or the like. The insert B220 defines a seat insert sealing surface B222 that is complementary to the valve sealing surface B214.

During operation the valve B204 reciprocates axially between open and closed positions. In the open position fluid flow occurs and in the closed position fluid flow is blocked. As the valve B204 moves from the open position to the closed position the valve insert B216 contacts the seat sealing surface B218 first and deforms around any trapped solids. Once the valve insert B216 deforms, or compresses, axially the valve sealing surface B214 contacts the seat insert sealing surface B222 and stops moving.

As shown in FIGS. 108A-108C, the seat insert B220 may be characterized by different shapes. The seat insert B220, at the top cylindrical portion, has a larger outer diameter. The sum of the seat insert sealing surface B222 and the seat sealing surface B218, has a larger surface area than conventional valve seats. As discussed with respect to valve sealing surface B214 area, the larger area allows for less force per unit area between the sealing surfaces B214, B218, B222 without reducing the closing force. An additional advantage of the increased outer diameter is that the seat insert B220 may now be installed without decreasing the seat B208 wall thickness to a point where premature failure of the seat B208 will occur.

Additional embodiments are shown in FIGS. 108B and 108C. These embodiments illustrate variations in the installation and retention methods of the seat insert B220 in the seat B208.

Any seat B208 having a separate component that is harder than the base material of the seat and is approximately complementary to the valve sealing surface B218 is contemplated. For instance, the seat insert B220 could be the outer diameter of the seat B208 and the inner diameter used to attach the seat insert to the seat by threading, interference fit or the like. This would require the valve sealing surface to also be the outer diameter portion of the valve and the valve insert to be the inner portion of the valve.

As shown in FIGS. 109A and 109B, a valve seat B500 has an outer surface B504 that may not match the bore B150 of the fluid end B100 precisely. In this embodiment, a valve seat B500 has an annular ring portion B502 with an outer surface B504 and a tapered portion B505 with a tapered portion outer surface B506. The outer surface B504 of the valve seat B500 differs from that of FIG. 104 and FIG. 107, as the angle of the outer surface relative to the internal bore 150 changes more than once along its length. Further, the outer surface B504 only partially conforms to the internal bore B150.

In one embodiment, a first outer surface section B510 and a second outer surface section B512 meet at an angle at transition B514. Transition B514 is generally disposed on a curve around the external surface B504 of the seat B500. It should be understood that the valve seat B500 generally conforms to the bore B150 at the second outer surface section B512 and abuts the bore when seated. In one embodiment, the second outer surface section may be press fit against the bore B150.

As shown best in FIG. 109B, the change in the taper of outer surface B504 at the transition B514 causes the fully seated valve seat B500 to define a gap B520 between the first outer surface section B510 and the bore B150. In one embodiment, the first outer surface section B510 may be offset from the bore B150 by less than 5 degrees. This angle may be less than one degree. It should be understood that the external angle between the first outer surface section B510 and the second outer surface section B512 at the transition B514 is just greater than one hundred eighty degrees. In one embodiment, the external angle at transition B514 is between one hundred eighty and one hundred ninety degrees.

The second outer surface section B512 and the tapered portion outer surface B506 both fully seat against the bore B150. However, gap B520 reduces the tendency of the valve seat B500 to become lodged within the fluid end B100 after repeated impacts between the valve seat B500 and the valve body B120. Therefore, the small gap B520 dramatically improves the ease of removal and replacement of the valve seat B500.

Thus, in the embodiment of FIG. 110, the valve seat B500 comprises a tapered portion B505, an intermediate portion B540, and a strike face portion B545, each defined by the shape of its outer surface. Generally, a transition point B350 defines the boundary between the tapered portion B505 and intermediate portion B540, while the transition B514 defines the boundary between the intermediate portion B540 and strike face portion 545.

First, the tapered portion B505 is defined by the tapered portion outer surface B506 and an inner surface B550. The inner surface B550 may comprise a surface complementary to the outer surface of a cylinder, or may have an inverse tapered portion or bevel B552 as shown. The inner surface B550 and tapered portion outer surface B506 terminate at the flat bottom surface B320. In the embodiment of the valve seat B500 shown in FIG. 109A, the entire tapered portion outer surface B506 engages the bore B150. None of the bottom surface B320 seats on the bore B150.

Second, the intermediate portion B540 is defined by the inner surface B550 and the second outer surface section B512. The intermediate portion should be of substantially constant thickness, outer diameter, and inner diameter; though a minor taper from the transition B514 to the transition B350 may exist. The taper of the intermediate portion B540 is significantly less per unit length than the taper of the tapered portion B505.

Third, the strike face portion B545 is defined by the inner surface B550, including a portion of the insert B530 that conforms to the inner surface, and the first outer surface section B510. The strike face portion B545 has a strike face B535 which conforms to a surface of the valve body B120. A recess B555 conforms to the insert B530 for seating the same. The portion of the insert B530 forms a part of the strike face B535.

The strike face B535 and inner surface B550 both include, in part, the insert B530. The insert B530 conforms to adjacent surfaces along the strike face B535 and inner surface B550. In the embodiment of FIG. 110, the insert B530 is only disposed in the strike face portion B545. In the embodiment of FIG. 110, the first outer surface section B510 is substantially cylindrical in shape while the adjacent bore B150 has a slight taper (roughly matching second outer surface section B512). Therefore, the strike face section B545 does not contact the bore B150, forming gap B520 (FIG. 109B).

Modifications to this geometry could be made, for example, if the bore B150 abutting the annular ring section B502 is complementary to a cylinder, the first outer surface section B510 could taper slightly inward to generate gap B520.

The strike face portion B545 does not engage the bore B150 at any point. Thus, all bore engagement between the valve seat B500 and bore B150 takes place at the tapered portion B505 and intermediate portion B540.

As shown best in FIG. 110, the entire valve seat B500, inclusive of the insert B530, is ring-shaped, and is defined by a cross-section that has no concave angles. Eliminating concave angles enhances the strength of the valve seat and prevents failure at weak points, such as the weak point at transition B130 (FIG. 103).

Appendix C: Stem Guided Valves

In FIGS. 111-124, an embodiment of a stem guided valve is shown. Such a valve may be used with the tapered valve seat (Appendix B) and in the fluid end described herein. For the purposes of the following description of FIGS. 111-124, reference numerals exclusive to those Figures will be used.

Figure 111:
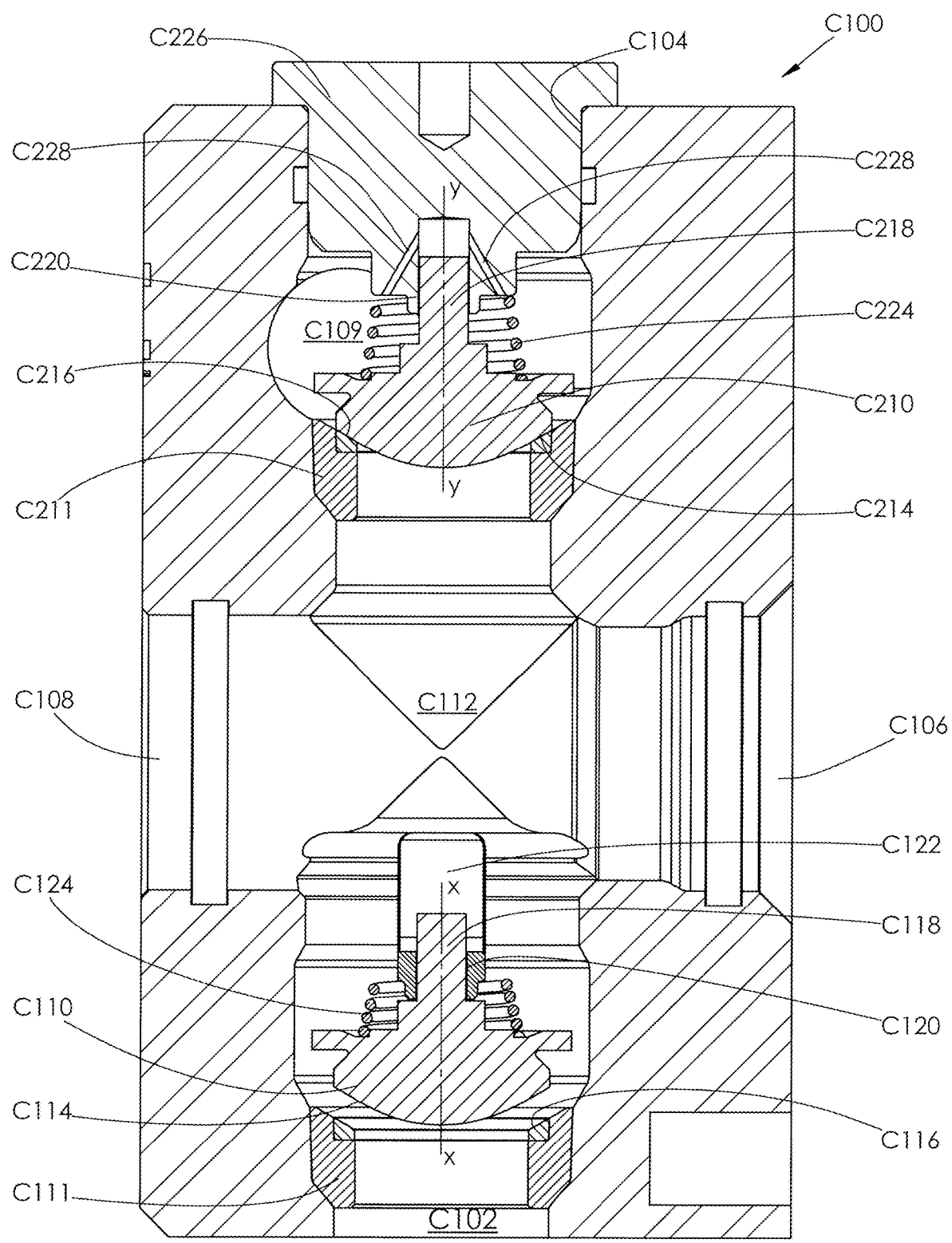

With reference to FIGS. 111-113, a fluid end body C100 having an inlet port C102, a discharge port C104, a plunger port C106, and a service port C108 is shown. An outlet port C109 is positioned adjacent the discharge port C104. Fluid enters the fluid end body C100 through the inlet port C102 and exits through the outlet port C109. The plunger port C106 contains a plunger (not shown) to pump fluid through the fluid end body C100. The ports C102, C104, C106, and C108 each open into bores that join at a pressure chamber C112.

A first male stem guided valve C110 having a central axis x-x is shown positioned above the inlet port C102 in FIGS. 111 and 113. The valve C110 seals against a valve seat C111. The valve seat C111 has a central opening that is concentric with the inlet port C102. The valve C110 has a sealing surface C114 formed on its bottom, and the valve seat C111 has a sealing surface C116 formed on its top. When the surfaces C114 and C116 engage, the valve C110 blocks fluid from passing from the inlet port C102 to the pressure chamber C112. The valve C110 is considered in the closed positioned when the sealing surfaces C114 and C116 are engaged.

The valve C110 is shown in the open position in FIGS. 111 and 113. The valve sealing surface C114 is axially spaced from the seat sealing surface C116 in the open position. Fluid may flow through the inlet port C102, around the valve C110 and into the pressure chamber C112 when the valve C110 is in the open position.

The valve C110 has a stem C118 projecting from its top opposite its sealing surface C114. A valve retainer C122 may be positioned in the fluid body C100 above the stem C118. The valve retainer C122 has a U-shape. The top edges of the retainer C122 sit within a valve groove C123 formed in the walls of the fluid end body C100, as shown in FIG. C26. A guide bore C120 is formed within the valve retainer C122. The guide bore C120 opens on opposite sides of the bottom of the retainer C122. As best shown in FIG. 113, the stem C118 may extend entirely through the bore C120 and project out of the top surface of the retainer C122. The stem C118 may be received within in the guide bore C120 of the valve retainer C122. In operation, the stem C118 may move axially along axis x-x within the guide bore C120. The guide bore C120 operates to maintain the orientation of the valve sealing surface C114 relative to the seat sealing surface C116. Because the bore C120 is open on both ends, any fluid within the bore may drain from the bore during operation.

A spring C124 is shown in FIG. 111 positioned on the top side of the valve C110. The spring C124 is not shown in FIG. 113 for clarity. The force applied by the spring C124 to the top of the valve C110 biases the valve C110 to the closed position. The position of valve C110 is determined by the difference in fluid pressure between the inlet port C102 and the fluid chamber C112. The valve C110 will be open if the force applied to the bottom of the valve C110 due to fluid pressure at the inlet port C102 is greater than the force applied to the top of the valve C110 due to fluid pressure in the chamber C112 plus the additional force applied by the spring C124. In contrast, the valve C110 will be closed when the force applied to the bottom of the valve C110 due to fluid pressure at the inlet port 102 is less than the force applied to the top of the valve C110 due to fluid pressure in the chamber C112 plus the additional force applied by the spring C124.

With reference to FIGS. 111 and 112, a second male stem guided valve C210 having a central axis y-y is shown positioned within the bore below the discharge port C104. Axis y-y may be collinear with axis x-x of valve C110 but is not required to be. The discharge port C104 is shown sealed by a discharge plug C226. The valve C210 is shown in the closed position. When in the closed position, the valve C210 blocks fluid from exiting the fluid end body C100 through the outlet port C109.

Like valve C110, valve C210 seals against a valve seat C211. The valve seat C211 has a central opening that opens into the chamber C112. The valve C210 has a sealing surface C214 formed on its bottom and the valve seat C211 has a sealing surface C216 formed on its top. The valve sealing surface C214 is in contact with the seat sealing surface C216 in the closed position.

The valve C210 has a stem C218 projecting from its top opposite sealing surface C214. A guide bore C220 is formed in the discharge plug C226. The stem C218 may be received within the guide bore C220. In operation, the stem C218 may move axially along its y-y axis within the guide bore C220. The guide bore C220 and the stem C218 operate to maintain the orientation of the valve sealing surface C214 relative to the seat sealing surface C216.

A spring C224 is shown in FIG. 111 positioned on the top side of the valve C210. The spring is not shown in FIG. 112 for clarity. The force applied by the spring C224 to the top of the valve C210 biases the valve C210 to the closed position. The position of valve C210 is determined by the difference in fluid pressure between the outlet port C109 and the fluid chamber C112. The valve C210 will be open if the force applied to the bottom of the valve C210 due to fluid pressure in the chamber C112 is greater than the force applied to the top of the valve C210 due to fluid pressure in the outlet port C109 plus the additional force applied by the spring C224. In contrast, the valve C210 will be closed when the force applied to the bottom of the valve C210 due to fluid pressure in the chamber C112 is less than the force applied to the top of the valve C210 due to fluid pressure at the outlet port C109 plus the additional force applied by the spring C124.

In operation, fluid may enter the guide bore C220 formed in the discharge plug C226. The fluid may reduce the range of motion of the stem C218 within the guide bore C220. A decrease in the range of motion of the stem C218 may lead to restricted fluid flow throughout the fluid end body C100, erosion of the bore walls C220 and the stem C218, and the possible failure of components within the fluid end C100. To prevent fluid build-up within the bore C220, at least one relief bore C228 may be formed in the discharge plug C226. The relief bore C228 drains fluid from the bore C220 during operation. The relief bore C228 opens in the guide bore C220 and opens in the outlet port C109. Two relief bores C228 are shown in FIGS. 111-112. The relief bores C228 are positioned diagonally within the plug C226. However, other configurations of bores may be used.

Turning now to FIGS. 114 and 116, a first female stem guided valve C310 having a central axis x-x is shown. The valve C310 is positioned within a bore above the inlet port C102. The fluid end body C100 and ports C102, C104, C106, C108, and C109 are identical to those of FIG. 111. The valve C310 seals against a valve seat C311 in the same manner as valve C110 and valve seat C111. The valve C310 is shown in the open position in FIGS. 114 and 116.

A guide bore C320 is formed in the body of the valve C310. The guide bore C320 opens on the top of the valve C310. A valve retainer C322 is shown positioned within the fluid body C100 above the guide bore C320. The valve retainer C322 has a U-shape. The top edges of the retainer C322 sit within a valve groove C323 formed in the walls of the fluid end body C100, as shown in FIG. 116.

A stem C318 is connected to or formed integral with the valve retainer C322. The stem C318 shown in FIGS. 114 and 116 is threaded to the retainer C322. The stem C318 projects downward towards the valve C310 and may be received within the bore C320. A stem vent C330 is connected to or formed integral with the top of the stem C318. The stem vent C330 projects upward away from the valve C310. As the valve C310 moves axially along its x-x axis between the open and closed positions the guide bore C320 also moves axially relative to the stem C318. The guide bore C320 and the stem C318 operate to maintain the orientation of the valve C310 relative to the valve seat C311. A spring C324 is shown in FIG. 114 positioned on the top of the valve C310. The spring C324 operates identically to spring C124. The spring C324 is not shown in FIG. 116 for clarity.

In operation, fluid may enter the guide bore C320 formed in the valve C310 and cause the same issues noted with regard to valve C210. To prevent fluid build-up within the bore C320, a relief port C328 may be formed in the stem C318 that joins a cross-bore C332 formed in the stem vent C330. The cross-bore C332 may be perpendicular to the relief port C328 and open on opposite sides of the stem C318. Fluid within the bore C320 may enter the relief port C328 and exit the stem through the cross-bore C332. After exiting the stem C318 through the cross-bore C332, fluid may flow towards the chamber C112.

With reference to FIGS. 114 and 115, a second female stem guided valve C410 with a central axis y-y, which may be collinear with axis x-x but is not required to be, is shown positioned within the bore below the discharge port C104. The discharge port C104 is shown sealed by a discharge plug C426. The valve C410 seals against a valve seat C411 in the same manner as valve C210 and seat C211. The valve C410 is shown in the closed position.

A guide bore 420 is formed in the body of the valve C410. The guide bore C420 opens on the top of the valve C410. A stem C418 is connected to or formed integral with the discharge plug C426. The stem C418 shown in FIGS. 114-115 is press fit into a bore formed in the discharge plug C426. The stem C418 projects downward towards the valve C410 and may be received within the guide bore C420. As the valve C410 moves axially along its y-y axis between the open and closed positions the guide bore C420 also moves axially relative to the stem C418. The guide bore C420 and the stem C418 operate to maintain the orientation of the valve C410 relative to the valve seat C411. A spring C424 is shown in FIG. 114 positioned on the top of the valve C410. The spring C424 operates identically to spring C224. The spring C424 is not shown in FIG. 115 for clarity.

In operation, fluid may enter the guide bore C420 formed in the valve C410 and cause the same issues noted with regard to valve C210. To prevent fluid build-up within the bore C420, a relief port C428 may be formed in the stem C418 that opens into a chamber C430 formed in the discharge plug C426. The chamber C430 is in fluid communication with a cross-bore C432 formed in the plug C426. The cross-bore C432 may be perpendicular to the relief port C428 and open on opposite sides of the discharge plug C426. Fluid within the bore C420 may enter the relief port C428 and exit the plug C426 through the cross-bore C432. After exiting the plug C426 through the cross-bore C432, fluid may flow towards the outlet port C109.

Turning to FIGS. 117, 118 and 120, a first female stem guided valve C510 having a central axis x-x is shown. The valve C510 is positioned within a bore above the inlet port C102. The fluid end body C100 and ports C102, C104, C106, C108, and C109 are identical to those of FIGS. 111 and 114. The valve C510 seals against a valve seat C511 in the same manner as valve C310 and valve seat C311. The valve C510 is shown in the open position.

A guide bore C520 is formed in the body of the valve C510. The bore C520 opens on the top of the valve C510. A guide C534 is positioned within and attached to the bore C520. The guide C534 shown in FIGS. 117,118 and 120 is threaded to the inner surface of the bore C520. The guide C534 projects upwards from the top of the valve C510 and has a central bore C530.

A valve retainer C522 is shown positioned within the fluid body C100 above the guide C534. The valve retainer C522 has a U-shape. The top edges of the retainer C522 sit within a valve groove C523 formed in the walls of the fluid end body C100, as shown in FIG. 30. A stem C518 is connected to or formed integral with the valve retainer C522. The stem C518 shown in FIGS. 117 and 120 is press fit into a bore formed in the retainer C522. The stem C518 projects downward towards the valve C510 and may be received within the central bore C530 of the guide C534. As the valve C510 moves axially along its x-x axis between the open and closed positions the central bore C530 also moves axially relative to the stem C518. The guide C534 and the stem C518 operate to maintain the orientation of the valve C510 relative to the valve seat C511. A spring C524 is shown in FIG. 117 positioned on the top of the valve C510. The spring C524 operates identically to spring C124. The spring C524 is not shown in FIGS. 118 and 120 for clarity.

In operation, fluid may enter the guide C534 attached to the valve C510 and cause the same issues noted with regard to valve C210. To prevent fluid build-up within the central bore C530 of the guide C534, a series of ports C536 may be formed in the guide C534. While ports C536 are shown to be circular in this embodiment any shape of port can be used. Fluid within the central bore C530 may pass through the ports C536 formed in the guide C534. After exiting the ports C536, the fluid may flow towards the chamber C112.

In operation, the stem C518 may be prevented from moving the entire length of the bore C530 by an annular shoulder C531 formed in the guide C534. This allows the portion of the bore C530 positioned below the shoulder C531 to accumulate fluid or other particles prior to draining the fluid and particles through the ports C536.

With reference to FIGS. 117-119, a second female stem guided valve C610 having a central axis y-y, which may be collinear with axis x-x but is not required to be, is shown positioned within a bore below the discharge port C104. The discharge port C104 is shown sealed by a discharge plug C626. The valve C610 seals against a valve seat C611 in the same manner as valve C410 and seat C411. The valve C610 is shown in the closed position.

A guide bore C620 is formed in the body of the valve C610. The guide bore C620 opens on the top of the valve C610. A guide C634 is positioned within and attached to the bore C620. The guide C634 is identical to the guide C534. The guide C634 has a central bore C630 and at least one port C636 formed in its sides.

A stem C618 is connected to or formed integral with the discharge plug C626. The stem C618 shown in FIGS. 117 and 119 is threaded into a bore formed in the discharge plug C626. The stem C618 projects downward towards the valve C610 and may be received within the central bore C630 of the guide C634. A plurality of ports C636 are formed in the guide C634. Fluid within the bore C630 may pass through the guide C634 the same way fluid passes through the guide C534.

Turning to FIGS. 121, 122, and 124, a first female stem guided valve C710 having a central axis x-x is shown. The fluid end body C100 and ports C102, C104, C106, C108, and C109 are identical to those of FIGS. 111, 114, 117. The valve C710 seals against a valve seat C711 in the same manner as valve C510 and seat C511. The valve C710 is shown in the open position.

A guide bore C720 is formed in the body of the valve C710. The bore C720 opens on the top of the valve C710. A guide C734 is positioned within and attached to the bore C720. The guide C734 shown in FIGS. 121, 122, 124 is threaded to the inner surface of the bore C720. The guide C734 projects upwards from the top of the valve C710 and has a central bore C730. The guide C734 is identical to guide C534 except that instead of having ports C536 formed in the guide C534, the guide C734 has a plurality of slots C736 formed in it. A retainer C722 is positioned in the fluid end body C100 above the valve C710. The retainer C722 is identical to retainer C522. A stem C718 is attached to the retainer C722. The stem C718 is identical to stem C518. Fluid is drained from the valve C710 and stem C718 the same way fluid is drained from valve C510.

In FIGS. 121-123, a second female stem guided valve C810 having a central axis y-y is shown. The valve C810 seals against a valve seat C811 in the same manner as valve C610 and seat C611. The valve C810 is shown in the closed position.

A guide bore C820 is formed in the body of the valve C810. The bore C820 opens on the top of the valve C810. A guide C834 is positioned within and attached to the guide bore C820. The guide C834 is identical to guide C634 except that instead of having ports C636 the guide C834 has a plurality of slots C836 formed in it. A discharge plug C826 is positioned above the valve C810. The discharge plug C826 is identical to discharge plug C626. A stem C818 is attached to the plug C826. The stem C818 is identical to stem C618. Fluid is drained from the valve C810 and guide C834 the same way fluid is drained from valve C610.

Enhancements such as the hardening of any or all contact surfaces of the stem, guide, and guide bore may reduce wear and increase life. Bushings, bearings, or any other replaceable wear items that can mitigate wear or prolong life could be used in the interface between the stem and guide bore. This includes replaceable wear rings such as elastomeric O-rings or the like. The stems, valves, or components described herein may also be formed from tungsten carbide or be coated or sprayed with tungsten carbide to help reduce wear over time.

Numerous methods to connect the stems to serviceable portions of the fluid end assembly may be used such as threading, press fit, welding, brazing or the like. There are also numerous ways to produce a guide bore in the appropriate component whether by producing separate components or making the bore integral. The ports described herein may also take on different shapes and sizes.

Appendix D: Valve Having Dual Inserts

The insert in the valve bodies shown in FIGS. 125-130 may be used with the fluid end described herein and the valve bodies and valve seat architecture previously discussed. For the purposes of the following description of FIGS. 125-130, reference numerals exclusive to those Figures will be used.

With reference to FIGS. 125 and 126, a fluid end D100 is shown. The fluid end D100 comprises a fluid end body D102 having a plurality of first and second bores D106, D108 formed adjacent one another therein, as shown in FIG. 125. The number of first bores D106 usually equals the number of second bores D108. Each first bore D106 intersects its paired second bore D108 within the fluid end body D102 to form an internal chamber D112, as shown in FIG. 125.

FIG. 125 shows five first and second bores D106, D108. In alternative embodiments, the number of sets of paired first and second bores in the fluid end body may be greater than five, or less than five.

Each bore of each set of paired bores D106 and D108 terminates in a corresponding opening D110. The bores D106 and D108 and openings D110 exist in one-to-one relationship. A plurality of internally threaded openings D144 may be formed in the body D102 and uniformly spaced around each bore opening D110, as shown in FIG. 125, to accommodate pins D148 and retainers D132 for closing the bore openings D110.

With reference to FIG. 126, each second bore D108 may have an intake opening D118 formed proximate the bottom end of the fluid end body D102. Each intake opening D118 is connected in one-to-one relationship to a corresponding coupler or pipe. These couplers or pipes are fed from a single common piping system (not shown).

A pair of valves D120 and D122 are positioned within each second bore D108. The valves D120, D122 route fluid flow within the body D102. The intake valve D120 blocks fluid backflow through the intake opening D118. The discharge valve D122 regulates fluid through one or more discharge openings D126. A plurality of couplers D127 may be attached to each discharge opening D126 for connection to a piping system (not shown).

Each valve D120, D122 opens and closes due to movement of fluid within the internal chamber D112. A plunger D130 is provided within the first bore D106. As the plunger D130 retracts, the discharge valve D122 closes and the intake valve D120 opens, pulling fluid into the internal chamber D112. As the plunger D130 is advanced into the first bore D106, the intake valve D120 is closed and the discharge valve D122 opens, expelling fluid from the internal chamber D112. As shown in FIG. 126, the discharge valve D122 and intake valve D120 are both closed.

A coil spring D131 is disposed on each valve D120, D122 to center the valve and maintain its placement within the second bore D108. The coil spring D131 may also bias the valves D120, D122 in a closed position. A valve seat D300 is provided with each valve D120, D122 such that repeated impacts occur between the valve and valve seat, rather than the fluid end body D102.

The valve seat D300 is disposed within the second bore D108 and seated against its wall. The valve seat D300 comprises a tapered strike face D304 (FIG. 130). The tapered strike face D304 may be hardened, or include a hardened insert D306 to provide durability necessary due to repeated strikes from each valve D120, D122.

With reference to FIG. 127, a prior art valve D150 is shown. Such a valve body D150 may be used as either the intake valve D120 or discharge valve D122.

The valve D150 has a valve body D160 and an alignment structure D152 to assist in maintaining proper valve D150 orientation to the seat D300 (FIG. 39) when in operation and is well known in the art. Protrusion D154 centers the coil spring 131 (FIG. 39). When the valve D150 is closed, a valve sealing surface D156 and valve insert D158 contact the valve seat sealing surface (not shown) stopping fluid flow.

The valve sealing surface D156 is hardened by a post manufacturing process, such as nitriding or flame hardening, or is manufactured from a hard material such as carbide. It is advantageous to have the hardened valve sealing surface D156 to minimize erosion.

Valve insert D158 can be made of any of a number of durable elastomeric materials well known in the art. The elastomeric material may be polyethylene, nitryl rubber, nitrile rubber, or a similar material. Valve insert D158 may be applied to the valve body D160 and may be permanently attached or replaceable. The purpose of valve insert D158 is to provide more sealing capability for the valve D150. While the primary sealing is accomplished by the metal to metal contact of the valve sealing surface D156 to the valve seat D300 sealing surface, it is advantageous to have the elastomeric material encapsulate and seal around any solids trapped between the valve insert D158 and the seat sealing surface.

Once the valve insert D158 deforms, or compresses, the valve sealing surface D156 contacts the seat sealing surface and stops moving. Erosion occurs with each cycle due to the impact of the valve sealing surface D156 on the seat sealing surface.

While the valve insert D158 does contact the seat sealing surface first, it is not designed to reduce the impact force of the valve sealing surface D156 against the seat sealing surface, any reduction of the impact force is incidental. The valve insert D158 instead deforms to provide a backup, or secondary, seal for the valve sealing surface D156. In practice, the elastomeric material used for the valve insert D158 retains the deformation over time and loses the ability to provide any reduction of impact force. This loss of memory causes the valve sealing surface D156 to apply the full force of impact on the seat sealing surface further increasing the erosion rate until the two surfaces erode to the point of valve D150 failure due to the lack of sealing.

With reference to FIGS. 128-130, an improved valve D200 is shown. The improved valve D200 may be used as either the intake valve D120 or the discharge valve D122.

The valve D200 has alignment structure D202 to assist in maintaining proper valve D200 orientation to the seat D300, when in operation. A protrusion D204 disposed on the valve D200 opposite the alignment structure D202 to provide support for the coil spring D131 (FIG. 126). The valve D200 comprises a valve sealing surface D206 with an outer insert D208 and an inner insert D212 disposed thereon.

When the valve D200 is closed by the spring D131, the valve sealing surface D206, outer valve insert D208, and inner valve insert D212 contact the seat sealing surface D304 stopping fluid flow.

Valve sealing surface D206 may be hardened by a post manufacturing process, such as nitriding or flame hardening, or is manufactured from a hard material such as carbide. It is advantageous to have the hardened valve sealing surface D206 to minimize erosion providing the valve D200 does not fail prematurely. The area of the valve sealing surface D206 is larger than that of typical metal to metal seal valves, such as the previously attempted solution described above. The larger surface area is to reduce the amount of impact force per unit area imparted to the two sealing surfaces. If the closing force is the same and the surface area is increased then the amount of force per unit area is decreased which reduces the amount of erosion caused by the impact force.

The outer valve insert D208 is disposed on the sealing surface D206 along its outer edge, at a transition between the sealing surface D206 and a side wall. Outer valve insert D208 can be made of any of a number of elastomeric materials well known in the art. The specific material is selected based on the sealing qualities of the material in the fluid being controlled. Polyurethane, polyethylene, and rubber compounds may be advantageous. As with valve D150 and insert D158, the outer valve insert D208 provides sealing capability for the valve D200.

While the primary sealing is accomplished by the metal to metal contact of the valve sealing surface D206 to the seat sealing surface D304, it is advantageous to have the elastomeric material encapsulate and seal around any solids trapped between the outer valve insert D208 and the seat sealing surface D304.

The inner valve insert D212 is disposed at an inner and lower extremity of the valve sealing surface D206. The inner valve insert D212 should be placed such that its radius is approximately the inner diameter of the seat sealing surface D304. An exposed portion D207 of the valve sealing surface D206 is disposed intermediate the inner valve insert D212 and the outer valve insert D208. It is this exposed portion D207 that performs the majority of the sealing function for the valve D200.

Inner valve insert D212 can be made of elastomeric materials that are suitable for the fluid being controlled, however the selection is based on energy absorption capacity and memory capability of the material not the sealing qualities. While elastomeric materials may accomplish this, a reinforced elastomer or molded urethane material may be employed in some embodiments to increase energy absorption and insert D212 life.

The two inserts D208, D212 may be made of the same material if desired. If the same material is used for both inserts D208, D212 the design may be changed to account for the different purpose of each insert. Inner valve insert D212 will reduce the impact force between the valve sealing surface D206 and the seat sealing surface D304. Some sealing may occur at inner valve insert D212 as well, but its primary function is that of a shock absorber.

The sealing surface D206 fully conforms to a portion of an imaginary smooth surface that extends between a pair of parallel planes that respectively limit the upper and lower ends of the valve body. The surface separates interior and exterior regions. The inserts D208 and D212 project within the exterior region while the sealing surface 206 does not project within the exterior region.

As the valve body moves axially toward the seat during valve closure, the inserts D208 and D212 contact the seat sealing surface D304 before the sealing surface D206 does so. In some embodiments, the axial extent of insert D212 within the exterior region, relative to the sealing face D206, exceeds that of insert D208. The inner insert D212 thus contacts sealing surface D304 during closure of the valve before either the outer insert D208 or valve sealing surface D206.

Any valve that uses one or more hardened surfaces may be improved by reducing the impact force of the valve sealing surface against the seat sealing surface. For instance, the inner valve insert D212 may be made of any material that will absorb enough energy to reduce the impact force to a level that both reduces erosion on the sealing surface D206 to an acceptable rate and deforms or compresses enough to allow the exposed sealing surface D207 to contact the seat sealing surface D304.

Another embodiment may include forming the inner valve insert out of hardened material and placing a spring or any other energy absorbing component between it and the valve body, axially, to absorb the energy and allow the movement necessary to allow the hardened sealing surfaces to contact. Another embodiment may reverse the positions of the inner and outer inserts making the inner valve insert D212 the sealing insert and the outer insert D208 the energy absorption insert. Yet another embodiment may reverse the metal and elastomeric components with one central elastomeric component that is designed to absorb the necessary energy and the inner and outer rings being hardened metal.

Hardened sealing surfaces may be used with the reduction of failure due to erosion. This provides for a longer service life of the valves, decreasing maintenance costs and increasing operating times.

Appendix E: Valve Having a Hardened Insert

The seat and valve geometries of FIGS. 131 and 132 may be used with the fluid end described. For the purposes of the following description of FIGS. 131 and 132, reference numerals exclusive to those Figures will be used.

The valve E100 has a seal groove E104 at its radius on a sealing face E106 of the valve E100 to allow for the insertion and retention of an elastomeric seal (not shown) as is well known in the art. While the seal (not shown) has the same material properties as those commonly used in this industry, it differs in that it has a reduced radial dimension. Using a narrower seal and corresponding seal groove E104 provides sufficient space for the carbide insert groove without having such a thin wall between the two grooves E104, E108 that premature failure occurs.

The valve E100 also has a carbide insert groove 108 on the sealing face E106 of the valve E100. In this embodiment the carbide insert groove E108 is at a radius smaller than that of the seal groove E104. The carbide insert groove E108 is sized to retain a ring-shaped carbide insert E102. The carbide insert E102 may be retained in any number of ways known in the art. In this embodiment it is retained by an interference fit between the carbide insert groove E108 and the carbide insert E102.

The carbide insert E102 has a seal face E110 that is planar and flush with the rest of the valve sealing face E106 when installed. The insert seal face E110 contacts the seal face E204 of the seat insert E202 when the valve E100 is closed. Since both inserts E102, E202 are harder material, the erosion rate is reduced and service life increased.

Even though the service life is increased due to the presence of the harder carbide material at the sealing faces E110, E204, the components will still eventually erode to the point that replacement is needed to maintain optimal performance. It is much more difficult to replace a seat E200 than a valve E100. Therefore, valve E100 may be the component that wears out first. To facilitate the selective need for replacement, the carbide insert E102 in the valve E100 is purposefully selected to be softer than the carbide insert E202 of the seat E200. Even with the softer carbide material used for the valve carbide insert E102, both inserts E102, E202 are still much harder than their respective host material and provide a far greater life than previous valve/ seat combinations.

FIG. 132 is a cross sectional view of a valve E300. In this embodiment the valve carbide insert E302 has a convex sealing face E306. This convex sealing face E306 allows for the uneven wear or any other misalignment between the two sealing faces E204, E306.

The elastomeric seal may be on the outside, radially, of the valve/seat assembly, but the radial positions of the elastomeric seal and carbide insert E302 could easily be switched with appropriate modifications to the position of the seat insert E202. Further, while the inserts are described throughout this disclosure as being carbide inserts, it is also contemplated that the insert may be made of any material that is harder than the base material of the valve. It is also contemplated that the convex face of the insert, as described in the second embodiment, may be any shape other than planar. Many additional non-planar shapes could provide sealing in the event of misalignment of the two sealing faces.

Appendix F: Adjustable Valves

The valve shown in FIG. 133 is adjustable, and may be used with the fluid end described herein and the valve bodies and valve seat architecture previously discussed. For the purposes of the following description of FIG. 133, reference numerals exclusive to it will be used.

Fluid end F100 is shown in FIG. 133. Fluid end F100 comprises a body F114 having an inlet port F120 and an outlet port F122 and a plunger F112. In operation the plunger F112 reciprocates in and out of the fluid end body F114 in cooperation with an inlet valve F116 and outlet valve F118 to draw fluid into the fluid end body F114 through the inlet port F120 at a lower relative pressure and expel the fluid out of the fluid end body F114 through the outlet port F122 at a higher relative pressure.

One cycle of operation for the section begins with the plunger F112 at its maximum internal position and ends when the plunger F112 returns to that same position. The half cycle position of the plunger F112 is at the point where the plunger F112 is at the minimum internal position. The maximum internal position generally coincides with the maximum pressure of the fluid in that section and the minimum internal position generally coincides with the minimum fluid pressure in that section. The operating cycle of each section is offset from other sections so that the plunger F112 of one section is never in the same position as plungers of other sections at the same time. This is accomplished by having the plungers driven by a crankshaft arrangement of a power end (not shown). This offsetting of cycles is the main method used in prior art fluid end systems to control the frequency of the maximum pressure spikes and flow volume through the system.

Looking now in detail at one operating cycle for one section, FIG. 133 shows the plunger F112 at the maximum inserted position. At this point the inlet valve F116 is in the closed position and the outlet valve F118 is in the maximum open position. Fluid has been flowing out of an opening F124 between the outlet valve F118 and an outlet valve seat F126 into the outlet port F122.

In the next segment of the cycle, the inlet stroke, the plunger F112 recedes from the maximum inserted position to the minimum inserted position. As the plunger F112 recedes the volume of a pressure chamber F132 increases thereby reducing the pressure in the pressure chamber F132. In prior art fluid ends, this change in pressure causes the outlet valve F118 to close and the inlet valve F116 to open to the maximum open position.

The third segment of the cycle is the minimum inserted plunger F112 position. At this point the outlet valve F118 is in the closed position and the inlet valve F116 is in the fully open position. Pressure in the pressure chamber F132 will be at a minimum and the pressure chamber F132 volume will be a maximum.

The fourth segment of the cycle is the pressure stroke. The plunger F112 advances to the maximum inserted position. As the plunger F112 advances the volume of the pressure chamber F132 decreases thereby increasing the pressure in the pressure chamber F132.

In prior art fluid end designs, the travel and positions of the inlet and outlet valves are determined passively by the spring rates of valve springs and placement of stops to limit the travel of the valves. In the embodiment of FIG. 46, however, the positions of the inlet valve F116 and outlet valve F118 are determined from the measurement of system parameters and by positive placement of each valve by a hydraulic cylinder F102 in cooperation with a push rod F104. While the push rod F104 is moved by a hydraulic cylinder F102 in the embodiments listed any type of device that can positively position the push rod F104 and or the valves F116, F118 is contemplated. For instance, the cylinders F102 could operate on pressurized air, or be electric motors.

In operation there are numerous sensors measuring system parameters and providing input to a processor or multiple processors to determine the optimum position of each valve F116, F118 at any given time. The processor then controls each hydraulic cylinder F102, specifically the flow into and out of each hydraulic cylinder F102, to place the valves F116, F118 at the previously determined optimum position. As the needs of the operator change the system parameters can be changed in the control system allowing each valve F116, F118 to be placed in a different position at a different time in the operating cycle than previously without having to change any components of the system except for the computer code operating the control system.

As an example, position sensors may be placed to determine the position of the valves F116, F118 attached to each cylinder F102. A position sensor may also be placed to determine the position of the plunger F112. The exact type and positioning of these sensors is not important for this example only that they accurately provide the position of the valves F116, F118 and the plungers F112 for every section at any point in the cycle. These position sensors may be any of those well known in the art, for example linear variable displacement transducers (LVDT).

There may also be pressure sensors placed in the pressure chambers F132 of each section, the inlet port F120 and outlet port F122 of each section, an upstream position prior to separation into individual inlet sections and a downstream position after the combination of each outlet flows into a common outlet conduit. There may also be pressure sensors placed in the hydraulic system. There may also be flow meters at various points in the system to provide information to the control system. Any system measurement used to determine valve F116, F118 or plunger F112 positioning, or fluid state may be used. The system measurements will cooperate to provide information to the control system which in turn provides input to each hydraulic cylinder F102 for the desired positioning of the inlet valve F116 and outlet valve F118.

In operation, a desired outlet fluid profile is determined. This desired outlet fluid profile can be described by parameters such as fluid pressure, flow rate, temperature, viscosity, velocity, or any other fluid flow parameters deemed important to the operator and measurable by the system sensors, or at least capable of being input to the control system.

Once the desired output fluid profile is entered into the control system operation begins. The system sensors provide input to the control system which then control the hydraulic pump or pumps and valves which in turn send the appropriate amount of hydraulic fluid to the correct hydraulic port F106 of the hydraulic cylinders F102 to place the valves F116, F118, at a desired velocity, in a desired position at a desired time. The exact position of the valves F116, F118 may be determined by the length of the push rod F104 and position of the hydraulic cylinder piston F108, or by direct measurement, or by inference from the pressure of the hydraulic fluid in either or both sides of the hydraulic cylinder F102 or any other method that provides the control system with the actual position of the valves F116, F118.

The adjustment of the amount of valve opening, the velocity at which the valve F116, F118 travels to the position, and the time at which the valve F116, F118 gets to a position and how long it stays at the position all affect the fluid profile. As an example, if the outlet valve F118 is held closed until the plunger F112 reaches the maximum internal position then opened at a high velocity to a relatively large amount of opening then the outlet pressure and flow would spike. Conversely if the outlet valve F118 is opened to the same position at a relatively low velocity as the plunger F112 approaches maximum internal position the pressure and flow will not spike as much. Numerous combinations of plunger F112 position and velocity, valve F116, F118 position, valve F116, F118 opening and closing velocity, and the time the valve F116, F118 spends at any position also known as dwell time can manipulate the outlet and inlet fluid profiles.

The measured outlet fluid profile is compared to the desired outlet fluid profile and if needed control system parameters are adjusted based on known effects of each system parameter on the outlet fluid profile to adjust the measured outlet fluid profile to match the desired output fluid profile. The process is repeated until the job is completed or until a different desired outlet fluid profile is input to the system.

The desired inlet fluid profile may be input to the control system in addition the desired outlet fluid profile. In operation the measured outlet and inlet fluid profiles would be compared to the desired profiles and if needed control system parameters adjusted based on known effects of each system parameter on the outlet and inlet fluid profiles to match the measured profiles to the desired profiles.

In operation the relative positions, and the velocity at which those positions are reached, of each pertinent component is predetermined and maintained using the control system. For example, an operator may desire to minimize erosion of valve faces F134, F146 and valve seat faces F148, F150 due to the high impact forces normally associated with conventional spring return valves. Using the present system, the operator may program the control system to open and close the valves F116, F118 at a predetermined velocity. The operator may also program the control system to move the valves F116, F118 at a higher velocity until just before the valve faces F134, F146 contact the valve seat faces F148, F150 thus reducing the impact velocity and resultant erosion.

Alternatively, the goal may be to provide as much clearance as possible between the valve faces F134, F146 and the valve seat faces F148, F150. This could occur if a high-volume proppant is to be pumped into a formation as in the hydraulic fracturing process. The ability to adjust the amount of opening between the valve faces F134, F146 and the valve seat faces F148, F150 will reduce the erosion damage to each face F134, F146, F148, F150 due to the proppant.

A means for independently controlling the position of the plungers F112 may be used. This may or may not be used in cooperation with the independent control of the positions of the valves F116, F118. To independently control the plungers F112 an independent drive source is supplied to each plunger F112. The position of the plungers F112 to each other is not fixed as it is when they are driven by a crankshaft as is common in power ends. The independent drive source for each plunger F112 is controlled by the control system in cooperation with the measurement system.

The fluid end is now described in more detail, utilizing the discussion given with reference to FIGS. 80-94, and those reference numbers.

Continuing with FIGS. 80 and 82, the fluid end 100 further comprises a plurality of sets of components A128 and A130. The number of sets equals the number of sets of paired first and second bores A106 and A108 formed in the body A102. The component A128 is positioned within a first bore A106, and the component A130 is positioned within its paired second bore A108. In one embodiment, the component A128 is a suction plug and the component A130 is a discharge plug. Each of the components A128 and A130 are substantially identical in shape and construction, and each is sized to fully block fluid flow within the respective bore A106, A108. A seal A136 is positioned around the outer surface of each component A128, A130 to block fluid from leaking from the bores A106, A108.

Appendix G: Sealing Locations within Fluid Ends

Sealing locations discussed in FIGS. 134-141 may be used with the fluid end described herein and the valve bodies and valve seat architecture previously discussed. For the purposes of the following description of FIGS. 134-141, reference numerals exclusive to those Figures will be used.

FIG. 134 is a simplified isometric cross-sectional depiction of a hydraulic fracturing fluid end G200 that is constructed in accordance with previously attempted solutions. The fluid end G200 is generally a manifold G201 used to deliver highly-pressurized corrosive and/or abrasive fluids, typically used in hydraulic fracturing processes in the oil and gas industry. Fluid may pass through the fluid end 200 at pressures that range from 5,000-15,000 pounds per square inch (psi). Fluid ends G200 used in high pressure hydraulic fracturing operations typically move fluid at a minimum of 8,000 psi. However, normally, the fluid end G200 will move fluid at pressures around 10,000-15,000 psi.

The manifold body or housing G201 typically has a first conduit G220 and a second conduit G221 formed within the body G201 that intersect to form an internal chamber G222. The first conduit G220 is typically orthogonal to the second conduit G221. The first conduit G220 may have aligned first and second sections G223 and G224 that are situated on opposite sides of the internal chamber G222. Likewise, the second conduit G221 may have aligned third and fourth sections G225 and G226 that are situated on opposite sides of the internal chamber G222. The sections G223, G224, G225, and G226 each may independently interconnect the internal chamber G222 to an external surface G227 of the fluid end G200.

A plunger G228 reciprocates within the body G201 to increase the pressure of fluid being discharged from the fluid end G200. As shown in FIG. 134, the plunger G228 may be disposed within the third section G225 of the second conduit G221. The plunger G228 is powered by an engine operatively engaged with the fluid end G200. In high pressure hydraulic fracturing operations, the engine may have a power output of at least 2,250 horsepower. Valve seats G229 are also shown within the first conduit G220. The valve seats G229 may support valves, such as a ball valve, used to control the movement of high pressure fluid within the body G201.

Figure 48:
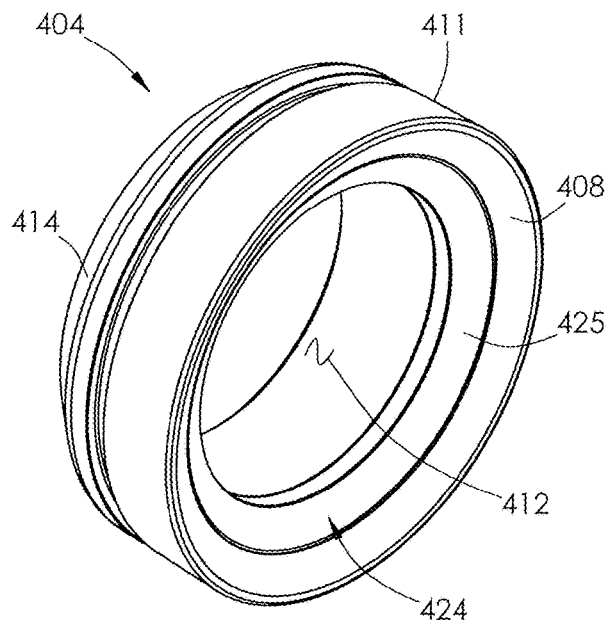
FIG. 48 is a top perspective view of a valve seat used with the fluid end shown in FIGS. 18 and 24.
Figure 49:
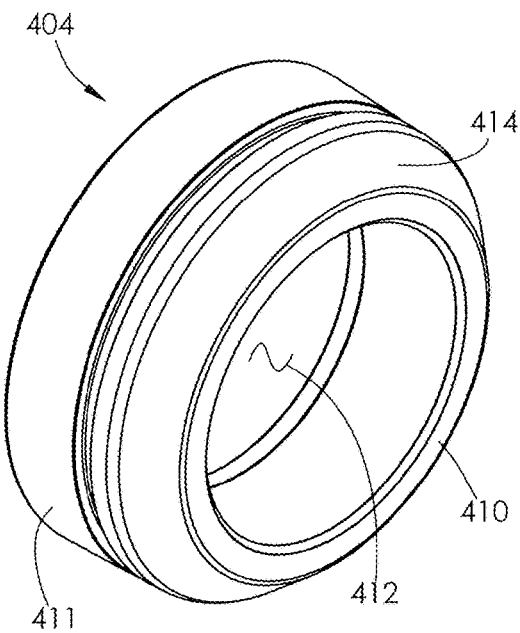
FIG. 49 is a bottom perspective view of the valve seat shown in FIG. 48.
Figure 50:
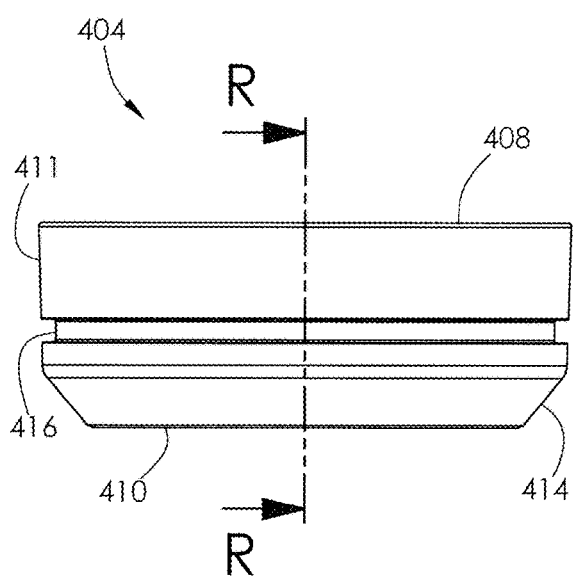
FIG. 50 is a side elevation view of the valve seat in FIGS. 48 and 49.
Figure 51:
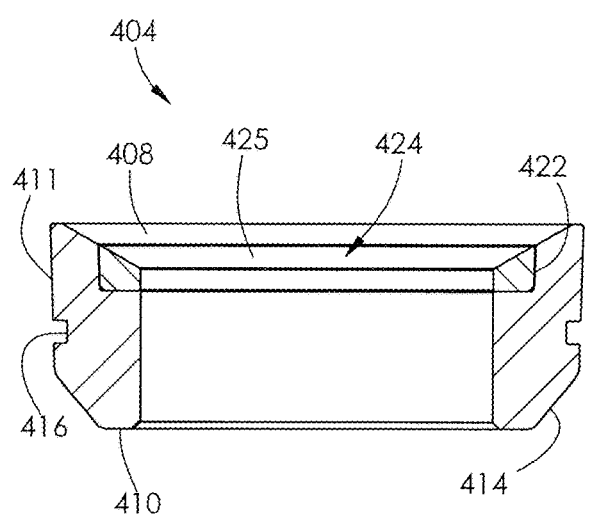
FIG. 51 is a cross-sectional view of the valve seat shown in FIG. 50, taken along line R-R.

The body G201 defines a discharge opening G202 that opens into the first conduit G220. The discharge opening G202 depicted in these embodiments is sealed closed by inserting a closure or discharge plug or cover G204 into the conduit G220 and securing it by advancing a retaining nut G206 into the body G201. The discharge plug G204 supports a seal G208 that seals against the bore defining the discharge opening G202. FIG. 48 is a simplified cross-sectional depiction of the discharge plug G204 that has a surface G205 defining a recess G207 into which the seal G208 is mounted at an inner radial surface G211 of the radial seal G208.

In these illustrative embodiments the recess G207 is rectangular but the contemplated embodiments are not so limited. The skilled artisan understands that the configuration of the recess G207 is largely determined by what shape is required to mount the type of seal selected. The recess G207 intersects an outer surface G215 of the discharge plug G204, permitting the seal G208 to be sized so that a portion not mounted within the recess G207 extends beyond the outer surface G215 to pressingly engage against the bore G209 defining the discharge opening G202. In this construction the highly-pressurized corrosive and/or abrasive fluid can harsh fluid can be injected between the seal G208 and the bore G209, causing erosion of the seal surface formed by the bore G209. This technology transfers that erosion wear from the body bore G209 to the less complex and less expensive discharge plug G204.

Fluid end bodies have conventionally been made of heat-treated carbon steel, so it was not uncommon for the body G201 to crack before any sacrificial erosion of the body progressed to the point of creating leakage between the discharge plug G204 and the bore G209. However, progress in the technology has introduced stainless steel body construction resulting in a significantly longer operating life. As a result, this erosion is no longer negligible but is instead a consideration for reducing erosion in modern fluid end construction. One leading source of bore G209 erosion in conventional fluid ends is the seal G208 mounted in the discharge plug G204 and extending therefrom to seal against a sealing surface formed by the body G201.

FIG. 136 is an exploded cross-sectional depiction of a fluid end G230 that is constructed in accordance with this technology to, in numerous places, transfer the erosion wear from the body to the less complex and less expensive component that is sealed to the body. A manifold body G232 forms a number of interconnected bores or conduits, including a first conduit or discharge bore G234 forming a discharge opening G235 that is similar to the discharge opening G202 in the conventional fluid end G200 depicted in FIG. 134. The discharge bore G234 further defines an intake opening G231 formed opposite the discharge opening G235. The term "discharge bore" for purposes of this description means the surface defining the discharge opening G235 into which a closure or discharge plug G236 and a retaining nut G238 are installed, and the surface defining the intake opening G231. For clarity, although FIG. 49 references the discharge bore G234 as defining an upper end of the discharge opening G235 where the retaining nut G238 attaches, the discharge bore G234 also references lower portions of the discharge opening G235 where the discharge plug G236 seals to the body G232 and where the valve seat (not depicted) seals to the body G232. Likewise, the discharge bore G234 also references upper portions of the intake opening G231. Generally, for purposes of this description the discharge bore G234 forms multi-dimensional diameters at different longitudinal locations of the discharge opening G235 and intake opening G231.

The discharge opening G235 is sealed closed by inserting the discharge plug G236 into the discharge opening G235 and securing it in place by advancing the retaining nut G238. Unlike the conventional plug G204 in FIG. 48, however, the plug G236 does not have a seal mounted to it that seals against the bore G234. Instead, the plug G236 defines a sealing surface 237 for a seal (not depicted in FIG. 136) that is mounted in an endless groove or recess formed by a surface G239 of the body G232. The sealing surface G237 is axially spaced between a first surface G251 and an opposite second surface G253 of the plug G236.

FIG. 137 is a simplified cross-sectional enlargement depicting the construction of the seal positioned within the surface G239 of the body G232. The surface G239 forms an endless groove or recess G240 that intersects the discharge bore G234. A seal G242 in these illustrative embodiments is mounted in the recess G240 to include an outer radial surface, and is thereby supported by the body G232. The recess G240 is characterized by a pair of parallel sidewalls joined by a base. The recess G240 opens towards a centerline of the conduit within which it is formed. Alternatively, as shown by recess G266 in FIGS. 139-140, the recess may open in a direction parallel to a centerline of the conduit within which it is formed. As above, the rectangular-groove shape of the recess G240 is merely illustrative and not limiting of the contemplated embodiments. Any shape necessary to properly mount a desired seal is contemplated, whether the seal is elastomeric, spring, metal, and the like. As above, the recess G240 intersects the bore G234 permitting the seal G242 to be sized so that a portion of the seal G242 not contained in the recess G240 extends beyond the recess G240 and beyond the bore G234 to pressingly seal against the sealing surface G237 (FIG. 136) defined by the discharge plug G236.

This seal construction depicted in FIG. 137 transfers the erosion wear from the body to the discharge plug. That significantly improves fluid end operations because repairs involving the discharge plug G236 are significantly less complex and less expensive than repairs involving the body G232, which typically involve weld-repair. Furthermore, weld-repairing the body G232 makes it susceptible to premature fatigue cracking in the repaired area. Further, even more operating life can be achieved by applying an erosion-resistant surface treatment to the plug G236, such as a high velocity oxygen fuel (HVOF) treatment, a tungsten carbide coating, material carburizing, and the like. Replacing instead of repairing an eroded discharge plug G236 is typically feasible, making it advantageously possible to repair a leaking valve constructed according to this technology in the field and thereby significantly reducing down time.

Returning to FIG. 136, the body G232 has a surface G241 defining an endless groove or recess intersecting the bore G234 and configured to mount a seal (not depicted) that extends from the recess to seal against a sealing surface formed by a discharge valve seat (not depicted). Similarly, the body G232 has a surface G243 forming another endless groove or recess intersecting the bore G234 and configured to mount another seal (not depicted) that is sized to extend from the recess to seal against a sealing surface formed by a suction valve seat (not depicted). The multiple references to a same bore G234 is for purposes of ease of description and is not narrowing of the contemplated embodiments of this technology. Whether the recesses defined by surfaces G241, G243 are formed in the same bore or different bores does not alter the scope of the contemplated embodiments directed to the recess for mounting the seal is formed in the body, and a seal is mounted in the recess and from there seals against a sealing surface of a component in a sealing engagement therebetween.

Similarly, a suction bore G247 is sealed closed by inserting a closure or suction plug or cover G244 defining a sealing surface G245 and securing it in place by advancing a retaining nut G246 in the body G232. Like the plug G236, the sealing surface G245 is axially spaced between a first surface G255 and an opposite second surface G261 of the plug G244. Again, the body G232 in these illustrative embodiments has a surface G248 forming an endless groove or recess intersecting the bore G247 and configured for mounting a seal (not depicted) extending from the recess and sealing against the sealing surface G245 of the suction plug G244. That transfers the wear from the body G232 to the suction plug G244 in comparison to previously attempted solutions and in accordance with the embodiments of this technology.

The body G232 also forms a plunger opening G250 sized to closely receive a stuffing box sleeve G254 that is sealed in place by advancing a retaining nut G256. The stuffing box sleeve G254 is characterized by a tubular sleeve. The plunger G228, shown in FIG. 136, may be disposed within the stuffing box sleeve G254.

The opening G250 is formed in part by the plunger bore G252 having a surface G257 defining an endless groove or recess intersecting the bore G252, into which a seal (not depicted) is mounted in these illustrative embodiments. The suction bore G247 and the plunger bore G252 together form the second conduit. Although these illustrative embodiments use a radial seal, the contemplated embodiments are not so limited. In alternative embodiments other types of constructions are contemplated by this technology employing axial seals, crush seals, and the like.

FIG. 138 is a simplified cross-sectional depiction of the body G232 having the surface G257 forming the recess G258. Again, the recess G258 intersects the body bore G252 permitting a portion including an outer radial surface of a radial seal G260 to be mounted in the recess G258. Another portion of the seal G260 not mounted in the recess G258 extends from the recess G258 to pressingly seal against the sealing surface G259 of the sleeve G254. Although in these depicted embodiments a radial seal is used, the contemplated embodiments are not so limited. The skilled artisan readily understands that other types of seals could be used instead of or in addition to the radial seal depicted, such as axial seals, crush seals, and the like.

FIG. 139 depicts a number of additional endless grooves or recesses in the body G232 for mounting various seals to transfer the wear away from the body G232 to the mating component in accordance with embodiments of this technology. For example, the body G232 has a surface 266 defining a recess G273 intersecting the body bore that defines the discharge opening G235. Consistent with this whole description, this permits mounting an axial seal G268 (not depicted in FIG. 139, see FIG. 140) in the recess G273, the seal G268 configured to extend from the recess G273 to seal against a leading face of the discharge plug G236 (FIG. 136). FIG. 140 is a simplified enlarged depiction of the body G232 having a surface G266 defining the recess G273 into which an axial seal G268 is mounted. In these illustrative embodiments the seal G268 is configured to extend beyond the body bore defining the discharge opening G235 to seal against the discharge plug G236 as it is urged downward by advancing the retaining nut G238 (FIG. 136).

Importantly, the simplified seal construction depicted in FIG. 140 and elsewhere is in no way limiting of the contemplated embodiments and scope of the claimed technology. In alternative embodiments a radial seal or a crush seal and the like can be employed to transfer the erosion wear from the body G232 to the mating component. A crush seal refers to a seal construction that acts at least to some degree both axially and radially. For example, surface G272, shown in FIG. 139, forms a recessed corner having two walls that extend concentrically around the bore G252 (FIG. 136). The stuffing box sleeve G254 may be formed to have side walls that fully overlie the corner section formed by surface G272 when it is positioned in the bore G252. This allows the seal to act as a crush seal because it seals axially and radially against the sleeve G254.

Returning to FIG. 139, the body G232 can have other surfaces forming endless grooves or recesses for mounting various other seals. For example, surface G270 forms a recess for mounting a seal that is configured to seal against a sealing surface of a suction plug (not depicted), like in FIG. 140. In the same way the body G232 can have surfaces G272, G274, G276 forming recesses for mounting seals that are configured to seal against sealing surfaces of the stuffing box sleeve G254 (FIG. 136), the discharge valve seat (not depicted), and the suction valve seat (not depicted), respectively. Likewise, the body G232 can have a surface G278 forming a recess for mounting a seal that is configured to seal against a suction manifold (not depicted). What's common in any event is the seal construction of this technology transfers the seal wear from the body G232 to the less complex and less expensive mating component that is attached to the body G232.

FIG. 141 depicts the stuffing box sleeve G254 (FIG. 136) inserted into the plunger opening G250 so that a seal G260 mounted in the recess G258 formed by the surface G257 extends from that recess G258 and seals against the sealing surface G259 defined by the stuffing box sleeve G254. As the stuffing box sleeve G254 is inserted into this position air pressure forms in a space defined in the clearance gap between the outer diameter of the stuffing box sleeve G254 and the body bore defining the plunger opening G250 and between the seal G260 and a seal G286 at an opposing end of the stuffing box sleeve G254. The air pressure exerts a force urging the stuffing box sleeve G254 out of the plunger opening G250, complicating manufacture and degrading the seal integrity at the lower end of the stuffing box sleeve G254. A breather opening G284 can be formed between that space and ambient space above the stuffing box sleeve G254 to vent the air pressure.

FIG. 141 also depicts a conventional construction of the seal G286 that is mounted in a recess formed by the stuffing box sleeve G254 and extends from that recess to seal against the body bore defining the plunger opening G250. The contemplated embodiments can include combinations of the conventional construction and the construction of this technology where other matters come into play. For example, without limitation, it can be feasible to use a stuffing box sleeve G254 depicted in FIG. 141 if it can be manufactured or otherwise acquired less expensively than providing the recess instead in the body G232, and if the particular seal location is one that is not necessarily critical in its role for the overall design for maintaining the highly-pressurized fluid in the flow passage.

FIG. 141 also depicts employing the open-cylinder-shaped stuffing box sleeve G254 and securing it in place by advancing the retaining nut G256 (FIG. 136). That construction is illustrative and in no way limiting of the contemplated technology. Other configurations can be employed as well. For example, the skilled artisan understands that a conventional stuffing box can be employed that combines the stuffing box sleeve G254 and the retaining nut G256, unitarily, into one component that has a recess for supporting a seal configured to seal against the body bore defining the plunger opening G235. In other conventional constructions a stuffing box without that recess is used in combination with a seal carrier insert that mates with the stuffing box and provides the recess for mounting the seal. In yet other contemplated embodiments the stuffing box sleeve G254 can be modified to a construction combining a substantially cylindrical-shaped stuffing box to which is mated a seal surface insert that provides the sealing surface G259 (FIG. 136).

In FIG. 136, the sleeve G254 also protects the bore G252 from erosion by providing an inner diameter surface G264 against which the stuffing box packing (not depicted) seals. That, again, by design transfers the wear from the body G232 to the less complex and less expensive sleeve G254.

Summarizing, this technology contemplates a high pressure fluid flow apparatus constructed of a body defining a flow passage, a closure mounted to the body, and a means for sealing between the body and the closure. For purposes of this description and meaning of the claims the term "closure" means a component that is attached or otherwise joined to the body to provide a high-pressure fluid seal between the body and the closure.

Appendix H: Bellows System

The bellows system described in FIGS. 142-148 may be used with the fluid end previously described and in combination with all its components. For the purposes of the following description of FIGS. 142-148, reference numerals exclusive to those Figures will be used.

One drawback of conventional systems is that seals must be used to prevent leakage around the reciprocating plunger. Specifically, seals must be installed on the internal surface of the retainer nut, through which the plunger extends. Fracturing fluid is abrasive, and such fluid at high pressure may cause wear on the reciprocating plunger and damage to the seals over time. Therefore, it would be advantageous to limit the exposure of dynamic seals to the high pressure, abrasive fracturing fluid.

Turning to FIGS. 142-148, a fluid end H10 is shown. The fluid end has a manifold body or housing H11. The housing may be formed in one piece, or may be formed of multiple sections, such as sections H11a and H11b shown in FIGS. 142-145. When a multi-piece body H11 is used, through-holes H13 allow for connectors (not shown), such as bolts, to connect sections H11a, H11b.

The housing H11 typically has a first conduit H20 and a second conduit H21 formed within the body H11 that intersect to form an internal working chamber H22. The first conduit H20 is typically orthogonal to the second conduit H21. The first conduit H20 may have aligned first and second sections H23 and H24 that are situated on opposite sides of the internal chamber H22. The second conduit H21 may also be referred to herein as a plunger bore.

The conduits H20, H21 each may independently interconnect the internal chamber H22 to an external surface H27 of the fluid end H10. Fluid travels into the chamber H22 through an inlet opening H40 when an inlet valve H42 is open. Fluid travels out of the chamber H22 to a discharge opening H44 when a discharge valve H46 is open. A plunger H28 having a smooth external surface reciprocates within the plunger bore H21 to change the effective volume of the internal chamber H22. As shown, the plunger H28 is disposed in a bellows H100 seated within the plunger bore H21. The plunger H28 is driven by a power end (not shown) and powered by an engine.

As shown in FIGS. 142-144, fluid end H10 typically comprises three to five plungers H28 and an equal number of working chambers H22. In FIG. 142, a five-plunger, or quintiplex, fluid end H10 is shown. It should be understood that a bellows may be utilized in one, many, or all of the sections of a fluid end H10.

The first section H23 is a conduit that allows fluid to enter the body H11 at intake opening H40, and thereafter to move into the internal chamber. A one-way suction valve H42 is positioned within the first section H23, and prevents backflow in the direction of the intake opening H40.

The second section H24 is a conduit that allows fluid to exit the internal chamber H22, and thereafter leave the body H11 through the discharge opening H44. A one-way discharge valve H46 is positioned within the second section H24, and prevents backflow in the direction of the chamber H22.

A valve seat H29 is formed in each of the first and second sections H23 and H24. Each valve seat H29 is shaped to conform to a surface of the valve that is received within the same section. Thus, the valve seat H29 within the first section H23 conforms to a surface of the suction valve H42. Likewise, the valve seat H29 within the second section conforms to a surface of the discharge valve H46. The valves H42, H46 close against the removable valve seats H29 rather than against a surface of the manifold body H11. As wear due to valve closure occurs, that wear is focused primarily at the seats H29, rather than at the body H11. Replacement of worn seats is far less costly than replacement of a worn body H11. A spring H47 is received within each of the sections H23 and H24. Each spring engages the valve received within the same section, and biases that valve towards its seat.

Each plunger H28 may reciprocate out of phase with the other plungers. This phase relationship allows the fluid end H10 to maintain pressure within the body at an approximately constant level. Fluid output downstream from the body H11 is kept approximately constant as a result.

The fluid end H10 further comprises a bellows H100 and an annular retainer nut H102. The annular retainer nut H102 defines a centrally-disposed passage H104 therethrough. The plunger H28 extends through the passage H104 of the retainer nut H102 and into the bellows H100. Several kits are useful for assembling a fluid end H10. A first kit comprises the bellows H100, retainer nut H102, and plunger H28 for placement within the plunger bore H21 of a fluid end H10, as shown in FIG. 144. A second kit comprises the same bellows H100, retainer nut H102, and plunger H28 for placement in a second plunger bore. Third, fourth and fifth kits may be used as well. Additional components of the fluid end H10 may be added to any of these kits.

The bellows H100 is formed from a strong, durable and metallic material, and includes alternating folds or pleats H105. The bellows H100 may be made entirely of high-strength material, such as steel, or may be a composite of more than one such material. The pleats H105 permit the bellows H100 to move between retracted and extended positions. The bellows H100 has an exterior and interior. The exterior is exposed to the fluid and pressure of the internal chamber H22 and plunger bore H21 of the fluid end H10. The interior forms an internal cavity H106 that is isolated from the internal chamber H22 and plunger bore H21 by the bellows H100.

The portion of the plunger H28 extends through the passage H104 of the retainer nut H102 so that its end is disposed within the cavity H106. When in operation, the plunger H28 is at least partially surrounded by the bellows H100.

The cavity H106 is in fluid communication with a fluid passage H107 disposed in the annular retainer nut H102. The cavity H106 is filled with a fluid. The fluid may be incompressible fluid, such as water, hydraulic oil, motor oil, or mineral oil. By "incompressible", what is meant is a fluid with a very low compressibility. Such fluid is pumped via the fluid passage H107 into the cavity H106. Once filled, the cavity and fluid passage are sealed.

The volume of the fluid within the cavity is static. When the plunger H28 presses against the bellows H100, the cavity H106 deforms, and the fluid it contains is displaced. Such fluid displacement causes the bellows H100 to extend. As the plunger H28 retracts from the cavity, fluid fills the void left by the plunger, causing the bellows H100 to retract. Therefore, the cavity H106 displaces as shown by the difference between FIG. 146 and FIG. 147. The displacement of the cavity H106 is proportional to the additional plunger H28 volume disposed within the cavity.

The bellows H100 is positioned within the plunger bore H21, and secured at its first end H108 to the body H11. As shown, a stuffing sleeve H111 is disposed inside the plunger bore H21. The stuffing sleeve H111 surrounds the bellows adjacent its first end. This sleeve H10 is sealed against the body H11 at a radial seal H111. The sleeve H10 abuts the annular retainer nut H102. In one embodiment, the first end H108 may be attached to the body H11 adjacent the stuffing sleeve H110. As shown, the bellows H100 at its first end H108 is sandwiched between the retainer nut H102 and a shoulder formed in the stuffing sleeve H110.

A second end H109 of the bellows H100 extends within the plunger bore H21 towards the working chamber H22. The second end H109 may be circular to match the sectional shape of the plunger bore H21. As shown in FIG. 148, each of the plunger bore H21, stuffing sleeve H110, bellows H100, and plunger H28 have a circular cross-section.

The bellows H100 is not to scale in the Figures. The wall forming the pleats H105 of the bellows 100 may in fact be much thinner than shown in the Figures. In one embodiment, the bellows H100 may have a thickness of a tenth of an inch or less along its wall.

In operation, as the plunger H28 is pushed into the cavity H106, the pleats H105 unfold, causing the bellows H100 to accordion into its extended position. The second end H109 of the bellows H100 displaces fluid within the working chamber H22, forcing the fluid past the discharge valve H46 and out of the discharge opening H44. The bellows H100 is shown in its extended position in FIG. 147.

As the plunger H28 is retracted from the cavity H106, the pleats H105 fold and the bellows H100 accordions into a retracted position. As the second end H109 of the bellows withdraws from the working chamber H22, the discharge valve H46 closes and the suction valve H42 opens. Fluid is pulled into the working chamber H22 through the intake opening H40. The bellows H100 is shown in its retracted position in FIG. 146.

The cavity H106 should be maintained at approximately the same pressure as the working chamber H22. Such pressure equalization protects the structural integrity of the bellows H100. Too low a pressure in the cavity H106 may cause the bellows H100 to collapse, while too high a pressure in the cavity may cause the bellows H100 to balloon outward.

The fluid is provided at low pressure, or vacuum pressure, when the fluid end H10 is not in operation. When the fluid end H10 operates, the pressure within the working chamber H22 is transferred directly to the bellows H100. The bellows then exerts a force on the fluid within the cavity H106. This causes the pressure differential to be minimal between the chamber H22 and the cavity H106. In some embodiments, this pressure differential is less than 500 psi.

The fluid end further comprises a clean-out section H48 that may be closed by a removable retainer nut H50. Components of the fluid end H10, such as the valve seats H29, valves H42, H46, and various seals may be serviced or replaced through the clean-out section H48.

The second section H24 is likewise enclosed by a retainer nut H50. Each retainer nut H50 and annular retainer nut H102 may be attached to the fluid end body H11 by bolts H52 extending into the body H11. In the nut H102, opening spaced peripherally about the central opening H104 receive the bolts H52. Such an arrangement may allow the nut H102 to be affixed to the body H11 without internal threads within the plunger bore H21.

Another embodiment, not shown in the figures, does not include any bolts H52. Instead, external threads are provided on each of the retainer nuts H52 and H102. These external threads mate with internal threads formed within the conduit into which the retainer nut is installed. Specifically, internal threads may be formed on each of the clean out section H48, first section H23, second section H24, and plunger bore H21.

The annular retainer nut H102 defines one or more grooves H130 formed in the central passage H104. These annular grooves H130 each contain a radial seal H132. The radial seals H132 prevent leakage of fluid from the cavity H106 as the plunger H28 reciprocates. To minimize the risk of leakage, multiple seals at the central passage H104 is may be employed.

The seals H132 are the only seals in the plunger bore which seal against a moving surface. As discussed above, the fluid in the cavity H106 may be a hydraulic oil or motor oil. As this fluid is not abrasive, the seals H132 that protect cavity H106 experience relatively low levels of wear. In contrast, in a conventional fluid end, the seals that bear against moving surfaces are exposed to the abrasive fluids that move through the chamber H22. These seals experience much greater levels of wear.

Appendix I: Plug Configured to Provide Bore Clearance

Plugs discussed in FIGS. 149-152 may be used with the fluid end described herein and the valve bodies and valve seat architecture previously discussed. For the purposes of the following description of FIGS. 149-152, reference numerals exclusive to those Figures will be used.

FIGS. 149-152 show a suction plug I100, FIG. 149, and a discharge plug I102, FIG. 150. FIGS. 151-152 show the plugs I100, 102 assembled in a fluid end body 104 as they are during operation. Note the sealing surfaces I106 of the joints are on the respective plugs I100, I102 while the seals I108 are mounted in grooves I110 in the fluid end body I104.

The wear surface of the seal joint between the plugs and the body I104 is on the plugs I100, I102. The plugs I100, I102 can be replaced easier and with less expense than repairing the fluid end body. This does not require the seals I108 to be mounted in the fluid end body I104.

FIG. 62 shows a suction plug I100 with a generally cylindrical shape having a cylindrical axis I112. The suction plug I100 has a mounting flange I114 with mounting holes I116 through which bolts (not shown) are assembled to retain the suction plug I100 in its correct position in the fluid end body I104 during operation. The diameter of the portion of the suction plug I100 that is inserted into the fluid end body I104 to seal the suction bore I118 is generally smaller than the diameter of the mounting flange I114 and in this embodiment has multiple sections along the cylindrical axis I112 of the suction plug I100 with different diameters.

The sealing surface I106 of the suction plug I100 is the portion of the suction plug I100 inserted in the fluid end body I104 with the maximum outside diameter and is positioned opposite the seal I108 during operation as shown in FIG. 151. For proper sealing the diameter of the sealing surface I106 may be sized to have an interference fit with the inside diameter of the seal I108. This sizing also results in the smallest clearance between the outside diameter of the suction plug I100 and the inside diameter of the suction bore I118 of the fluid end body I104. This small clearance increases friction during assembly and disassembly. To minimize this friction the shortest axial segment possible is sized to the diameter needed for sealing. This shortest possible segment is the sealing surface I106 of the suction plug I100. The sections I120, I122 on either side, axially, of the sealing surface I106 have reduced diameters. The section I120 of the suction plug I100 the farthest distance away from the mounting flange I114, axially, may also have a chamfered nose 1124 to assist in the initial alignment of the suction plug I100 as it is inserted in the suction bore I118 and seal I108.

To assemble, the suction plug I100 is inserted in the suction bore I118 and an axial force is applied to the outside surface I126 sliding the sealing surface I106 and adjacent sections I120, I122 into the suction bore I118 along the cylindrical axis I112. Once the suction plug I100 is inserted far enough into the suction bore I118 the retention bolts are inserted through the mounting holes I116 of the mounting flange I114 and tightened into threaded holes (not shown) of the fluid end body I104. When the retention bolts are tightened to the appropriate torque the sealing surface I106 of the suction plug I100 is positioned to seal against the seal I108 installed in the fluid end body I104. Since the axial length of the sealing surface I106 has been minimized the axial force required to insert the suction plug I100 to the correct position in the fluid end body I104 has been reduced from that required to insert a plug with its entire inserted axial length the same diameter as that required for the sealing surface.

Another advantage of the smaller diameter sections I120, I122 before and after, axially, the larger diameter section of the sealing surface I106 is the diametrical clearance provided by the smaller diameter sections I120, I122 that allows the suction plug I100 to be rotated about an axis perpendicular I128 to the cylindrical axis I112 of the suction plug I100. This allows the suction plug I100 to be "rocked up and down" as the insertion force is being applied. The sealing surface I106 is the fulcrum for the perpendicular axis I128 rotation which allows the suction plug I100 to be worked in step wise. The suction plug I100 is rotated about the perpendicular axis I128 from the position where a first contact point I130 on the outside diameter of the smaller diameter section I122 closest to the mounting flange I114 contacts the inner diameter of the suction bore I118 while a second contact point 1132 diametrically opposite the first contact point I130 and on the smaller diameter section I120 farthest from the mounting flange I114, contacts a point on the inside diameter of the suction bore I118.

To disassemble, a threaded rod (not shown) is torqued into a threaded hole I134 in the outside surface I126 of the suction plug I100. The threaded hole I134 may be coincident with the cylindrical axis I112. The threaded rod may be a component of a slide hammer. A force is applied to the threaded rod to remove the suction plug I100 from the suction bore I118. The force may be generally along the cylindrical axis I112. The diametral clearance provided by the smaller diameter sections I120, I122 also allows the suction plug I100 to be rotated about the perpendicular axis I128 while the removal force is being applied along the cylindrical axis I112. This rotation allows the suction plug I100 to be worked out of the suction bore I118 in a step wise fashion using the sealing surface I106 as a fulcrum as described above. However, in this instance the suction plug I100 is being removed instead of inserted. The basic structure, assembly, and disassembly are the same for the discharge plug I102 and discharge bore I136.

Alternatively, material may be removed from the bores to provide the diametral clearances needed to allow the rotation of the plugs about the axis perpendicular to the cylindrical axis. In this embodiment the diameter of the bores are increased before and after the seals which has segment with an axial length of a smaller diameter to support the seals. The diameter of the plugs may be constant in this embodiment. One skilled in the art can appreciate the possibility of using any combination of reduced outside diameter of the plugs combined with an increased diameter of the bores to allow the rotation of the plugs about the perpendicular axis or possibly both increasing the diameter of the bores and decreasing the diameter of the plugs in areas that are not the sealing surface or supporting the seal. The fulcrum, or center of rotation would always be the sealing area of the plug and bore.

The diameter of the plugs may be reduced on only one side of the sealing surface. This would reduce the possible rotation about the perpendicular axis by approximately half but would still provide more opportunity for movement than no reduction at all. It is contemplated that the smaller diameter section could be either before or after the sealing surface, or may be a larger diameter section in the bores either before or after the seal, or could be both increased bore diameter and decreased plug diameter. This embodiment will also work with the typical fluid end sealing set up that has the seal in the plug.

The plugs may also be flangeless. The plugs may be inserted until they are flush with the fluid end body. A separate plate may be used to retain the plugs in position during operation or the plugs may be threaded on their outside diameter to engage a matching thread on the inside of the bores of the fluid end body. If threaded, the diametral clearances obtained by either increasing the bore dimeters, reducing the plug diameters, or both, may only be of assistance until the threads engage at which point the possibility of perpendicular axial rotation is eliminated, however, the increased clearance will still reduce the friction and thus the torque required to assemble and disassemble.

Appendix J: Two-Piece Fluid End

The fluid ends described above may be made in two pieces, as shown and described with reference to FIGS. 153-167. For the purposes of the following description of FIGS. 153-167, reference numerals exclusive to those Figures will be used.

In fluid ends known in the art, such as the fluid end J300 shown in FIGS. 166 and 167, a flange is machined into a fluid end body to provide a connection point for a plurality of stay rods. A flange J302 is shown formed in a fluid end body J304 in FIGS. 166 and 167. A plurality of stay rods J306 interconnect a power end J308 and the flange J302. The inventors have recognized that current fluid end designs including those in FIGS. 166-167 are problematic for several reasons.

The machining required to create a flange reduces the strength of the fluid end and produces stress concentrations that reduce the effective life of the fluid end. Machining the flange into the fluid end also entails wastage of significant amounts of removed raw material, and requires a significant investment of time and labor. These factors result in increased manufacturing costs.

One solution to the issues a machined flange presents is to remove the flange and attach the stay rods directly to the fluid end body. However, this solution requires uniquely designed stay rods that must be replaced with the fluid end each time the fluid end reaches the end of its lifespan. Such an approach may thus be disadvantageous during actual operation of the device.

To address these problems, the inventors have designed a multi-body-piece fluid end, embodiments of which are shown in FIGS. 153-165. Such designs, particularly those that are flangeless, may lead to less stress being placed on the fluid end during operation, resulting in increased product life. This design also uses fewer raw materials, reducing manufacturing costs. Still further, the construction of the fluid end permits it to be attached to a power end using traditional stay rods.

In general, fluid ends with multiple body pieces are contemplated by the present disclosure. Thus, the fluid end body is not formed from a monolithic piece of material as in certain prior art designs. As will be described below, FIGS. 153-154, for example, illustrate a fluid end with two body pieces, J20 and J22; this design achieves savings in raw materials (and thus cost), and also leads to less stress on the fluid end during operation, in part because of the flangeless design. That is, neither of body pieces J20 or J22 includes a flange, such as flange J302 shown in FIGS. 166-167. As used herein, a "flange" is used according to its ordinary meaning in the art, and includes a piece of a structural member that has a wider portion as compared to another portion of the structural member, such as a rim, rib, collar, plate, ring, etc. In FIGS. 166-167, for example, the flanged member has the shape of a half I-beam, or alternately a sideways "T"-shape. As used herein, a "flangeless" fluid end body piece is one that does not include a flange.

In embodiments with two body pieces, the second body piece, upon installation, is closer to the power end than the first body piece. In such an arrangement, a front side of the second body piece may engage with a back side of the front body piece in various manners. In certain embodiments, the first and second body pieces may be in flush engagement, meaning that the entire surface of the front side of the second body piece (excluding bores and through holes since these areas have no surface) is in contact with the back side of the first body piece. The concept of flush engagement thus includes embodiments in which the front side of the second body piece and the back side of the first body piece have the same surface dimensions, as well as embodiments in which the back side of the front body piece has at least one surface dimension that is larger than a corresponding surface dimension of the front side of the second body piece. In the former scenario, the front side of the second body piece may be said to align with and abut the back side of the first body piece. In other embodiments, the front side of the second body piece might have one or more beveled edges, such that it has slightly smaller dimensions than the back side of the first body piece. Flush engagement between the front side of the second body piece and the back side of the first body piece includes embodiments in which the engaging portions of the two surfaces are planar, as well as embodiments in which the surfaces are not planar. Alternately, the front side of the second body piece may be partially engaged with the back side of the second body piece, meaning that not every portion of the front side of the second body piece contacts a portion of the back side of the first body piece. Note that partial engagement between the two body pieces may exist both when the two pieces have the same surface dimensions (for example, certain portions of one or both of the pieces may project such that only those portions contact the other piece), as well as when the second body piece has at least one surface dimension that is greater than a corresponding surface dimension of the first body piece.

The present disclosure also contemplates fluid ends with more than two body pieces. For instance, the front side of the second body piece may engage with the back side of the first body piece via one or more spacer elements. For example, washers might be used to separate the first and second body pieces at a distance. In other embodiments, the spacer element may be a thin intervening body piece configured to be situated between the first and second body pieces. The portion of the fluid end nearest the power end upon installation can also be composed of multiple individual pieces ("a plurality of second fluid end body pieces"), each of which has a front side that can engage with the back side of the first body in one of the various manners described above. Whether the portion of the fluid end nearest the power end is composed of a single piece or two or more sub-pieces, this portion being flangeless may advantageously reduce internal stress on the fluid end and extend its life.

Turning now to the figures, FIGS. 153-154 show a fluid end J10 with two body pieces attached to a power end J12. The power end J12 comprises a housing J14 having a mounting plate J16 formed on its front end. A plurality of stay rods J18 attach to the mounting plate J16 and project from its surface. As will be discussed in more detail later herein, the fluid end J10 attaches to the projecting ends of the stay rods J18.

The fluid end J10 comprises a first body J20 releasably attached to a separate second body J22. The first and second bodies J20 and J22 both have a plurality of flat external surfaces J24, J26. Each surface J24, J26 may be rectangular in shape. The exterior surfaces J24 and J26 of each body J20 and J22 may be joined in the shape of a rectangular prism. However, the corner edges of such prism may be beveled. As will be discussed in more detail later herein, a back side J28 of the first body J20 is attached to a front side J30 of the second body J22. The bodies J20 and J22 are attached such that a portion of the external surface J24 of the first body J20 is in flush engagement with a portion of the external surface J26 of the second body J22.

With reference to FIG. 156, a plurality of rectilinear first bores J32 are formed in the first body J20. The plural first bores J32 are arranged in side-by-side relationship. Each of the first bores J32 extends through the entirety of the first body J20, interconnecting the top and bottom ends J34 and J36. At each of its opposed ends J34 and J36, the first bore J32 opens at the external surface J24. The diameter of each first bore J32 may vary throughout its length. Adjacent the top end J34 of the first body J20, each first bore J32 is closed by an installed component J38, as shown in FIG. 155. Each component J38 is releasably held within its first bore J32 by a retainer element J40 and fastening system J42, as shown in FIGS. 153-155, 157 and 158.

The components J38, retainer elements J40, and fastening system J42 shown in FIG. 155 comprise those described in U.S. patent application Ser. No. 16/035,126, authored by Foster, et al. (the '126 application). Likewise, the inner components of the fluid end J10, shown in FIG. 155, may comprise those inner components described in the '126 application.

At the bottom end J36 of the first body J20, each of the first bores J32 is joined by a conduit J44 to an inlet manifold J46, as shown in FIGS. 153-154. Fluid enters the fluid end J10 through the conduits J44 of the inlet manifold J46.

Continuing with FIG. 156, a plurality of rectilinear second bores J48 are formed in the first body J20. The plural second bores J48 are arranged in side-by-side relationship. Each of the second bores J48 extends through the entirety of the first body J20, interconnecting the front and back sides J50 and J28. At each of its opposed sides J50 and J28, each second bore J48 opens at the external surface J24. Each of the second bores J48 intersects a corresponding one of the first bores J32. Each second bore J48 may be disposed in orthogonal relationship to its intersecting first bore J32.

Adjacent the front side J50 of the first body J20, each second bore J48 is closed by an installed component J52, as shown in FIG. 155, which may be identical to the component J38. Each component J52 is releasably held within its second bore J48 by a retainer element J54 and fastening system J56, as shown in FIGS. 153-155 and 157. The retainer element J54 may be identical to the retainer element J40, and the fastening system J56 may be identical to the fastening system J42.

With reference to FIGS. 156, 158 and 159, a plurality of rectilinear bores J58, one of which is shown in FIG. 156, are formed in the second body J22. The bores J58 are arranged in side-by-side relationship. Each of the bores J58 extends through the entirety of the second body J22, interconnecting the front and back sides J30 and J60. At each of its opposed sides J30 and J60, each bore J58 opens at the external surface J26. Each bore J58 includes a counterbore J59 formed adjacent the back side J60 of the second body J22, as shown in FIGS. 156 and 158. Each bore J58 formed in the second body J22 registers with a corresponding one of the second bores J48 formed in the first body J20. When the bodies J20 and J22 are joined and aligned, each bore J58 becomes an extension of its associated second bore J48, as shown in FIG. 156.

With reference to FIG. 155, a plunger J62 is installed within each pair of aligned bores J48 and J58. A sealing arrangement J64 is installed within each pair of aligned bores J48 and J58, and surrounds the plunger J62 within those bores. Each sealing arrangement J64 comprises a stuffing box sleeve J66 that houses a series of annular packing seals J71. The stuffing box sleeves J66 and packing seals J71 may be selected from those described in the '126 application.

A retainer element J68 is installed within each bore J58, and holds the stuffing box sleeve J66 within such bore. Each retainer element J68 is secured to a flat bottom J69 of the counterbore J59 of its associated bore J58. A fastening system J70 holds the retainer element J68 in place. The seals J71 are compressed by a packing nut J72 threaded into an associated retainer element J68. The retainer elements J68, fastening system J70, plungers J62, and packing nuts J72 may be selected from those described in the '126 application.

Turning back to FIGS. 153-154, the power end J12 comprises a plurality of pony rods J74. Pony rods are known in the art as elongate rods that interconnect the crankshaft of a power end to each of the plungers positioned within a fluid end. Each pony rod J74 extends through a corresponding opening formed in the mounting plate J16. Each pony rod J74 is attached to a corresponding one of the plungers J62 by means of a clamp J76. An engine attached to the power end J12 drives reciprocating movement of the pony rods J74. Such movement of the pony rods J74 causes each plunger J62 to reciprocate within its associated pair of aligned bores J48 and J58. High pressure fluid pumped through the fluid end J10 by the plungers J62 exits the fluid end J10 through one or more outlet conduits J78.

With reference to FIGS. 158 and 159, each stay rod J18 comprises a cylindrical body J84 having opposed first and second ends J80 and J82. External threads are formed in the body J84 adjacent each of its ends J80 and J82. These threaded portions of the body J84 are of lesser diameter than the rest of the body J84. A step separates each threaded portion of the body from its unthreaded portion. Step J85 is situated adjacent the first end J80, and step J86 is situated adjacent the second end J82.

Continuing with FIG. 159, a plurality of internally threaded connectors J88 are supported on the front surface of the mounting plate J16. Each connector J88 mates with the threaded first end J80 of a corresponding stay rod J18. An integral nut J90 is formed on each stay rod J18 adjacent its first end J80. The nut J90 provides a gripping surface where torque may be applied to the stay rod J18 during installation. Once a stay rod J18 has been installed in a connector J88, its second end J82 projects from the front surface of the mounting plate J16. In alternative embodiments, the stay rods J18 may thread directly into holes formed in the mounting plate.

With reference to FIGS. 160-162, the second body J22 is secured to the stay rods J18 using a fastening system J92. The fastening system J92 includes a plurality of washers J94 and a plurality of internally threaded nuts J96. A plurality of bores J98 are formed about the periphery of the second body J22. The number of bores J98 may equal the number of stay rods J18. A single stay rod J18 is installed within each of the bores J98, at its second end J82, as shown in FIG. 162. Each bore J98 includes a counterbore J100 formed adjacent the front side J30 of the second body J22, as shown in FIGS. 160 and 162. Adjacent counterbores J100 may overlap each other, as shown in FIGS. 160 and 161. In alternative embodiments, each bore may be spaced from each adjacent bore such that their respective counterbores do not overlap.

A stay rod J18 is installed by inserting its second end J82 into the opening of the bore J98 formed in the back side J60 of the second body J22. The stay rod J82 is extended into the bore J98 until the step J86 abuts the back side J60, as shown in FIG. 162.

When a stay rod J18 is installed, its second end J82 projects within the counterbore J100 of its associated bore J98. To secure each stay rod J18 to the second body J22, a washer J94 and nut J96 are installed on the second end J82 of the stay rod J18, as shown in FIGS. 161 and 162. Each nut J96 and its underlying washer J94 press against a flat bottom J102 of the counterbore J100 within which they are installed. Each nut J96 is fully submerged within its recessed counterbore J10.

With reference to FIGS. 155-158, the first body J20 is secured to the second body J22 using a fastening system J104. The fastening system J104 comprises a plurality of studs J106, a plurality of washers J108, and plurality of internally threaded nuts J110. Each stud J106 comprises a cylindrical body J116 having a pair of opposed ends J112 and J114, as shown in FIGS. 155-157. Each of the ends J112 and J114 is externally threaded.

A plurality of internally threaded openings J118 are formed about the periphery of the first body J20, as shown in FIGS. 155-157. The first end J112 of each stud J106 mates with a corresponding one of the openings J118. Once a stud J106 has been installed in the first body J20, its second end J114 projects from the body's external surface J24, as shown in FIG. 158.

A plurality of through-bores J120 are formed about the periphery of the second body J22, as shown in FIGS. 155-157. The through-bores J120 are alignable with the plural studs J106 projecting from the first body J20.

To assemble the first and second bodies J20 and J22, the plural studs J106 are installed in the plural openings J118 of the first body J20. The first body J20 and installed studs J106 are positioned such that each through-bore J120 formed in the second body J22 is aligned with a corresponding stud J106. The first and second bodies J20 and J22 are then brought together such that each stud J106 is received within a corresponding through-bore J120. When the bodies J20 and J22 are thus joined, the second end J114 of each stud J106 projects from the back side J60 of the second body J22. Finally, a washer J108 and nut J10 are installed on the second end J114 of each stud J106, as shown in FIGS. 154-157, thereby securing the bodies together.

Continuing with FIG. 157, one or more pin bores J122 may be formed in the first body J20 adjacent its outer edges. Each pin bore J122 may receive a pin J124 that projects from the external surface J24 of the first body J20, as shown in FIGS. 157 and 158. These pins J124 may be installed within a corresponding bore J126 formed in the second body J22, as shown in FIGS. 157 and 158. The pins J124 help align the first and second bodies J20 and J22 during assembly of the fluid end J10.

The concept of a "kit" is described herein due to the fact that fluid ends are often shipped or provided unassembled by a manufacturer, with the expectation that an end customer will use components of the kit to assemble a functional fluid end. Accordingly, certain embodiments within the present disclosure are described as "kits," which are unassembled collections of components. The present disclosure also describes and claims assembled apparatuses and systems by way of reference to specified kits, along with a description of how the various kit components are actually coupled to one another to form the apparatus or system.

Several kits are useful for assembling the fluid end J10. A first kit comprises the first body J20 and the second body J22. The first kit may also comprise the fastening system J92 and/or the fastening system J104. The first kit may further comprise the components J38 or J52, sealing arrangements J64, retainer elements J40, J54 or J68, fastening systems J42, J56 or J70, packing nuts J72, plungers J62, and/or clamps J72, described herein.

With reference to FIGS. 158-160, the positioning of the bores J98 around the periphery of the second body J22 corresponds with the positioning of the stay rods J18 on the mounting plate J16. Thus, each second body J22 is constructed specifically to match different stay rod J18 spacing configurations known in the art.

As shown in FIGS. 154-158, the second body J22 has a lesser thickness than the first body J20 (thickness being measured in FIG. 154 along the line A-A, for example). However, the bodies J20 and J22 have the same depth and height, so that they form a rectangular prism when assembled. Thus, the front side of the second fluid end body and the back side of the first fluid body may have the same dimensions in some embodiments. In other embodiments, the dimensions of these opposing sides may be different. Also, it is noted that the corner edges of such prism may be beveled.

The first and second bodies J20, J22 may be formed from a strong durable material, such as steel. Because the first body J20 must receive fluids under conditions of high pressure, it may be formed from stainless steel or cast iron. In contrast, the second body J22 does not receive high pressure fluids: it serves only as a connection between the power end J12 and the first body J20. The second body J2 can thus be formed from a different, lower strength, and less costly material than the first body J20. For example, when the first body J20 is formed from stainless steel, the second body can be formed from a less costly alloy steel. Alternatively, the first and second bodies may be formed from the same material, such as stainless steel.

In order to manufacture the fluid end J10, the first and second bodies J20 and J22 are each cut to size from blocks of steel. Multiple first or second bodies J20 or J22 may be forged from the same block. In such case, the bodies J20 and J22 may be forged by dividing the block parallel to its length into multiple rectangular pieces. Because a flange is not forged from the block, material that is typically discarded may instead be used to form one of the first or second bodies J20 or J22. If the bodies J20 and J22 are formed from the same material, the first and second body J20 and J22 may be forged from the same block.

After the bodies J20 and J22 are formed, the bores and openings described herein are machined into each body J20 and J22. The studs J106, as well as the internal components shown in FIG. 155, including the components J38, retainer elements J40 and fastening system J42, are next installed in the first body J20. After the necessary bores have been formed in the second body J22, the sealing arrangements J64, retainer elements J68, fastening system J70, plungers J62 and packing nuts J72 described herein are installed. Prior to operation, the second body J22 is attached to the power end J12, and the first body J20 is attached to the second body J22.

During operation, the pumping of high-pressure fluid through the fluid end J10 causes it to pulsate or flex. Such motion applies torque to the fluid end J10. The amount of torque applied to the fluid end J10 corresponds to the distance between the power end J12 and the front side J50 of the fluid end: the moment arm.

In flanged fluid ends, such as the fluid end J300 shown in FIGS. 166 and 167, the applied torque is known to cause fatigue failures at the flanged connection point. A flanged connection point J310 is shown in FIGS. 166 and 167. Flanged fluid ends require space between the flange and the fluid end body to operate a wrench, as shown by a space J312. Such space is not needed with the fluid end J10. Thus, the moment arm associated with the fluid end J10 is decreased from that associated with flanged fluid ends. Therefore, less torque is applied to the fluid end J10 during operation than flanged fluid ends, which makes the fluid end J10 less susceptible to fatigue failures.

Turning to FIGS. 163-165, an alternative embodiment of a fluid end J200 is shown. The fluid end J200 comprises a first body J202 attached to separate second body J204. The second body J204 is machined to have a lesser thickness than that of the second body J22, shown in FIGS. 153-154. As described later herein, providing the second body J204 with a lesser thickness allows the first and second bodies J202 and J204 to be attached together using a single fastening system.

Continuing with FIGS. 163-165, the first and second bodies J202 and J204 each have a plurality of flat external surfaces J206 and J208. The surfaces J206 and J208 may be rectangular in shape. The exterior surfaces J206 and J208 of each body J202 and J204 may be joined in the shape of a rectangular prism. However, the corner edges of such prism may be beveled.

With reference to FIG. 165, a plurality of rectilinear first bores J210, one of which is shown in FIG. 165, are formed in the first body J202. The plural bores J210 are arranged in side-by-side relationship. Each first bore J210 extends through the entirety of the first body J202, interconnecting its top and bottom ends J212 and J214. At each of its opposed ends J212 and J214, the first bore J210 opens at the external surface J206.

Adjacent the top end J212 of the first body J202, each first bore J210 is closed by an installed component J213. Each component J213 is releasably held within its first bore J210 by a retainer element J215 and fastening system J217, as shown in FIGS. 163-165. The components J213, retainer elements J215, and fastening system J217 may be selected from those described in the '126 application.

Continuing with FIG. 165, a plurality of rectilinear second bores J216 are formed in the first body J202. The plural second bores J216 are arranged in side-by-side relationship.

Each second bore J216 extends through the entirety of the first body J202, interconnecting its front and back sides J218 and J220. At each of its opposed sides J218 and J220, each second bore J216 opens at the external surface J206. The second bores J216 each intersect a corresponding one of the first bores J210. Each second bore J216 may be disposed in orthogonal relationship to its intersecting first bore J210.

Adjacent the front side J218, each second bore J216 is closed by an installed component J221, which may be identical to the component J213. Each component J221 is releasably held within its second bore J216 by a retainer element J223 and fastening system J225, as shown in FIGS. 164 and 165. The retainer element J223 may be identical to the retainer element J215, and the fastening system J225 may be identical to the fastening system J217.

Continuing with FIG. 165, a plurality of bores J222, one of which is shown in FIG. 165, are formed in the second body J204. The bores J222 are arranged in side-by-side relationship. Each bore J222 extends through the entirety of the second body J204, interconnecting its front and back sides J224 and J226. At each of its opposed sides J224 and J226, each bore J222 opens at the external surface J208. Each bore J222 formed in the second body J204 registers with a corresponding one of the second bores J216 formed in the first body J202. When the bodies J202 and J204 are joined and aligned, each bore J222 becomes an extension of its associated second bore J216.

With reference to FIG. 164, a plurality of bores J228 are formed in the outer periphery of the first body J202. Each bore J228 includes a counterbore J230 positioned immediately adjacent the front side J218 of the first body J202. The bores J228 are each alignable with a plurality of corresponding through-bores J232 formed about the periphery of the second body J204, as shown in FIGS. 163-164.

A fastening system is used to secure the first body J202 to the second body J204. The fastening system comprises a plurality of stay rods, similar to stay rods J18, and a plurality of nuts and washers. The stay rods are installed within each aligned bore J228 and J232. A nut and washer is torqued on the end of each stay rod within each corresponding counterbore J230. The bodies J202 and J204 are attached such that the back side J220 of the first body J202 is in flush engagement with the front side J224 of the second body J204.

Continuing with FIG. 164, in order for a stay rod to extend the length between the first and second bodies J202 and J204, the second body J204 is machined to have a lesser thickness than the second body J22, shown in FIGS. 153-158. Such decrease in size is possible because a plurality of sealing arrangements J234 used with the second body J204 are primarily positioned outside of the second body J204, as shown in FIG. 165. Each sealing arrangement J234 comprises a stuffing box sleeve J236 that houses a series of packing seals J238. The stuffing box sleeves J236 and packing seals J238 may be selected from those described in the '126 application.

As shown in FIG. 165, each bore J222 formed in the second body J204 includes a counterbore J242 that opens on the back side J226 of the second body J204. A removable box gland J240 is closely received within each counterbore J242. The removable box glands J240 are each tubular sleeves having open first and second ends J241 and J244. Each second end J244 has a flanged outer edge J245 that is sized to be closely received within each counterbore J242. Each sealing arrangement J234 is housed at least partially within a corresponding removable box gland J240.

A plurality of openings J246 are formed in the flanged outer edge J245 of each box gland J240. The openings J246 correspond with a plurality of openings (not shown) formed in a flat bottom J250 of each counterbore J242. A plurality of fasteners may be installed within the opening J246 and the opening formed in the bottom J250. When installed, the fasteners releasably secure each box gland J240 to the second body J204.

Continuing with FIG. 163-165, a retainer element J252 and fastening system hold the sleeve J236 within the box gland J240 and aligned with bores J222 and J242, as shown in FIG. 165. The retainer element J252 and fastening system may be the same as the retainer element J68 and fastening system J70, as shown in FIG. 155. The seals J238 are compressed by a packing nut J254 threaded into an associated retainer element J252, as shown in FIG. 165. A plunger J258 is installed within each pair of aligned bores J216 and J222.

Several kits are useful for assembling the fluid end J200. A first kit comprises the first body J202 and the second body J204. The first kit may also comprise the fastening system described with reference to FIG. 165 to attach the bodies J202 and J204. The first kit may further comprise the components J213 or J221, removable box glands J240, sealing arrangements J234, retainer elements J215, J223 or J252, fastening system J217, J225 or the fastening system used with the box gland J240, packing nuts J254, and/or plungers J258, described herein.

The bodies J202 and J204 may be formed of the same material as the bodies J20 and J22. Likewise, the bodies J202 and J204 may be manufactured in the same manner as the bodies J20 and J22.

The plurality of washers used with each fastening system J92 and J104, shown in FIGS. 155-158, 161 and 162, may be configured to allow a large amount of torque to be applied to the nuts without using a reaction arm. Instead, the washer itself may serve as the counterforce needed to torque a nut onto a stud. Not having to use a reaction arm increases the safety of the assembly process. The same is true for the washers that may be used with the fastening system described with reference to FIG. 164.

The nuts used with the fastening systems J92 and J104 may also comprise a hardened inner layer to help reduce galling between the threads of the nuts and studs during the assembly process. The same is true for the nuts that may be used with the fastening system described with reference to FIG. 164. An example of the above described washers, nuts, and methods are described in Patent Cooperation Treaty Application Serial No. PCT/US2017/020548, authored by Junkers, et al.

Changes may be made in the construction, operation and arrangement of the various parts, elements, steps and procedures described herein. For example, certain embodiments of the second fluid end body piece (or pieces) are described above as "flangeless." In other embodiments, a minimally flanged fluid end body piece may also be utilized. Consider the surface dimension of the wider portion of the flanged piece to the narrower portion of the piece—for example, the height of the portion of flange J302 in FIG. 166 to the height of the narrower portion that engages with the first body piece. In one set of embodiments, the ratio r of the height (or other corresponding surface dimension) of the narrower portion to the height (or other corresponding surface dimension) of the wider portion may be 0.90<r<1.0; in other embodiments the ratio r may be 0.95<r<1.0.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A fluid end, comprising:
a fluid end body of single-piece construction and having an external surface and an internal chamber and comprising:
a first conduit having a first axis extending therethrough and having first and second sections, each section independently interconnecting the internal chamber and the external surface;
a second conduit intersecting the first conduit and having third and fourth sections, each section independently interconnecting the internal chamber and the external surface;
a discharge valve installed within the first section of the first conduit; and
an intake valve installed within the second section of the first conduit; in which the discharge and intake valves move between open and closed positions along the first axis;
in which no flange is formed on the fluid end body; and
a connect plate releasably attached to the fluid end body using a plurality of threaded studs, each stud installed within the fluid end body and the connect plate, the connect plate comprising:
a third conduit aligned with the second conduit and configured to receive a reciprocating plunger.

2. The fluid end of claim 1, in which the connect plate is attached to the fluid end body such that at least a portion of the connect plate is in flush engagement with the fluid end body.

3. The fluid end of claim 1, in which the fluid end body further comprises:
a plurality of threaded openings; and
in which the connect plate further comprises:
a plurality of through-bores, in which each through-bore is aligned with one of the plurality of threaded openings in a one-to-one relationship;
in which each of the plurality of studs is installed within a corresponding threaded opening and a corresponding through-bore in a one-to-one relationship.

4. The fluid end of claim 3, in which the plurality of through-bores are characterized as a first plurality of through-bores, and the connect plate further comprises:
a second plurality of through-bores;
in which the second plurality of through-bores are configured to receive a plurality of stay rods in a one-to-one relationship; in which the plurality of stay rods are configured to attach the connect plate to a power end.

5. The fluid end of claim 1, further comprising:
a stuffing box installed within at least a portion of the second conduit and at least a portion of the third conduit;
a plunger packing installed within at least a portion of the stuffing box; and
a reciprocating plunger installed within the plunger packing and the stuffing box.

6. The fluid end of claim 5, further comprising:
an annular groove formed in the fluid end body surrounding the second conduit; and
a seal installed within the annular groove;
in which at least a portion of the seal engages an outer surface of the stuffing box.

7. The fluid end of claim 5, in which the stuffing box is secured to the fluid end body using a plurality of fasteners.

8. The fluid end of claim 1, in which the connect plate is of single-piece construction.

9. The fluid end of claim 1, in which a wall surrounding the first conduit has a tapered surface, and in which the intake valve comprises:
a valve seat having a tapered outer surface;
in which the valve seat is installed within the first conduit such that the tapered outer surface of the valve seat engages the tapered surface of the first conduit.

10. The fluid end of claim 1, in which the intake valve comprises:
a valve seat installed within the first conduit, the valve seat comprising:
a sealing surface have an annular recess formed therein; and
a hardened insert installed within the recess.

11. The fluid end of claim 1, in which the fluid end has the shape of a rectangular prism.

12. The fluid end of claim 1, in which the connect plate has the shape of a rectangular prism.

13. The fluid end of claim 1, in which the fluid end body and the connect plate have the same height and width.

14. An apparatus, comprising:
a connect plate having opposed front and rear surfaces and configured to interface between a fluid end body and a power end, the connect plate comprising:
a plurality of horizontal bores positioned in a side-by-side relationship and alignable with a plurality of horizontal bores formed in the fluid end body; in which the plurality of horizontal bores formed in the connect plate are configured to receive a plurality of stuffing boxes in a one-to-one relationship, each stuffing box configured to receive a reciprocating plunger in a one-to-one relationship;
a plurality of first through-bores, each of the plurality of first through-bores configured to receive a stud in a one-to-one relationship, the studs configured to attach the fluid end body to the connect plate; and
a plurality of second through-bores, each of the plurality of second through-bores configured to receive a stay rod in a one-to-one relationship, the stay rods configured to attach the connect plate to the power end such that the rear surface of the connect plate faces and is in a spaced-relationship with a front surface of the power end.

15. The apparatus of claim 14, in which the connect plate has the shape of a rectangular prism.

16. The apparatus of claim 14, in which no flange is formed on the connect plate.

17. An apparatus comprising:
a fluid end body of single-piece construction and configured to attach to a connect plate such that at least a portion of the fluid end body is in flush engagement with the connect plate, the connect plate configured to interface between the fluid end body and a power end;
the fluid end body having an external surface and an internal chamber and comprising:

a first conduit formed in the fluid end body and having a first axis extending therethrough, the first conduit having first and second sections, each section independently interconnecting the internal chamber and the external surface; in which the first section is configured to receive a discharge valve; in which the second section is configured to receive an intake valve; and in which the discharge and intake valves are configured to move between open and closed positions along the first axis;

a second conduit formed in the fluid end body, intersecting the first conduit and having third and fourth sections, each section independently interconnecting the internal chamber and the external surface; in which the second conduit is configured to align with a conduit formed in the connect plate; and a plurality of threaded openings formed in the fluid end body, each of the plurality of openings configured to receive a stud in a one-to-one relationship, the studs configured to releasably attach the fluid end body to the connect plate;

in which no flange is formed on the fluid end body.

18. The apparatus of claim 17, in which the connect plate has the shape of a rectangular prism.

19. The apparatus of claim 17, in which the second conduit is configured to receive a reciprocating plunger.

20. A fluid end, comprising:
a fluid end body having an external surface and an internal chamber and comprising:
a first conduit having first and second sections, each section independently interconnecting the internal chamber and the external surface;
a second conduit intersecting the first conduit and having third and fourth sections, each section independently interconnecting the internal chamber and the external surface;
a connect plate releasably attached to the fluid end body using a plurality of threaded studs, each stud installed within the fluid end body and the connect plate, the connect plate comprising:
a third conduit aligned with the second conduit;
a stuffing box installed within at least a portion of the second conduit and at least a portion of the third conduit; in which the stuffing box is secured to the fluid end body using a plurality of fasteners;
a plunger packing installed within at least a portion of the stuffing box; and
a reciprocating plunger installed within the plunger packing and the stuffing box.

21. A fluid end, comprising:
a fluid end body of single-piece construction and having an external surface and an internal chamber and comprising:
a first conduit having a first axis extending therethrough and having first and second sections, each section independently interconnecting the internal chamber and the external surface;
a second conduit intersecting the first conduit and having third and fourth sections, each section independently interconnecting the internal chamber and the external surface;
a discharge valve installed within the first section of the first conduit; and
an intake valve installed within the second section of the first conduit; in which the discharge and intake valves move between open and closed positions along the first axis; and
a plurality of threaded openings; and
a connect plate releasably attached to the fluid end body using a plurality of threaded studs, each stud installed within the fluid end body and the connect plate, the connect plate comprising:
a third conduit aligned with the second conduit and configured to receive a reciprocating plunger;
a plurality of first through-bores, in which each first through-bore is aligned with one of the plurality of threaded openings in a one-to-one relationship;
in which each of the plurality of studs is installed within a corresponding threaded opening and a corresponding first through-bore in a one-to-one relationship; and
a plurality of second through-bores;
in which the plurality of second through-bores are configured to receive a plurality of stay rods in a one-to-one relationship; in which the plurality of stay rods are configured to attach the connect plate to a power end.

22. The fluid end of claim 1, in which the external surface of the fluid end body comprises opposed top and bottom surfaces; and in which the first section of the first conduit opens at the top surface and the second section of the first conduit opens at the bottom surface, the fluid end further comprising:
an intake manifold attached to the bottom surface of the fluid end body and in fluid communication with the internal chamber.

* * * * *